(12) United States Patent
Oki et al.

(10) Patent No.: US 8,081,881 B2
(45) Date of Patent: *Dec. 20, 2011

(54) OPTICAL NODE DEVICE, NETWORK CONTROL DEVICE, MAINTENANCE-STAFF DEVICE, OPTICAL NETWORK, AND 3R RELAY IMPLEMENTATION NODE DECISION METHOD

(75) Inventors: Eiji Oki, Tokyo (JP); Akira Misawa, Tokyo (JP); Masaru Katayama, Tokyo (JP); Satoru Okamoto, Yokohama (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 12 days.

This patent is subject to a terminal disclaimer.

(21) Appl. No.: 12/417,173

(22) Filed: Apr. 2, 2009

(65) Prior Publication Data

US 2009/0196608 A1 Aug. 6, 2009

Related U.S. Application Data

(62) Division of application No. 12/255,923, filed on Oct. 22, 2008, now Pat. No. 7,720,390, which is a division of application No. 10/531,507, filed as application No. PCT/JP2004/003301 on Mar. 12, 2004, now Pat. No. 7,630,649.

(30) Foreign Application Priority Data

Mar. 14, 2003 (JP) ................. 2003-069216
Mar. 14, 2003 (JP) ................. 2003-069223
Mar. 14, 2003 (JP) ................. 2003-069233
Mar. 14, 2003 (JP) ................. 2003-069246

(51) Int. Cl.
*H04B 10/00* (2006.01)
*H04B 10/02* (2006.01)
*H04B 10/08* (2006.01)
*H04B 10/20* (2006.01)

(52) U.S. Cl. ................. 398/175; 398/6; 398/25; 398/33; 398/58; 398/154; 398/155

(58) Field of Classification Search ................. 398/25, 398/49, 57, 175, 6, 33, 58, 154, 155
See application file for complete search history.

(56) References Cited

U.S. PATENT DOCUMENTS 6,256,125 B1 7/2001 Uehara
(Continued)

FOREIGN PATENT DOCUMENTS

EP 1 049 272 A2 11/2000
(Continued)

OTHER PUBLICATIONS

Eiji Oki, Daisaku Shimazaki, Kohei Shiomoto, Nobaki Matsuura, Wataru Imajuku and Naoaki Yamanaka, "Performance Evaluation of Distributed-Controlled Dynamic Wavelength-Conversion GMPLS Networks", Technical Report of IEICE, The Institute of Electronics, Information and Communication Engineers, Feb. 2002, pp. 5-10.

(Continued)

*Primary Examiner* — Dalzid Singh
(74) *Attorney, Agent, or Firm* — Harness, Dickey & Pierce, P.L.C.

(57) ABSTRACT

An economical optical network is constituted by effectively using network resources by using the minimum number of, or minimum capacity of 3R repeaters. 3R section information corresponding to topology information on the optical network to which an optical node device itself belongs is stored, and the 3R section information stored is referred so as to autonomously determine whether or not the optical node device itself is an optical node device for implementing the 3R relay when setting an optical path passing through the optical node device itself. Alternatively, when the optical node device itself is a source node, another optical node device for implementing the 3R relay among the other optical node devices through which the optical path from the optical node device itself to the destination node passes is identified, and this identified optical node device is requested to implement the 3R relay when setting an optical path in which the optical node device itself is a source node.

4 Claims, 66 Drawing Sheets

U.S. PATENT DOCUMENTS

| | | | |
|---|---|---|---|
| 6,694,273 | B2 | 2/2004 | Kurooka et al. |
| 6,757,494 | B2 | 6/2004 | Lu et al. |
| 7,190,902 | B2 | 3/2007 | Solheim et al. |
| 7,630,649 | B2 * | 12/2009 | Oki et al. ............... 398/177 |
| 7,720,390 | B2 * | 5/2010 | Oki et al. ............... 398/158 |
| 2002/0063915 | A1 | 5/2002 | Levandovsky et al. |
| 2002/0093712 | A1 | 7/2002 | Fukashiro et al. |
| 2002/0196490 | A1 | 12/2002 | Smith |
| 2003/0128981 | A1 | 7/2003 | Shiomoto et al. |
| 2003/0147645 | A1 * | 8/2003 | Imajuku et al. ............ 398/7 |
| 2003/0189933 | A1 | 10/2003 | Ozugur et al. |
| 2004/0208558 | A1 | 10/2004 | Roorda et al. |
| 2004/0208587 | A1 * | 10/2004 | Chang et al. ............ 398/100 |
| 2007/0212065 | A1 | 9/2007 | Shin et al. |
| 2008/0226303 | A1 * | 9/2008 | Tanaka et al. ............ 398/159 |
| 2010/0040367 | A1 * | 2/2010 | Oki et al. ............... 398/45 |

FOREIGN PATENT DOCUMENTS

| | | |
|---|---|---|
| JP | 02-052535 | 2/1990 |
| JP | H10-032436 | 2/1998 |
| JP | 2001-144693 | 5/2001 |
| JP | 2002-261692 | 9/2002 |
| JP | 2003-234771 A | 8/2003 |
| JP | 2003-244098 A | 8/2003 |
| JP | 2004-048477 | 2/2004 |

OTHER PUBLICATIONS

Ken-ichi Sato, Naoaki Yamanaka, Yoshihiro Takigawa, Masafumi Koga, Satoru Okamoto, Kohei Shiomoto, Eiji Oki and Wataru Imajuku, "GMPLS-Based Photonic Multilayer Router (Hikari Router) Architecture: An Overview of Traffic Engineering and Signaling Technology", IEEE Communications Magazine, Mar. 2002, pp. 96-101.

Eiji Oki, Daisaku Shimazaki, Kohei Shiomoto, Nobuaki Matsuura, Wataru Imajuku and Naoaki Yamanaka, "Performance of Distributed-Controlled Dynamic Wavelength-Conversion GMPLS Networks", First International Conference on Optical Communications and Networks 2002, Nov. 11-14, 2002, Shangri-La Hotel, Singapore.

A. Banerjee et al, "Generalized Multiprotocol Label Switching: An Overview of Routing and Management Enhancements", IEEE Communications Magazine, pp. 144-150, Jan. 2001.

A. Banerjee et al., "Generalized Multiprotocol Label Switching: An Overview of Signaling Enhancements and Recovery Techniques", IEEE Communications Magazine, pp. 144-151, Jul. 2001.

S. Okamoto et al., "Demonstration of the Highly Reliable HIKARI Router Network Based on a Newly Developed Disjoint Path Selection Scheme", IEEE Communications Magazine, pp. 52-59, Nov. 2002.

D. Shimazaki et al., "Performance of Distributed-Controller Dynamic Wavelength-Conversion Optical Networks", Technical Report of IEICE, the Institute of Electronics, Incormation and Communication Engineers, PN2002-51 (Oct. 2002), pp. 11-16 (English Abstract).

Hjalmtysson, Gisli, et al., "Smart Routers—Simple Optics: An Architecture for the Optical Internet," Journal of Lightwave Technology, vol. 18, No. 12, Dec. 2000, pp. 1880-1891.

* cited by examiner

OPTICAL NODE DEVICE, NETWORK CONTROL DEVICE, MAINTENANCE-STAFF DEVICE, OPTICAL NETWORK, AND 3R RELAY IMPLEMENTATION NODE DECISION METHOD

CROSS-REFERENCE TO RELATED APPLICATIONS

This application is a divisional of U.S. patent application Ser. No. 12/255,923 filed Oct. 22, 2008 which is a divisional of U.S. patent application Ser. No. 10/531,507 filed Apr. 14, 2005 which is a National Stage of International Application No. PCT/JP2004/003301 filed Mar. 12, 2004. Priority is claimed on Japanese Patent Application No. 2003-069216, Japanese Patent Application No. 2003-069223, Japanese Patent Application No. 2003-069233, and Japanese Patent Application No. 2003-069246, each filed Mar. 14, 2003. The entire disclosures of each of the above applications are incorporated herein by reference.

TECHNICAL FIELD

The present invention is used in optical networks that switch optical signals. In particular, the present invention relates to optical networks including optical node devices that implement 3R (Reshaping, Retiming, and Regenerating) relay.

BACKGROUND ART

In an optical network, it may be necessary to provide 3R relay partway along an optical transmission path, in consideration of deterioration and loss in the fiber, and crosstalk. FIG. 87 shows a conventional optical network configuration. In order to provide 3R relay, 3R repeaters 1002 are inserted into each optical node device 1001 provided partway along an optical transmission path. In practice, since transmission is possible up to a certain distance without 3R relay, a 3R repeater 1002 is not necessarily provided in every optical node device 1001. However, since the distance over which transmission is possible without 3R relay differs depending on the performance of optical devices contained in the optical node device, the material of the optical fiber between the optical node devices, and the wavelengths used, the distance cannot be determined uniformly, and there is no efficient method of obtaining the distance over which transmission is possible without 3R relay over a whole optical network. Conventionally, as shown in FIG. 87, a 3R repeater 1002 is inserted into each stage so that deterioration of an optical signal can be compensated regardless of the route through which a path is established (for example, refer to non-patent documents 1, 2 and 3).

Non-patent document 1: Eiji Oki, Daisaku Shimazaki, Kohei Shiomoto, Nobaki Matsuura, Wataru Imajuku, and Naoaki Yamanaka, "Performance Evaluation of Distributed-Controlled Dynamic Wavelength-Conversion GMPLS Networks", Technical report of IEICE, The Institute of Electronics, Information and Communication Engineers, February 2002, pp. 5-10.

Non-patent document 2: Ken-ichi Sato, Naoaki Yamanaka, Yoshihiro Takigawa, Masafumi Koga, Satoru Okamoto, Kohei Shiomoto, Eiji Oki, and Wataru Imajuku, "GMPLS-Based Photonic Multilayer Router (Hikari Router) Architecture: An Overview of Traffic Engineering and Signaling Technology", IEEE Communications Magazine, March 2002, pp. 96-101.

Non-patent document 3: Eiji Oki, Daisaku Shimazaki, Kohei Shiomoto, Nobuaki Matsuura, Wataru Imajuku, and Naoaki Yamanaka, "Performance of Distributed-Controlled Dynamic Wavelength-Conversion GMPLS Networks", First International Conference on Optical Communications and Networks 2002, Nov. 11-14, 2002, Shangri-La Hotel, Singapore.

3R repeaters are expensive, so if the use of 3R repeaters is avoided as much as possible, optical networks can be realized extremely economically. However, conventionally, there is no effective method of obtaining the distance over which transmission is possible without 3R relay over a whole optical network. Hence it is not possible to determine the places where 3R repeaters do not need to be provided.

Furthermore, conventionally, in each optical node device, 3R relays are provided in all optical paths passing through the concerned optical node device. Therefore, 3R repeaters are needed to provide 3R relay capability in a large number of optical paths at the same time, and it is difficult to achieve low cost.

DISCLOSURE OF INVENTION

The present invention is made under such a background, with an object of providing an optical node device and an optical network that can use network resources effectively using the minimum number of, or minimum capability of, 3R repeaters necessary, and configure economical optical networks.

In the present invention, by using 3R sections, being the sections in which data transmission is possible without 3R relay, efficiently, or generating 3R section information efficiently, it is possible to eliminate the waste of providing 3R repeaters in places that do not require 3R relay, achieve effective usage of network resources, and reduce the cost of optical networks. Furthermore, by identifying the places that require 3R relay, it is possible to extract an optical path that actually requires 3R relay in an optical node device from among a plurality of optical paths that pass optical node devices having 3R repeaters to provide 3R relay only on this optical path. Hence it is possible to reduce the capability of the 3R repeaters. Consequently, network resources can be used effectively, and thus it is possible to reduce the cost of the optical network.

Here, in the following description, a preset section in which data transmission is possible without 3R relay is defined as a 3R section, an optical node device at a start point of the 3R section is defined as a 3R source node, an optical node device at an end point of the 3R section is defined as a 3R destination node, an optical node device, being a source of a setting request for an optical path, is defined as a source node, an optical node device at an end point of the optical path is defined as a destination node, and when the optical path is bi-directional, an optical path directed away from the source node toward the destination node is defined as a downstream optical path, and an optical path directed away from the destination node toward the source node is defined as an upstream optical path.

That is, a first aspect of the present invention is an optical node device that switches an optical signal, the optical node device comprising: a storing unit which stores 3R section information corresponding to topology information of an optical network to which the optical node device itself belongs; and a determining unit which determines autonomously whether the optical node device itself is an optical node device that implements 3R relay when setting an optical path passing through the optical node device itself, with reference to the 3R section information stored in the storing unit which stores the 3R section information.

As described above, by storing 3R section information in each optical node device, when an optical path is established in itself, if the source node of the optical path is identified, it is possible to determine autonomously whether or not itself implements 3R relay of an optical signal transmitted through the optical path.

Alternatively, an optical node device of the present invention may be provided with: a storing unit which stores 3R section information corresponding to topology information of an optical network to which the optical node device itself belongs; an identifying unit which identifies another optical node device which implements 3R relay among other optical node devices through which an optical path from the optical node device itself to the destination node passes with reference to the 3R section information stored in the storing unit, when the optical node device itself is the source node; and a unit which requests 3R relay be implemented in the other optical node device identified by the identifying unit, when setting an optical path in which the optical node device itself is the source node.

In this manner, since the optical node device other than the source node does not need to determine whether 3R relay is implemented or not, it is possible to reduce the processing load accordingly. For example, in the case where a large number of optical paths passes through an optical node device and the processing load becomes enormous due to determining whether 3R relay is implemented or not for every optical path, it is possible to reduce the processing load by identifying, from amongst the other optical node devices through which the optical paths pass on their way to their destination nodes, only the other optical node devices that implement 3R relay in optical paths whose source nodes are the present optical node device. Furthermore, in this case, only the optical node device corresponding to the source node must store 3R section information, so it is possible to use information storage resources effectively.

Alternatively, an optical node device of the present invention may be provided with: a storing unit which stores 3R section information corresponding to topology information of an optical network to which the optical node device itself belongs when the optical node device itself is an optical node device through which an optical path between the source node and the destination node passes; and a determining unit which determines autonomously whether the optical node device itself is an optical node device that implements 3R relay in the optical path, based on the 3R section information stored in the storing unit.

In this manner, since each optical node device stores 3R section information only when an optical path passes through each optical node device itself, it is possible to use the information storage resources effectively.

Furthermore, when the optical path is a bi-directional optical path, the determining unit or the identifying unit is preferably provided with a unit which decides which optical node device implements 3R relay in both the downstream optical path and the upstream optical path.

In this manner, at the time that a bi-directional path setting is signaled, it is possible to decide which optical node device implements 3R relay in both the upstream and downstream directions, and immediately after signaling completion, optical signals can be transmitted. Thus it is possible to set optical paths promptly.

Moreover, when one optical node device is a 3R source node of any one of a plurality of different 3R sections overlapping on an optical path that passes through the one optical node device, and the one optical node device is not a 3R source node or 3R destination node of other 3R sections, the determining unit or the identifying unit is preferably provided with: a comparing unit which compares the number of 3R relay implementations for both the case where the one optical node device functions as a 3R source node and where the one optical node device does not function as a 3R source node, with reference to the 3R section information related to an optical path from the one optical node device to the destination node; and a unit which, when the number of 3R implementations in the case where the one optical node device functions as a 3R source node is less than the number of 3R implementations in the case where the one optical node device does not function as a 3R source node, decides that the one optical node device is an optical node device that implements 3R relay based on a comparison result from the comparing unit.

In this manner, since an optical signal can be transmitted by the minimum number of 3R relay operations possible, it is possible to use network resources effectively using the minimum number of, or minimum capability of, 3R repeaters necessary, and configure economical optical networks.

Furthermore, when one optical node device is an optical node device corresponding to a 3R destination node, and is not a destination node, the determining unit or the identifying unit is preferably provided with a unit which decides that the one optical node device is an optical node device that implements 3R relay by using the one optical node device as a 3R source node, and a next hop optical node device as a 3R destination node.

In this manner, even in the case where one optical node device is a 3R destination node, and this one optical node device does not store 3R section information ahead of itself, it is possible to realize 3R relay transmission without delay.

Moreover, when one optical node device does not belong to any one of 3R sections having a 3R source node on an optical path that passes through the one optical node device, the determining unit or the identifying unit is preferably provided with a unit which decides that the one optical node device is an optical node device that implements 3R relay by using the one optical node device as a 3R source node, and a next hop optical node device of the one optical node device as a 3R destination node.

Furthermore, preferably there is provided a unit which, when one optical node device is a 3R source node in an upstream optical path, and is not a destination node, and the one optical node device is not a 3R destination node in the upstream optical path, transmits a message in order to transmit information to a previous hop optical node device in the upstream optical path that the previous hop optical node device is a 3R source node which uses the one optical node device as a 3R destination node, wherein the determining unit or the identifying unit is provided with a unit which decides that the optical node device itself is a 3R source node in the upstream optical path with an optical node device which has sent the message as a 3R destination node when the optical node device itself receives the message in the upstream optical path.

In this manner, even if the optical node device does not correspond to any one of the pieces of existing 3R section information, it is possible for this optical node device to implement 3R relay without delay. Accordingly, 3R section information for all of the sections of an optical network does not need to be stored, and 3R section information must only be stored for key places. Thus it is possible to store 3R section information efficiently.

Alternatively, the optical node device of the present invention may also be provided with: a storing unit which stores information of a 3R section in which the optical node device itself is a 3R source node; and a unit which, when the optical node device itself is not a destination node on receiving a message, contained in a setting request for an optical path, indicating that the optical node device itself is a 3R destination node, refers to the storing unit, and when the optical node device itself is a 3R source node in the optical path, determines that the optical node device itself is an optical node device that implements 3R relay, and transmits a message to an optical node device, corresponding to a 3R destination node of a 3R section in an optical path in which the optical node device itself is a 3R source node, in order to transmit that the optical node device corresponding to the 3R destination node is a 3R destination node.

In this manner, it is not necessary to store 3R section information not related to itself, and thus it is possible to use information storage resources effectively.

Moreover, it is preferable to provide a unit which, when the optical node device itself is not a destination node on receiving the message, contained in the setting request for the optical path, indicating that the optical node device itself is the 3R destination node, refers to the storing unit, and when the optical node device itself is not a 3R source node in the optical path, determines that the optical node device itself is an optical node device that implements 3R relay as a 3R source node using a next hop optical node device as a 3R destination node, and transmits a message to the next hop optical node device in order to transmit that the next hop optical node device is a 3R destination node.

In this manner, even if the 3R source node only stores 3R section information up to the 3R destination node related to itself, it is possible to realize 3R relay transmission in the 3R destination node and the nodes ahead of the 3R destination node without delay.

In this case, since information of a 3R section in which itself is a 3R source node, and 3R section information other than this is not stored, it is determined whether itself is required to function as a 3R source node or a 3R destination node by a message contained in the optical path setting request.

For example, when an optical path setting request reaches an optical node device, being a 3R source node of a 3R section in an optical path, there is also a possibility that a 3R section other than the 3R section that the optical node device stores is used in an optical path set by the optical path setting request. However, it is difficult to determine this from the 3R section information that the optical node device contains. Accordingly, the optical node device determines whether itself needs to function as a 3R source node or a 3R destination node.

Alternatively, the optical node device of the present invention may also be provided with: a storing unit which stores information of a 3R section in which the optical node device itself is a 3R source node and a 3R destination node; a unit which, when the optical node device itself is not a destination node on receiving a message, contained in an optical path setting request, indicating that the optical node device itself is a 3R destination node in the downstream optical path, refers to the storing unit, and when the optical node device itself is a 3R source node in the downstream optical path, determines that the optical node device itself is an optical node device that implements 3R relay, and transmits a message to an optical node device corresponding to a 3R destination node of a 3R section in the downstream optical path in which the optical node device itself is a 3R source node, in order to transmit that the optical node device corresponding to the 3R destination node is a 3R destination node; and a unit which determines that the optical node device itself is an optical node device that implements 3R relay in the upstream optical path on receiving a message, contained in an optical path setting request, indicating that the optical node device itself is a 3R source node in the upstream optical path and which, when the optical node device itself is not a destination node, refers to the storing unit, and when the optical node device itself is a 3R destination node in the upstream optical path, transmits a message to an optical node device corresponding to a 3R source node in the upstream optical path in which the optical node device itself is a 3R destination node, in order to transmit that the optical node device corresponding to the 3R source node is a 3R source node.

In this manner, it is not necessary to store 3R section information unrelated to itself, and it is possible to set an optical node device that implements 3R relay in a bi-directional optical path while using information storage resources effectively.

Furthermore, it is preferable to provide: a unit which, when the optical node device itself is not a destination node on receiving the message, contained in the optical path setting request, indicating that the optical node device itself is the 3R destination node in the downstream optical path, refers to the storing unit, and when the optical node device itself is not a 3R source node in the downstream optical path, determines that the optical node device itself is an optical node device that implements 3R relay using the optical node device itself as a 3R source node and a next hop optical node device in the downstream optical path as a 3R destination node, and transmits a message to the next hop optical node device in order to transmit that the next hop optical node device is a 3R destination node of the optical node device itself; and a unit which determines that the optical node device itself is an optical node device that implements 3R relay in the upstream optical path on receiving the message, contained in the optical path setting request, indicating that the optical node device itself is the 3R source node in the upstream optical path, and which when the optical node device itself is not a destination node, refers to the storing unit, and when the optical node device itself is not a 3R destination node in the upstream optical path, transmits a message to a previous hop optical node device in the upstream optical path, in order to transmit that the previous hop optical node device is a 3R source node using the optical node device itself as a 3R destination node.

In this manner, 3R relay transmission can be realized in a bidirectional optical path without delay even in an optical node device that does not store 3R section information in itself.

Here, in this case, since the 3R section information defining itself as a 3R source node or a 3R destination node is stored, but 3R section information other than this is not stored, it is determined whether itself is required to function as a 3R source node or a 3R destination node by a message contained in the optical path setting request.

For example, when an optical path setting request reaches an optical node device, being a 3R source node or a 3R destination node of a 3R section in an optical path, there is also a possibility that a 3R section other than the 3R section that the optical node device stores is used in an optical path set by the optical path setting request. However, it is difficult to determine this from the 3R section information that the optical node device contains. Accordingly, the optical node device determines whether itself needs to function as a 3R source node or a 3R destination node by a message contained in the optical path setting request.

A second aspect of the present invention is a network control device that manages an optical network which is provided with: a plurality of optical node devices that switch optical signals; and optical transmission paths connecting the plurality of optical node devices.

Here, a network control device of the present invention is provided with a storing unit which stores 3R section information corresponding to topology information of the optical network; and a unit which provides the 3R section information stored in the storing unit to an optical node device according to a request from the optical node device.

Moreover, the optical node device of the present invention is provided with an acquiring unit which requests a network control device managing an optical network to which the optical node device itself belongs to provide 3R section information corresponding to topology information of the optical network, and acquires the 3R section information.

Furthermore, it is preferable that the acquiring unit is provided with a unit which selects and stores at least a part of information associated with the optical node device itself from the 3R section information acquired.

That is, in the present invention, there is a case where all optical node devices have the same 3R section information, a case where an optical node device through which an optical path passes stores 3R section information, a case where a source node of an optical path stores 3R section information, and a case where a 3R source node or a 3R destination node stores 3R section information associated with itself.

In order to handle each of these cases flexibly, it is convenient to have a unit which provides each of the optical node devices with the 3R section information that each of the optical node devices requests quickly. For example, using a structure in which a network control device is provided, where this network control device provides each of the optical node devices with required 3R section information based on requests from each of the optical node devices, each of the optical node devices can obtain the 3R section information itself needs quickly.

For example, in the case where all of the optical node devices store common 3R section information, the optical node device according to the present invention is provided with: an acquiring unit which requests a network control device that manages an optical network to which the optical node device itself belongs, for 3R section information corresponding to topology information of the optical network to which the optical node device itself belongs and acquires the 3R section information; and a unit which stores the 3R section information acquired by the acquiring unit, and advertises the 3R section information to other optical node devices.

In this manner, some optical node devices request the network control device for 3R section information, and acquire it, and these optical node devices acquiring 3R section information from the network control device advertise it to the other optical node devices. Thus all optical node devices can store the common 3R section information. It is desirable to use such a scheme in the case where network resources can be used effectively compared with the case where all optical node devices request the network control device for 3R section information to acquire it individually.

For example, in the case where an optical node device in the route between a source node and a destination node stores 3R section information, the optical node device of the present invention is provided with: an acquiring unit which requests a network control device managing an optical network to which the optical node device itself belongs for 3R section information corresponding to topology information of the optical network to which the optical node device itself belongs when the optical node device itself is a source node, and acquires the 3R section information; and a unit which stores the 3R section information acquired by the acquiring unit, and transmits the 3R section information to other optical node devices contained in an optical path up to the destination node when the optical node device itself is used as the source node.

In this manner, since it is possible for an optical node device corresponding to a source node to request the network control device for 3R section information, acquire it, and transmit the 3R section information acquired to the other optical node devices in the route, it is possible to reduce the processing load on the network control device and the optical node devices in the route compared with the case where the optical node devices in the route request the network control device for 3R section information and acquire it individually.

Alternatively, in the case where an optical node device in the route between a source node and a destination node stores 3R section information, it is also possible for the optical node device of the present invention to be provided with: an acquiring unit which requests a network control device managing an optical network to which the optical node device itself belongs for 3R section information corresponding to topology information of the optical network to which the optical node device itself belongs when the optical node device itself is a source node, and acquires the 3R section information; an advertising unit which stores the 3R section information acquired by the acquiring unit, and advertises the 3R section information to other optical node devices; a determining unit which determines whether an advertisement by the advertising unit is associated with an optical path that passes through the optical node device itself; a unit which discards the advertisement when a determination result of the determining unit indicates that the advertisement is not associated with the optical path that passes through the optical node device itself; and a unit which stores contents of the advertisement when the determination result of the determining unit indicates that the advertisement is associated with the optical path which passes through the optical node device itself.

In this manner, an optical node device corresponding to a source node requests the network control device for 3R section information, acquires it, and advertises the 3R section information acquired to other optical node devices. At this time, an optical node device corresponding to a source node does not need to limit the advertised address to the other optical node devices in the route. Thus it is possible to reduce the processing load required for such limitation. An optical node device which receives the advertisement, may discard it if the advertisement is not associated with itself.

Alternatively, the optical node device of the present invention may be provided with: a storing unit which stores information of the number of hops H between the optical node device itself and a 3R destination node in a 3R section to which the optical node device itself belongs; and a determining unit which determines autonomously whether the optical node device itself implements 3R relay of an optical signal transmitted from a 3R source node in the 3R section to which the optical node device itself belongs, wherein the determining unit determines that 3R relay is implemented, if T>TH_T, and H<TH_H, where T is the number of 3R trunks that the optical node device itself has, TH_T is a threshold value of the number of vacant 3R trunks, and TH_H is a threshold value of the number of hops up to the 3R destination node.

That is, in the case where an optical node device is not a 3R destination node, but there is a 3R destination node only a few hops ahead, and its 3R trunk has additional processing capability available, it is possible for itself to reduce the 3R relay load of the optical node device corresponding to the 3R destination node (that is a 3R source node of the next 3R section) by implementing 3R relay instead of the 3R destination node.

The threshold values TH_T and TH_H are set appropriately depending on the 3R relay capability of the optical node device itself or another optical node device corresponding to a 3R destination node. For example, the lower the number of 3R trunks of the 3R source node of the next 3R section compared with the number of 3R trunks of the optical node device itself, the higher the degree of necessity for the optical node device itself to help the 3R relay of the 3R source node of the next 3R section. Therefore, it is preferable to set the TH_T low, and for the optical node device itself to implement 3R relay so as to help the 3R relay of the 3R source node of the next 3R section if there is even a little spare capacity in the 3R trunk of the optical node device itself. However, in the case where the number of hops to the 3R source node of the next 3R section is high, even if there is some margin in the number of 3R trunks of the optical node device itself, if the optical node device itself implements 3R relay instead of the 3R source node of the next 3R section, there is a possibility that the number of 3R operations up to a destination node increases. Therefore, it is preferable that TH_H is low.

In this manner, TH_T and TH_H are set appropriately with consideration of the number of hops of the whole 3R section and the 3R destination node, that is, the number of 3R trunks of a 3R source node of the next 3R section.

A third aspect of the present invention is an optical network that is provided with an optical node device of the present invention or a network control device of the present invention.

A fourth aspect of the present invention is a decision method of a 3R relay implementation node in an optical node device that switches an optical signal, the method comprising the steps of: when one optical node device is a 3R source node of any one of a plurality of different 3R sections overlapping on an optical path that passes through the one optical node device, and the one optical node device does not correspond to a 3R source node or 3R destination node of other 3R sections, comparing the number of 3R implementations for both the case where the one optical node device functions as a 3R source node and where the one optical node device does not function as a 3R source node, with reference to 3R section information related to an optical path from the one optical node device up to the destination node, and deciding that the one optical node device is an optical node device that implements 3R relay, when the number of 3R implementations is less in the case where the one optical node device functions as a 3R source node than in the case where the one optical node device does not function as a 3R source node, based on a comparison result.

Alternatively, a decision method of a 3R relay implementation node of the present invention decides that when one optical node device is an optical node device corresponding to a 3R destination node, and is not a destination node, the one optical node device is an optical node device that implements 3R relay using the one optical node device as a 3R source node, and a next hop optical node device as a 3R destination node.

Alternatively, a decision method of a 3R relay implementation node of the present invention decides that when one optical node device does not belong to any one of 3R sections having a 3R source node in an optical path which passes through the one optical node device, the one optical node device is an optical node device that implements 3R relay using the one optical node device as a 3R source node, and a next hop optical node device of the one optical node device as a 3R destination node.

Alternatively, a decision method of a 3R relay implementation node of the present invention, when one optical node device is a 3R source node, but not a destination node in the upstream optical path, and the one optical node device is not a 3R destination node in the upstream optical path, sends a message to a previous hop optical node device in the upstream optical path in order to transmit information that the previous hop optical node device is a 3R source node using the one optical node device as a 3R destination node; and the optical node device receiving the message in the upstream optical path decides that the optical node device itself is a 3R source node in the upstream optical path using an optical node device, being a sender of the message, as a 3R destination node.

Alternatively, in a decision method of a 3R relay implementation node of the present invention, an optical node device corresponding to a 3R source node stores 3R section information related to the optical node device itself, referring to the 3R section information when the optical node device corresponding to a 3R source node is not a destination node on receiving a message, contained in a setting request for an optical path, indicating that the optical node device corresponding to a 3R source node is a 3R destination node, determining that the optical node device itself is an optical node device that implements 3R relay when the optical node device itself is a 3R source node in the optical path, and sending a message to an optical node device corresponding to a 3R destination node of a 3R section in an optical path in which the optical node device itself is a 3R source node in order to transmit that the optical node device corresponding to the 3R destination node is a 3R destination node.

Furthermore, it is preferable to refer to the 3R section information when the optical node device itself is not a destination node on receiving the message, contained in the setting request for the optical path, that the optical node device itself is the 3R destination node; determine that the optical node device itself is an optical node device that implements 3R relay as a 3R source node using a next hop optical node device as a 3R destination node when the optical node device itself is not a 3R source node in the optical path; and transmit a message to the next hop optical node device in order to transmit that the next hop optical node device is a 3R destination node.

Alternatively, a decision method of a 3R relay implementation node of the present invention is provided with the steps of: storing information of a 3R section in which an optical node device is a 3R source node and a 3R destination node, and when the optical node device itself is not a destination node on receiving a message, contained in a setting request for an optical path, indicating that the optical node device itself is a 3R destination node in the downstream optical path, referring to the information of the 3R section, and when the optical node device itself is a 3R source node in the downstream optical path, determining that the optical node device itself is an optical node device that implements 3R relay, and transmitting a message to an optical node device corresponding to a 3R destination node of a 3R section in the downstream optical path in which the optical node device itself is a 3R source node, in order to transmit that the optical node device corresponding to the 3R destination node is a 3R destination node, and determining that the optical node device itself is an optical node device that implements 3R relay in the upstream optical path on receiving a message, contained in a setting request for an optical path, indicating that the optical node device itself is a 3R source node in the upstream optical path, and when the optical node device itself is not a destination node, referring to the information of the 3R section, and when the optical node device itself is a 3R destination node in the upstream optical path, transmitting a message to an optical node device corresponding to a 3R source node in the upstream optical path in which the optical node device itself is a 3R destination node, in order to transmit that the optical node device corresponding to the 3R source node is a 3R source node.

Moreover, it is preferable that the optical node device itself refers to the information of the 3R section when the optical node device itself is not a destination node on receiving the message, contained in the setting request for the optical path, indicating that the optical node device itself is a 3R destination node in the downstream optical path, and when the optical node device itself is not a 3R source node in the downstream optical path, determines that the optical node device itself is an optical node device that implements 3R relay using the optical node device itself as a 3R source node by using a next hop optical node device in the downstream optical path as a 3R destination node, and transmits a message to the next hop optical node device to transmit that the next hop optical node device is a 3R destination node of the optical node device itself, and determines that the optical node device itself is an optical node device that implements 3R relay in the upstream optical path on receiving the message, contained in the setting request for the optical path, indicating that the optical node device itself is a 3R source node in the upstream optical path, and when the optical node device itself is not a destination node, refers to the 3R section information, and when the optical node device itself is not a 3R destination node in the upstream optical path, transmits a message to a previous hop optical node device in the upstream optical path, to transmit that the previous hop optical node device is a 3R source node using the optical node device itself as a 3R destination node.

Alternatively, in a decision method of a 3R relay implementation node of the present invention is further provided with the step of: deciding that one optical node device is an optical node device that implements 3R relay, if T>TH_T and H<TH_H, where H is the number of hops between the one optical node device and a 3R destination node in a 3R section to which the one optical node device belongs, T is the number of 3R trunks with which the one optical node device is provided, TH_T is a threshold value of the number of vacant 3R trunks, and TH_H is a threshold value of the number of hops up to the 3R destination node.

A fifth aspect of the present invention is an optical node device comprising a switching unit which switches an optical signal, wherein the setting request for the optical path contains labels for specifying wavelengths to be used in order from the source node at the time of switching from the source node to the destination node, and the labels are deleted one by one each time a wavelength is set, and the switching unit is provided with a wavelength conversion unit or a 3R relay unit, and the optical node device further comprises: a unit which stores information of the number of hops H between the optical node device itself and a 3R destination node of a 3R section to which the optical node device itself belongs; and a determining unit which determines autonomously whether the optical node device itself implements 3R relay of an optical signal transmitted from a 3R source node in the 3R section to which the optical node device itself belongs, and the determining unit determines that 3R relay is implemented if T>TH_T and (H<TH_H and L<TH_L) or T>TH_T and (H<TH_H or L<TH_L), where T is the number of trunks provided in the wavelength conversion unit or the 3R relay unit, TH_T is a threshold value of the number of vacant trunks, TH_H is a threshold value of the number of hops up to the 3R destination node, L is the number of remaining labels, and TH_L is a threshold value of the number of the remaining labels.

In addition, it is preferable to provide a unit which determines that the optical node device itself does not implement 3R relay regardless of a result determined by the determining unit when the optical node device itself belongs to a 3R section in which a 3R destination node is the destination node.

Furthermore, in an optical node device of the present invention, when the optical path is bi-directional, an optical path directed away from the source node toward the destination node is defined as a downstream optical path, and an optical path directed away from the destination node toward the source node is defined as an upstream optical path, and the setting request for the optical path contains labels for specifying wavelengths to be used in order from the source node at the time of switching from the source node to the destination node, and the labels are deleted one by one each time a wavelength is set, and the switching unit is provided with a wavelength conversion unit or a 3R relay unit, and the optical node device further comprises: a unit which stores information of the number of hops H between the optical node device itself and a 3R destination node of a 3R section to which the optical node device itself belongs in the upstream optical path; and a determining unit which determines autonomously whether the optical node device itself implements 3R relay of an optical signal transmitted from a 3R source node in the 3R section to which the optical node device itself belongs in the upstream optical path, and the determining unit determines that 3R relay is implemented if T>TH_T and (H<TH_H and L>TH_L) or T>TH_T and (H<TH_H or L>TH_L), where T is the number of trunks provided in the wavelength conversion unit or the 3R relay unit, TH_T is a threshold value of the number of vacant trunks, TH_H is a threshold value of the number of hops up to the 3R destination node, L is the number of remaining labels, and TH_L is a threshold value of the number of the remaining labels.

It is preferable to provide a unit which determines that the optical node device itself does not implement 3R relay regardless of a result determined by the determining unit when the optical node device itself belongs to a 3R section in which a 3R destination node is the destination node.

A sixth aspect of the present invention is an optical network constructed using an optical node device of the present invention.

A seventh aspect of the present invention is a decision method of a 3R relay implementation node in an optical node device that switches an optical signal, the method comprising the steps of: deleting labels, contained in the setting request for the optical path, for specifying wavelengths to be used in order from the source node at the time of switching from the source node to the destination node, one by one each time a wavelength is used; storing information of the number of hops H between the optical node device and a 3R destination node of a 3R section to which the optical node device belongs; and when determining autonomously whether the optical node device implements 3R relay of an optical signal transmitted from a 3R source node in the 3R section to which the optical node device belongs, determining that 3R relay is implemented if T>TH_T and (H<TH_H and L<TH_L) or T>TH_T and (H<TH_H or L<TH_L), where T is the number of trunks having a function to perform wavelength conversion or 3R relay, TH_T is a threshold value of the number of vacant trunks, TH_H is a threshold value of the number of hops up to the 3R destination node, L is the number of remaining labels, and TH_L is a threshold value of the number of the remaining labels.

Here, when the optical node device itself belongs to a 3R section in which a 3R destination node is the destination node, it is preferable to determine that the optical node device itself does not implement 3R relay regardless of a determination result.

Moreover, when the optical path is bi-directional, a decision method of a 3R relay implementation node of the present invention is provided with the steps of: defining an optical path directed away from the source node toward the destination node as a downstream optical path, and an optical path directed away from the destination node toward the source node as an upstream optical path; deleting labels, contained in the setting request for the optical path, for specifying wavelengths to be used in order from the source node at the time of switching from the source node to the destination node, one by one each time a wavelength is set; storing information of the number of hops H between the optical node device itself and a 3R destination node of a 3R section to which the optical node device itself belongs in the upstream optical path; and when determining autonomously whether the optical node device itself implements 3R relay of an optical signal transmitted from a 3R source node in the 3R section to which the optical node device itself belongs in the upstream optical path, determining that 3R relay is implemented if $T>TH\_T$ and ($H<TH\_H$ and $L>TH\_L$) or $T>TH\_T$ and ($H<TH\_H$ or $L>TH\_L$), where T is the number of trunks having a function to perform wavelength conversion or 3R relay, $TH\_T$ is a threshold value of the number of vacant trunks, $TH\_H$ is a threshold value of the number of hops up to the 3R destination node, L is the number of remaining labels, and $TH\_L$ is a threshold value of the number of the remaining labels.

When the optical node device itself belongs to a 3R section in which a 3R destination node is the source node, it is preferable to determine that the optical node device itself does not implement 3R relay regardless of a determination result.

That is, in the case where an optical node device is not a 3R destination node, but there is a 3R destination node only a few hops ahead, and its 3R trunk has additional processing capability available, it is possible for itself to reduce the 3R relay load of the optical node device corresponding to the 3R destination node (that is the 3R source node of the next 3R section) by implementing the 3R relay instead of the 3R destination node.

Furthermore, for 3R relay, not only may a specialized 3R repeater for 3R relay be used, but a wavelength converter that converts an optical signal into an electric signal momentarily, and then converts it into an optical signal again, may also be used. In this case, an optical path setting request contains labels for specifying the wavelengths to be used in order from the source node at the time of switching from a source node to a destination node, and since one label is deleted each time one wavelength is used, it is possible to estimate the distance to the destination node by finding out the number of remaining labels. Therefore, the number of remaining labels is also utilized in the present invention.

That is, since the optical node device before a 3R destination node takes on the 3R destination node's role to implement 3R relay, the original 3R section may be shortened. Accordingly, if such substitution is performed out of order, there is a possibility of increasing the number of 3R relay operations between a source node and a destination node, which is not desirable. Therefore, the present invention addresses 3R relay capability, the number of hops to a 3R destination node, and the number of remaining labels, sets threshold values to them to ensure order, and prevents an increase in the number of 3R relay operations from the source node to the destination node due to the substitution.

One of the determination rules used at this time is $T>TH\_T$ and ($H<TH\_H$ and $L<TH\_L$). That is, in an optical node device in which there is sufficient additional 3R relay capability available, the number of hops to a 3R destination node, and the distance to a destination node, are both monitored, and when both are below the threshold values, the aforementioned substitution is performed.

Another is $T>TH\_T$ and ($H<TH\_H$ or $L<TH\_L$). That is, similarly to the previous, in an optical node device in which there is sufficient additional 3R relay capability available, the number of hops to a 3R destination node, and the distance to a destination node, are both monitored. However, even if the distance to the destination node is great, if the number of hops to the 3R destination node is low, substitution is performed.

When the two are compared, the former performs substitution only from a position near to both the 3R destination node and the destination node. Accordingly, the substitution is performed from the point of time that the destination node gets close. If the number of hops to the 3R destination node is below the threshold value, the latter performs substitution even if the distance to the destination node is great. Therefore, a greater number of optical node devices can be objects to perform substitution in the latter than in the former.

In the former, since the substitution is performed from the point of time that the destination node gets close, there is an advantage in that the possibility of an increase in the number of 3R operations from the source node to the destination node is lower than the latter. Furthermore, in the latter, since the optical node device that performs substitution can be positioned in numerous places in the optical path, there is an advantage in that substitution can be performed efficiently. Since each has different advantages, it is desirable to select the former or the latter appropriately according to the situation of an optical network.

Moreover, when itself belongs to a 3R section in which the destination node is a 3R destination node, it is preferable to determine that itself does not implement 3R relay. That is, the optical node device corresponding to the destination node is an optical node device that does not need to implement 3R relay. Therefore, it is not necessary to consider substitution for such an optical node device that is not required to implement 3R relay.

Furthermore, in the case where an optical path is a bi-directional path, in the upstream optical path, the optical node device that implements 3R relay is arranged with a 3R destination node close to a source node, and a 3R source node close to a destination node. Accordingly, the direction of the inequality symbol between the numbers of remaining labels and the threshold value is reversed compared with the case of a downstream optical path. When establishing a physical bi-directional optical path, an optical node device is used that implements 3R relay in both the downstream and upstream optical paths at the same time.

In this case, when itself belongs to a 3R section in which the source node is a 3R destination node, it is preferable to determine that itself does not implement 3R relay. That is, the optical node device corresponding to the source node is an optical node device that does not need to implement 3R relay in the upstream optical path. Therefore, it is not necessary to consider substitution for such an optical node device that is not required to implement 3R relay.

An eighth aspect of the present invention is an optical node device that switches an optical signal, the optical node device comprising: a detecting unit which detects deterioration in the state of an optical signal that reaches the optical node device itself; a transmitting unit which, when a detection result from the detecting unit indicates signal deterioration, transmits a 3R relay request to an adjacent optical node device corresponding to one hop before the optical node device itself; and a unit which, when the optical node device itself receives a 3R relay request from the transmitting unit of a next hop adjacent optical node device, implements 3R relay of an optical signal that reaches the optical node device itself.

In this manner, by detecting deterioration in the state of an optical signal that physically reaches the optical node device itself, it recognizes the necessity of 3R relay, and requests 3R relay implementation in an adjacent optical node device corresponding to the previous hop, and the optical node device which receives this request activates a function as an optical node device that implements 3R relay. In this manner, each optical node device can set an appropriate 3R section while performing measurement in an optical path setting process or in a switching process of optical signals.

Alternatively, the optical node device of the present invention is provided with: a detecting unit which detects deterioration in the state of an optical signal that reaches the optical node device itself; and a unit which, when a detection result from the detecting unit indicates signal deterioration, implements 3R relay of an optical signal that reaches the optical node device itself.

In this manner, by detecting deterioration in the state of the optical signal that physically reaches the optical node device itself, it recognizes the necessity of 3R relay, and activates a function as an optical node device that implements 3R relay. In this manner, each optical node device can set an appropriate 3R section while performing measurement in an optical path setting process or in a switching process of optical signals.

Alternatively, the optical node device of the present invention is an optical node device which switches an optical signal and which sets an optical path for other optical node devices contained in a route from the optical node device itself to a destination node which is defined as an optical node device at an end point of the optical path, one hop at a time in order from a next hop adjacent optical node device, the optical node device comprising: a transmitting unit which transmits an optical test signal each time an optical path is set for the other optical node devices contained in the route from the optical node device itself to the destination node one hop at a time in order from the next hop adjacent optical node device; a receiving unit which, each time the optical test signal is transmitted to the other optical node devices contained in the route to the destination node one hop at a time in order from the next hop adjacent optical node device by the transmitting unit, receives a report of deterioration in the state of the optical test signal from another optical node device at the farthest end receiving the optical test signal; and a unit which, when the deterioration in the state of the optical test signal based on the report received by the receiving unit satisfies a predetermined deterioration condition, requests another optical node device corresponding to one hop before the other optical node device at the farthest end to implement 3R relay, and the other optical node device that is requested to implement 3R relay is provided with: a transmission unit which transmits an optical test signal to the other optical node devices contained in a route to the destination node each time an optical path is set one hop at a time in order from a next hop adjacent optical node device; a reception unit which, each time the optical test signal is transmitted to the other optical node devices contained in the route to the destination node one hop at a time in order from the next hop adjacent optical node device by the transmission unit, receives a report of deterioration in the state of the optical test signal from another optical node device at the farthest end receiving the optical test signal; and a unit which, when the deterioration in the state of the optical test signal based on the report received by the reception unit satisfies a predetermined deterioration condition, requests another optical node device corresponding to one hop before the other optical node device at the farthest end to implement 3R relay.

In this manner, since it is possible to determine an optical node device that implements 3R relay while physically establishing an optical path, 3R section information does not need to be generated in advance. Thus it is possible to reduce the processing load required for generating 3R section information.

Alternatively, the optical node device of the present invention is provided with: a unit which stores a value Q, preset for each link based on optical signal deterioration characteristics in a link between the optical node device itself and an adjacent node; a unit which, when the optical node device itself is a source node, transmits an initial value P of a minuend to a next hop adjacent optical node device; a calculating unit which, when the optical node device itself receives from a previous hop adjacent optical node device, the initial value P or a minuend value P', which has already been reduced from the initial value P, calculates (P−Q) or (P'−Q); a unit which compares a calculated result of the calculating unit with a threshold value, and when the calculated result is greater than the threshold value, transmits the calculated result to the next hop adjacent optical node device, and when the calculated result is less than or equal to the threshold value, implements 3R relay of an optical signal that reaches the optical node device itself; and a unit which, when the optical node device itself is not the destination node of an optical path to which the value of the minuend is transmitted, transmits the initial value P of the minuend to the next hop adjacent optical node device using the optical node device itself as a 3R source node.

In this manner, the information stored in each optical node device consists only of the value Q associated with itself, and the initial value P to be transmitted to the adjacent optical node device in the case where itself is a source node, and it is possible to determine autonomously whether or not itself requires 3R relay when establishing an optical path with an extremely small amount of information. Thus it is possible to reduce the processing load required for generation and collection of 3R section information. Furthermore, when establishing an optical path, it is not necessary to measure the deterioration in the state of an optical signal, and thus it is possible to set optical paths promptly.

Up to this point, the optical node device of the present invention has been described assuming a unidirectional optical path, or a downstream optical path of a bi-directional optical path. The following is a description assuming an upstream optical path of a bi-directional optical path.

The optical node device of the present invention is provided with: a detecting unit which detects deterioration in the state of an optical signal in the upstream optical path that reaches the optical node device itself; a unit which, when a detection result from the detecting unit indicates signal deterioration, transmits a 3R relay implementation request to an adjacent optical node device corresponding to a next hop of the optical node device itself; and a unit which, when the optical node device itself receives a 3R relay implementation request from a previous hop adjacent optical node device, implements 3R relay of an optical signal in the upstream optical path that reaches the optical node device itself.

In this manner, by detecting deterioration in the state of an optical signal that physically reaches the optical node device itself, it recognizes the necessity of 3R relay, and requests 3R relay implementation in the adjacent optical node device corresponding to the previous hop, and the optical node device itself which receives this request activates a function as an optical node device that implements 3R relay. In this manner, each optical node device can set an appropriate 3R section while performing measurement in an optical path setting process or in a switching process of optical signals.

Alternatively, the optical node device of the present invention is provided with a detecting unit which detects deterioration in the state of an optical signal in the upstream optical path that reaches the optical node device itself; and a unit which, when a detection result from the detecting unit indicates signal deterioration, implements 3R relay of an optical signal in the upstream optical path that reaches the optical node device itself.

In this manner, by detecting deterioration in the state of the optical signal that physically reaches the optical node device itself, it recognizes the necessity of 3R relay, and activates a function as an optical node device that implements 3R relay. In this manner, each optical node device can set an appropriate 3R section while performing measurement in an optical path setting process or in a switching process of optical signals.

Alternatively, the optical node device of the present invention is provided with: a unit which, when the optical node device itself is a source node, sets an optical path for other optical node devices contained in a route to the destination node one hop at a time in order from a next hop adjacent optical node device; a unit which, when an optical path is set in the optical node device itself and when the optical node device itself is not a source node, transmits an optical test signal to the upstream optical path; a unit which, when the optical node device itself is a source node, receives the optical test signal, and informs a sender of the optical test signal of a report of deterioration in the state of the optical test signal; a unit which, when the optical node device itself is a sender optical node device of an optical test signal, if the deterioration in the state of the optical test signal based on the report satisfies a predetermined deterioration condition, implements 3R relay of an optical signal from the upstream optical path that reaches the optical node device itself; and a unit which, when the optical node device itself is an optical node device that implements 3R relay in the upstream optical path, sets an optical path for the other optical node devices contained in a route from the optical node device itself to the destination node one hop at a time in order from a next hop adjacent optical node device, receives an optical test signal, and informs a sender of the optical test signal of a report of deterioration in the state of the optical test signal.

In this manner, since it is possible to determine an optical node device that implements 3R relay while physically establishing an optical path, 3R section information does not need to be generated in advance. Thus it is possible to reduce the processing load required for generating 3R section information. Here, it is desirable to perform the procedure at the time of upstream optical path setting at the same time as the procedure at the time of downstream optical path setting.

Alternatively, the optical node device of the present invention is provided with: a unit which stores a value q, preset for each link based on optical signal deterioration characteristics in a link between the optical node device itself and an adjacent node; a unit which, when the optical node device itself is a source node, transmits an initial value p of an augend to a next hop adjacent optical node device; a calculating unit which, when the optical node device itself receives from a previous hop adjacent optical node device, the initial value p or an augend value p', which has already been increased from the initial value p, calculates (p+q) or (p'+q); a unit which compares a calculated result of the calculating unit with a threshold value, and when the calculated result is less than the threshold value, transmits the calculated result to a next hop adjacent optical node device, and when the calculated result is greater than or equal to the threshold value, implements 3R relay of an optical signal that reaches the optical node device itself; and a unit which, when the optical node device itself is not the destination node of an optical path to which the value of the augend is transmitted, transmits the initial value p of the value of the augend to the next hop adjacent optical node device using the optical node device itself as a 3R destination node in the upstream optical path.

In this manner, the information stored in each optical node device consists only of the value q associated with itself, and the initial value p to be transmitted to an adjacent optical node device in the case where itself is a source node, and it is possible to determine autonomously whether or not itself requires 3R relay when establishing an optical path with an extremely small amount of information. Thus it is possible to reduce the processing load required for generation and collection of 3R section information. Furthermore, when establishing an optical path, it is not necessary to measure the deterioration in the state of an optical signal, and thus it is possible to establish optical paths promptly.

A ninth aspect of the present invention is an optical network constructed using the optical node device of the present invention.

A tenth aspect of the present invention is an optical path setting method for establishing an optical path for an optical node device contained in a path from a source node to a destination node one hop at a time in order from the next hop adjacent optical node device to the optical node device, being the source node.

Here, an optical path setting method of the present invention performs: a first step of transmitting an optical test signal from an optical node device, being a source node, each time an optical path, is set for the optical node devices contained in the route to the destination node one hop at a time in order from the next hop adjacent optical node device of the optical node device, being the source node; a second step in which, each time the optical test signal is transmitted in the first step to the optical node devices contained in the route to the destination node one hop at a time in order from the next hop adjacent optical node device of the optical node device, being the source node, the optical node device, being the source node, receives a report of deterioration in the state of the optical test signal from an optical node device at the farthest end that receives the optical test signal; a third step in which, when the deterioration in the state of the optical test signal based on the report received in the second step satisfies a predetermined deterioration condition, the optical node device, being the source node, requests an optical node device one hop before the optical node device at the farthest end to implement 3R relay; a fourth step in which, each time the optical path is set for the other optical node devices contained in the route to the destination node one hop at a time in order from the next hop adjacent optical node device, the optical node device that is requested to implement 3R relay transmits an optical test signal; a fifth step in which, each time the optical test signal is transmitted to the other optical node devices contained in the route to the destination node, one hop at a time in order from the next hop adjacent optical node device in the fourth step, the optical node device that is requested to implement 3R relay receives a report of deterioration in the state of the optical test signal from the other optical node device at the farthest end which receives the optical test signal; and a sixth step in which, when the deterioration in the state of the optical test signal based on the report received in the fifth step satisfies a predetermined deterioration condition, the optical node device that is requested to implement 3R relay requests another optical node device one hop before the other optical node device at the farthest end to implement 3R relay.

Alternatively, an eleventh aspect of the present invention is a 3R relay implementation node setting method in an optical node device that switches an optical signal, the method comprising: a step in which each optical node device stores a value Q, preset for each link based on optical signal deterioration characteristics in a link between the optical node device itself and an adjacent node; a step in which an optical node device, being a source node, transmits an initial value P of a minuend to a next hop adjacent optical node device; and a step in which each optical node device calculates (P−Q) or (P'−Q) when the optical node device itself receives from a previous hop adjacent optical node device, the initial value P or a minuend value P', which has already been reduced from the initial value P, compares a calculated result with a threshold value, and when the calculated result is greater than the threshold value, transmits the calculated result to the next hop adjacent optical node device, and when the calculated result is less than or equal to the threshold value, implements 3R relay of an optical signal that reaches each optical node device, and when each optical node device is not a destination node of an optical path to which the value of the minuend is transmitted, transmits the initial value P of the minuend to the next hop adjacent optical node device using each optical node device as a 3R source node.

Up to this point, the optical path setting method and 3R relay implementation node setting method of the present invention have been described assuming a unidirectional optical path, or a downstream optical path of a bi-directional optical path. The following is a description assuming an upstream optical path of a bi-directional optical path.

An optical path setting method of the present invention performs: a seventh step in which an optical node device, being a source node, sets an optical path for other optical node devices contained in a route to the destination node one hop at a time in order from a next hop adjacent optical node device; an eighth step in which an optical node device that is not the source node transmits an optical test signal to the upstream optical path when an optical path is set in the optical node device itself; a ninth step in which the optical node device, being a source node, receives the optical test signal, and gives notification to a sender of the optical test signal of a report of deterioration in the state of the optical test signal; a tenth step in which an optical node device, being the sender of the optical test signal, implements 3R relay of an optical signal in the upstream optical path that reaches the optical node device itself when the deterioration in the state of the optical test signal based on the notification satisfies a predetermined deterioration condition; and an eleventh step in which the optical node device that implements 3R relay in the upstream optical path sets an optical path for the other optical node devices contained in a route from the optical node device itself to the destination node one hop at a time in order from a next hop adjacent optical node device, receives an optical test signal, and informs a sender of the optical test signal of report of deterioration in the state of the optical test signal.

Alternatively, a twelfth aspect of the present invention is a 3R relay implementation node setting method in an optical node device that switches an optical signal, the method comprising: a step in which each optical node device stores a value q, preset for each link based on optical signal deterioration characteristics in a link between the optical node device itself and an adjacent node; a step in which an optical node device, being a source node, sends an initial value p of an augend to a next hop adjacent optical node device; and a step in which each optical node device calculates (p+q) or (p'+q) when the optical node device itself receives from a previous hop adjacent optical node device, the initial value p or an augend value p', which has already been increased from the initial value p, compares a calculated result with a threshold value, and when the calculated result is less than the threshold value, transmits the calculated result to the next hop adjacent optical node device, and when the calculated result is greater than or equal to the threshold value, implements 3R relay of an optical signal that reaches the optical node device itself, and when each optical node device is not the destination node of an optical path to which the value of the augend is transmitted, transmits the initial value p of the augend to the next hop adjacent optical node device using each optical node device as a 3R destination node in the upstream optical path.

In particular, in the above aspect of the invention, an optical network can be easily configured, where at the time of optical path setting, or at the time of switching of optical signals, the respective optical node devices can sequentially determine autonomously the necessity of 3R relay implementation, and perform 3R relay.

A thirteenth aspect of the present invention is a network control device that manages an optical network provided with a plurality of optical node devices that switch optical signals, and optical transmission paths that connect the plurality of optical node devices, the network control device comprising: a topology information storage unit which stores topology information of the optical network; a generating unit which generates in the topology information, estimate information of a 3R section in which a specified optical node device is a 3R source node based on input information of the number of hops; a changing unit which changes part or the whole of the estimate information of the 3R section in the topology information generated by the generating unit, based on an input instruction; and a unit which informs information of a 3R section in the topology information, changed by the changing unit, to the optical node device.

In this manner, by inputting the number of estimated hops of a 3R section, it is possible to generate approximate 3R section estimate information quickly. Although the 3R section estimate information is generated approximately in this manner, additional processing such as measurement is performed for any link whose physical usage rate is high. Thus it is also possible to increase the reliability of 3R section information. In this manner, it is possible to generate 3R section information more quickly than in the case where all of the 3R section information is generated by measurement.

Furthermore, a fourteenth aspect of the present invention is a maintenance-staff device which supplies input information of the number of hops to a network control device that manages an optical network provided with a plurality of optical node devices that switch optical signals, and optical transmission paths that connect the plurality of optical node devices, and generates in topology information, estimate information of a 3R section in which an optical node device specified is a 3R source node based on the input information of the number of hops, wherein the information of the number of hops is an estimated value of the number of hops of a 3R section, the maintenance-staff device comprising: a generating unit which generates the estimated value of the number of hops; a unit which stores topology information of the optical network together with optical fiber type information and wavelength band information used in the optical network; and a table in which the relationship between the optical fiber type and wavelength band and degree of deterioration of an optical signal per unit section is stored, and wherein the generating unit generates the estimated value of the number of hops with reference to the optical fiber type information and the wavelength band information in the topology information, and the optical fiber type, the wavelength band, and the degree of deterioration of an optical signal per unit section, stored in the table.

In this manner, it is possible to obtain an estimate of the number of hops of a 3R section accurately. That is, on a route, there is a large number of physical links through the combination of optical fibers on the route, and wavelengths. The distance over which data transmission is possible without 3R relay changes due to this variability. For example, the distance over which transmission is possible differs due to differences of fiber characteristics, such as between normal fiber and dispersion shifted fiber. Therefore, in the case where the number of estimated hops of a 3R section is obtained, it is possible to obtain an estimated value with less error by obtaining it with reference to the information of such optical fiber types and wavelength bands.

Alternatively, a network control device of the present invention is provided with: a topology information storage unit which stores topology information of the optical network; a generating unit which generates in the topology information, estimate information of a 3R section in which an optical node device specified is a 3R source node based on input information of the number of hops; an instructing unit which instructs the optical node device to set an optical test path in a section of the optical network corresponding to the estimate information of the 3R section in the topology information generated by the generating unit; a collecting unit which collects a measurement result of degree of optical signal deterioration due to the optical test path set by the optical node device instructed by the instructing unit; a changing unit which changes part or all of the estimate information of the 3R section in the topology information generated by the generating unit based on the measurement result of the degree of optical signal deterioration collected by the collecting unit; and a unit which informs the optical node device of information of a 3R section in the topology information changed by the changing unit.

In this manner, by inputting an estimate of the number of hops of a 3R section, it is possible to generate approximate estimate information of a 3R section to be measured quickly. By instructing the optical node device to measure based on the 3R section estimate information generated in this manner, it is possible to generate 3R section information. In this manner, since estimated information of a 3R section to be measured is generated prior to measurement, unnecessary or duplicated measurement can be avoided. Thus it is possible to generate 3R section information efficiently.

The present invention is an optical node device which manages an optical network provided with: a plurality of optical node devices that switch optical signals; and optical transmission paths that connect the plurality of optical node devices, generating in topology information, estimate information of a 3R section in which an optical node device specified is a 3R source node based on input information of the number of hops, giving an instruction to the optical node device to set the optical test path in a section of the optical network corresponding to the estimate information of the 3R section in the generated topology information, collecting the measurement result of the degree of optical signal deterioration due to the optical test path set by the optical node device by the instruction, changing part or all of the estimate information of the 3R section in the topology information generated based on the measurement result of the degree of optical signal deterioration collected, and informs changed information of the 3R section in the topology information to the optical node device.

Here, the optical node device of the present invention is provided with a setting unit which sets an optical test path as instructed by the network control device; a measuring unit which measures the degree of optical signal deterioration of the optical test path set by the setting unit; and a unit which informs the network control device of a measurement result by the measuring unit. In this manner, it is possible to realize automatic collection of 3R section information by a network control device.

Alternatively, a network control device of the present invention is provided with: a topology information storage unit which stores topology information of the optical network; a 3R section information storage unit which stores 3R sections set in the optical network, corresponding to the topology information; a collecting unit which collects traffic demand information in the optical network; and a unit which informs a maintenance-staff of sections in which 3R section information has not been generated, among sections in which traffic demand is increased, based on the traffic demand information collected by the collecting unit, with reference to information from the 3R section information storage unit.

Alternatively, a network control device of the present invention is provided with: a topology information storage unit which stores topology information of the optical network; a 3R section information storage unit which stores 3R sections set in the optical network, corresponding to the topology information; a collecting unit which collects traffic demand information in the optical network; and a unit which generates new 3R section information of sections in which 3R section information has not been generated, among sections in which traffic demand is increased, based on the traffic demand information collected by the collecting unit, with reference to the 3R section information storage unit.

By so doing, it is possible to add new 3R section information automatically to the 3R section information collected initially. In particular, it is possible to collect 3R section information of sections in which traffic demand is increased from the point of time that 3R section information was collected initially. In this manner, it is possible to collect useful 3R section information efficiently.

Alternatively, the optical node device of the present invention is provided with: a detecting unit which detects deterioration in the state of an optical signal that reaches the optical node device itself; a notifying unit which, when a detection result from the detecting unit indicates signal deterioration, notifies an adjacent optical node device one hop before the optical node device itself that the adjacent optical node device is a 3R destination node, and also a 3R source node of a next 3R section; a unit which, when the optical node device itself receives notification from the notifying unit of a next hop adjacent optical node device, recognizes that the optical node device itself is a 3R destination node, and also a 3R source node of a next 3R section; and an updating unit which updates information of a 3R section the optical node device itself stores based on a recognition result.

In this manner, by detecting the deterioration in the state of the optical signal that physically reaches the optical node device itself, the necessity of 3R relay is recognized, and the necessity of 3R relay is notified to the adjacent optical node device corresponding to the previous hop, and on receiving this notification, the optical node device recognizes that itself is a 3R destination node, and also a 3R source node of the next 3R section. Therefore, 3R section information can be generated based on the notification. In this manner, each optical node device can set an appropriate 3R section while performing measurement in an optical path setting process or in a switching process of optical signals, and furthermore, can update the 3R section information.

Alternatively, the optical node device of the present invention is provided with a detecting unit which detects deterioration in the state of an optical signal that reaches the optical node device itself; a unit which, when a detection result from the detecting unit indicates signal deterioration, recognizes that the optical node device itself is a 3R destination node, and also a 3R source node of a next 3R section; and an updating unit which updates information of a 3R section the optical node device itself stores based on a recognition result.

In this manner, by detecting the deterioration in the state of the optical signal that physically reaches the optical node device itself, the necessity of 3R relay is recognized, and it is recognized that itself is a 3R destination node, and also a 3R source node of the next 3R section. In this manner, it is possible to generate 3R section information based on the detection result. By so doing, each optical node device can set an appropriate 3R section while performing measurement in an optical path setting process or in a switching process of optical signals, and furthermore, can update 3R section information.

Moreover, it is preferable to provide a unit which advertises the information of the 3R section updated by the updating unit to other optical node devices; and a unit which receives an advertisement from the other optical node devices, and updates the information of the 3R section the optical node device itself stores. That is, it is possible to recognize that itself is a 3R destination node or a 3R source node by the measurement of an optical signal that reaches itself, but this recognition result is a recognition result that can only be seen by the optical node device itself. Therefore, by advertising this recognition result to other optical node devices, it is possible to synchronize the 3R section information updated by the updating unit and share it with all the optical node devices, and utilize it effectively.

Alternatively, the optical node device of the present invention is an optical node device switching an optical signal and comprising: a transmitting unit which transmits an optical test signal each time an optical path is set for other optical node devices contained in the route from the optical node device itself to the destination node one hop at a time in order from a next hop adjacent optical node device; a receiving unit which, each time the optical test signal is transmitted to the other optical node devices contained in the route to the destination node one hop at a time in order from the next hop adjacent optical node device by the transmitting unit, receives a report of deterioration in the state of the optical test signal from another optical node device at the farthest end which receives the optical test signal; and a unit which, when the deterioration in the state of the optical test signal based on the report received by the receiving unit satisfies a predetermined deterioration condition, gives notification to another optical node device corresponding to one hop before the other optical node device at the farthest end that the other optical node device corresponding to one hop before the other optical node device at the farthest end is a 3R destination node, and also a 3R source node of a next 3R section, wherein the other optical node device that receives the notification is provided with: a transmission unit which transmits an optical test signal each time an optical path is set for other optical node devices contained in a route to the destination node one hop at a time in order from a next hop adjacent optical node device; a reception unit which, each time the optical test signal is transmitted to the other optical node devices contained in the route to the destination node one hop at a time in order from the next hop adjacent optical node device by the transmission unit, receives a report of deterioration in the state of the optical test signal from another optical node device at the farthest end which receives the optical test signal; and a unit which, when the deterioration in the state of the optical test signal based on the report received by the reception unit satisfies a predetermined deterioration condition, informs another optical node device corresponding to one hop before the other optical node device at the farthest end that the other optical node device corresponding to one hop before the other optical node device at the farthest end is a 3R destination node, and also a 3R source node of a next 3R section.

In this manner, since it is possible to generate 3R section information while physically establishing an optical path, 3R section information does not need to be generated in advance. Thus it is possible to reduce the processing load required for generating 3R section information.

Alternatively, the optical node device of the present invention is provided with: a setting unit which sets an optical test path from the optical node device itself to other optical node devices contained in a link to be measured, being a measurement object of 3R section information, one hop at a time in order from a next hop adjacent optical node device: a transmitting unit which transmits an optical test signal each time the optical test path is set for the other optical node devices contained in the link to be measured one hop at a time in order from the next hop adjacent optical node device by the setting unit; a receiving unit which, each time the optical test signal is transmitted to the other optical node devices contained in the link to be measured one hop at a time in order from the next hop adjacent optical node device by the transmitting unit, receives a report of deterioration in the state of the optical test signal from another optical node device at the farthest end that receives the optical test signal; and a recognizing unit which, when the deterioration in the state of the optical test signal based on the report received by the receiving unit satisfies a predetermined deterioration condition, recognizes another optical node device corresponding to one hop before the other optical node device at the farthest end as a 3R destination node, and also a 3R source node, of a next 3R section.

In this manner, since it is possible to generate 3R section information by the same procedure as in the case of physical optical path setting, it is possible to generate 3R section information with high accuracy based on measurement.

In this case, it is preferable to provide a unit which stores a recognition result from the recognizing unit. By so doing, it is possible to store 3R section information when establishing an optical path with the optical node device itself being a source node.

Alternatively, by providing a unit which advertises a recognition result from the recognizing unit to other optical node devices; and a unit which receives an advertisement from other optical node devices, and stores a recognition result contained in the advertisement together with a recognition result of the optical node itself device, it is possible for each optical node device to share 3R section information generated by itself and others. By so doing, it is possible to store 3R section information not only in the case where the optical node device itself is a source node, but also in the case where another optical node device is a source node. Hence it is possible to determine whether the optical node device itself implements 3R relay or not by itself in the case where another optical node device is a source node. Accordingly, it is possible to reduce the processing load when an optical node device, being a source node, requests the optical node device that implements 3R relay to implement 3R relay.

Alternatively, it is also possible to provide a unit which notifies a network control device which manages an optical network and stores 3R section information in the optical network, of a recognition result from the recognizing unit.

In this manner, it is possible for a network control device to store 3R section information for the whole optical network. Accordingly, since an optical node device can request a network control device for 3R section information as required, and acquire it, it is not necessary to provide large memory storage such as a database in the optical node device. Furthermore, it is not necessary for each optical node device to advertise the 3R section information generated by itself to the other optical node devices, and must advertise the 3R section information that itself generates only to the network control device. Thus it is possible to reduce the processing load required for advertisement.

The network control device in this case is provided with a unit which receives information of the 3R destination node or 3R source node from the optical node device that configures the optical network, and updates the 3R section information stored.

Alternatively, the optical node device of the present invention is provided with: a unit which stores a value Q, preset for each link based on optical signal deterioration characteristics in a link between the optical node device itself and an adjacent node; a unit which, when the optical node device itself is a source node, transmits an initial value P of a minuend to a next hop adjacent optical node device; a calculating unit which, when the optical node device itself receives from a previous hop adjacent optical node device, the initial value P or a minuend value P', which has already been reduced from the initial value P, calculates (P−Q) or (P'−Q); a unit which compares a calculated result of the calculating unit with a threshold value, and when the calculated result is greater than the threshold value, transmits the calculated result to the next hop adjacent optical node device, and when the calculated result is less than or equal to the threshold value, recognizes that the optical node device itself is a 3R destination node when an optical node device that transmits the initial value P of the minuend is a 3R source node; and a unit which, when it is recognized that the optical node device itself is a 3R destination node, and the optical node device itself is not a destination node of an optical path to which the value of the minuend is transmitted, transmits the initial value P of the minuend to the next hop adjacent optical node device using the optical node device itself as a 3R source node.

In this manner, the information stored in each optical node device consists only of the value Q associated with itself, and the initial value P to be transmitted to an adjacent optical node device in the case where itself is a source node, so it is possible to generate 3R section information using an extremely small amount of information. Furthermore, since it is possible to determine autonomously whether or not itself requires 3R relay when establishing an optical path, it is possible to reduce the processing load required for advertisement and the like. Furthermore, when establishing an optical path, it is not necessary to measure the deterioration in the state of an optical signal. Thus it is possible to set optical paths promptly.

Up to this point, the optical node device and a network control device of the present invention have been described assuming a unidirectional optical path, or a downstream optical path of a bi-directional optical path. The following is a description assuming an upstream optical path of a bi-directional optical path.

The optical node device of the present invention is provided with: a detecting unit which detects deterioration in the state of an optical signal in the upstream optical path that reaches the optical node device itself; a notifying unit which, when a detection result from the detecting unit indicates signal deterioration, notifies a next hop adjacent optical node device of the optical node device itself, that the next hop adjacent optical node device is a 3R destination node of the upstream optical path, and also a 3R source node of a next 3R section; a unit which, when the optical node device itself receives notification from the notifying unit of a previous hop adjacent optical node device, recognizes that the optical node device itself is a 3R destination node of the upstream optical path, and also a 3R source node of a next 3R section; and an updating unit which updates information of a 3R section the optical node device itself stores, based on a recognition result.

Alternatively, the optical node device of the present invention is provided with: a detecting unit which detects deterioration in the state of an optical signal in the upstream optical path that reaches the optical node device itself; a unit which, when a detection result from the detecting unit indicates signal deterioration, recognizes that the optical node device itself is a 3R destination node of the upstream optical path, and also a 3R source node of a next 3R section; and an updating unit which updates information of a 3R section the optical node device itself stores, based on a recognition result.

In this manner, in the case where an optical path is bi-directional, each optical node device can set an appropriate 3R section while performing measurement in an optical path setting process or in switching a process of optical signals, and furthermore can update the 3R section information.

Moreover, it is preferable to provide: a unit which advertises the information of the 3R section updated by the updating unit to other optical node devices; and a unit which receives an advertisement from the other optical node devices, and updates the information of the 3R section the optical node device itself stores. That is, it is possible to recognize that itself is a 3R destination node or a 3R source node by the measurement of an optical signal that reaches itself, but this recognition result is a recognition result that can only be seen by the optical node device itself. Therefore, by advertising this recognition result to other optical node devices, it is possible to synchronize the 3R section information updated by the updating unit and share it with all the optical node devices, and utilize it effectively Alternatively, the optical node device of the present invention is provided with: a unit which, when the optical node device itself is a source node, sets an optical path for other optical node devices contained in a route to the destination node one hop at a time in order from a next hop adjacent optical node device; a unit which, when the optical node device itself is not a source node, and when an optical path is set in the optical node device itself, transmits an optical test signal to the upstream optical path; a unit which, when the optical node device itself is a source node, receives the optical test signal, and give notification to a sender of the optical test signal of a report of deterioration in the state of the optical test signal; a unit which, when the optical node device itself is an optical node device being the sender of the optical test signal, and when the deterioration in the state of the optical test signal based on the notification satisfies a predetermined deterioration condition, recognizes that the optical node device itself is a 3R source node in the upstream optical path, and also a 3R destination node of a previous 3R section; and a unit which, when the optical node device itself is an optical node device that recognizes that the optical node device itself is a 3R source node in the upstream optical path, and also a 3R destination node of the previous 3R section, sets an optical path for the other optical node devices contained in a route from the optical node device itself to the destination node one hop at a time in order from the next hop adjacent optical node device, receives the optical test signal, and notifies the sender of the optical test signal of the report of the deterioration in the state of the optical test signal.

In this manner, in the case where an optical path is bi-directional, since it is possible to generate 3R section information while physically establishing an optical path, 3R section information does not need to be generated in advance. Thus it is possible to reduce the processing load required for generating 3R section information.

Alternatively, the optical node device of the present invention is provided with: a unit which, when the optical node device itself is a source node, sets an upstream optical test path in other optical node devices contained in a link to be measured, being a measurement object of 3R section information, one hop at a time in order from a next hop adjacent optical node device; a unit which, when the optical node device itself is an optical node device in which the upstream optical test path is set, sends an optical test signal to the upstream optical test path; a unit which, when the optical node device itself is a source node, receives the optical test signal, and notifies a sender of the optical test signal of a report of deterioration in the state of the optical test signal; a recognizing unit which, when the optical node device itself is an optical node device being the sender of the optical test signal, and when the deterioration in the state of the optical test signal based on the report satisfies a predetermined deterioration condition, recognizes that the optical node device itself is a 3R source node in the upstream optical path, and also a 3R destination node of a previous 3R section; and a unit which, when the optical node device itself is an optical node device that recognizes that the optical node device itself is a 3R source node in the upstream optical path, and also a 3R destination node of the previous 3R section, sets an upstream optical test path in the other optical node devices contained in a link to be measured, being a measurement object of 3R section information, one hop at a time in order from the next hop adjacent optical node device, receives the optical test signal, and informs the sender of the optical test signal of a report of deterioration in the state of the optical test signal.

In this manner, in the case where an optical path is bi-directional, since it is possible to generate 3R section information by the same procedure as in the case of physical optical path setting, it is possible to generate 3R section information with high accuracy based on measurement.

In this case, it is preferable to provide a unit which stores a recognition result from the recognizing unit. By so doing, it is possible to store 3R section information when establishing an optical path with the optical node device itself being a source node.

Alternatively, by providing a unit which advertises a recognition result from the recognizing unit to other optical node devices; and a unit which receives an advertisement from other optical node devices, and stores a recognition result contained in the advertisement together with a recognition result of the optical node itself device, it is possible for each optical node device to share 3R section information generated by itself and others. By so doing, it is possible to store 3R section information not only in the case where the optical node device itself is a source node, but also in the case where another optical node device is a source node. Hence it is possible to determine whether the optical node device itself implements 3R relay or not by itself in the case where another optical node device is a source node. Accordingly, it is possible to reduce the processing load when an optical node device, being a source node, requests the optical node device that implements 3R relay to implement 3R relay.

Alternatively, it is also possible to provide a unit which notifies a network control device which manages an optical network and stores 3R section information in the optical network, of a recognition result from the recognizing unit.

In this manner, it is possible for a network control device to store 3R section information of the whole optical network. Accordingly, since an optical node device can request a network control device for 3R section information as required, and acquire it, it is not necessary to provide large memory storage such as a database in the optical node device. Furthermore, it is not necessary for each optical node device to advertise the 3R section information generated by itself to the other optical node devices, and must notify the 3R section information that itself generates only to the network control device. Thus it is possible to reduce the processing load required for advertisement.

The network control device in this case is provided with a unit which receives information of the 3R destination node or 3R source node from the optical node device that configures the optical network, and updates the 3R section information stored.

Alternatively, the optical node device of the present invention is provided with: a unit which stores a value q, preset for each link based on optical signal deterioration characteristics in a link between the optical node device itself and an adjacent node; a unit which, when the optical node device itself is a source node, transmits an initial value p of an augend to a next hop adjacent optical node device; a calculating unit which, when the optical node device itself receives from a previous hop adjacent optical node device, the initial value p or an augend value p', which has already been increased from the initial value p, calculates (p+q) or (p'+q); a unit which compares a calculated result of the calculating unit with a threshold value, and when the calculated result is less than the threshold value, transmits the calculated result to the next hop adjacent optical node device, and when the calculated result is greater than or equal to the threshold value, recognizes that the optical node device itself is a 3R source node when an optical node device that transmits the initial value p of the augend is a 3R destination node in the upstream optical path; and a unit which, when the optical node device itself recognizes that the optical node device itself is a 3R source node in the upstream optical path, and is not a destination node of an optical path to which the value of the augend is transmitted, transmits the initial value p of the augend to the next hop adjacent optical node device using the optical node device itself as a 3R destination node in the upstream optical path.

In this manner, the information stored in each optical node device consists only of the value q associated with itself, and the initial value p to be transmitted to an adjacent optical node device in the case where itself is a source node, it is possible to generate the 3R section information with an extremely small amount of information. Furthermore, since it is possible to determine autonomously whether or not itself requires 3R relay when establishing an optical path, it is possible to reduce the processing load required for advertisement. Furthermore, when establishing an optical path, it is not necessary to measure the deterioration in the state of an optical signal, and thus it is possible to set optical paths promptly.

A fifteenth aspect of the present invention is an optical network that is provided with an optical node device, a maintenance-staff device, or a network control device, of the present invention.

A sixteenth aspect of the present invention is a method of generating 3R section information in a path from a source node to a destination node, which performs: a first step of transmitting an optical test signal from an optical node device being the source node each time an optical path, is set for optical node devices contained in a route to the destination node one hop at a time in order from a next hop adjacent optical node device of the optical node device, being the source node; a second step in which, each time the optical test signal is transmitted in the first step to the optical node devices contained in the route to the destination node one hop at a time in order from the next hop adjacent optical node device of the optical node device, being the source node, the optical node device, being the source node, receives a report of deterioration in the state of the optical test signal from an optical node device at the farthest end that receives the optical test signal; a third step in which, when the deterioration in the state of the optical test signal based on the report received in the second step satisfies a predetermined deterioration condition, the optical node device, being the source node, gives notification to an optical node device one hop before the optical node device at the farthest end that the optical node device one hop before the optical node device at the farthest end is a 3R destination node, and also a 3R source node of a next 3R section; a fourth step in which an optical node device which receives the notification transmits an optical test signal each time an optical path is set for optical node devices contained in a route to the destination node one hop at a time in order from a next hop adjacent optical node device to the optical node device itself; a fifth step in which the optical node device which receives the notification receives a report of deterioration in the state of the optical test signal from the optical node device at the farthest end which receives the optical test signal, each time the optical test signal is transmitted in the fourth step to the optical node devices contained in the route to the destination node one hop at a time in order from the next hop adjacent optical node device to the optical node device itself; and a sixth step in which, when the deterioration in the state of the optical test signal based on the report received in the fifth step satisfies a predetermined deterioration condition, the optical node device which receives the notification informs an optical node device one hop before the optical node device at the farthest end that the optical node device one hop before the optical node device at the farthest end is a 3R destination node, and also a 3R source node, of a next 3R section.

Alternatively, a method of generating 3R section information of the present invention performs: a seventh step in which an optical node device, being a 3R source node, sets an optical test path to optical node devices contained in a link to be measured, being a measurement object of 3R section information, one hop at a time in order from a next hop adjacent optical node device; an eighth step of transmitting an optical test signal, each time the optical test path is set for the optical node devices contained in the link to be measured one hop at a time in order from the next hop adjacent optical node device of the optical node device, being the 3R source node, in the seventh step; a ninth step in which the optical node device, being the 3R source node, receives a report of deterioration in the state of the optical test signal from an optical node device at the farthest end which receives the optical test signal, each time the optical test signal is transmitted to the optical node devices contained in the link to be measured one hop at a time in order from the next hop adjacent optical node device of the optical node device, being the 3R source node, in the eighth step; and a tenth step in which, when the deterioration in the state of the optical test signal based on the report received in the ninth step satisfies a predetermined deterioration condition, the optical node device, being the 3R source node, recognizes an optical node device one hop before the optical node device at the farthest end as a 3R destination node.

Alternatively, a method of generating 3R section information of the present invention is further provided with: a step in which each optical node device stores a value Q, preset for each link based on optical signal deterioration characteristics in a link between each optical node device and an adjacent node; a step in which an optical node device, being a source node, transmits an initial value P of a minuend to a next hop adjacent optical node device; a step in which each optical node device calculates (P–Q) or (P'–Q) when each optical node device receives from a previous hop adjacent optical node device, the initial value P or a value of a minuend P', which has already been reduced from the initial value P, compares a calculated result with a threshold value, and when the calculated result is greater than the threshold value, each optical node device transmits the calculated result to the next hop adjacent optical node device, and when the calculated result is less than or equal to the threshold value, each optical node device recognizes that the optical node device itself is a 3R destination node when the optical node device that has transmitted the initial value P of the minuend is a 3R source node, and when each optical node recognizes that the optical node device itself is a 3R destination node, and when the optical node device itself is not a destination node of an optical path to which the value of the minuend is transmitted, each optical node device transmits the initial value P of the minuend to the next hop adjacent optical node device using the optical node device itself as a 3R source node.

Up to this point, the method of generating 3R section information according to the present invention has been described assuming a unidirectional optical path, or a downstream optical path of a bi-directional optical path. The following is a description assuming an upstream optical path of a bi-directional optical path.

A method of generating 3R section information of the present invention performs: an eleventh step in which an optical node device, being a source node, sets an optical path for other optical node devices contained in a route to the destination node one hop at a time in order from a next hop adjacent optical node device; a twelfth step in which an optical node device that is not a source node transmits an optical test signal to the upstream optical path when an optical path is set in the optical node device that is not the source node; a thirteenth step in which the optical node device, being a source node, receives the optical test signal, and informs a sender of the optical test signal of a report of deterioration in the state of the optical test signal; a fourteenth step in which, when the deterioration in the state of the optical test signal based on the report satisfies a predetermined deterioration condition, the optical node device being the sender of the optical test signal, recognizes that the optical node device being the sender of the optical test signal, is a 3R source node in the upstream optical path, and also a 3R destination node of a previous 3R section; and a fifteenth step in which the optical node device that recognizes that the optical node device itself is a 3R source node in the upstream optical path, and also a 3R destination node of the previous 3R section, sets an optical path for other optical node devices contained in a route from the optical node device itself to the destination node one hop at a time in order from a next hop adjacent optical node device, receives the optical test signal, and informs a sender of the optical test signal of a report of deterioration in the state of the optical test signal.

Alternatively, a method of generating 3R section information of the present invention performs: a sixteenth step in which an optical node device, being a source node, sets an upstream optical test path in other optical node devices contained in a link to be measured, being a measurement object of 3R section information, one hop at a time in order from a next hop adjacent optical node device; a seventeenth step in which an optical node device in which the upstream optical test path is set transmits an optical test signal to the upstream optical test path; an eighteenth step in which the optical node device, being the source node, receives the optical test signal, and notifies a report of deterioration in the state of the optical test signal to a sender of the optical test signal; a nineteenth step in which, when the deterioration in the state of the optical test signal based on the report satisfies a predetermined deterioration condition, the optical node device being the sender of the optical test signal, recognizes that the optical node device, being the sender of the optical test signal, is a 3R source node in the upstream optical path, and also a 3R destination node of a previous 3R section; and a twentieth step, in which the optical node device that recognizes that the optical node device itself is a 3R source node in the upstream optical path, and also a 3R destination node of the previous 3R section, sets an upstream optical test path for the other optical node devices contained in the link to be measured, being a measurement object of 3R section information, one hop at a time in order from the next hop adjacent optical node device, receives the optical test signal, and informs the sender of the optical test signal of the report of the deterioration in the state of the optical test signal.

Alternatively, a method of generating 3R section information of the present invention is further provided with: a step in which each optical node device stores a value q, preset for each link based on optical signal deterioration characteristics in a link between each optical node device and an adjacent node; a step in which an optical node device, being a source node, transmits an initial value p of an augend to a next hop adjacent optical node device; and a step in which each optical node device calculates (p+q) or (p'+q) when each optical node device receives from a previous hop adjacent optical node device, the initial value p or a value of an augend p', which has already been increased from the initial value p, compares a calculated result with a threshold value, and when the calculated result is less than the threshold value, transmits the calculated result to the next hop adjacent optical node device, and when the calculated result is greater than or equal to the threshold value, recognizes that the optical node device itself is a 3R source node when the optical node device that has transmitted the initial value p of the augend is a 3R destination node of the upstream optical path, and when each optical node device recognizes that the optical node device itself is a 3R source node of the upstream optical path, and is not a destination node of an optical path to which the value of the augend is transmitted, each optical node device transmits the initial value p of the augend to the next hop adjacent optical node device using the optical node device itself as a 3R destination node of the upstream optical path.

As described above, according to the present invention, it is possible to realize effective usage of network resources using the minimum number or minimum capability of 3R repeaters necessary, and to construct an economical optical network.

BEST MODE FOR CARRYING OUT THE INVENTION

Hereunder is a description of preferred embodiments according to the present invention, with the reference of drawings. However, the present invention is not limited to the respective embodiments below, and for example, components of these embodiments may be appropriately combined.

Figure 1:
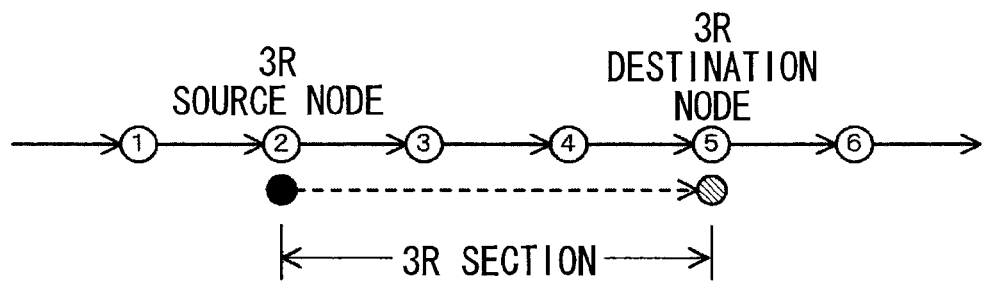
FIG. 1 is an explanatory diagram of the denotation of a 3R source node, a 3R destination node, and a 3R section.
Figure 2:
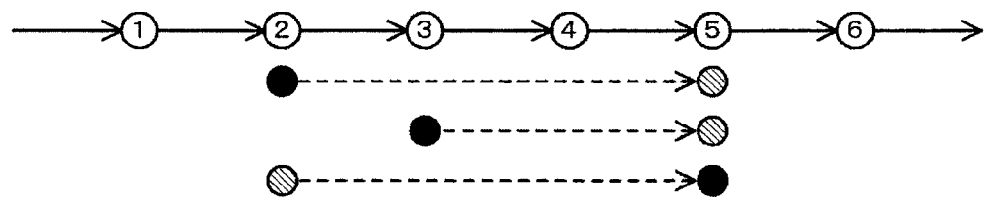
FIG. 2 is an explanatory diagram of the character of 3R sections.
Figure 3:
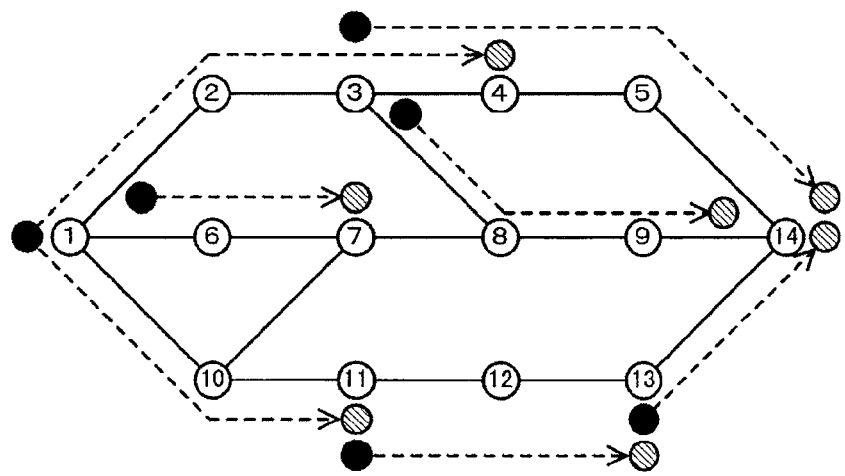
FIG. 3 shows an example of 3R section information corresponding to topology information of an optical network.

Prior to describing the respective embodiments of the present invention, the denotation of a 3R section, a 3R source node, and a 3R destination node are described with reference to FIG. 1 to FIG. 3. FIG. 1 is an explanatory diagram of the denotation of a 3R source node, a 3R destination node, and a 3R section. FIG. 2 is an explanatory diagram of the character of 3R sections. FIG. 3 shows an example of 3R section information corresponding to topology information of an optical network. As shown in FIG. 1, in the respective embodiments according to the present invention, a black circle denotes a 3R source node and a hatched circle denotes a 3R destination node.

Moreover, the section between optical node devices 2 and 5 is the 3R section. However, not every section between the optical node devices 2, 3, 4, and 5 included therebetween is necessarily the 3R section. The reason is that the capacity of the light emission element and the light receiving element of the respective optical node devices is not necessarily uniform.

That is, in a case where an optical signal emitted from the light emission element of the optical node device 2 is received by the light receiving element of the optical node device 5 without the necessity of the 3R relay partway, for example, assuming that the light emission element of the optical node device 3 can output only half the optical signal intensity or less compared to the light emission element of the optical node device 2, the section between the optical node devices 3 and 5 will not necessarily become the 3R section. Alternatively, assuming that the light receiving element of the optical node device 4 has only half the light receiving sensitivity or less compared to the light receiving element of the optical node device 5, the section between the optical node devices 2 and 4 will not necessarily become the 3R section. Moreover, even in a section where the optical node device 5 is the 3R source node and the optical node device 2 is the 3R destination node, the same light emission element or light receiving element is not necessarily used for upstream and downstream communication so that the optical signal intensity or the light receiving sensitivity may differ for each case, and hence it does not necessarily become the 3R section. Therefore, as shown in FIG. 2, the 3R section may be denoted overlapping a part of or all of the other 3R sections in some cases.

As shown in FIG. 3, the 3R section information that is set in such manner is denoted corresponding to the topology information of the optical network. In the example of FIG. 3, optical node devices 1, 3, 11, and 13 are specified as the 3R source nodes. The administrator of the optical network specifies such 3R source nodes; for example source nodes of an optical path having a large traffic demand are specified as the 3R source nodes.

A one hop section between adjacent optical node devices obviously functions as the 3R section. However, in the present invention, a section between a 3R source node and a 3R destination node which has been previously specified is set as the 3R section. Moreover, when setting an optical path between optical node devices where the 3R section has not been previously set, there may be cases where the 3R section needs to be set temporarily. In such cases, the 3R section is temporarily set based on a predetermined determination policy. In such a case, the 3R section is set as an obvious 3R section one hop at a time.

Moreover, if it is possible to link between the source node and the destination node with the same wavelength, wavelength conversion is unnecessary so that wavelength conversion resources can be used most effectively. However, the usage situation of the wavelength changes each time according to the wavelength usage situation in the overall optical network. Therefore there is no other way but to decide the optical node device for converting the wavelength according to the wavelength vacancy situation at the time of the optical path setting request. However, in a case where an optical node device necessarily requiring wavelength conversion is previously known, the optical node device is preferably set as the 3R source node. Such cases where the optical node device necessarily requiring the wavelength conversion is previously known, includes a case, for example where the contents of the wavelength conversion resources of a certain optical node device differ from the contents of the wavelength conversion resources of the previous-hop optical node device, so that optical path setting with the same wavelength is impossible in terms of hardware.

First Embodiment

Figure 4:
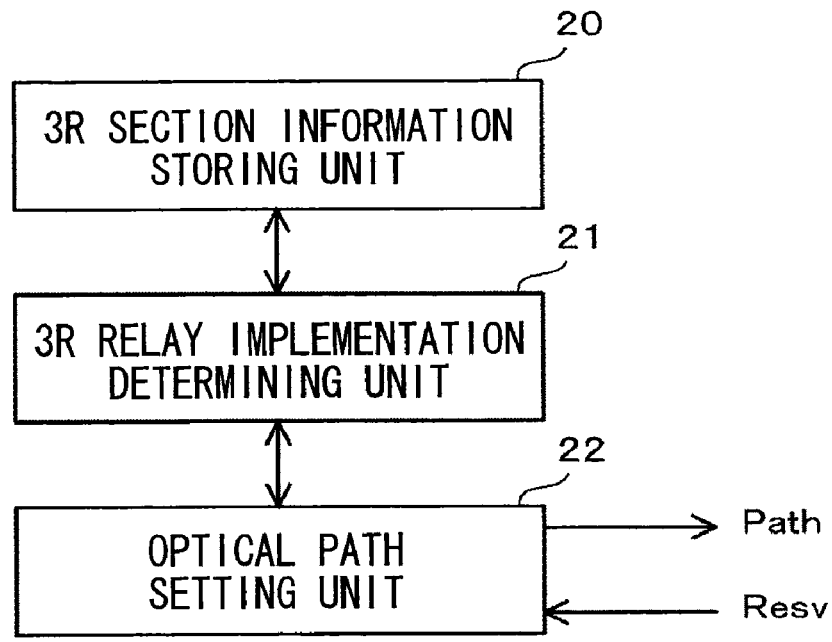
FIG. 4 is a schematic block diagram of an optical node device according to first, third, fifth, sixth, twelfth, and sixteenth embodiments.
Figure 5:
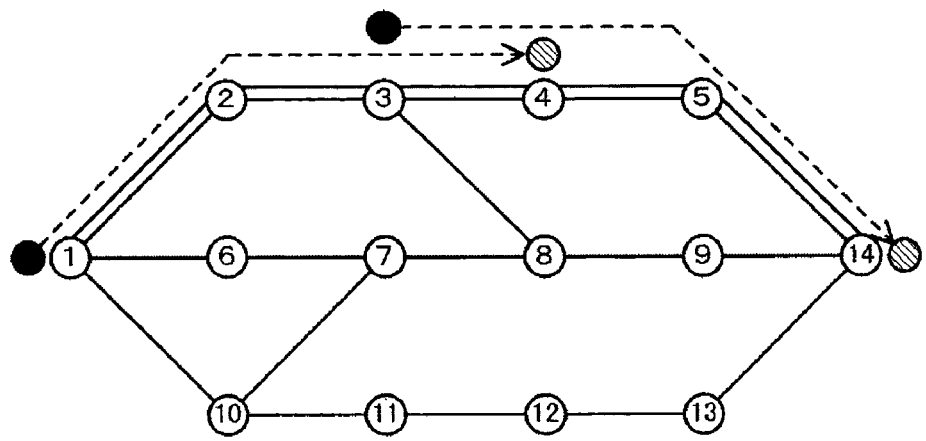
FIG. 5 is a diagram showing optical paths and 3R sections set in an optical network.
Figure 6:
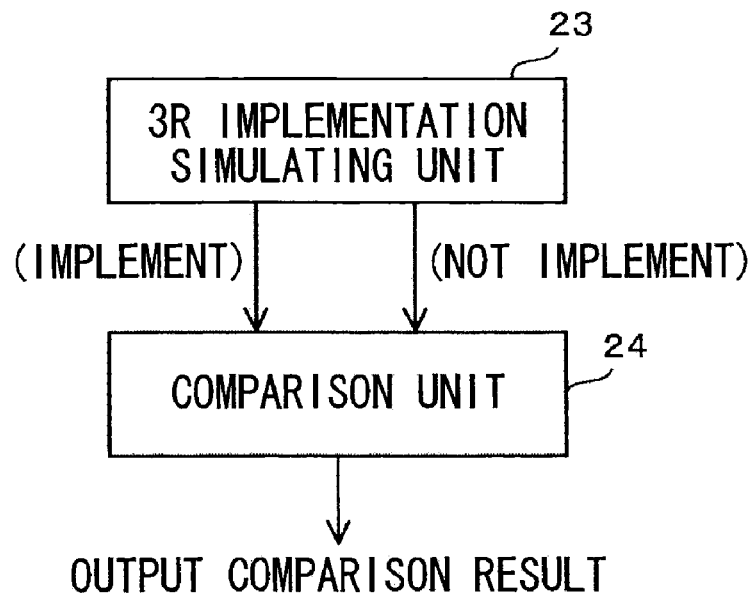
FIG. 6 is a block diagram of a 3R relay implementation determining unit.
Figure 7:
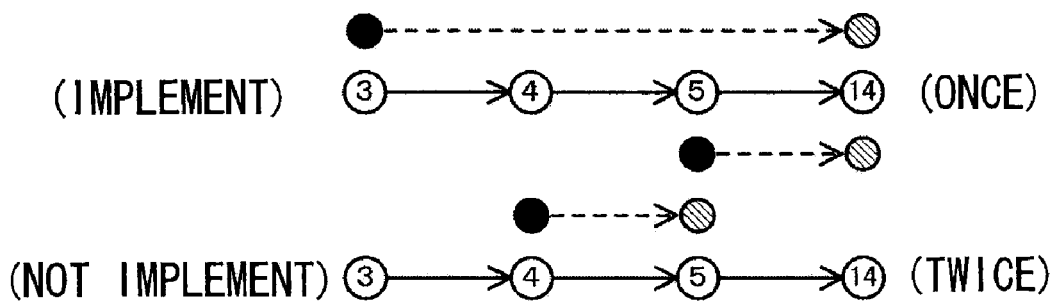
FIG. 7 is an explanatory diagram of the operation of a 3R implementation simulating unit.
Figure 8:
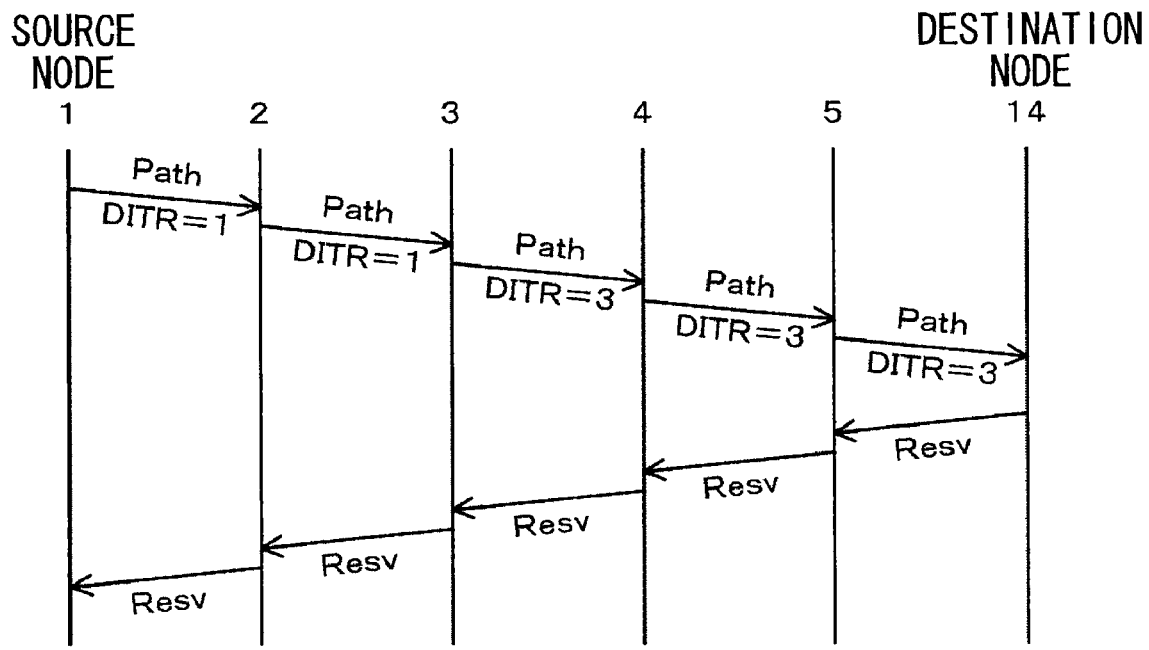
FIG. 8 shows a signaling procedure when setting an optical path in the first embodiment.
Figure 9:
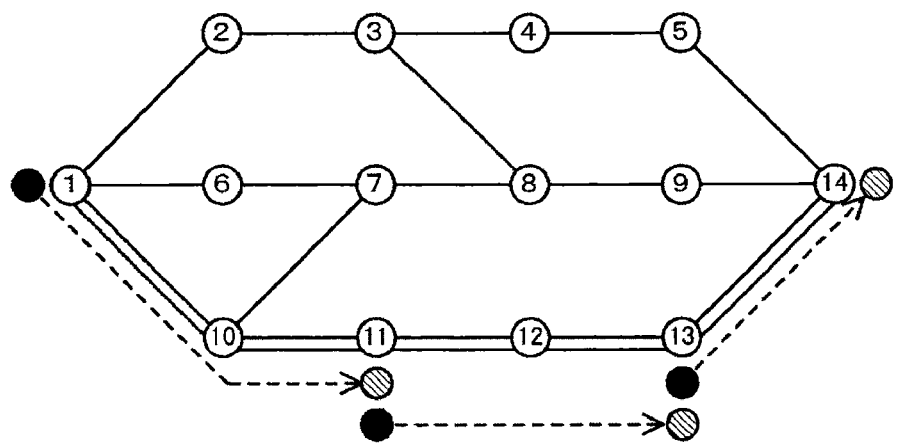
FIG. 9 shows optical paths and 3R sections set in an optical network.
Figure 10:
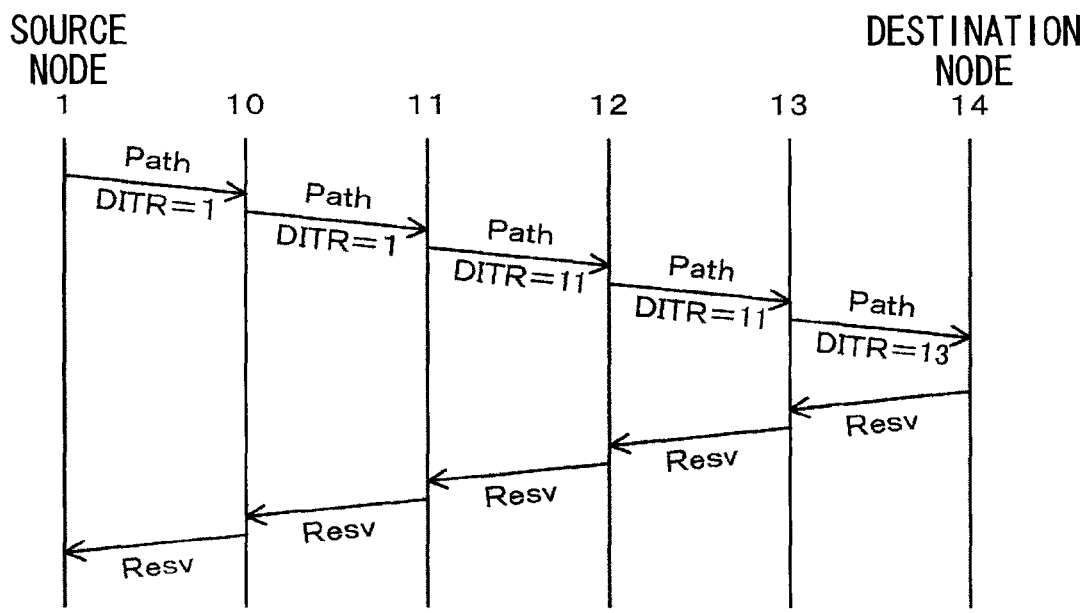
FIG. 10 shows a signaling procedure when setting an optical path in the first embodiment.

Optical node devices of a first embodiment are described with reference to FIG. 3 to FIG. 10. FIG. 4 is a schematic block diagram of an optical node device according to the first embodiment. FIG. 5 and FIG. 9 show optical paths and 3R sections set in optical networks. FIG. 6 is a block diagram of a 3R relay implementation determining unit 21. FIG. 7 is an explanatory diagram of the operation of a 3R implementation simulating unit. FIG. 8 and FIG. 10 show signaling procedures according to the first embodiment when setting an optical path.

As shown in FIG. 4, the optical node device according to the first embodiment comprises: a 3R section information storing unit 20 which stores 3R section information corresponding to the topology information of the optical network to which the optical node device itself belongs as shown in FIG. 3; and a 3R relay implementation determining unit 21 which determines autonomously whether or not the optical node device itself is the optical node device for implementing the 3R relay when an optical path passing through the optical node device itself is set, with reference to the 3R section information stored in the 3R section information storing unit 20.

In the first embodiment, since each optical node device determines autonomously whether or not each optical node device itself is the 3R relay implementation node, each optical node device is required to store the 3R section information respectively. However, the optical node device not related to the optical path setting is not required to store the 3R section information. Therefore if only the optical node device on the route related to the optical path setting stores the 3R section information, the information storage resources can be effectively used.

Next is a description of the operation of the optical node device according to the first embodiment. Here, as shown in FIG. 5, is a description of an example where an optical path from the optical node device 1 to the optical node device 14 (double lines) is set. The 3R relay implementation determining unit 21 of the optical node device 1 refers to the 3R section information storing unit 20 in order to know what part the optical node device 1 is in the topology of the optical network. As a result, it recognizes that the optical node device 1 is a source node of the optical path to be set, so that the optical node device 1 determines to implement the 3R relay.

An optical path setting unit 22 of the optical node device 1 receives the determination of the 3R relay implementation determining unit 21 and ensures the resources for optical path setting and 3R relay. Then, as shown in FIG. 8, the optical path setting unit 22 loads a message of DITR (Downstream Ingress Three R)=1 showing that the optical node device 1 is the 3R source node, into the optical path setting request when sending the optical path setting request (Path) to the optical node device 2.

The optical path setting unit 22 of the optical node device 2 which receives the optical path setting request (Path) from the optical node device 1 queries the 3R relay implementation determining unit 21 as to whether or not the optical node device 2 is the optical node device for implementing the 3R relay. The 3R relay implementation determining unit 21 of the optical node device 2 refers to the 3R section information stored in the 3R section information storing unit 20 and finds out that the optical node device 2 is not the 3R source node, and due to the delivery of the DITR=1 from the optical node device 1, that the 3R section is up to the optical node device 4 if the optical node device 1 is the 3R source node, so that the 3R relay implementation determining unit 21 determines that optical node device 2 does not implement the 3R relay.

The optical path setting unit 22 of the optical node device 2 receives the determination of the 3R relay implementation determining unit 21 and ensures the resources for optical path setting. Then, as shown in FIG. 8, since the optical node device 2 does not implement the 3R relay, when sending the optical path setting request (Path) to the optical node device 3, the optical path setting unit 22 loads the intact DITR=1 from the optical node device 1 into the optical path setting request.

The optical path setting unit 22 of the optical node device 3 which receives the optical path setting request (Path) from the optical node device 2 queries the 3R relay implementation determining unit 21 as to whether or not the optical node device 3 is the optical node device for implementing the 3R relay. The 3R relay implementation determining unit 21 of the optical node device 3 refers to the 3R section information stored in the 3R section information storing unit 20 and recognizes that the optical node device 3 may implement the 3R relay since it is the 3R source node on the 3R section from the optical node device 3 to the optical node device 14, or that the optical node device 3 may not implement the 3R relay but transmit the intact optical signal to the optical node device 4 being the 3R destination node since it is not the 3R source node on the 3R section from the optical node device 1 to the optical node device 4.

In such a case, the 3R relay implementation determining unit 21 of the optical node device 3 uses a 3R implementation simulating unit 23 and a comparison unit 24 shown in FIG. 6 to compare the number of 3R implementations with regards to the optical path from the optical node device 3 to the optical node device 14 in the case where the optical node device 3 functions as the 3R source node, and the case where the optical node device 3 does not function as the 3R source node. That is, as shown in FIG. 7, in the 3R implementation simulating unit 23, the 3R section is set for respective cases where the optical node device 3 implements the 3R relay and the case where the optical node device 3 does not implement the 3R relay. If the optical node device 3 performs the 3R relay, then as shown in FIG. 7, there is 3R section information where the optical node device 3 is the 3R source node and the optical node device 14 being the destination node is the 3R destination node, so that one 3R section is set. Therefore, the number of 3R implementations becomes once.

If the optical node device 3 does not perform the 3R relay, the optical node device 4 becomes the 3R destination node. Here, the 3R implementation simulating unit 23 simulates the determination of the 3R relay implementation determining unit 21 of the optical node device 4. The determination policy of the 3R relay implementation determining unit 21 of the optical node device 4 is "when the optical node device itself is the optical node device corresponding to the 3R destination node and the optical node device is not a destination node, the optical node device determines that itself is the optical node device for implementing the 3R relay using itself as the 3R source node and the next-hop optical node device as the 3R destination node."

That is, it simulates that, "the 3R relay implementation determining unit 21 of the optical node device 4 determines that the optical node device 4 itself is the optical node device corresponding to the 3R destination node and is not a destination node, so that the optical node device 4 itself is the optical node device for implementing the 3R relay using itself as the 3R source node and the next-hop optical node device 5 as the 3R destination node." Therefore, if the optical node device 4 becomes the 3R destination node, the optical node device 4 determines to perform the 3R relay using the optical node device 4 as the 3R source node and the next-hop optical node device 5 as the 3R destination node.

Next, the 3R implementation simulating unit 23 simulates the determination of the 3R relay implementation determining unit 21 of the optical node device 5. The determination policy of the 3R relay implementation determining unit 21 of the optical node device 5 is "when the optical node device 5 itself does not belong to any 3R section having a 3R source node on the optical path passing through the optical node device 5, it determines that the optical node device 5 itself is the optical node device for implementing the 3R relay using the optical node device 5 itself as the 3R source node and the next-hop optical node device as the 3R destination node".

That is, it simulates that, "the 3R relay implementation determining unit 21 of the optical node device 5 determines that the optical node device 5 itself does not belong to any 3R section having a 3R source node on the optical path passing through the optical node device 5 itself, so that the optical node device 5 is the optical node device for implementing the 3R relay using the optical node device 5 itself as the 3R source node and the next-hop optical node device 14 as the 3R destination node". Accordingly it is found that the optical node device 5 implements 3R relay with the optical node device 5 as the 3R source node and the next-hop optical node device 14 of the optical node device 5 as the 3R destination node. Therefore, the number of 3R implementations becomes twice.

Such simulation results of the 3R implementation simulating unit 23 are input into the comparison unit 24. In the comparison unit 24, it is found that the number of 3R implementations can be reduced in the case where the optical node device 3 performs the 3R relay compared to the case where the optical node device 3 does not perform the 3R relay. Therefore to that effect is output as a comparison result. In the 3R relay implementation determining unit 21, as a comparison result, the case having the lower number of 3R implementations is selected. Therefore, the optical node device 3 determines that it performs the 3R relay.

In principle, such simulation is performed when, the one optical node device is the 3R source node on any one of a plurality of 3R sections including the overlapped part on the optical paths passing through this one optical node device, and this one optical node device does not correspond to the 3R source node or 3R destination node on any other 3R sections. This is applied to the other embodiments.

The optical path setting unit 22 of the optical node device 3 receives the determination of the 3R relay implementation determining unit 21 and ensures the resources for optical path setting and the 3R relay. Then, as shown in FIG. 8, the optical path setting unit 22 loads a message of DITR=3 showing that the optical node device 3 is the 3R source node, into the optical path setting request when sending the optical path setting request (Path) to the optical node device 4.

The optical path setting unit 22 of the optical node device 4 which receives the optical path setting request (Path) from the optical node device 3 queries the 3R relay implementation determining unit 21 as to whether or not the optical node device 4 is an optical node device for implementing the 3R relay. The 3R relay implementation determining unit 21 of the optical node device 4 refers to the 3R section information stored in the 3R section information storing unit 20 and finds out that the optical node device 4 is the 3R destination node, and due to the delivery of the DITR=3 from the optical node device 3, that the 3R section is up to the optical node device 14 if the optical node device 3 is the 3R source node. Therefore the 3R relay implementation determining unit 21 determines that the optical node device 4 is not required to perform the 3R relay.

The optical path setting unit 22 of the optical node device 4 receives the determination of the 3R relay implementation determining unit 21 and ensures the resources for optical path setting. Then, since the optical node device 4 does not perform the 3R relay, as shown in FIG. 8, when sending the optical path setting request (Path) to the optical node device 5, the optical path setting unit 22 loads the intact DITR=3 from the optical node device 3 into the optical path setting request.

The optical path setting unit 22 of the optical node device 5 which receives the optical path setting request (Path) from the optical node device 4 queries the 3R relay implementation determining unit 21 as to whether or not the optical node device 5 is an optical node device for implementing the 3R relay. The 3R relay implementation determining unit 21 of the optical node device 5 refers to the 3R section information stored in the 3R section information storing unit 20 and finds out that the optical node device 5 is not the 3R source node, and due to the delivery of the DITR=3 from the optical node device 4, that the 3R section is up to the optical node device 14 if the optical node device 3 is the 3R source node. Therefore the optical path setting unit 22 determines that the optical node device 5 is not required to implement the 3R relay.

The optical path setting unit 22 of the optical node device 5 receives the determination of the 3R relay implementation determining unit 21 and ensures the resources for optical path setting. Then, since the optical node device 5 does not implement the 3R relay, as shown in FIG. 8, when sending the optical path setting request (Path) to the optical node device 14, the optical path setting unit 22 loads the intact DITR=3 from the optical node device 4 into the optical path setting request.

The optical path setting unit 22 of the optical node device 14 which receives the optical path setting request (Path) from the optical node device 5 queries the 3R relay implementation determining unit 21 as to whether or not the optical node device 14 is the optical node device for implementing the 3R relay. The 3R relay implementation determining unit 21 of the optical node device 14 refers to the 3R section information stored in the 3R section information storing unit 20 and determines that it is not required to implement the 3R relay since the optical node device 14 is the destination node.

The optical path setting unit 22 of the optical node device 14 receives the determination of the 3R relay implementation determining unit 21 and ensures the resources for optical path setting. Then, as shown in FIG. 8, the optical path setting unit 22 sends the optical path setting completion notification (Resv) to the optical node device 5.

This optical path setting completion notification (Resv) is transmitted through the optical node devices 5->4->3->2->1 so that the optical path setting is completed. In this way, the respective optical node devices 1, 2, 3, 4, 5, and 14 can determine autonomously whether or not they themselves implement the 3R relay in the process of performing the signaling procedure of the optical path setting.

Next is a description of another example of the operation of the optical node device according to the first embodiment. Here as shown in FIG. 9, is a description of an example where an optical path from the optical node device 1 to the optical node device 14 (double lines) is set. The 3R relay implementation determining unit 21 of the optical node device 1 refers to the 3R section information storing unit 20 in order to know what part the optical node device 1 is in the topology of the optical network. As a result, the 3R relay implementation determining unit 21 recognizes that the optical node device 1 is a source node of the optical path to be set, and the 3R relay implementation determining unit 21 determines that the optical node device 1 implements the 3R relay.

The optical path setting unit 22 of the optical node device 1 receives the determination of the 3R relay implementation determining unit 21 and ensures the resources for optical path setting and the 3R relay. Then, as shown in FIG. 10, the optical path setting unit 22 loads a message of DITR=1 showing that the optical node device 1 is the 3R source node, into the optical path setting request when sending the optical path setting request (Path) to the optical node device 10.

The optical path setting unit 22 of the optical node device 10 which receives the optical path setting request (Path) from the optical node device 1 queries the 3R relay implementation determining unit 21 as to whether or not the optical node device 10 is the optical node device for implementing the 3R relay. The 3R relay implementation determining unit 21 of the optical node device 10 refers to the 3R section information stored in the 3R section information storing unit 20 and finds out that the optical node device 10 is not the 3R source node, and due to the delivery of the DITR=1 from the optical node device 1, that the 3R section is up to the optical node device 11 if the optical node device 1 is the 3R source node. Therefore the 3R relay implementation determining unit 21 determines that the optical node device 10 does not implement the 3R relay.

The optical path setting unit 22 of the optical node device 10 receives the determination of the 3R relay implementation determining unit 21 and ensures the resources for optical path setting. Then, since the optical node device 10 does not implement the 3R relay, as shown in FIG. 10, when sending the optical path setting request (Path) to the optical node device 11, the optical path setting unit 22 loads the intact DITR=1 from the optical node device 1 into the optical path setting request.

The optical path setting unit 22 of the optical node device 11 which receives the optical path setting request (Path) from the optical node device 10 queries the 3R relay implementation determining unit 21 as to whether or not the optical node device 11 is the optical node device for implementing the 3R relay. The 3R relay implementation determining unit 21 of the optical node device 11 refers to the 3R section information stored in the 3R section information storing unit 20, and determines that the optical node device 11 implements the 3R relay since the optical node device 11 is the 3R source node on the 3R section from the optical node device 11 to the optical node device 13.

The optical path setting unit 22 of the optical node device 11 receives the determination of the 3R relay implementation determining unit 21 and ensures the resources for optical path setting and the 3R relay. Then, as shown in FIG. 10, the optical path setting unit 22 loads a message of DITR=11 showing that the optical node device 11 is the 3R source node, into the optical path setting request when sending the optical path setting request (Path) to the optical node device 12.

The optical path setting unit 22 of the optical node device 12 which received the optical path setting request (Path) from the optical node device 11 queries the 3R relay implementation determining unit 21 as to whether or not the optical node device 12 is the optical node device for implementing the 3R relay. The 3R relay implementation determining unit 21 of the optical node device 12 refers to the 3R section information stored in the 3R section information storing unit 20, and determines that the optical node device 12 is not the 3R source node or 3R destination node, so that the optical node device 12 is not required to implement the 3R relay.

The optical path setting unit 22 of the optical node device 12 receives the determination of the 3R relay implementation determining unit 21 and ensures the resources for optical path setting. Then, since the optical node device 12 does not implement the 3R relay, as shown in FIG. 10, when sending the optical path setting request (Path) to the optical node device 13, the optical path setting unit 22 loads the intact DITR=11 from the optical node device 11 into the optical path setting request.

The optical path setting unit 22 of the optical node device 13 which receives the optical path setting request (Path) from the optical node device 12 queries the 3R relay implementation determining unit 21 as to whether or not the optical node device 13 is the optical node device for implementing the 3R relay. The 3R relay implementation determining unit 21 of the optical node device 13 refers to the 3R section information stored in the 3R section information storing unit 20, and determines that the optical node device 13 is the 3R source node, so that the optical node device 13 implements the 3R relay.

The optical path setting unit 22 of the optical node device 13 receives the determination of the 3R relay implementation determining unit 21 and ensures the resources for optical path setting and the 3R relay. Then, since the optical node device 13 implements the 3R relay, as shown in FIG. 10, when sending the optical path setting request (Path) to the optical node device 14, the optical path setting unit 22 loads DITR=13 into the optical path setting request.

The optical path setting unit 22 of the optical node device 14 which receives the optical path setting request (Path) from the optical node device 13 queries the 3R relay implementation determining unit 21 as to whether or not the optical node device 14 is the optical node device for implementing the 3R relay. The 3R relay implementation determining unit 21 of the optical node device 14 refers to the 3R section information stored in the 3R section information storing unit 20, and determines that the optical node device 14 is the destination node, so that the optical node device 14 is not required to implement the 3R relay.

The optical path setting unit 22 of the optical node device 14 receives the determination of the 3R relay implementation determining unit 21 and ensures the resources for optical path setting. Then, as shown in FIG. 10, the optical path setting unit 22 sends the optical path setting completion notification (Resv) to the optical node device 13.

This optical path setting completion notification (Resv) is transmitted through the optical node devices 13->12->11->10->1 so that the optical path setting is completed. In this way, the respective optical node devices 1, 10, 11, 12, 13, and 14 can determine autonomously whether or not they themselves implement the 3R relay in the process of performing the signaling procedure of the optical path setting.

Second Embodiment

Figure 11:
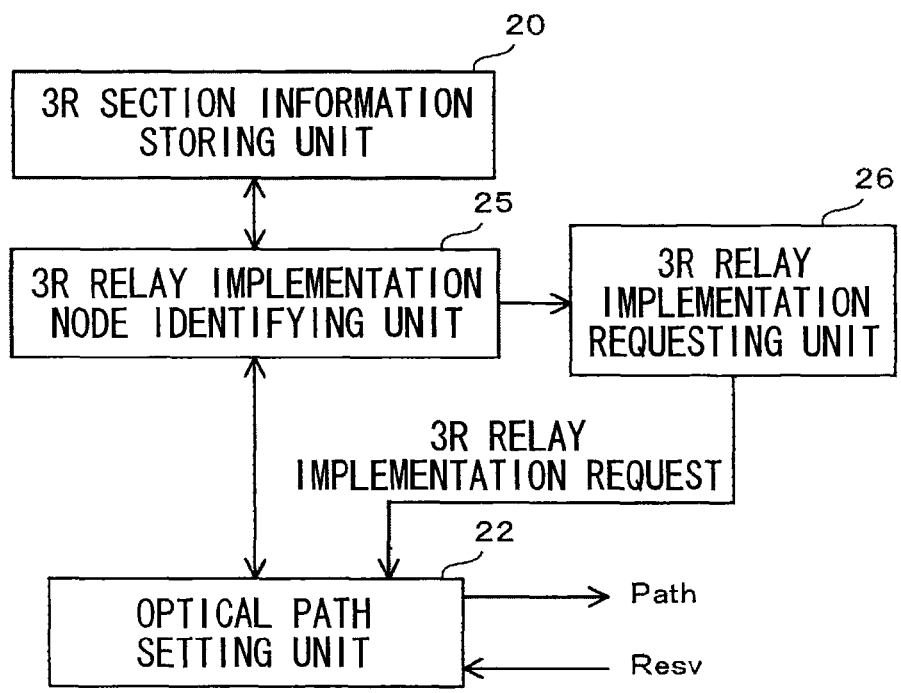
FIG. 11 is a schematic block diagram of an optical node device of a second embodiment.
Figure 12:
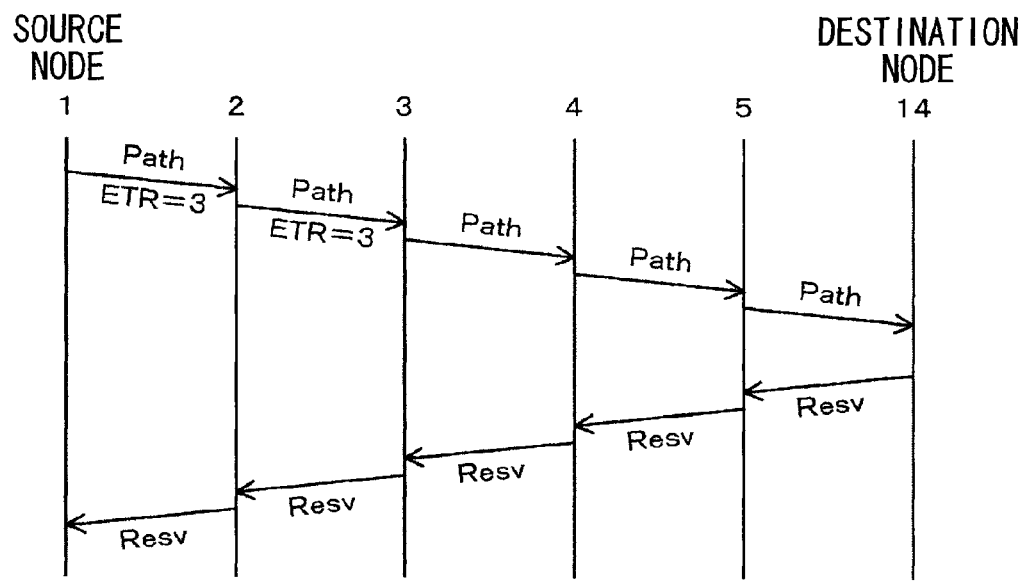
FIG. 12 shows a signaling procedure when setting an optical path in the second embodiment.
Figure 13:
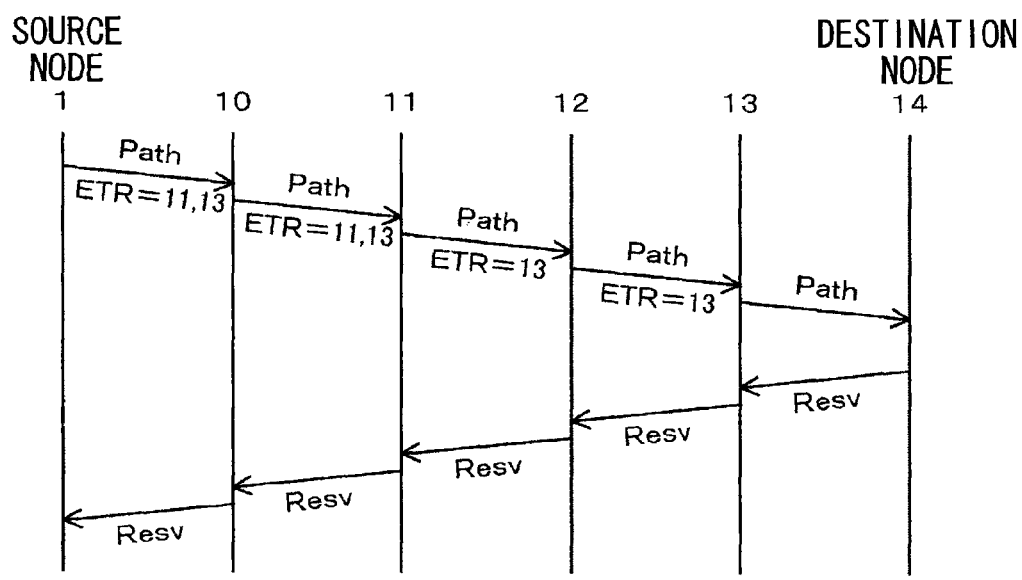
FIG. 13 shows a signaling procedure when setting an optical path in the second embodiment.

Optical node devices of a second embodiment according to the present invention are described with reference to FIG. 3, FIG. 5, FIG. 6, FIG. 9, FIG. 11, FIG. 12, and FIG. 13. FIG. 11 is a schematic block diagram of an optical node device according to the second embodiment. FIG. 12 and FIG. 13 show signaling procedures when setting an optical path in the second embodiment.

The optical node device according to the second embodiment comprises: a 3R section information storing unit 20 which stores 3R section information corresponding to the topology information of the optical network to which the optical node device itself belongs; a 3R relay implementation node identifying unit 25 which identifies another optical node device for implementing the 3R relay among the other optical node devices through which an optical path passes from the optical node device itself to the destination node when the optical node device itself is the source node, with reference to the 3R section information stored in this 3R section information storing unit 20; and a 3R relay implementation requesting unit 26 which requests 3R relay be implemented on the optical path where the optical node device itself is the source node, to the other optical node device identified by this 3R relay implementation node identifying unit 25.

In the second embodiment, since the optical node device corresponding to the source node identifies the 3R relay implementation node, it is sufficient if the optical node device corresponding to the source node stores the 3R section information for the present, and it is not necessary that all optical node devices or a plurality of optical node devices related to the optical path setting store the 3R section information similarly to the first embodiment. Therefore, if only the optical node device corresponding to the source node stores the 3R section information, the information storage resources can be effectively used.

Next is a description of the operation of the optical node device according to the second embodiment. The 3R section information shown in FIG. 3 is stored in the 3R section information storing unit 20. As shown in FIG. 5, the optical path setting unit 22 of the optical node device 1 is about to attempt to set the optical path from the optical node device 1 to the optical node device 14 (double lines), using the optical node device 1 as the source node and the optical node device 14 as the destination node. The optical path setting unit 22 requests the 3R relay implementation node identifying unit 25 to identify the optical node device for implementing the 3R relay except for the optical node device 1 itself.

Here is a description of an identification algorithm of the optical node device for implementing the 3R relay, in the 3R relay implementation node identifying unit 25. Since the optical node device 2 is not the 3R source node and the optical node device 1 implements the 3R relay, it is determined that the optical node device 2 does not implement the 3R relay. Since the optical node device 3 is the 3R source node on the 3R section from the optical node device 3 to the optical node device 14, the 3R relay may be implemented. Alternatively, since the optical node device 3 is not the 3R source node of the 3R section from the optical node device 1 to the optical node device 4, it may not implement the 3R relay, but transmit the intact optical signal to the optical node device 4 being the 3R destination node.

In such a case, the 3R relay implementation node identifying unit 25 uses the 3R implementation simulating unit 23 and the comparison unit 24 shown in FIG. 6 to compare the number of 3R implementations in the case where the optical node device 3 functions as the 3R source node, and the case where the optical node device 3 does not function as the 3R source node, with regards to the optical path from the optical node device 3 to the optical node device 14. The description hereunder is similar to that of the first embodiment.

Such simulation results of the 3R implementation simulating unit 23 are input into the comparison unit 24. In the comparison unit 24, it is found that the number of 3R implementations can be reduced in the case where the optical node device 3 implements the 3R relay compared to the case where the optical node device 3 does not implement the 3R relay. Therefore to that effect is output as a comparison result. The 3R relay implementation node identifying unit 25 selects the case having the lower number of 3R implementations as a comparison result. Therefore, it is determined that the optical node device 3 implements the 3R relay.

Since the optical node device 4 is the 3R destination node, it is determined that the optical node device 4 does not implement the 3R relay. The optical node device 5 is not the source node so that it is determined that the optical node device does not implement the 3R relay. The optical node device 14 is the destination node so that it is determined that the optical node device 14 does not implement the 3R relay.

In this manner, the optical node device 1 being the source node identifies the optical node device for implementing the 3R relay on the optical path from the optical node device 1 to the optical node device 14. Furthermore, the optical node device 1 outputs an ETR (Explicit Three R)=3 as the 3R relay implementation request from the 3R relay implementation requesting unit 26, to the optical node device 3 for implementing the 3R relay identified by the optical node device 1 itself.

When the optical node device for implementing the 3R relay can be identified, then as shown in FIG. 12, the optical path setting unit 22 of the optical node device 1 performs the signaling procedure of the optical path setting. That is, the optical node device 1 ensures the resources for optical path setting and 3R relay, and sends the optical path setting request (Path) to the optical node device 2. At this time, ETR=3 is loaded into the optical path setting request.

The optical node device 2 which receives the optical path setting request (Path) from the optical node device 1 refers to ETR=3 to recognize that the optical node device 2 itself is not the optical node device for implementing the 3R relay, ensures the resources for optical path setting, and sends the optical path setting request (Path) to the optical node device 3. At this time, the intact ETR=3 delivered from the optical node device 1 is loaded.

The optical node device 3 which receives the optical path setting request (Path) from the optical node device 2 refers to ETR=3 to recognize that the optical node device 3 itself is the optical node device for implementing the 3R relay, ensures the resources for optical path setting and 3R relay, and sends the optical path setting request (Path) to the optical node device 4. At this time, since ETR=3 is deleted after the optical node device 3 recognizes it is to implement the 3R relay, ETR=3 is not transmitted to the nodes ahead of the optical node device 3.

The optical node device 4 which receives the optical path setting request (Path) from the optical node device 3 ensures the resources for optical path setting, and sends the optical path setting request (Path) to the optical node device 5. The optical node device 5 which receives the optical path setting request (Path) from the optical node device 4 ensures the resources for optical path setting, and sends the optical path setting request (Path) to the optical node device 14. The optical node device 14 which receives the optical path setting request (Path) from the optical node device 5 ensures the resources for optical path setting, and sends the optical path setting completion notification (Resv) to the optical node device 5. The optical path setting completion notification (Resv) is transmitted through the optical node devices 5->4->3->2->1 so that the optical path setting is completed.

Next is a description of another example of the operation of the optical node device according to the second embodiment. With reference to FIG. 9 and FIG. 13, a description is given of an example of a case where the 3R relay is implemented twice on the optical path between the source node and the destination node. The 3R section information shown in FIG. 3 is stored in the 3R section information storing unit 20. As shown in FIG. 9, the optical path setting unit 22 of the optical node device 1 is about to attempt to set the optical path from the optical node device 1 to the optical node device 14 (double lines), using the optical node device 1 as the source node and the optical node device 14 as the destination node. The optical path setting unit 22 requests the 3R relay implementation node identifying unit 25 to identify the optical node device for implementing the 3R relay except for the optical node device 1 itself.

Here is a description of an identification algorithm of the optical node device for implementing the 3R relay, in the 3R relay implementation node identifying unit 25. Since the optical node device 10 is not the 3R source node and the optical node device 1 implements the 3R relay, it is determined that the optical node device 10 does not implement the 3R relay. Since the optical node device 11 is the 3R source node on the 3R section from the optical node device 11 to the optical node device 13, it is determined that the optical node device 11 implements the 3R relay. Since the optical node device 12 is not the 3R source node, it is determined that the optical node device 12 does not implement the 3R relay. Since the optical node device 13 is the 3R source node on the 3R section from the optical node device 13 to the optical node device 14, it is determined that the optical node device 13 implements the 3R relay. Since the optical node device 14 is the destination node, it is determined that the optical node device 14 does not implement the 3R relay.

In this manner, the optical node device 1 being the source node identifies the optical node device for implementing the 3R relay on the optical path from the optical node device 1 to the optical node device 14. Furthermore, the optical node device 1 outputs an ETR=11, 13 as the 3R relay implementation request from the 3R relay implementation requesting unit 26, to the optical node device 3 for implementing the 3R relay identified by the optical node device 1 itself.

When the optical node device for implementing the 3R relay can be identified, then as shown in FIG. 13, the optical path setting unit 22 of the optical node device 1 performs the signaling procedure of the optical path setting. That is, the optical node device 1 ensures the resources for the optical path setting and the 3R relay, and sends the optical path setting request (Path) to the optical node device 10. At this time, ETR=11, 13 is loaded into the optical path setting request.

The optical node device 10 which receives the optical path setting request (Path) from the optical node device 1 refers to ETR=11, 13 to recognize that the optical node device 10 itself is not the optical node device for implementing the 3R relay, ensures the resources for optical path setting, and sends the optical path setting request (Path) to the optical node device 11. At this time, the intact ETR=11, 13 delivered from the optical node device 1 is loaded.

The optical node device 11 which receives the optical path setting request (Path) from the optical node device 10 refers to ETR=11, 13 to recognize that the optical node device 11 itself is the optical node device for implementing the 3R relay, ensures the resources for optical path setting and 3R relay, and sends the optical path setting request (Path) to the optical node device 12. At this time, since ETR=11 is deleted after the optical node device 11 recognizes it is to implement the 3R relay, ETR=13 is loaded into the optical path setting request.

The optical node device 12 which receives the optical path setting request (Path) from the optical node device 11 refers to ETR=13 to recognize that the optical node device 12 itself is not the optical node device for implementing the 3R relay, ensures the resources for optical path setting, and sends the optical path setting request (Path) to the optical node device 13. At this time, the intact ETR=13 delivered from the optical node device 11 is loaded.

The optical node device 13 which receives the optical path setting request (Path) from the optical node device 12 refers to ETR=13 to recognize that the optical node device 13 itself is the optical node device for implementing the 3R relay, ensures the resources for optical path setting and 3R relay, and sends the optical path setting request (Path) to the optical node device 14. At this time, since ETR=13 is deleted after the optical node device 13 recognizes it is to implement the 3R relay, so that it is not transmitted to the optical node device 14.

The optical node device 14 which receives the optical path setting request (Path) from the optical node device 13 ensures the resources for optical path setting, and sends the optical path setting completion notification (Resv) to the optical node device 13. The optical path setting completion notification (Resv) is transmitted through the optical node devices 13->12->11>10->1 so that the optical path setting is completed.

In this manner, the optical node device being the source node identifies the optical node device for implementing the 3R relay on the optical path up to the destination node, so that other optical node devices on this optical path may simply follow the instruction from the source node, reducing the calculation load. Moreover, the optical node devices except for the optical node device being the source node, do not have to store the 3R section information, so that the information storage resources can be effectively used.

Third Embodiment

Figure 14:
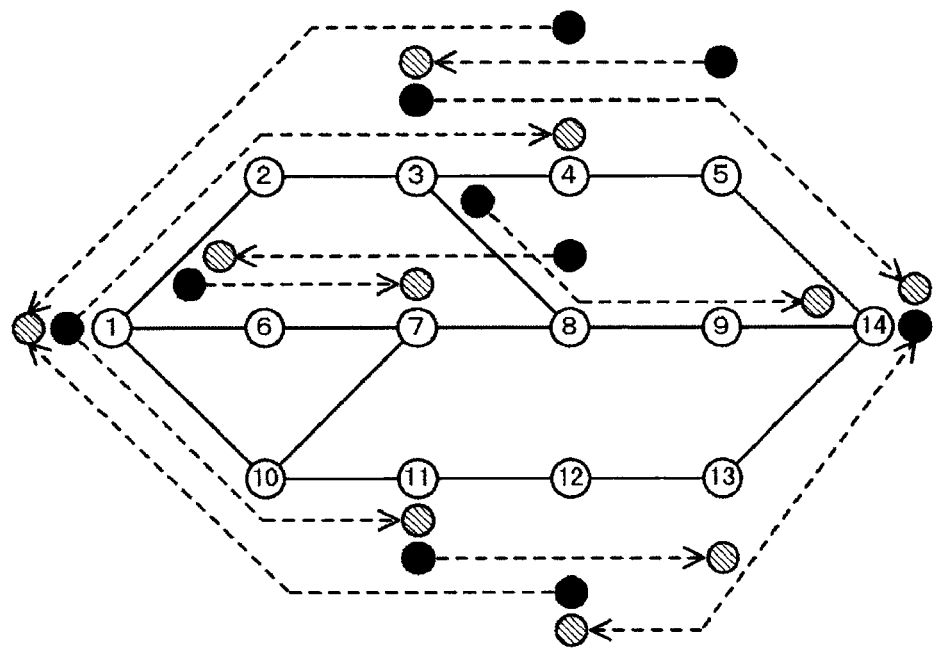
FIG. 14 shows 3R section information according to third and fourth embodiments.
Figure 15:
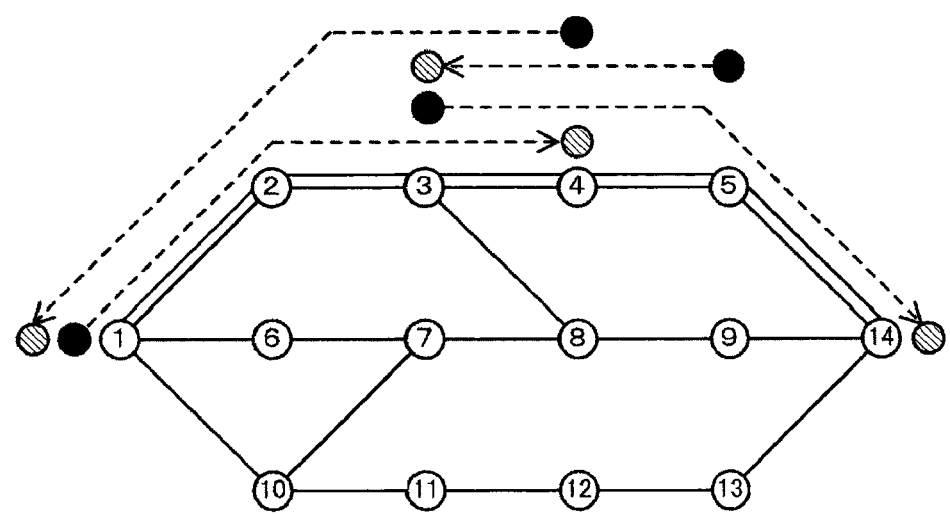
FIG. 15 shows optical paths and 3R sections set in an optical network.
Figure 16:
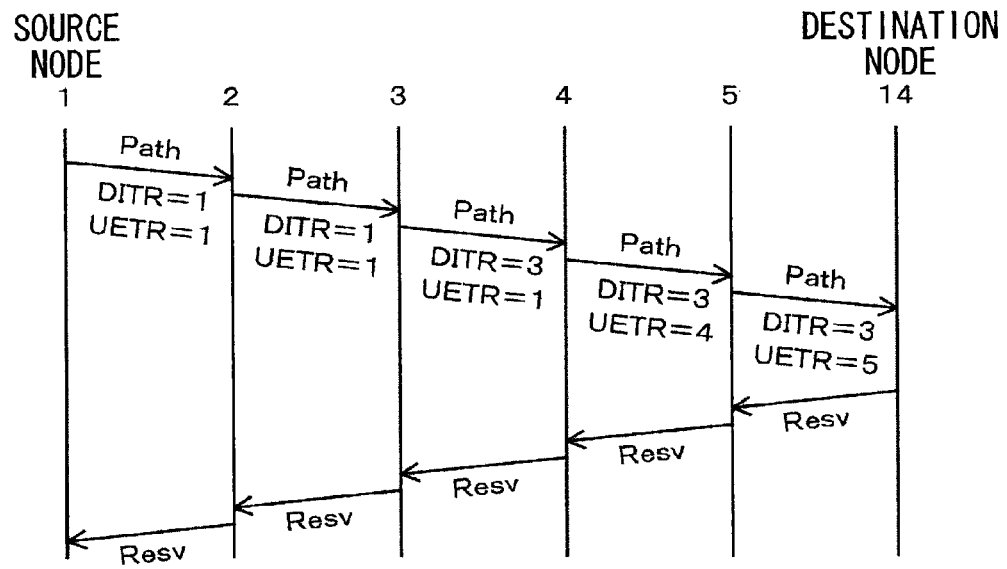
FIG. 16 shows a signaling procedure when setting an optical path in the third embodiment.
Figure 18:
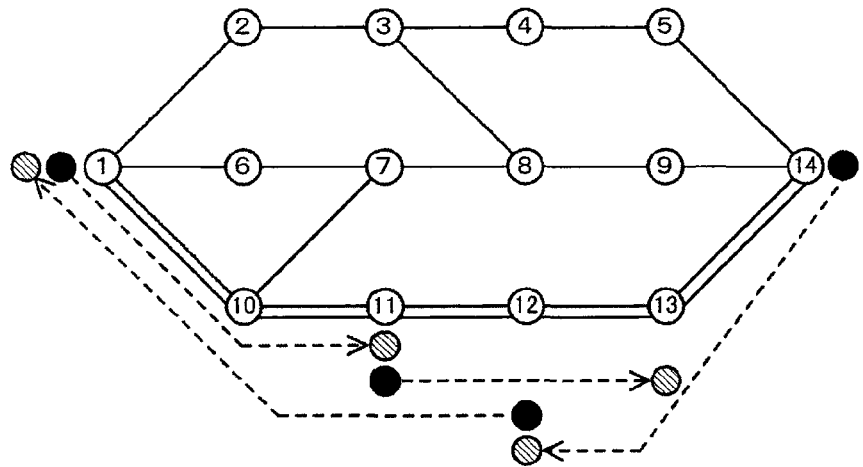
FIG. 18 shows optical paths and 3R sections set in an optical network.
Figure 19:
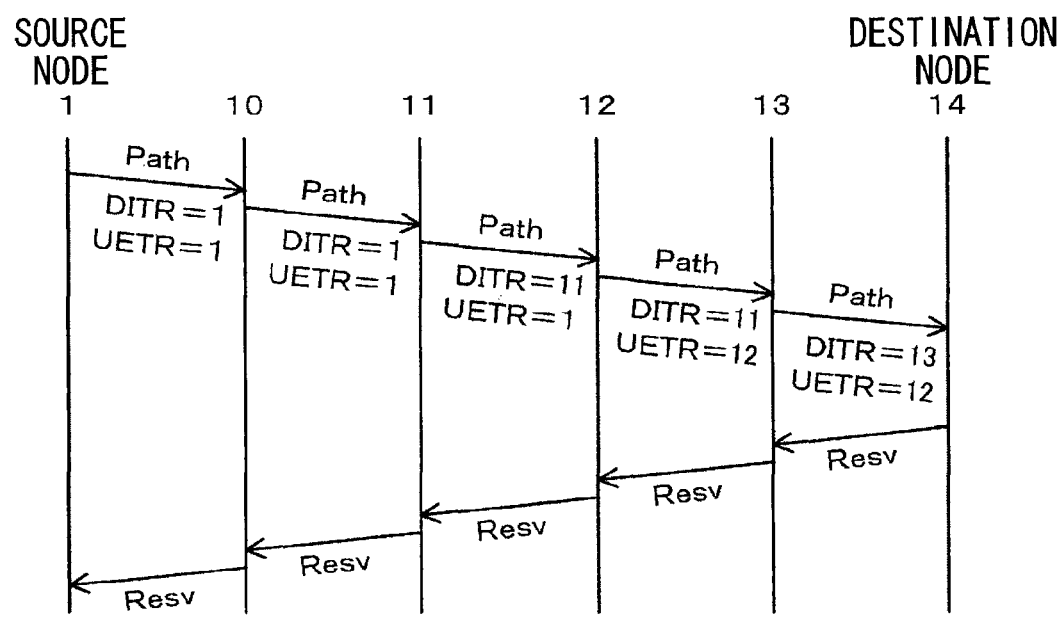
FIG. 19 shows a signaling procedure when setting an optical path in the third embodiment.

Optical node devices according to a third embodiment are described with reference to FIG. 4, FIG. 14, FIG. 15, FIG. 16, FIG. 18, and FIG. 19. FIG. 14 shows 3R section information according to the third embodiment. FIG. 15 and FIG. 18 show optical paths and 3R sections set in an optical network. FIG. 16 and FIG. 19 show signaling procedures when setting an optical path in the third embodiment.

The third embodiment describes an example where the optical node device for implementing the 3R relay is set at the time of signaling, for both of the upstream optical path and the downstream optical path on a bi-directional optical path. The optical node device of the third embodiment is described as the configuration shown in FIG. 4. In the configuration shown in FIG. 4, each optical node device stores the same 3R section information and determines autonomously whether or not each optical node device itself implements the 3R relay. The 3R section information shown in FIG. 14 is stored in the 3R section information storing unit 20.

In the third embodiment, similarly to the first embodiment, since each optical node device determines autonomously whether or not it is a node for implementing the 3R relay, each optical node device is required to store the 3R section information respectively. However, the optical node device not related to the optical path setting is not required to store the 3R section information. Therefore if only the optical node device on the route related to the optical path setting stores the 3R section information, the information storage resources can be effectively used.

Next is a description of the operation of the optical node device according to the third embodiment. Here as shown in FIG. 15, is a description of an example where a bi-directional optical path from the optical node device 1 to the optical node device 14 (double lines) is set. The 3R relay implementation determining unit 21 of the optical node device 1 refers to the 3R section information storing unit 20 in order to know what part the optical node device 1 is in the topology of the optical network. As a result, the 3R relay implementation determining unit 21 recognizes that the optical node device 1 is a source node on the bi-directional optical path to be set, and is the 3R source node of the downstream optical path, and determines that the optical node device 1 implements the 3R relay on the downstream optical path.

The optical path setting unit 22 of the optical node device 1 receives the determination of the 3R relay implementation determining unit 21 and ensures the resources for downstream optical path setting and the 3R relay. Then, as shown in FIG. 16, the optical path setting unit 22 loads a message of DITR=1 showing that the optical node device 1 is the optical node device for implementing the 3R relay on the downstream optical path, into the optical path setting request when sending the optical path setting request (Path) to the optical node device 2.

Furthermore, the 3R relay implementation determining unit 21 refers to the 3R section information storing unit 20, and recognizes that the optical node device 1 is the 3R destination node on the upstream optical path to be set, so that the 3R relay implementation determining unit 21 determines that the optical node device 1 does not implement the 3R relay on the upstream optical path.

The optical path setting unit 22 of the optical node device 1 receives the determination of the 3R relay implementation determining unit 21 and ensures the resources for upstream optical path setting. Then, as shown in FIG. 16, the optical path setting unit 22 loads a message of UETR (Upstream Egress Three R)=1 showing that the optical node device 1 is the 3R destination node on the upstream optical path, into the optical path setting request when sending the optical path setting request (Path) to the optical node device 2.

The optical path setting unit 22 of the optical node device 2 which receives the optical path setting request (Path) from the optical node device 1 queries the 3R relay implementation determining unit 21 as to whether or not the optical node device 2 is the optical node device for implementing the 3R relay on the upstream or downstream optical path. The 3R relay implementation determining unit 21 of the optical node device 2 refers to the 3R section information stored in the 3R section information storing unit 20 and finds out that the optical node device 2 is not the 3R source node on the upstream or downstream optical path, and due to the delivery of the DITR=1 from the optical node device 1, that the 3R section is up to the optical node device 4 if the optical node device 1 is the 3R source node on the downstream optical path. Therefore, the 3R relay implementation determining unit 21 determines that the optical node device 2 does not implement the 3R relay. Moreover, the 3R relay implementation determining unit 21 finds out due to the delivery of the UETR=1 from the optical node device 1, that the optical node device 1 is the 3R destination node on the upstream optical path, and that the optical node device 4 is the 3R source node using the optical node device 1 as the 3R destination node according to the 3R section information. Therefore, the 3R relay implementation determining unit 21 determines that the optical node device 2 does not implement the 3R relay on the upstream optical path neither.

The optical path setting unit 22 of the optical node device 2 receives the determination of the 3R relay implementation determining unit 21 and ensures the resources for downstream and upstream optical path setting. Then, as shown in FIG. 16, since the optical node device 2 does not implement the 3R relay, when sending the optical path setting request (Path) to the optical node device 3, the optical path setting unit 22 loads the intact DITR=1 and UETR=1 from the optical node device 1 into the optical path setting request.

The optical path setting unit 22 of the optical node device 3 which receives the optical path setting request (Path) from the optical node device 2 queries the 3R relay implementation determining unit 21 as to whether or not the optical node device 3 is the optical node device for implementing the 3R relay. The 3R relay implementation determining unit 21 of the optical node device 3 refers to the 3R section information stored in the 3R section information storing unit 20 and recognizes that the optical node device 3 may implement the 3R relay since it is the 3R source node on the 3R section from the optical node device 3 to the optical node device 14 on the downstream optical path, or that the optical node device 3 may not implement the 3R relay but transmit the intact optical signal to the optical node device 4 being the 3R destination node since it is not the 3R source node on the 3R section from the optical node device 1 to the optical node device 4 on the downstream optical path.

In such a case, the 3R relay implementation determining unit 21 of the optical node device 3 uses a 3R implementation simulating unit 23 and a comparison unit 24 to compare the number of 3R implementations in the case where the optical node device 3 functions as the 3R source node, and the case where the optical node device 3 does not function as the 3R source node, with regards to the optical path from the optical node device 3 to the optical node device 14. The description hereunder is similar to that of the first embodiment.

Such simulation results of the 3R implementation simulating unit 23 are input into the comparison unit 24. In the comparison unit 24, it is found that the number of 3R implementations can be reduced in the case where the optical node device 3 implements the 3R relay on the downstream optical path compared to the case where the optical node device 3 does not implement the 3R relay. Therefore to that effect is output as a comparison result. The 3R relay implementation determining unit 21 selects the case having the lower number of 3R implementations as a comparison result. Therefore, the 3R relay implementation determining unit 21 determines that the optical node device 3 implements the 3R relay on the downstream optical path.

Furthermore, the 3R relay implementation determining unit 21 finds out that the optical node device 3 is not the 3R source node on the upstream optical path, and due to the delivery of the UETR=1 from the optical node device 2, that the optical node device 4 is the 3R source node if the optical node device 1 is used as the 3R destination node, so that the 3R relay implementation determining unit 21 determines that the 3R relay is not implemented on the upstream optical path.

The optical path setting unit 22 of the optical node device 3 receives the determination of the 3R relay implementation determining unit 21 and ensures the resources for optical path setting and the 3R relay. Then, as shown in FIG. 16, the optical path setting unit 22 loads a message of DITR=3 showing that the optical node device 3 is the optical node device for implementing the 3R relay on the downstream optical path, into the optical path setting request when sending the optical path setting request (Path) to the optical node device 4. Moreover, since the optical node device 3 does not implement the 3R relay on the upstream optical path, the intact UETR=1 delivered from the optical node device 2 is loaded into the optical path setting request.

The optical path setting unit 22 of the optical node device 4 which receives the optical path setting request (Path) from the optical node device 3 queries the 3R relay implementation determining unit 21 as to whether or not the optical node device 4 is the optical node device for implementing the 3R relay. The 3R relay implementation determining unit 21 of the optical node device 4 refers to the 3R section information stored in the 3R section information storing unit 20 and finds out that the optical node device 4 is the 3R destination node on the downstream optical path, and due to the delivery of the DITR=3 from the optical node device 3, that the 3R section is up to the optical node device 14 if the optical node device 3 is the 3R source node on the downstream optical path, so that the 3R relay implementation determining unit 21 determines that the optical node device 4 is not required to implement the 3R relay.

Furthermore, the 3R relay implementation determining unit 21 refers to the 3R section information stored in the 3R section information storing unit 20 and finds out due to the delivery of the UETR=1 from the optical node device 3, that the optical node device 4 is the 3R source node on the upstream optical path using the optical node device 1 as the 3R destination node, so that the 3R relay implementation determining unit 21 determines that the 3R relay is implemented on the upstream optical path.

The optical path setting unit 22 of the optical node device 4 receives the determination of the 3R relay implementation determining unit 21 and ensures the resources for optical path setting and 3R relay. Then, as shown in FIG. 16, since the optical node device 4 does not implement the 3R relay on the downstream optical path, when sending the optical path setting request (Path) to the optical node device 5, the optical path setting unit 22 loads the intact DITR=3 from the optical node device 3 into the optical path setting request.

Moreover, since the optical node device 4 is the 3R source node but not the destination node on the upstream optical path and neither the 3R destination node on the upstream optical path, the optical path setting unit 22 of the optical node device 4 loads UETR=4 as a message to transmit to the optical node device 5 that the optical node device 5 is the 3R source node using the optical node device 4 as the 3R destination node, into the optical path setting request.

The optical path setting unit 22 of the optical node device 5 which receives the optical path setting request (Path) from the optical node device 4 queries the 3R relay implementation determining unit 21 as to whether or not the optical node device 5 is the optical node device for implementing the 3R relay. The 3R relay implementation determining unit 21 of the optical node device 5 refers to the 3R section information stored in the 3R section information storing unit 20 and finds out that the optical node device 5 is not the 3R source node on the downstream optical path, and due to the delivery of the DITR=3 from the optical node device 4, that the 3R section is up to the optical node device 14 if the optical node device 3 is the 3R source node, so that the 3R relay implementation determining unit 21 determines that the optical node device 5 does not implement the 3R relay. Moreover, the 3R relay implementation determining unit 21 refers to the 3R section information and receives the UETR=4, and recognizes that the optical node device 5 is the 3R source node using the optical node device 4 being a transmission source of the UETR=4 as the 3R destination node on the upstream optical path, and determines that the 3R relay is implemented on the upstream optical path.

The optical path setting unit 22 of the optical node device 5 receives the determination of the 3R relay implementation determining unit 21 and ensures the resources for optical path setting and 3R relay. Then, as shown in FIG. 16, since the optical node device 5 does not implement the 3R relay on the downstream optical path, when sending the optical path setting request (Path) to the optical node device 14, the optical path setting unit 22 loads the intact DITR=3 from the optical node device 4 into the optical path setting request.

Moreover, the optical node device 5 is the 3R source node on the upstream optical path; however the 3R section using the optical node device 14 as the 3R source node and the optical node device 5 as the 3R destination node is not set. In such a case, the optical node device 14 is required to be the 3R source node based on the determination policy of "when the optical node device itself does not belong to any 3R section having the 3R source node on the optical path passing through the optical node device itself, it is determined that the optical node device itself is the optical node device for implementing the 3R relay using the optical node device itself as the 3R source node and the next-hop optical node device of the optical node device itself as the 3R destination node." Therefore, UETR=5 showing that the optical node device 5 is the 3R destination node, is loaded into the optical path request.

The optical path setting unit 22 of the optical node device 14 which receives the optical path setting request (Path) from the optical node device 5 queries the 3R relay implementation determining unit 21 as to whether or not the optical node device 14 is the optical node device for implementing the 3R relay. The 3R relay implementation determining unit 21 of the optical node device 14 refers to the 3R section information stored in the 3R section information storing unit 20 and determines that it is not required to implement the 3R relay on the downstream optical path since the optical node device 14 is the destination node, but due to the delivery of the UETR=5 from the optical node device 5 it is required to implement the 3R relay on the upstream optical path using the optical node device 14 as the 3R source node and the optical node device 5 as the 3R destination node.

The optical path setting unit 22 of the optical node device 14 receives the determination of the 3R relay implementation determining unit 21 and ensures the resources for optical path setting and 3R relay. Then, as shown in FIG. 16, the optical path setting unit 22 sends the optical path setting completion notification (Resv) to the optical node device 5.

This optical path setting completion notification (Resv) is transmitted through the optical node devices 5->4->3->2->1 so that the optical path setting is completed. In this way, the respective optical node devices 1, 2, 3, 4, 5, and 14 can determine autonomously whether or not they themselves implement the 3R relay in the process of performing the signaling procedure of the optical path setting.

Next is a description of another example of the operation of the optical node device according to the third embodiment.

Here as shown in FIG. 18, is a description of an example where a bi-directional optical path from the optical node device 1 to the optical node device 14 (double lines) is set. The 3R relay implementation determining unit 21 of the optical node device 1 refers to the 3R section information storing unit 20 in order to know what part the optical node device 1 is in the topology of the optical network. As a result, it is determined that the optical node device 1 is a source node of the bi-directional optical path to be set, and is the 3R source node of the downstream optical path, and it is determined that the optical node device 1 implements the 3R relay on the downstream optical path.

The optical path setting unit 22 of the optical node device 1 receives the determination of the 3R relay implementation determining unit 21 and ensures the resources for downstream optical path setting and the 3R relay. Then, as shown in FIG. 19, the optical path setting unit 22 loads a message of DITR=1 showing that the optical node device 1 is the optical node device for implementing the 3R relay on the downstream optical path, into the optical path setting request when sending the optical path setting request (Path) to the optical node device 10.

Furthermore, the 3R relay implementation determining unit 21 refers to the 3R section information storing unit 20, and recognizes that the optical node device 1 is the 3R destination node on the upstream optical path to be set, so that the 3R relay implementation determining unit 21 determines that the optical node device 1 does not implement the 3R relay on the upstream optical path.

The optical path setting unit 22 of the optical node device 1 receives the determination of the 3R relay implementation determining unit 21 and ensures the resources for upstream optical path setting. Then, as shown in FIG. 19, the optical path setting unit 22 loads a message of UETR=1 showing that the optical node device 1 is the 3R destination node on the upstream optical path, into the optical path setting request when sending the optical path setting request (Path) to the optical node device 10.

The optical path setting unit 22 of the optical node device 10 which receives the optical path setting request (Path) from the optical node device 1 queries the 3R relay implementation determining unit 21 as to whether or not the optical node device 10 is the optical node device for implementing the 3R relay on the upstream or downstream optical path. The 3R relay implementation determining unit 21 of the optical node device 10 refers to the 3R section information stored in the 3R section information storing unit 20 and finds out that the optical node device 10 is not the 3R source node on the upstream or downstream optical path, and due to the delivery of the DITR=1 from the optical node device 1, that the 3R section is up to the optical node device 11 if the optical node device 1 is the 3R source node on the downstream optical path, so that the 3R relay implementation determining unit 21 determines that the optical node device 10 does not implement the 3R relay. Moreover, the 3R relay implementation determining unit 21 finds out due to the delivery of the UETR=1 from the optical node device 1, that the optical node device 1 is the 3R destination node on the upstream optical path, and that the optical node device 12 is the 3R source node using the optical node device 1 as the 3R destination node according to the 3R section information, so that the 3R relay implementation determining unit 21 determines that the optical node device 10 does not implement the 3R relay on the upstream optical path neither.

The optical path setting unit 22 of the optical node device 10 receives the determination of the 3R relay implementation determining unit 21 and ensures the resources for upstream and downstream optical path setting. Then, as shown in FIG. 19, since the optical node device 10 does not implement the 3R relay, when sending the optical path setting request (Path) to the optical node device 11, the optical path setting unit 22 loads the intact DITR=1 and UETR=1 from the optical node device 1 into the optical path setting request.

The optical path setting unit 22 of the optical node device 11 which receives the optical path setting request (Path) from the optical node device 10 queries the 3R relay implementation determining unit 21 as to whether or not the optical node device 11 is the optical node device for implementing the 3R relay. The 3R relay implementation determining unit 21 of the optical node device 11 refers to the 3R section information stored in the 3R section information storing unit 20 and determines that the optical node device 11 implements the 3R relay since the optical node device 11 is the 3R source node on the 3R section from the optical node device 11 to the optical node device 13 on the downstream optical path.

Furthermore, the 3R relay implementation determining unit 21 finds out that the optical node device 11 is not the 3R source node on the upstream optical path, and due to the delivery of the UETR=1 from the optical node device 10, that the optical node device 12 is the 3R source node if the optical node device 1 is used as the 3R destination node, so that the 3R relay implementation determining unit 21 determines not to implement the 3R relay on the upstream optical path.

The optical path setting unit 22 of the optical node device 11 receives the determination of the 3R relay implementation determining unit 21 and ensures the resources for optical path setting and the 3R relay. Then, as shown in FIG. 19, the optical path setting unit 22 loads a message of DITR=11 showing that the optical node device 11 is the optical node device for implementing the 3R relay on the downstream optical path, into the optical path setting request when sending the optical path setting request (Path) to the optical node device 12. Moreover, since the optical node device 11 does not implement the 3R relay on the upstream optical path, the optical path setting unit 22 loads the intact UETR=1 delivered from the optical node device 10 into the optical path setting request.

The optical path setting unit 22 of the optical node device 12 which receives the optical path setting request (Path) from the optical node device 11 queries the 3R relay implementation determining unit 21 as to whether or not the optical node device 12 is the optical node device for implementing the 3R relay. The 3R relay implementation determining unit 21 of the optical node device 12 refers to the 3R section information stored in the 3R section information storing unit 20 and finds out that the optical node device 12 is the 3R destination node on the downstream optical path, and due to the delivery of the DITR=11 from the optical node device 11, that the 3R section is up to the optical node device 13 if the optical node device 11 is the 3R source node on the downstream optical path, so that the 3R relay implementation determining unit 21 determines that the optical node device 12 is not required to implement the 3R relay.

Furthermore, the 3R relay implementation determining unit 21 refers to the 3R section information stored in the 3R section information storing unit 20 and finds out due to the delivery of the UETR=1 from the optical node device 11 that the optical node device 12 is the 3R source node on the upstream optical path using the optical node device 1 as the 3R destination node, so that the 3R relay implementation determining unit 21 determines not to implement the 3R relay on the upstream optical path.

The optical path setting unit 22 of the optical node device 12 receives the determination of the 3R relay implementation determining unit 21 and ensures the resources for optical path setting and 3R relay. Then, as shown in FIG. 19, since the optical node device 12 does not implement the 3R relay on the downstream optical path, when sending the optical path setting request (Path) to the optical node device 13, the optical path setting unit 22 loads the intact DITR=11 from the optical node device 11 into the optical path setting request.

Moreover, the optical node device 12 is the 3R source node on the upstream optical path and is the 3R destination node in the case where the optical node device 14 is the 3R source node on the upstream optical path. Therefore, the optical path setting unit 22 loads UETR=12 showing that the optical node device 12 is the 3R destination node, into the optical path setting request.

The optical path setting unit 22 of the optical node device 13 which receives the optical path setting request (Path) from the optical node device 12 queries the 3R relay implementation determining unit 21 as to whether or not the optical node device 13 is the optical node device for implementing the 3R relay. The 3R relay implementation determining unit 21 of the optical node device 13 refers to the 3R section information stored in the 3R section information storing unit 20 and finds out that the optical node device 13 is not the 3R source node on the downstream optical path, and due to the delivery of the DITR=11 from the optical node device 12, that the optical node device 13 is the 3R destination node if the optical node device 11 is the 3R source node.

Here, the determination is made based on the determination policy of "when the optical node device itself is the 3R destination node on the downstream optical path, the optical node device itself is not the destination node, and the optical node device itself is not the 3R source node on the downstream optical path, it is determined that the optical node device itself is the optical node device for implementing the 3R relay using the optical node device itself as the 3R source node which uses the next-hop optical node device as the 3R destination node on the downstream optical path", and then it is determined that the optical node device 13 implements the 3R relay.

Moreover, on the upstream optical path, due to the delivery of the UETR=12, the 3R relay implementation determining unit 21 finds out that the section between the optical node device 14 and the optical node device 12 is the 3R section, so that the 3R relay implementation determining unit 21 determines that the optical node device 13 does not implement the 3R relay.

The optical path setting unit 22 of the optical node device 13 receives the determination of the 3R relay implementation determining unit 21 and ensures the resources for optical path setting and 3R relay. Then, as shown in FIG. 19, since the optical node device 13 implements the 3R relay on the downstream optical path, when sending the optical path setting request (Path) to the optical node device 14, the optical path setting unit 22 loads DITR=13 into the optical path setting request. Moreover, since the optical node device 13 does not implement the 3R relay on the upstream optical path, the optical path setting unit 22 loads the intact UETR=12 from the optical node device 12 into the optical path setting request.

The optical path setting unit 22 of the optical node device 14 which receives the optical path setting request (Path) from the optical node device 13 queries the 3R relay implementation determining unit 21 as to whether or not the optical node device 14 is the optical node device for implementing the 3R relay. The 3R relay implementation determining unit 21 of the optical node device 14 refers to the 3R section information stored in the 3R section information storing unit 20 and determines that it is not required to implement the 3R relay on the downstream optical path since the optical node device 14 is the destination node, but due to the delivery of the UETR=12 from the optical node device 13, it is required to implement the 3R relay on the upstream optical path using the optical node device 14 as the 3R source node and the optical node device 12 as the 3R destination node.

The optical path setting unit 22 of the optical node device 14 receives the determination of the 3R relay implementation determining unit 21 and ensures the resources for optical path setting and 3R relay. Then, as shown in FIG. 19, the optical path setting unit 22 sends the optical path setting completion notification (Resv) to the optical node device 13.

This optical path setting completion notification (Resv) is transmitted through the optical node devices 13->12->11->10->1 so that the optical path setting is completed. In this way, the respective optical node devices 1, 10, 11, 12, 13, and 14 can determine autonomously whether or not they themselves implement the 3R relay in the process of performing the signaling procedure of the optical path setting.

Fourth Embodiment

Figure 17:
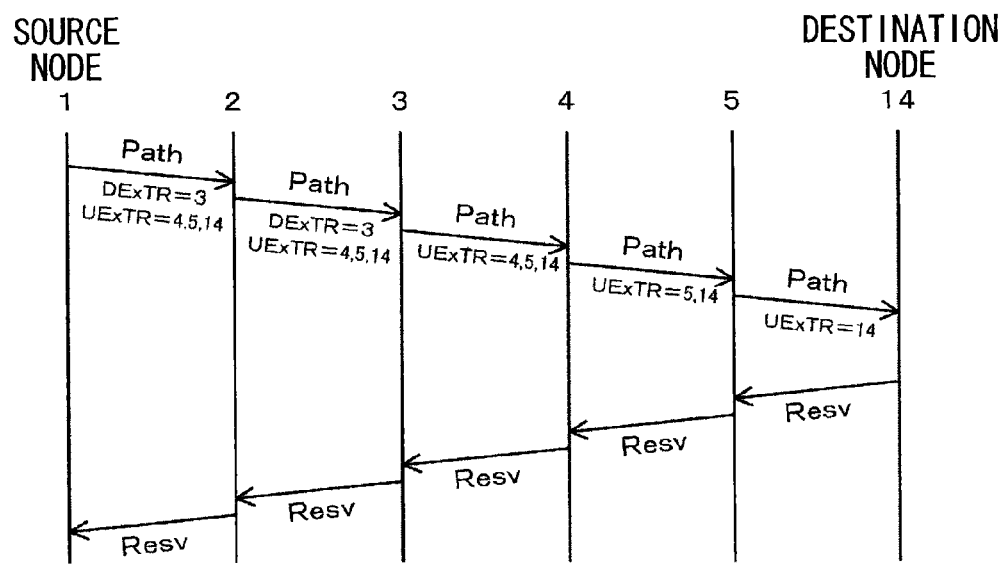
FIG. 17 shows a signaling procedure when setting an optical path in the fourth embodiment.
Figure 20:
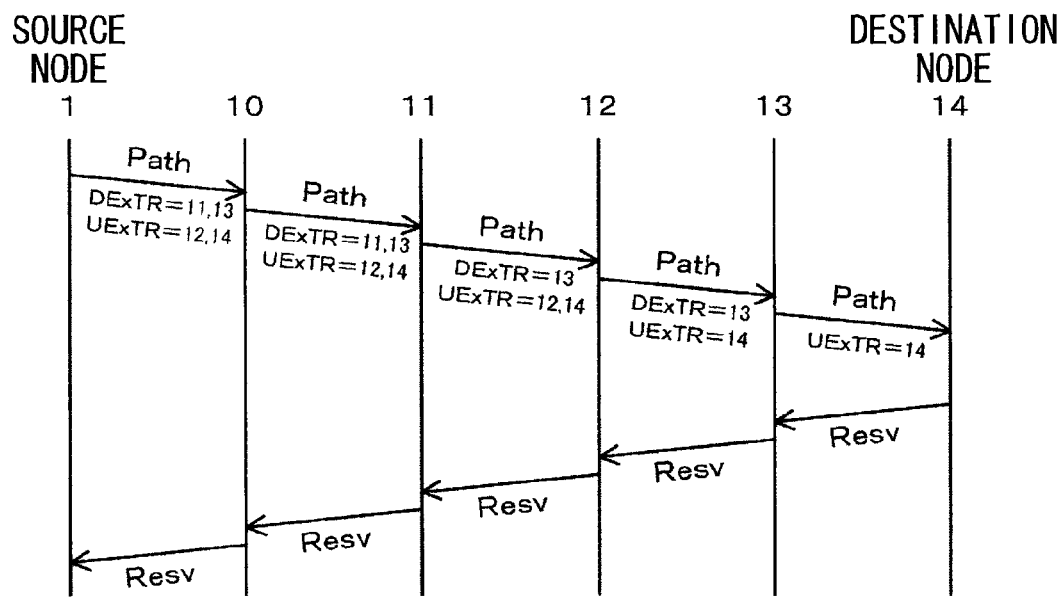
FIG. 20 shows a signaling procedure when setting an optical path in the fourth embodiment.
Figure 21:
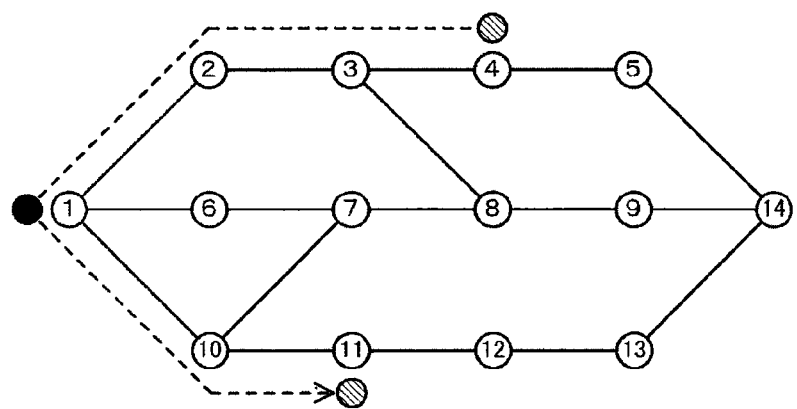
FIG. 21 shows 3R section information in the optical node device according to the fifth embodiment.
Figure 22:
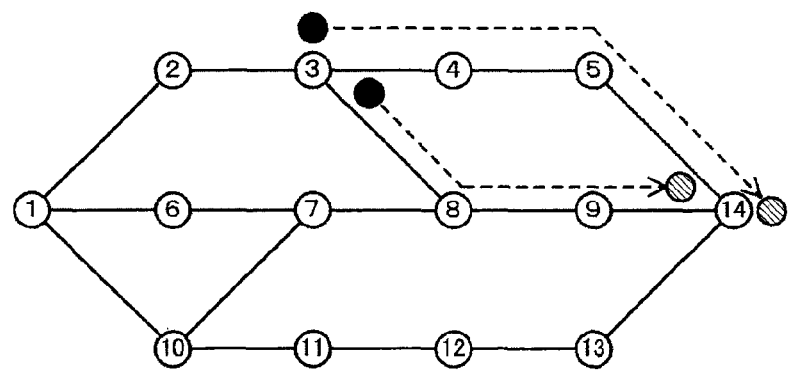
FIG. 22 shows 3R section information in the optical node device according to the fifth embodiment.

Optical node devices according to a fourth embodiment are described with reference to FIG. 11, FIG. 14, FIG. 15, FIG. 17, FIG. 18, and FIG. 20. FIG. 14 shows 3R section information according to the fourth embodiment used in common with the third embodiment. FIG. 15 and FIG. 18 show optical paths and 3R sections set in an optical network used in common with the third embodiment. FIG. 17 and FIG. 20 show signaling procedures when setting an optical path in the fourth embodiment.

The fourth embodiment describes an example where the optical node device for implementing the 3R relay is set at the time of signaling, for both of the upstream optical path and the downstream optical path on a bi-directional optical path. The optical node device according to the fourth embodiment is described as the configuration shown in FIG. 11. In the configuration shown in FIG. 11, the optical node device corresponding to the source node identifies the optical node device for implementing the 3R relay on the optical path up to the destination node, and requests this optical node device to implement the 3R relay. The 3R section information shown in FIG. 14 is stored in the 3R section information storing unit 20.

In the fourth embodiment, similarly to the second embodiment, since the optical node device corresponding to the source node identifies the node for implementing the 3R relay, it is sufficient that the optical node device corresponding to the source node stores the 3R section information for the present, and it is not necessary that all optical node devices or a plurality of optical node devices related to the optical path setting store the 3R section information similarly to the third embodiment. Therefore, if only the optical node device corresponding to the source node stores the 3R section information, the information storage resources can be effectively used.

Next is a description of the operation of the optical node device according to the fourth embodiment. Here as shown in FIG. 15, is a description of an example where a bi-directional optical path from the optical node device 1 to the optical node device 14 (double lines) is set. The 3R relay implementation node identifying unit 25 of the optical node device 1 corresponding to the source node refers to the 3R section information storing unit 20 in order to know what part the optical node device 1 is in the topology of the optical network. As a result, the 3R relay implementation node identifying unit 25 recognizes that the optical node device 1 is a source node on the bi-directional optical path to be set, and is the 3R source node of the downstream optical path, and determines that the optical node device 1 implements the 3R relay on the downstream optical path.

Furthermore, the 3R relay implementation node identifying unit 25 refers to the 3R section information storing unit 20, and recognizes that the optical node device 1 is the 3R destination node on the upstream optical path to be set, so that the 3R relay implementation node identifying unit 25 determines that the optical node device 1 does not implement the 3R relay on the upstream optical path.

Moreover, the 3R relay implementation node identifying unit 25 determines whether or not the optical node device 2 is the optical node device for implementing the 3R relay on the upstream or downstream optical path. The 3R relay implementation node identifying unit 25 refers to the 3R section information stored in the 3R section information storing unit 20 and finds out that the optical node device 2 is not the 3R source node on the upstream or downstream optical path, and that the 3R section is up to the optical node device 4 if the optical node device 1 is the 3R source node on the downstream optical path, so that the 3R relay implementation node identifying unit 25 determines that the optical node device 2 does not implement the 3R relay. Furthermore, the 3R relay implementation node identifying unit 25 finds out that the optical node device 1 is the 3R destination node on the upstream optical path, and according to the 3R section information, that the optical node device 4 is the 3R source node using the optical node device 1 as the 3R destination node. Therefore, the 3R relay implementation node identifying unit 25 determines that the optical node device 2 does not implement the 3R relay on the upstream optical path.

Moreover, the 3R relay implementation node identifying unit 25 determines whether or not the optical node device 3 is the optical node device for implementing the 3R relay. The 3R relay implementation node identifying unit 25 refers to the 3R section information stored in the 3R section information storing unit 20 and recognizes that the optical node device 3 may implement the 3R relay since the optical node device 3 is the 3R source node on the 3R section from the optical node device 3 to the optical node device 14 on the downstream optical path, or that the optical node device 3 may not implement the 3R relay but transmit the intact optical signal to the optical node device 4 being the 3R destination node since the optical node device 3 is not the 3R source node on the 3R section from the optical node device 1 to the optical node device 4 on the downstream optical path.

In such a case, the 3R relay implementation node identifying unit 25 uses the 3R implementation simulating unit 23 and the comparison unit 24 to compare the number of 3R implementations in the case where the optical node device 3 functions as the 3R source node, and the case where the optical node device 3 does not function as the 3R source node, with regards to the optical path from the optical node device 3 to the optical node device 14. The description hereunder is similar to that of the first embodiment.

Such simulation results of the 3R implementation simulating unit 23 are input into the comparison unit 24. In the comparison unit 24, it is found that the number of 3R implementations can be reduced in the case where the optical node device 3 implements the 3R relay on the downstream optical path compared to the case where the optical node device 3 does not implement the 3R relay. Therefore, to that effect is output as a comparison result. As a comparison result, 3R relay implementation node identifying unit 25 selects the case having the lower number of 3R implementations. Therefore, the optical node device 3 determines to implement the 3R relay on the downstream optical path.

Furthermore, the 3R relay implementation node identifying unit 25 finds out that the optical node device 3 is not the 3R source node on the upstream optical path, and that the optical node device 4 is the 3R source node if the optical node device 1 is used as the 3R destination node, so that the 3R relay implementation node identifying unit 25 determines not to implement the 3R relay on the upstream optical path.

Moreover, the 3R relay implementation node identifying unit 25 determines whether or not the optical node device 4 is the optical node device for implementing the 3R relay. The 3R relay implementation node identifying unit 25 refers to the 3R section information stored in the 3R section information storing unit 20 and finds out that the optical node device 4 is the 3R destination node on the downstream optical path, and that the 3R section is up to the optical node device 14 if the optical node device 3 is the 3R source node on the downstream optical path, so that the 3R relay implementation node identifying unit 25 determines that the optical node device 4 is not required to implement the 3R relay.

Furthermore, the 3R relay implementation node identifying unit 25 refers to the 3R section information stored in the 3R section information storing unit 20 and finds out that the optical node device 4 is the 3R source node on the upstream optical path using the optical node device 1 as the 3R destination node, so that the 3R relay implementation node identifying unit 25 determines to implement the 3R relay on the upstream optical path.

The 3R relay implementation node identifying unit 25 determines whether or not the optical node device 5 is the optical node device for implementing the 3R relay. The 3R relay implementation node identifying unit 25 refers to the 3R section information stored in the 3R section information storing unit 20 and finds out that the optical node device 5 is not the 3R source node on the downstream optical path, and that the 3R section is up to the optical node device 14 if the optical node device 3 is the 3R source node, so that the 3R relay implementation node identifying unit 25 determines that the optical node device 5 does not implement the 3R relay. Moreover, the 3R relay implementation node identifying unit 25 recognizes that the optical node device 5 is the 3R source node on the upstream optical path, and determines to implement the 3R relay on the upstream optical path.

The 3R relay implementation node identifying unit 25 determines whether or not the optical node device 14 is the optical node device for implementing the 3R relay. The 3R relay implementation node identifying unit 25 refers to the 3R section information stored in the 3R section information storing unit 20 and determines that it is not required to implement the 3R relay on the downstream optical path since that the optical node device 14 is the destination node, but it is required to implement the 3R relay on the upstream optical path using the optical node device 14 as the 3R source node.

The reason is such that: the optical node device 5 is the 3R source node on the upstream optical path; however the 3R section using the optical node device 14 as the 3R source node and the optical node device 5 as the 3R destination node is not set. In such a case, the optical node device 14 is required to be the 3R source node based on the determination policy of "when the optical node device itself does not belong to any 3R section having the 3R source node on the optical path passing through the optical node device itself, it is determined that the optical node device itself is the optical node device for implementing the 3R relay using the optical node device itself as the 3R source node and the next-hop optical node device of the optical node device itself as the 3R destination node."

In this manner, the optical node device 1 being the source node identifies the optical node device for implementing the 3R relay on the optical path from the optical node device 1 to the optical node device 14. Furthermore, the 3R relay implementation requesting unit 26 of the optical node device 1 outputs DExTR (Downstream Explicit Three R)=3 and UExTR (Upstream Explicit Three R)=4, 5, 14 as the 3R relay implementation request on the downstream and upstream optical paths, respectively, to the optical node device 3 for implementing the 3R relay identified by the optical node device 1 itself.

When the optical node device for implementing the 3R relay can be identified, then as shown in FIG. 17, the optical path setting unit 22 of the optical node device 1 performs the signaling procedure of the optical path setting. That is, the optical node device 1 ensures the resources for optical path setting and 3R relay, and sends the optical path setting request (Path) to the optical node device 2. At this time, DExTR=3 and UExTR=4, 5, 14 are loaded into the optical path setting request.

The optical node device 2 which receives the optical path setting request (Path) from the optical node device 1 refers to DExTR=3 and UExTR=4, 5, 14 to recognize that the optical node device 2 itself is not the optical node device for implementing the 3R relay, ensures the resources for optical path setting, and sends the optical path setting request (Path) to the optical node device 3. At this time, the intact DExTR=3 and UExTR=4, 5, 14 delivered from the optical node device 1 are loaded.

The optical node device 3 which receives the optical path setting request (Path) from the optical node device 2 refers to DExTR=3 and UExTR=4, 5, 14 to recognize that the optical node device 3 itself is the optical node device for implementing the 3R relay on the downstream optical path, ensures the resources for optical path setting and 3R relay, and sends the optical path setting request (Path) to the optical node device 4. At this time, since DExTR=3 is deleted after the optical node device 3 recognizes to implement the 3R relay, UExTR=4, 5, 14 are loaded into the optical path setting request.

The optical node device 4 which receives the optical path setting request (Path) from the optical node device 3 refers to UExTR=4, 5, 14 to recognize that the optical node device 4 itself is the optical node device for implementing the 3R relay on the upstream optical path, ensures the resources for optical path setting and 3R relay, and sends the optical path setting request (Path) to the optical node device 5. At this time, since UExTR=4 is deleted after the optical node device 4 recognizes to implement the 3R relay, UExTR=5, 14 are loaded into the optical path setting request.

The optical node device 5 which receives the optical path setting request (Path) from the optical node device 4 refers to UExTR=5, 14 to recognize that the optical node device 5 itself is the optical node device for implementing the 3R relay on the upstream optical path, ensures the resources for optical path setting and 3R relay, and sends the optical path setting request (Path) to the optical node device 14. At this time, since UExTR=5 is deleted after the optical node device 5 recognizes to implement the 3R relay, UExTR=14 is loaded into the optical path setting request.

The optical node device 14 which receives the optical path setting request (Path) from the optical node device 5 refers to UExTR=14 to recognize that the optical node device 14 itself is the optical node device for implementing the 3R relay on the upstream optical path, ensures the resources for optical path setting and 3R relay, and sends the optical path setting completion notification (Resv) to the optical node device 5. The optical path setting completion notification (Resv) is transmitted through the optical node devices 5->4->3->2->1 so that the optical path setting is completed.

In this manner, the optical node device being the source node identifies the optical node device for implementing the 3R relay on the bi-directional optical path up to the destination node, so that the other optical node devices on this bi-directional optical path may simply follow the instruction from the source node, reducing the calculation load. Moreover, the optical node devices except for the optical node device being the source node, do not have to store the 3R section information, so that the information storage resources can be effectively used.

Next is a description of another example of the operation of the optical node device according to the fourth embodiment. Here as shown in FIG. 18, is a description of an embodiment where a bi-directional optical path from the optical node device 1 to the optical node device 14 (double lines) is set. The 3R relay implementation node identifying unit 25 of the optical node device 1 corresponding to the source node refers to the 3R section information storing unit 20 in order to know what part the optical node device 1 is in the topology of the optical network. As a result, the 3R relay implementation node identifying unit 25 recognizes that the optical node device 1 is a source node on the bi-directional optical path to be set, and is the 3R source node of the downstream optical path, and determines that the optical node device 1 implements the 3R relay on the downstream optical path.

Furthermore, the 3R relay implementation node identifying unit 25 refers to the 3R section information storing unit 20, and recognizes that the optical node device 1 is the 3R destination node on the upstream optical path to be set, so that the 3R relay implementation node identifying unit 25 determines that the optical node device 1 does not implement the 3R relay on the upstream optical path.

Moreover, the 3R relay implementation node identifying unit 25 determines whether or not the optical node device 10 is the optical node device for implementing the 3R relay on the upstream or downstream optical path. The 3R relay implementation node identifying unit 25 refers to the 3R section information stored in the 3R section information storing unit 20 and finds out that the optical node device 10 is not the 3R source node on the upstream or downstream optical path, and that the 3R section is up to the optical node device 11 if the optical node device 1 is the 3R source node on the downstream optical path, so that the 3R relay implementation node identifying unit 25 determines that the optical node device 10 does not implement the 3R relay. Furthermore, the 3R relay implementation node identifying unit 25 finds out that the optical node device 1 is the 3R destination node on the upstream optical path, and according to the 3R section information, that the optical node device 12 is the 3R source node using the optical node device 1 as the 3R destination node. Therefore, the 3R relay implementation node identifying unit 25 determines that the optical node device 10 does not implement the 3R relay on the upstream optical path.

Furthermore, the 3R relay implementation node identifying unit 25 determines whether or not the optical node device 11 is the optical node device for implementing the 3R relay. The 3R relay implementation node identifying unit 25 refers to the 3R section information stored in the 3R section information storing unit 20, and determines that the optical node device 11 implements the 3R relay since the optical node device 11 is the 3R source node on the 3R section from the optical node device 11 to the optical node device 13 on the downstream optical path. Furthermore, the 3R relay implementation node identifying unit 25 finds out that the optical node device 11 is not the 3R source node on the upstream optical path, and that the optical node device 12 is the 3R source node if the optical node device 1 is used as the 3R destination node, so that the 3R relay implementation node identifying unit 25 determines not to implement the 3R relay on the upstream optical path.

Moreover the 3R relay implementation node identifying unit 25 finds out that the optical node device 12 is neither the 3R source node nor the 3R destination node on the downstream optical path, and that the 3R section is up to the optical node device 13 if the optical node device 11 is the 3R source node on the downstream optical path, so that the 3R relay implementation node identifying unit 25 determines that the optical node device 12 is not required to implement the 3R relay. Furthermore, the 3R relay implementation node identifying unit 25 finds out that the optical node device 12 is the 3R source node on the upstream optical path using the optical node device 1 as the 3R destination node, so that the 3R relay implementation node identifying unit 25 determines to implement the 3R relay on the upstream optical path.

The 3R relay implementation node identifying unit 25 finds out that the optical node device 13 is not the 3R source node on the downstream optical path, and that the optical node device 13 is the 3R destination node if the optical node device 11 is the 3R source node. Here, the determination is made based on the determination policy of "when one optical node device is the optical node device corresponding to the 3R destination node and is not a destination node, it is determined that the one optical node device is the optical node device for implementing the 3R relay using the one optical node device as the 3R source node and the next-hop optical node device as the 3R destination node", and it is determined that the optical node device 13 implements the 3R relay. Furthermore, the 3R relay implementation node identifying unit 25 finds out that the section between the optical node device 14 and the optical node device 12 is the 3R section on the upstream optical path, so that the 3R relay implementation node identifying unit 25 determines that the optical node device 13 does not implement the 3R relay.

Moreover, the 3R relay implementation node identifying unit 25 determines that it is not required to implement the 3R relay on the downstream optical path since the optical node device 14 is the destination node, but it is required to implement the 3R relay on the upstream optical path using the optical node device 14 as the 3R source node and the optical node device 12 as the 3R destination node.

In this manner, the optical node device 1 being the source node identifies the optical node device for implementing the 3R relay on the optical path from the optical node device 1 to the optical node device 14. Furthermore, the 3R relay implementation requesting unit 26 of the optical node device 1 outputs DExTR=11, 13 and UExTR=12, 14 as the 3R relay implementation request on the downstream and upstream optical paths, respectively, to the optical node device 3 for implementing the 3R relay identified by the optical node device 1 itself.

When the optical node device for implementing the 3R relay can be identified, then as shown in FIG. 20, the optical path setting unit 22 of the optical node device 1 performs the signaling procedure of the optical path setting. That is, the optical node device 1 ensures the resources for optical path setting and 3R relay, and sends the optical path setting request (Path) to the optical node device 10. At this time, DExTR=11, 13 and UExTR=12, 14 are loaded into the optical path setting request.

The optical node device 10 which receives the optical path setting request (Path) from the optical node device 1 refers to DExTR=11, 13 and UExTR=12, 14 to recognize that the optical node device 10 itself is not the optical node device for implementing the 3R relay, ensures the resources for optical path setting, and sends the optical path setting request (Path) to the optical node device 11. At this time, the intact DExTR=11, 13 and UExTR=12, 14 delivered from the optical node device 1 are loaded.

The optical node device 11 which receives the optical path setting request (Path) from the optical node device 10 refers to DExTR=11, 13 and UExTR=12, 14 to recognize that the optical node device 11 itself is the optical node device for implementing the 3R relay on the downstream optical path, ensures the resources for optical path setting and 3R relay, and sends the optical path setting request (Path) to the optical node device 12. At this time, since DExTR=1 is deleted after the optical node device 3 recognizes to implement the 3R relay, DExTR=13 and UExTR=12, 14 are loaded into the optical path setting request.

The optical node device 12 which receives the optical path setting request (Path) from the optical node device 11 refers to DExTR=13 and UExTR=12, 14 to recognize that the optical node device 12 itself is the optical node device for implementing the 3R relay on the upstream optical path, ensures the resources for optical path setting and 3R relay, and sends the optical path setting request (Path) to the optical node device 13. At this time, since UExTR=12 is deleted after the optical node device 12 recognizes to implement the 3R relay, DExTR=13 and UExTR=14 are loaded into the optical path setting request.

The optical node device 13 which receives the optical path setting request (Path) from the optical node device 12 refers to DExTR=13 and UExTR=14 to recognize that the optical node device 13 itself is the optical node device for implementing the 3R relay on the downstream optical path, ensures the resources for optical path setting and 3R relay, and sends the optical path setting request (Path) to the optical node device 14. At this time, since DExTR=13 is deleted after the optical node device 13 recognizes to implement the 3R relay, UExTR=14 is loaded into the optical path setting request.

The optical node device 14 which receives the optical path setting request (Path) from the optical node device 13 refers to UExTR=14 to recognize that the optical node device 14 itself is the optical node device for implementing the 3R relay on the upstream optical path, ensures the resources for optical path setting and 3R relay, and sends the optical path setting completion notification (Resv) to the optical node device 13. The optical path setting completion notification (Resv) is transmitted through the optical node devices 13->12->11->10->1 so that the optical path setting is completed.

In this manner, the optical node device being the source node identifies the optical node device for implementing the 3R relay on the bi-directional optical path up to the destination node, so that the other optical node devices on this bi-directional optical path may simply follow the instruction from the source node, reducing the calculation load. Moreover, the optical node devices except for the optical node device being the source node, do not have to store the 3R section information, so that the information storage resources can be effectively used.

Fifth Embodiment

Figure 23:
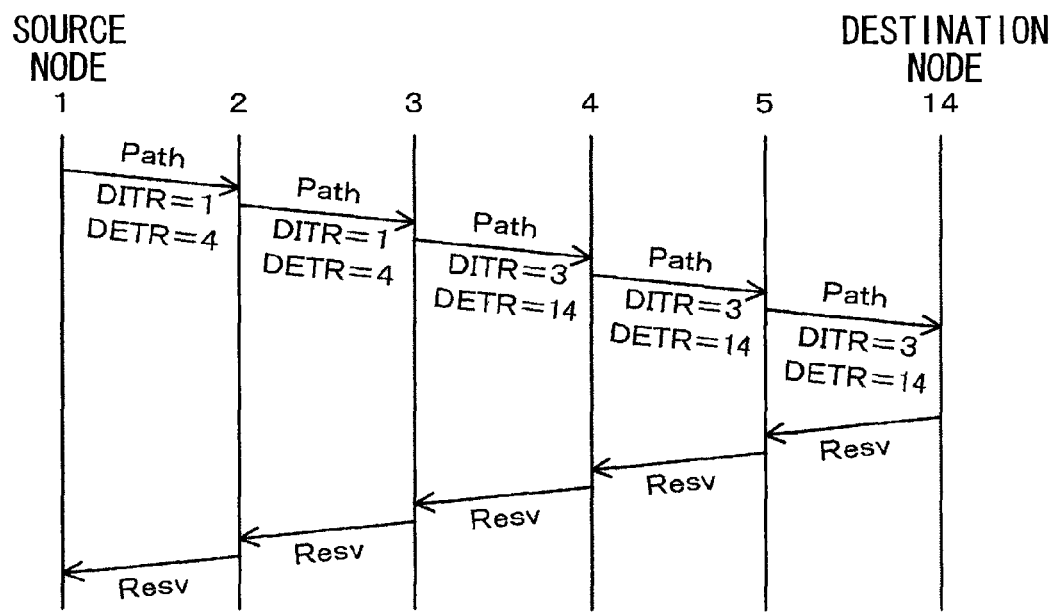
FIG. 23 shows a signaling procedure when setting an optical path in the fifth embodiment.
Figure 24:
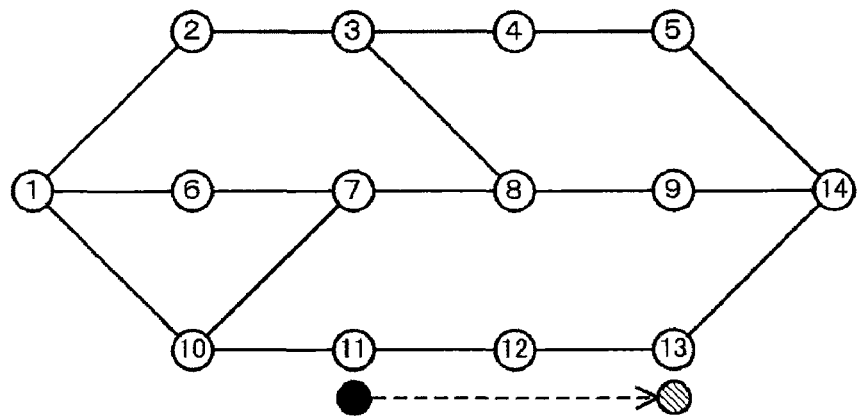
FIG. 24 shows 3R section information in the optical node device according to the fifth embodiment.
Figure 25:
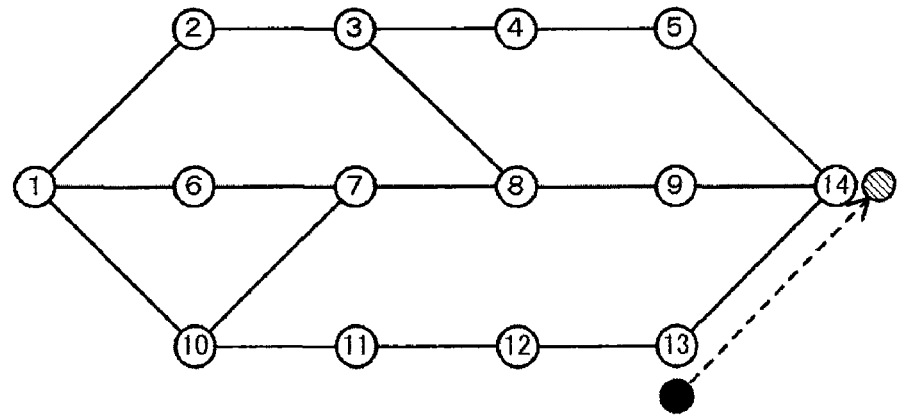
FIG. 25 shows 3R section information in the optical node device according to the fifth embodiment.
Figure 26:
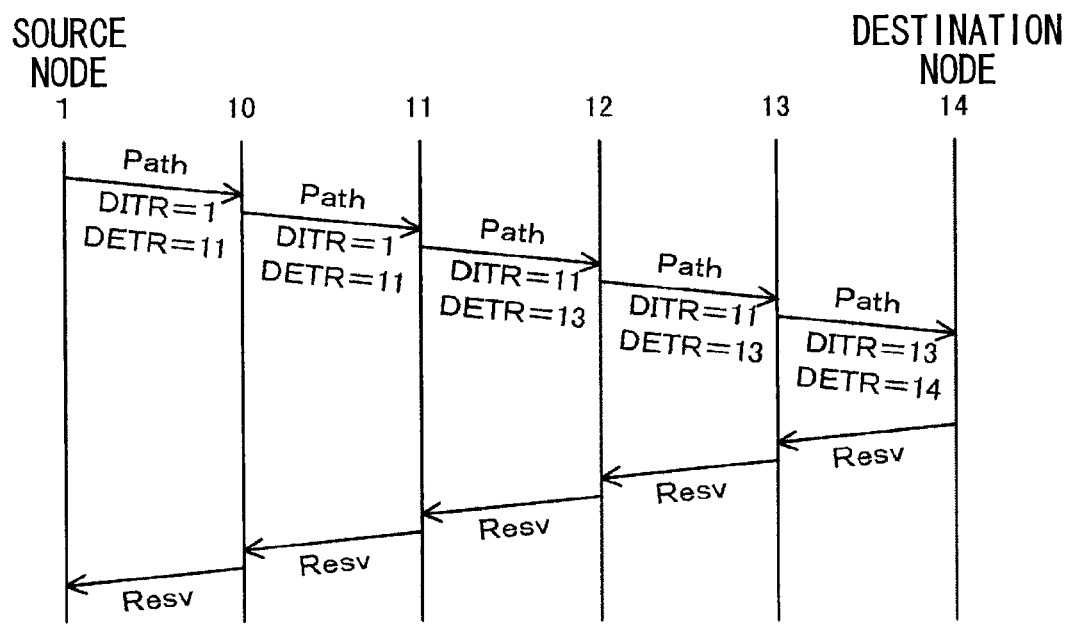
FIG. 26 shows a signaling procedure when setting an optical path in the fifth embodiment.
Figure 27:
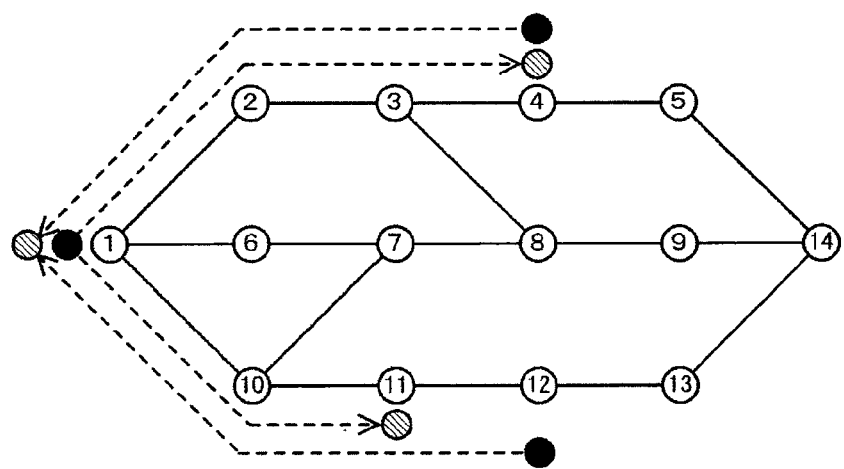
FIG. 27 shows 3R section information in the optical node device according to the sixth embodiment.
Figure 28:
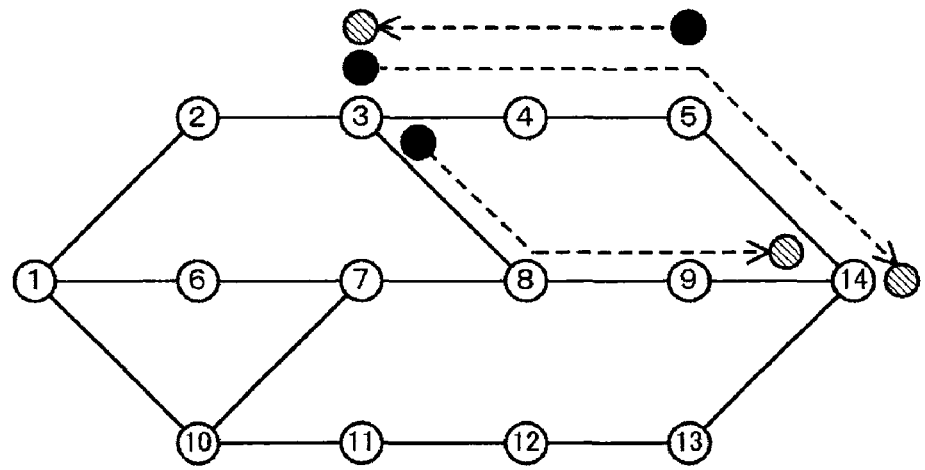
FIG. 28 shows 3R section information in the optical node device according to the sixth embodiment.
Figure 29:
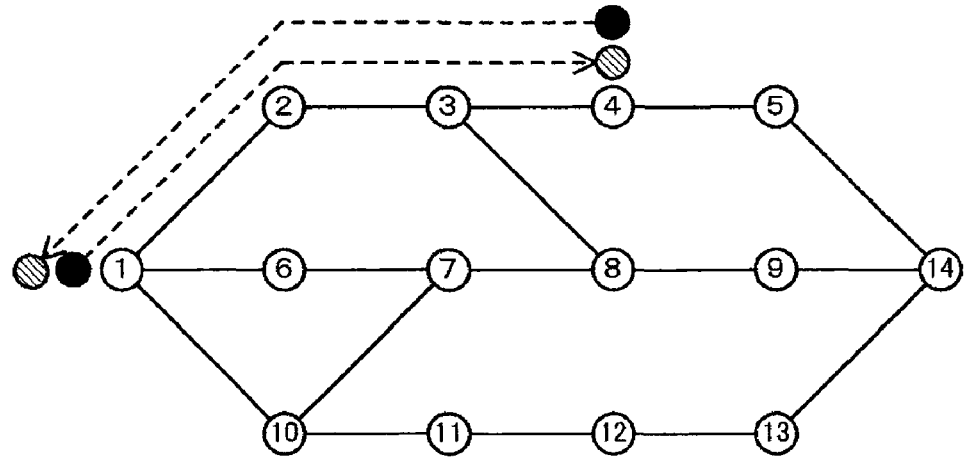
FIG. 29 shows 3R section information in the optical node device according to the sixth embodiment.
Figure 30:
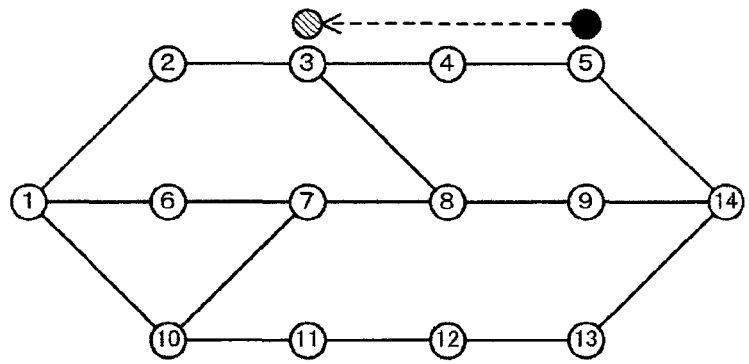
FIG. 30 shows 3R section information in the optical node device according to the sixth embodiment.

Optical node devices according to a fifth embodiment are described with reference to FIG. 3, FIG. 4, FIG. 5, FIG. 9, and FIG. 21 to FIG. 26. FIG. 21, FIG. 22, FIG. 24, and FIG. 25 show 3R section information in the optical node devices according to the fifth embodiment. FIG. 23 and FIG. 26 show signaling procedures when setting an optical path in the fifth embodiment.

As shown in FIG. 4, the optical node device according to the fifth embodiment comprises: a 3R section information storing unit 20 which stores 3R section information using the optical node device itself as the 3R source node; and a 3R relay implementation determining unit 21 which receives a message included in an optical path setting request showing that the optical node device itself is the 3R destination node, then, when the optical node device itself is not the destination node, refers to the 3R section information storing unit 20 and determines that itself is the optical node device for implementing the 3R relay if the optical node device itself is the 3R source node on this optical path. Moreover, the optical path setting unit 22 sends a message to transmit to the optical node device corresponding to the 3R destination node of the 3R section on the optical path using the optical node device itself as the 3R source node, that this optical node device corresponding to the 3R destination node of the 3R section is the 3R destination node.

The 3R relay implementation determining unit 21 receives a message included in an optical path setting request showing that the optical node device itself is the 3R destination node, then when the optical node device itself is not the destination node, refers to the 3R section information storing unit 20 and determines that the optical node device itself is the optical node device for implementing the 3R relay using the optical node device itself as the 3R source node and the next-hop optical node device as the 3R destination node if the optical node device itself is not the 3R source node on this optical path. Moreover, the optical path setting unit 22 sends a message to transmit to the next-hop optical node device that this next-hop optical node device is the 3R destination node.

In the fifth embodiment, the optical node device corresponding to the 3R source node stores the 3R section information of this 3R source node. Since it does not store other 3R section information, the information storage resources can be effectively used.

Next is a description of the operation of the optical node device according to the fifth embodiment. Here as shown in FIG. 5, is a description of an example where an optical path from the optical node device 1 to the optical node device 14 (double lines) is set. The 3R relay implementation determining unit 21 of the optical node device 1 corresponding to the 3R source node recognizes that an optical path setting request using the optical node device 1 as the source node has issued, and determines that the optical node device 1 implements the 3R relay on the optical path. Moreover, the 3R section information storing unit 20 stores the 3R section information shown in FIG. 21, so that the 3R relay implementation determining unit 21 recognizes that if using the optical node device 1 as the 3R source node, the 3R destination node is the optical node device 4.

As shown in FIG. 23, the optical path setting unit 22 which has been notified of the recognition result of the 3R relay implementation determining unit 21 generates DITR=1 as a message showing that the optical node device 1 is the 3R source node, and DETR=4 as a message showing that the optical node device 4 is the 3R destination node. The optical path setting unit 22 ensures the resources for optical path setting and the 3R relay, and loads DITR=1 and DETR=4 when sending the optical path setting request (Path) to the optical node device 2.

The 3R relay implementation determining unit 21 of the optical node device 2 which receives the optical path setting request (Path) from the optical node device 1 refers to the DITR=1 and DETR=4 to recognize that the optical node device 2 itself is not the optical node device for implementing the 3R relay. The optical path setting unit 22 of the optical node device 2 ensures the resources for optical path setting, and loads the intact DITR=1 and DETR=4 from the optical node device 1 when sending the optical path setting request (Path) to the optical node device 3.

The 3R relay implementation determining unit 21 of the optical node device 3 which receives the optical path setting request (Path) from the optical node device 2 refers to the DITR=1 and DETR=4. Furthermore the 3R section information storing unit 20 stores the 3R section information shown in FIG. 22 since the optical node device 3 is the 3R source node, and the 3R relay implementation determining unit 21 refers to this 3R section information. The message included in the optical path setting request is DETR=4 specifying that the optical node device 4 is the 3R destination node. However the 3R relay implementation determining unit 21 determines whether or not the optical node device 3 is the optical node device for implementing the 3R relay.

The 3R relay implementation determining unit 21 refers to the 3R section information stored in the 3R section information storing unit 20 and recognizes that the optical node device 3 may implement the 3R relay since the optical node device 3 is the 3R source node on the 3R section from the optical node device 3 to the optical node device 14, or that the optical node device 3 may not implement the 3R relay but transmit the intact optical signal to the optical node device 4 being the 3R destination node since the optical node device is not the 3R source node on the 3R section from the optical node device 1 to the optical node device 4.

In such a case, the 3R relay implementation determining unit 21 uses a 3R implementation simulating unit 23 and a comparison unit 24 to compare the number of 3R implementations in the case where the optical node device 3 functions as the 3R source node, and the case where the optical node device 3 does not function as the 3R source node, with regards to the optical path from the optical node device 3 to the optical node device 14. The description hereunder is similar to that of the first embodiment.

Such simulation results of the 3R implementation simulating unit 23 are input into the comparison unit 24. In the comparison unit 24, it is found that the number of 3R implementations can be reduced in the case where the optical node device 3 implements the 3R relay compared to the case where the optical node device 3 does not implement the 3R relay. Therefore to that effect is output as a comparison result. As a comparison result, the 3R relay implementation determining unit 21 selects the case having the lower number of 3R implementations. Therefore, the optical node device 3 determines to implement the 3R relay.

In response to this determination, the optical path setting unit 22 ensures the resources for optical path setting and the 3R relay, and as shown in FIG. 23 it loads DITR=3 and DETR=14 as a message showing that the optical node device 3 is the 3R source node and the optical node device 14 is the 3R destination node, when sending the optical path setting request (Path) to the optical node device 4.

The 3R relay implementation determining unit 21 of the optical node device 4 which receives the optical path setting request (Path) from the optical node device 3 refers to the DITR=3 and DETR=14 to recognize that the optical node device 4 itself is not the optical node device for implementing the 3R relay. The optical path setting unit 22 of the optical node device 4 ensures the resources for optical path setting, and loads the intact DITR=3 and DETR=14 from the optical node device 3 when sending the optical path setting request (Path) to the optical node device 5.

The 3R relay implementation determining unit 21 of the optical node device 5 which receives the optical path setting request (Path) from the optical node device 4 refers to the DITR=3 and DETR=14 to recognize that the optical node device 5 itself is not the optical node device for implementing the 3R relay. The optical path setting unit 22 of the optical node device 5 ensures the resources for optical path setting, and loads the intact DITR=3 and DETR=14 from the optical node device 4 when sending the optical path setting request (Path) to the optical node device 14.

The 3R relay implementation determining unit 21 of the optical node device 14 which receives the optical path setting request (Path) from the optical node device 5 refers to the DITR=3 and DETR=14 to recognize that itself is the 3R destination node. Furthermore, based on the determination policy of "when the optical node device itself is the optical node device corresponding to the 3R destination node on the optical path and is not a destination node, it requests the next-hop optical node device to implement the 3R relay using the optical node device itself as the 3R source node and the next-hop optical node device as the 3R destination node", the 3R relay implementation determining unit 21 determines whether or not the optical node device 14 itself implements the 3R relay. The 3R relay implementation determining unit 21 refers to the optical path setting request and recognizes that the optical node device 14 itself is the destination node, so that the 3R relay implementation determining unit 21 determines that it is not required to implement the 3R relay.

The optical path setting unit 22 of the optical node device 14 ensures the resources for optical path setting and sends the optical path setting completion notification (Resv) to the optical node device 5. The optical path setting completion notification (Resv) is transmitted through the optical node devices 5->4->3->2->1 so that the optical path setting is completed.

Next is a description of another example of the operation of the optical node device of the fifth embodiment. Here as shown in FIG. 9, is a description of an example where an optical path from the optical node device 1 to the optical node device 14 (double lines) is set. The 3R relay implementation determining unit 21 of the optical node device 1 corresponding to the 3R source node recognizes that an optical path setting request using the optical node device 1 as the source node has issued, and the optical node device 1 determines to implement the 3R relay on the optical path. Moreover, the 3R section information storing unit 20 stores the 3R section information shown in FIG. 21, so that the 3R section implementation determining unit 21 can recognize that the 3R destination node using the optical node device 1 as the 3R source node is the optical node device 11.

The optical path setting unit 22 which has been notified of the recognition result of the 3R relay implementation determining unit 21 generates DITR=1 as a message showing that the optical node device 1 is the 3R source node, and DETR=11 as a message showing that the optical node device 11 is the 3R destination node. The optical path setting unit 22 ensures the resources for optical path setting and the 3R relay, and as shown in FIG. 26, loads DITR=1 and DETR=11 when sending the optical path setting request (Path) to the optical node device 10.

The optical node device 10 which receives the optical path setting request (Path) from the optical node device 1 refers to the DITR=1 and DETR=11 to recognize that the optical node device 10 itself is not the optical node device for implementing the 3R relay. The optical path setting unit 22 of the optical node device 10 ensures the resources for optical path setting, and loads the intact DITR=1 and DETR=11 from the optical node device 1 when sending the optical path setting request (Path) to the optical node device 11.

The 3R relay implementation determining unit 21 of the optical node device 11 which receives the optical path setting request (Path) from the optical node device 10 refers to the DITR=1 and DETR=11. Furthermore, the 3R section information storing unit 20 stores the 3R section information shown in FIG. 24 since the optical node device 11 is the 3R source node, and thus the 3R relay implementation determining unit 21 refers to this 3R section information. Therefore, the 3R relay implementation determining unit 21 recognizes that the optical node device 11 itself is the 3R destination node and the 3R source node of the 3R section using the optical node device 13 as the 3R destination node.

The optical path setting unit 22 which receives this recognition result generates DITR=11 as a message showing that the optical node device 11 itself is the 3R source node, and DETR=13 as a message showing that the optical node device 13 is the 3R destination node.

The optical path setting unit 22 of the optical node device 11 ensures the resources for optical path setting and the 3R relay, and loads DITR=11 and DETR=13 when sending the optical path setting request (Path) to the optical node device 12.

The 3R relay implementation determining unit 21 of the optical node device 12 which receives the optical path setting request (Path) from the optical node device 11 refers to the DITR=11 and DETR=13 to recognize that the optical node device 12 itself is not the optical node device for implementing the 3R relay. The optical path setting unit 22 of the optical node device 12 ensures the resources for optical path setting, and loads the intact DITR=11 and DETR=13 from the optical node device 11 when sending the optical path setting request (Path) to the optical node device 13.

The 3R relay implementation determining unit 21 of the optical node device 13 which receives the optical path setting request (Path) from the optical node device 12 refers to the DITR=11 and DETR=13. Furthermore, the 3R section information storing unit 20 stores the 3R section information shown in FIG. 25 since the optical node device 13 is the 3R source node, and thus the 3R relay implementation determining unit 21 refers to this 3R section information. Therefore, the 3R relay implementation determining unit 21 recognizes that the optical node device 13 itself is the 3R destination node and the 3R source node of the 3R section using the optical node device 14 as the 3R destination node.

The optical path setting unit 22 which receives this recognition result generates DITR=13 as a message showing that the optical node device 13 itself is the 3R source node, and DETR=14 as a message showing that the optical node device 14 is the 3R destination node.

The optical path setting unit 22 of the optical node device 13 ensures the resources for optical path setting and the 3R relay, and loads DITR=13 and DETR=14 when sending the optical path setting request (Path) to the optical node device 14.

The 3R relay implementation determining unit 21 of the optical node device 14 which receives the optical path setting request (Path) from the optical node device 13 refers to the DITR=13 and DETR=14 to recognize that the optical node device 14 itself is the 3R destination node. Furthermore, the 3R relay implementation determining unit 21 makes a determination based on the determination policy of "when the optical node device itself is the optical node device corresponding to the 3R destination node on the optical path and is not a destination node, the optical node device requests the next-hop optical node device to implement the 3R relay using the optical node device itself as the 3R source node and the next-hop optical node device as the 3R destination node", and determines that it is not required to implement the 3R relay since the optical node device 14 itself is the destination node.

The optical path setting unit 22 of the optical node device 14 ensures the resources for optical path setting and sends the optical path setting completion notification (Resv) to the optical node device 13. The optical path setting completion notification (Resv) is transmitted through the optical node devices 13->12->11>10->1 so that the optical path setting is completed.

Sixth Embodiment

Figure 31:
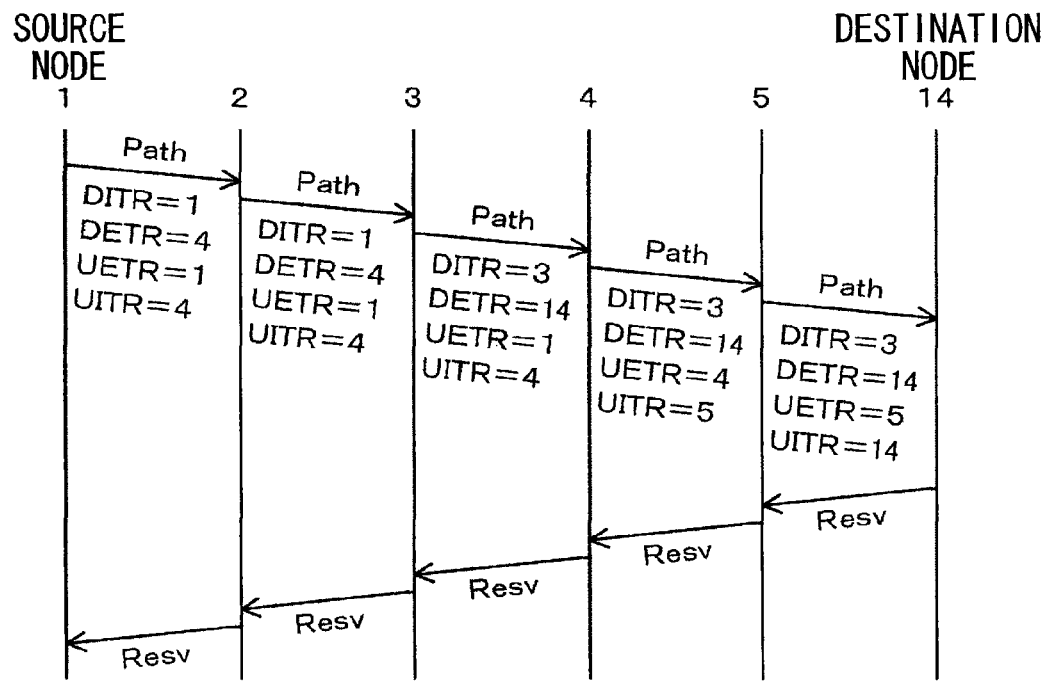
FIG. 31 shows a signaling procedure when setting an optical path in the sixth embodiment.
Figure 32:
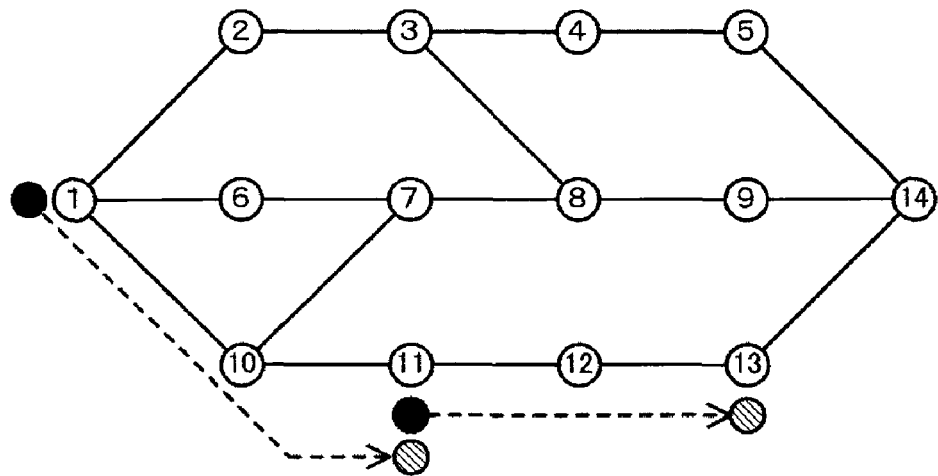
FIG. 32 shows 3R section information in the optical node device according to the sixth embodiment.
Figure 33:
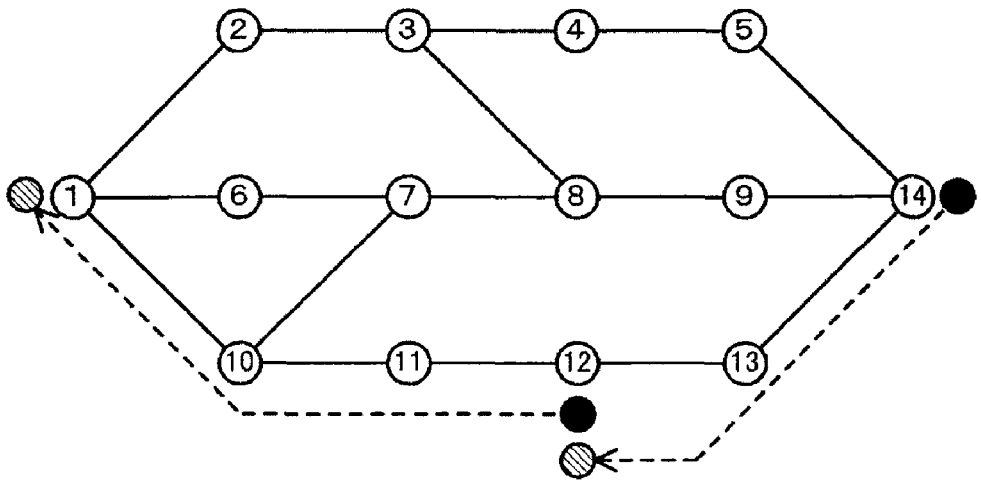
FIG. 33 shows 3R section information in the optical node device according to the sixth embodiment.
Figure 34:
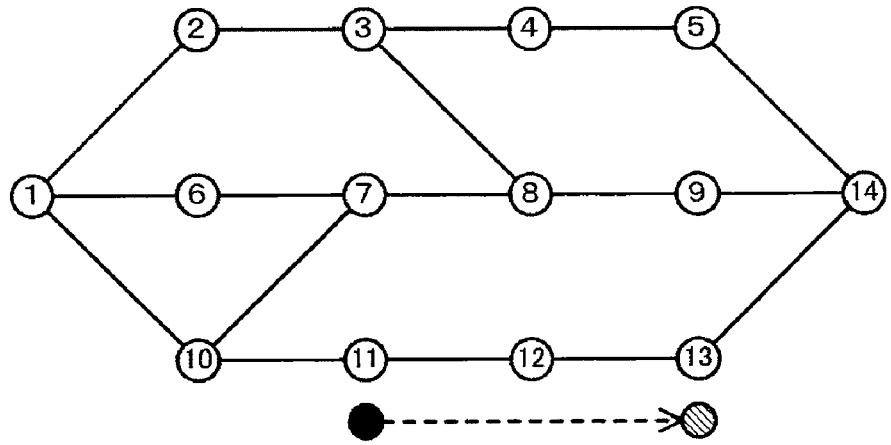
FIG. 34 shows 3R section information in the optical node device according to the sixth embodiment.
Figure 35:
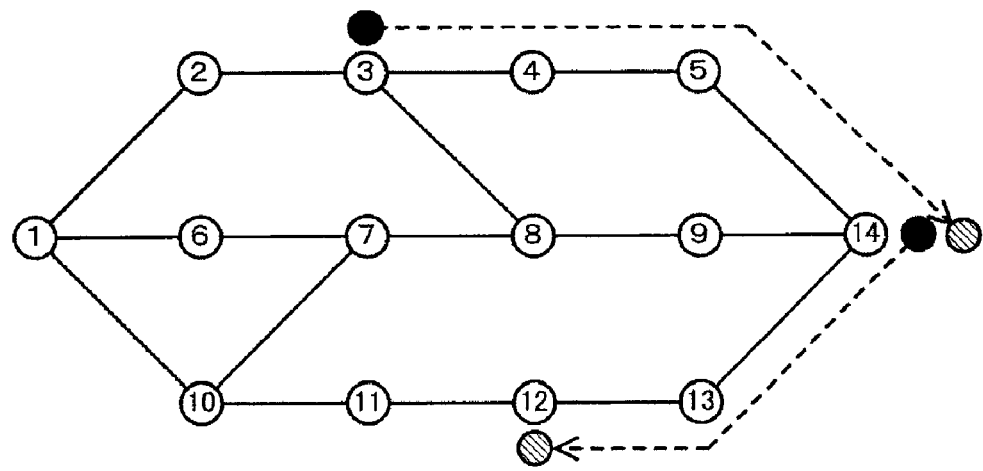
FIG. 35 shows 3R section information in the optical node device according to the sixth embodiment.
Figure 36:
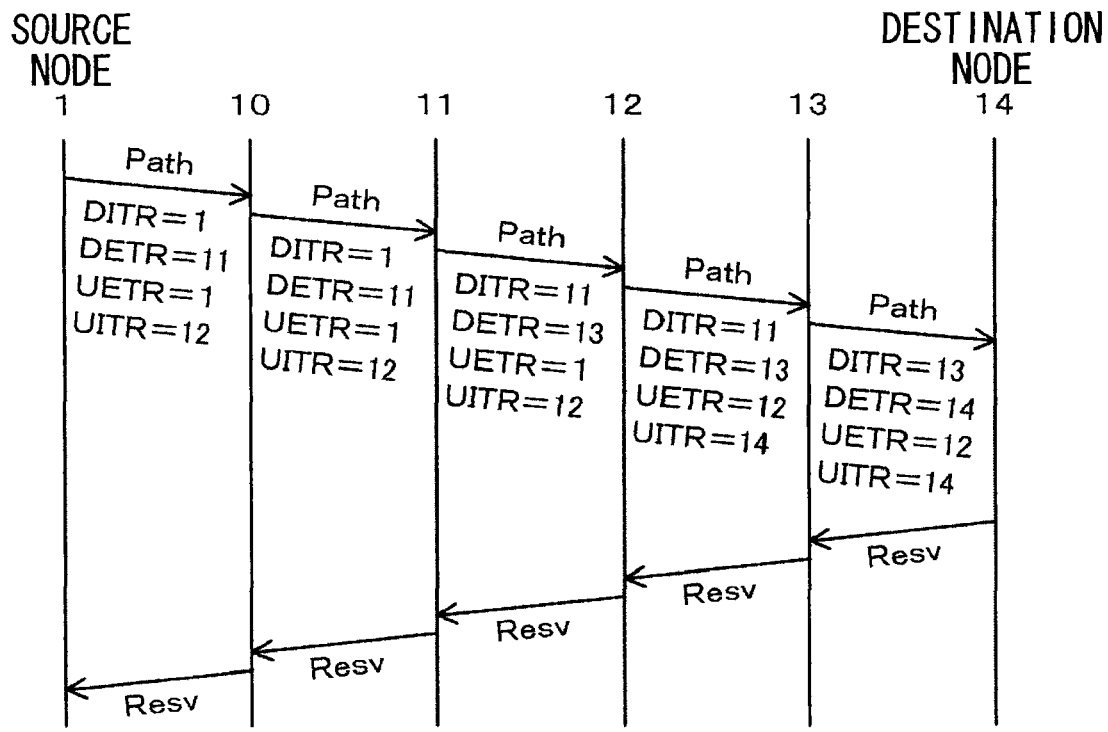
FIG. 36 shows a signaling procedure when setting an optical path in the sixth embodiment.

Optical node devices according to a sixth embodiment are described with reference to FIG. 4, FIG. 14, FIG. 15, and FIG. 27 to FIG. 36. FIG. 27 to FIG. 30 and FIG. 32 to FIG. 35 show 3R section information of an optical node device according to the sixth embodiment. FIG. 31 and FIG. 36 show signaling procedures when setting an optical path in the sixth embodiment.

As shown in FIG. 4, the optical node device according to the sixth embodiment comprises: a 3R section information storing unit 20 which stores 3R section information using the optical node device itself as the 3R source node and the 3R destination node; and an optical path setting unit 22 which receives a message included in an optical path setting request showing that the optical node device itself is the 3R destination node on the downstream optical path, then refers to the 3R section information storing unit 20 when the optical node device itself is not the destination node, and if the optical node device itself is the 3R source node on the downstream optical path, determines that the optical node device itself is the optical node device for implementing the 3R relay, and sends a message to transmit to the optical node device corresponding to the 3R destination node of the 3R section on the downstream optical path using the optical node device itself as the 3R source node, that the optical node device corresponding to the 3R destination node is the 3R destination node.

Moreover, the optical path setting unit 22 receives a message included in an optical path setting request showing that the optical node device itself is the 3R source node on the upstream optical path, and determines that the optical node device itself is the optical node device for implementing the 3R relay on the upstream optical path, then refers to the 3R section information storing unit 20 when the optical node device itself is not the destination node, and when the optical node device itself is the 3R destination node on this upstream optical path, sends a message to transmit to the optical node device corresponding to the 3R source node on the upstream optical path using the optical node device itself as the 3R destination node, that the optical node device corresponding to the 3R source node is the 3R source node.

Furthermore, the optical path setting unit 22 receives a message included in an optical path setting request showing that the optical node device itself is the 3R destination node on the downstream optical path, then refers to the 3R section information storing unit 20 when the optical node device itself is not the destination node, determines when the optical node device itself is not the 3R source node on the downstream optical path, that the optical node device itself is the optical node device for implementing the 3R relay using the optical node device itself as the 3R source node and the next-hop optical node device on the downstream optical path as the 3R destination node, and generates a message to transmit to this next-hop optical node device, that this next-hop optical node device is the 3R destination node of the optical node device itself.

Moreover, the optical path setting unit 22 receives a message included in an optical path setting request showing that the optical node device itself is the 3R source node on the upstream optical path, and determines that the optical node device itself is the optical node device for implementing the 3R relay on the upstream optical path, then refers to the 3R section information storing unit 20 when the optical node device itself is not the destination node, and generates a message when the optical node device itself is not the 3R destination node on the upstream optical path, to transmit to the previous-hop optical node device, that this previous-hop optical node device on the upstream optical path is the 3R source node using the optical node device itself as the 3R destination node.

In the sixth embodiment, the optical node device corresponding to the 3R source node or the 3R destination node stores the 3R section information relating to the optical node device itself. Since it does not store the other 3R section information, the information storage resources can be effectively used.

Next is a description of the operation of the optical node device according to the sixth embodiment. Here as shown in FIG. 15, is a description of an example where a bi-directional optical path from the optical node device 1 to the optical node device 14 (double lines) is set. The 3R relay implementation determining unit 21 of the optical node device 1 recognizes that a bi-directional optical path setting request using the optical node device 1 as the source node has issued, and determines that the optical node device 1 implements the 3R relay on the downstream optical path. Moreover, the 3R section information storing unit 20 stores the 3R section information shown in FIG. 27, so that the 3R relay implementation determining unit 21 recognizes that the 3R destination node if using the optical node device 1 as the 3R source node, is the optical node device 4 on the downstream optical path. Moreover, the 3R relay implementation determining unit 21 recognizes that the optical node device 1 is the 3R destination node if using the optical node device 4 as the 3R source node on the upstream optical path.

The optical path setting unit 22 of the optical node device 1 receives the determination of the 3R relay implementation determining unit 21 and ensures the resources for the downstream optical path setting. Then, as shown in FIG. 31, the optical path setting unit 22 loads a message of DITR=1 and DETR=4 showing that the optical node device 1 is the 3R source node on the downstream optical path and that the 3R destination node of this 3R section is the optical node device 4, into the optical path setting request (Path) when sending the optical path setting request (Path) to the optical node device 2.

Furthermore, the 3R relay implementation determining unit 21 refers to the 3R section information storing unit 20 to recognize that the optical node device 1 is the 3R destination node of the upstream optical path to be set, and determines that the optical node device 1 does not implement the 3R relay on the upstream optical path. The optical path setting unit 22 of the optical node device 1 receives the determination of the 3R relay implementation determining unit 21 and ensures the resources for the upstream optical path setting. Then, as shown in FIG. 31, the optical path setting unit 22 loads a message of UETR=1 and UITR=4 showing that the optical node device 1 is the 3R destination node on the upstream optical path and that the 3R source node of this 3R section is the optical node device 4, into the optical path setting request when sending the optical path setting request (Path) to the optical node device 2.

The optical path setting unit 22 of the optical node device 2 which receives the optical path setting request (Path) from the optical node device 1 queries the 3R relay implementation determining unit 21 as to whether or not the optical node device 2 is the optical node device for implementing the 3R relay on the upstream or downstream optical path. Since the optical node device 2 is neither the 3R source node nor the 3R destination node, the 3R section information storing unit 20 does not store the 3R section information. Therefore, it is determined that the optical node device 2 does not implement the 3R relay.

The optical path setting unit 22 of the optical node device 2 receives the determination of the 3R relay implementation determining unit 21 and ensures the resources for upstream and downstream optical path setting. Then, as shown in FIG. 31, since the optical node device 2 does not implement the 3R relay, when sending the optical path setting request (Path) to the optical node device 3, the optical path setting unit 22 loads the intact DITR=1, DETR=4, UETR=1 and UITR=4 from the optical node device 1 into the optical path setting request.

The optical path setting unit 22 of the optical node device 3 which receives the optical path setting request (Path) from the optical node device 2 queries the 3R relay implementation determining unit 21 as to whether or not the optical node device 3 is the optical node device for implementing the 3R relay. The 3R relay implementation determining unit 21 of the optical node device 3 refers to the 3R section information stored in the 3R section information storing unit 20 shown in FIG. 28, and recognizes that the optical node device 3 may implement the 3R relay since the optical node device 3 is the 3R source node on the 3R section from the optical node device 3 to the optical node device 14 on the downstream optical path, and that the optical node device 3 may not implement the 3R relay but transmit the intact optical signal to the optical node device 4 being the 3R destination node since, due to the DITR=1 and DETR=4, there is the 3R section from the optical node device 1 to the optical node device 4 on the downstream optical path, and the optical node device 3 is not the 3R source node on this 3R section.

In such a case, the 3R relay implementation determining unit 21 of the optical node device 3 uses a 3R implementation simulating unit 23 and a comparison unit 24 to compare the number of 3R implementations in the case where the optical node device 3 functions as the 3R source node, and the case where it does not function as the 3R source node, with regards to the downstream optical path from the optical node device 3 to the optical node device 14. The description hereunder is similar to that of the first embodiment.

Such simulation results of the 3R implementation simulating unit 23 are input into the comparison unit 24. In the comparison unit 24, it is found that the number of 3R implementations can be reduced in the case where the optical node device 3 implements the 3R relay on the downstream optical path compared to the case where the optical node device 3 does not implement the 3R relay. Therefore to that effect is output as a comparison result. As a comparison result, the 3R relay implementation determining unit 21 selects the case having the lower number of 3R implementations. Therefore, it is determined that the optical node device 3 implements the 3R relay on the downstream optical path.

Furthermore, the 3R relay implementation determining unit 21 finds out that the optical node device 3 is not the 3R source node on the upstream optical path, and due to the delivery of the UETR=1 and UITR=4 from the optical node device 2, that there is a 3R section using the optical node device 1 as the 3R destination node and the optical node device 4 as the 3R source node, so that the 3R relay implementation determining unit 21 determines not to implement the 3R relay on the upstream optical path.

The optical path setting unit 22 of the optical node device 3 receives the determination of the 3R relay implementation determining unit 21 and ensures the resources for optical path setting and the 3R relay. Then, as shown in FIG. 31, the optical path setting unit 22 loads a message of DITR=3 and DETR=14 showing that the optical node device 3 is the 3R source node on the downstream optical path and that the 3R destination node of this 3R section is the optical node device 14, into the optical path setting request when sending the optical path setting request (Path) to the optical node device 4. Moreover, since the optical node device 3 does not implement the 3R relay on the upstream optical path, the optical path setting unit 22 loads the intact UETR=1 and UITR=4 delivered from the optical node device 2 into the optical path setting request.

The optical path setting unit 22 of the optical node device 4 which receives the optical path setting request (Path) from the optical node device 3 queries the 3R relay implementation determining unit 21 as to whether or not the optical node device 4 is the optical node device for implementing the 3R relay. The 3R relay implementation determining unit 21 of the optical node device 4 refers to the 3R section information shown in FIG. 29 and stored in the 3R section information storing unit 20 and finds out that the optical node device 4 is the 3R destination node on the downstream optical path, and due to the delivery of the DITR=3 and DETR=14 from the optical node device 3, that the 3R section is up to the optical node device 14 if the optical node device 3 is the 3R source node on the downstream optical path, so that the 3R relay implementation determining unit 21 determines that the optical node device 4 is not required to implement the 3R relay.

Furthermore, the 3R relay implementation determining unit 21 refers to the 3R section information stored in the 3R section information storing unit 20 and finds out due to the delivery of the UETR=1 and UITR=4 from the optical node device 3, that the optical node device 4 is the 3R source node on the upstream optical path using the optical node device 1 as the 3R destination node, so that the 3R relay implementation determining unit 21 determines to implement the 3R relay on the upstream optical path.

The optical path setting unit 22 of the optical node device 4 receives the determination of the 3R relay implementation determining unit 21 and ensures the resources for optical path setting and 3R relay. Then, as shown in FIG. 31, since the optical node device 4 does not implement the 3R relay on the downstream optical path, when sending the optical path setting request (Path) to the optical node device 5, the optical path setting unit 22 loads the intact DITR=3 and DETR=14 from the optical node device 3 into the optical path setting request.

Moreover, the optical node device 4 recognizes that the optical node device 4 is the 3R source node on the upstream optical path, and with reference to the 3R section information storing unit 20 that the optical node device 4 itself is not the 3R destination node on this upstream optical path. In such a case, the previous-hop optical node device 5 on the upstream optical path is required to be the 3R source node using the optical node device 4 itself as the 3R destination node. Therefore, in order to transmit this to the optical node device 5, UETR=4 and UITR=5 are loaded into the optical path setting request.

The optical path setting unit 22 of the optical node device 5 which receives the optical path setting request (Path) from the optical node device 4 queries the 3R relay implementation determining unit 21 as to whether or not the optical node device 5 is the optical node device for implementing the 3R relay. The 3R relay implementation determining unit 21 of the optical node device 5 refers to the 3R section information shown in FIG. 30 and stored in the 3R section information storing unit 20 and finds out that the optical node device 5 is not the 3R source node on the downstream optical path, and due to the delivery of the DITR=3 and DETR=14 from the optical node device 4, that the 3R section is up to the optical node device 14 if the optical node device 3 is the 3R source node, so that the 3R relay implementation determining unit 21 determines that the optical node device 5 does not implement the 3R relay. Moreover, due to the delivery of the UETR=4 and UITR=5 from the optical node device 4, the 3R relay implementation determining unit 21 refers to the 3R section information storing unit 20 to recognize that the optical node device 5 is the 3R source node on the upstream optical path, so that the 3R relay implementation determining unit 21 determines to implement the 3R relay on the upstream optical path.

The optical path setting unit 22 of the optical node device 5 receives the determination of the 3R relay implementation determining unit 21 and ensures the resources for optical path setting and 3R relay. Then, as shown in FIG. 31, since the optical node device 5 does not implement the 3R relay on the downstream optical path, when sending the optical path setting request (Path) to the optical node device 14, the optical path setting unit 22 loads the intact DITR=3 and DETR=14 from the optical node device 4 into the optical path setting request.

Moreover, the optical node device 5 is the 3R source node on the upstream optical path; however the 3R section using the optical node device 14 as the 3R source node and the optical node device 5 as the 3R destination node is not set. In such a case, the optical node device 14 is required to be the 3R source node based on the determination policy of "when the optical node device itself does not belong to any 3R section having the 3R source node on the optical path passing through the optical node device itself, it is determined that the optical node device itself is the optical node device for implementing the 3R relay using the optical node device itself as the 3R source node and the next-hop optical node device as the 3R destination node." Therefore, UETR=5 and UITR=14 showing that the optical node device 5 is the 3R destination node and the 3R source node of this 3R section is the optical node device 14, are loaded into the optical path request.

The optical path setting unit 22 of the optical node device 14 which receives the optical path setting request (Path) from the optical node device 5 queries the 3R relay implementation determining unit 21 as to whether or not the optical node device 14 is the optical node device for implementing the 3R relay. The 3R relay implementation determining unit 21 of the optical node device 14 refers to the 3R section information shown in FIG. 35 and stored in the 3R section information storing unit 20 and determines that it is not required to implement the 3R relay on the downstream optical path since the optical node device 14 is the destination node, but due to the delivery of the UETR=5 and UITR=14 from the optical node device 5 it is required to implement the 3R relay on the upstream optical path using the optical node device 14 as the 3R source node and the optical node device 5 as the 3R destination node.

The optical path setting unit 22 of the optical node device 14 receives the determination of the 3R relay implementation determining unit 21 and ensures the resources for optical path setting and 3R relay. Then, as shown in FIG. 31, the optical path setting unit 22 sends the optical path setting completion notification (Resv) to the optical node device 5.

This optical path setting completion notification (Resv) is transmitted through the optical node devices 5->4->3->2->1 so that the optical path setting is completed. In this way, the respective optical node devices 1, 2, 3, 4, 5, and 14 can determine autonomously whether or not they themselves implement the 3R relay in the process of performing the signaling procedure of the optical path setting.

Next is a description of another example of the operation of the optical node device according to the sixth embodiment. Here as shown in FIG. 18, is a description of an example where a bi-directional optical path from the optical node device 1 to the optical node device 14 (double lines) is set. The 3R relay implementation determining unit 21 of the optical node device 1 recognizes that a bi-directional optical path setting request using the optical node device 1 as the source node has issued, and determines that the optical node device 1 implements the 3R relay on the downstream optical path. Moreover, the 3R section information storing unit 20 stores the 3R section information shown in FIG. 27, so that the 3R relay implementation determining unit 21 recognizes that the 3R destination node if using the optical node device 1 as the 3R source node, is the optical node device 11 on the downstream optical path. Moreover, the 3R relay implementation determining unit 21 recognizes that the optical node device 1 is the 3R destination node on the upstream optical path if using the optical node device 12 as the 3R source node.

The optical path setting unit 22 of the optical node device 1 receives the determination of the 3R relay implementation determining unit 21 and ensures the resources for the downstream optical path setting. Then, as shown in FIG. 36, the optical path setting unit 22 loads a message of DITR=1 and DETR=11 showing that the optical node device 1 is the 3R source node on the downstream optical path and that the 3R destination node of this 3R section is the optical node device 11, into the optical path setting request (Path) when sending the optical path setting request (Path) to the optical node device 10.

Furthermore, the 3R relay implementation determining unit 21 refers to the 3R section information storing unit 20 to recognize that the optical node device 1 is the 3R destination node of the upstream optical path to be set, and determines that the optical node device 1 does not implement the 3R relay on the upstream optical path.

The optical path setting unit 22 of the optical node device 1 receives the determination of the 3R relay implementation determining unit 21 and ensures the resources for the upstream optical path setting and the 3R relay. Then, as shown in FIG. 36, the optical path setting unit 22 loads a message of UETR=1 and UITR=12 showing that the optical node device 1 is the 3R destination node on the upstream optical path and that the 3R source node of this 3R section is the optical node device 12, into the optical path setting request when sending the optical path setting request (Path) to the optical node device 10.

The optical path setting unit 22 of the optical node device 10 which receives the optical path setting request (Path) from the optical node device 1 queries the 3R relay implementation determining unit 21 as to whether or not the optical node device 10 is the optical node device for implementing the 3R relay on the upstream or downstream optical path. The optical node device 10 is neither the 3R source node nor the 3R destination node, and does not store the 3R section information in the 3R section information storing unit 20. Therefore, it is determined that the optical node device 10 does not implement the 3R relay on any upstream or downstream optical paths.

The optical path setting unit 22 of the optical node device 10 receives the determination of the 3R relay implementation determining unit 21 and ensures the resources for upstream and downstream optical path setting. Then, as shown in FIG. 36, since the optical node device 10 does not implement the 3R relay, when sending the optical path setting request (Path) to the optical node device 11, the optical path setting unit 22 loads the intact DITR=1, DETR=11, UETR=1 and UITR=12 from the optical node device 1 into the optical path setting request.

The optical path setting unit 22 of the optical node device 11 which receives the optical path setting request (Path) from the optical node device 10 queries the 3R relay implementation determining unit 21 as to whether or not the optical node device 11 is the optical node device for implementing the 3R relay. The 3R relay implementation determining unit 21 of the optical node device 11 refers to the 3R section information shown in FIG. 32 and stored in the 3R section information storing unit 20, and determines that the optical node device 11 implements the 3R relay since the optical node device 11 is the 3R source node on the 3R section from the optical node device 11 to the optical node device 13 on the downstream optical path.

Furthermore, the 3R relay implementation determining unit 21 finds out that the optical node device 11 is not the 3R source node on the upstream optical path, and due to the delivery of the UETR=1 and UITR=12 from the optical node device 10, that the optical node device 12 is the 3R source node if the optical node device 1 is used as the 3R destination node, so that it determines not to implement the 3R relay on the upstream optical path.

The optical path setting unit 22 of the optical node device 11 receives the determination of the 3R relay implementation determining unit 21 and ensures the resources for optical path setting and the 3R relay. Then, as shown in FIG. 36, the optical path setting unit 22 loads a message of DITR=11 and DETR=13 showing that the optical node device 11 is the 3R source node on the downstream optical path and that the 3R destination node of this 3R section is the optical node device 13, into the optical path setting request when sending the optical path setting request (Path) to the optical node device 12. Moreover, since the optical node device 11 does not implement the 3R relay on the upstream optical path, the optical path setting unit 22 loads the intact UETR=1 and UITR=12 delivered from the optical node device 10 into the optical path setting request.

The optical path setting unit 22 of the optical node device 12 which receives the optical path setting request (Path) from the optical node device 11 queries the 3R relay implementation determining unit 21 as to whether or not the optical node device 12 is the optical node device for implementing the 3R relay. The 3R relay implementation determining unit 21 of the optical node device 12 refers to the 3R section information shown in FIG. 33 and stored in the 3R section information storing unit 20 and determines that the optical node device 12 is neither the 3R source node nor the 3R destination node on the downstream optical path and it is not required to implement the 3R relay.

Furthermore, the 3R relay implementation determining unit 21 refers to the 3R section information stored in the 3R section information storing unit 20 and finds out due to the delivery of the UETR=1 and UITR=12 from the optical node device 11 that the optical node device 12 is the 3R source node on the upstream optical path using the optical node device 1 as the 3R destination node, so that the 3R relay implementation determining unit 21 determines to implement the 3R relay on the upstream optical path.

The optical path setting unit 22 of the optical node device 12 receives the determination of the 3R relay implementation determining unit 21 and ensures the resources for optical path setting and 3R relay. Then, as shown in FIG. 36, since the optical node device 12 does not implement the 3R relay on the downstream optical path, when sending the optical path setting request (Path) to the optical node device 13, the optical path setting unit 22 loads the intact DITR=1 and DETR=13 from the optical node device 11 into the optical path setting request.

Moreover, the optical node device 12 is the 3R source node on the upstream optical path and is the 3R destination node if using the optical node device 14 as the 3R source node of the upstream optical path. Therefore, the UETR=12 and UITR=14 are loaded into the optical path setting request.

The optical path setting unit 22 of the optical node device 13 which receives the optical path setting request (Path) from the optical node device 12 queries the 3R relay implementation determining unit 21 as to whether or not the optical node device 13 is the optical node device for implementing the 3R relay. The 3R relay implementation determining unit 21 of the optical node device 13 refers to the 3R section information shown in FIG. 34 and stored in the 3R section information storing unit 20, and finds out due to the delivery of the DITR=11 and DETR=13 from the optical node device 12 that the optical node device 13 is the 3R destination node on the downstream optical path.

Here, a determination is made based on the determination policy of "in response to a message included in the optical path setting request showing that the optical node device itself is the 3R destination node on the downstream optical path, it refers to the 3R section information storing unit 20 when the optical node device itself is not the destination node, and it is determined when the optical node device itself is not the 3R source node on the downstream optical path, that the optical node device itself is the optical node device for implementing the 3R relay using the optical node device itself as the 3R source node and the next-hop optical node device as the 3R destination node on the downstream optical path", and it is determined that the optical node device 13 implements the 3R relay. Moreover, in this case, the optical path setting unit 22 generates DETR=14 as a message to transmit to the next-hop optical node device 14, that this optical node device 14 is the 3R destination node of the optical node device 13. Moreover, the optical path setting unit 22 determines that on the upstream optical path, the optical node device 13 is neither the 3R source node nor the 3R destination node and does not implement the 3R relay.

The optical path setting unit 22 of the optical node device 13 receives the determination of the 3R relay implementation determining unit 21 and ensures the resources for optical path setting and 3R relay. Then, as shown in FIG. 36, when sending the optical path setting request (Path) to the optical node device 14, the optical path setting unit 22 loads a message of DITR=13 and DETR=14 showing that the optical node device 13 is the 3R source node on the downstream optical path and the 3R destination node of this 3R section is the optical node device 14, into the optical path setting request. Moreover, since the optical node device 13 does not implement the 3R relay on the upstream optical path, the optical path setting unit 22 loads the intact UETR=12 and UITR=14 from the optical node device 12 into the optical path setting request.

The optical path setting unit 22 of the optical node device 14 which receives the optical path setting request (Path) from the optical node device 13 queries the 3R relay implementation determining unit 21 as to whether or not the optical node device 14 is the optical node device for implementing the 3R relay. The 3R relay implementation determining unit 21 of the optical node device 14 refers to the 3R section information shown in FIG. 35 and stored in the 3R section information storing unit 20 and determines that it is not required to implement the 3R relay on the downstream optical path since the optical node device 14 is the destination node, but due to the delivery of the UETR=12 and DITR=14 from the optical node device 13, it is required to implement the 3R relay on the upstream optical path using the optical node device 14 as the 3R source node and the optical node device 12 as the 3R destination node.

The optical path setting unit 22 of the optical node device 14 receives the determination of the 3R relay implementation determining unit 21 and ensures the resources for optical path setting and 3R relay. Then, as shown in FIG. 36, the optical path setting unit 22 sends the optical path setting completion notification (Resv) to the optical node device 13.

This optical path setting completion notification (Resv) is transmitted through the optical node devices 13->12->11->10->1 so that the optical path setting is completed. In this way, the respective optical node devices 1, 10, 11, 12, 13, and 14 can determine autonomously whether or not they themselves implement the 3R relay in the process of performing the signaling procedure of the optical path setting.

Seventh Embodiment

Figure 37:
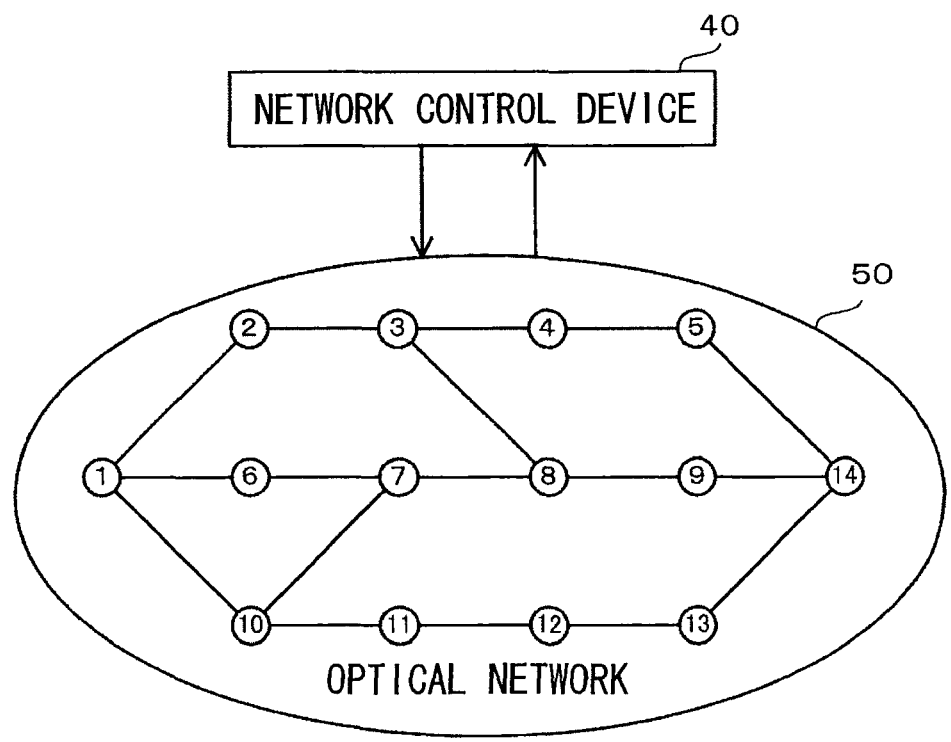
FIG. 37 is a conceptual diagram showing the relation of a network control device and optical node devices in seventh and eighth embodiments.
Figure 38:
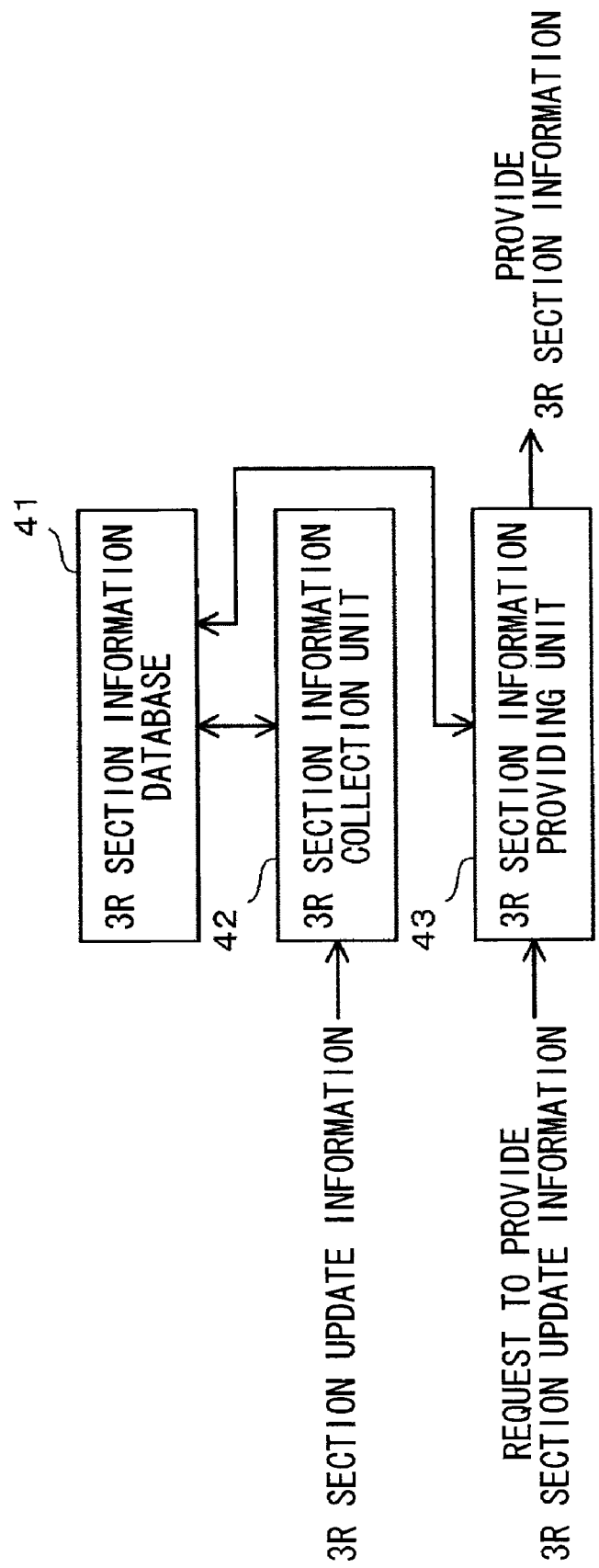
FIG. 38 is a block diagram of the network control device according to the seventh and eighth embodiments.
Figure 39:
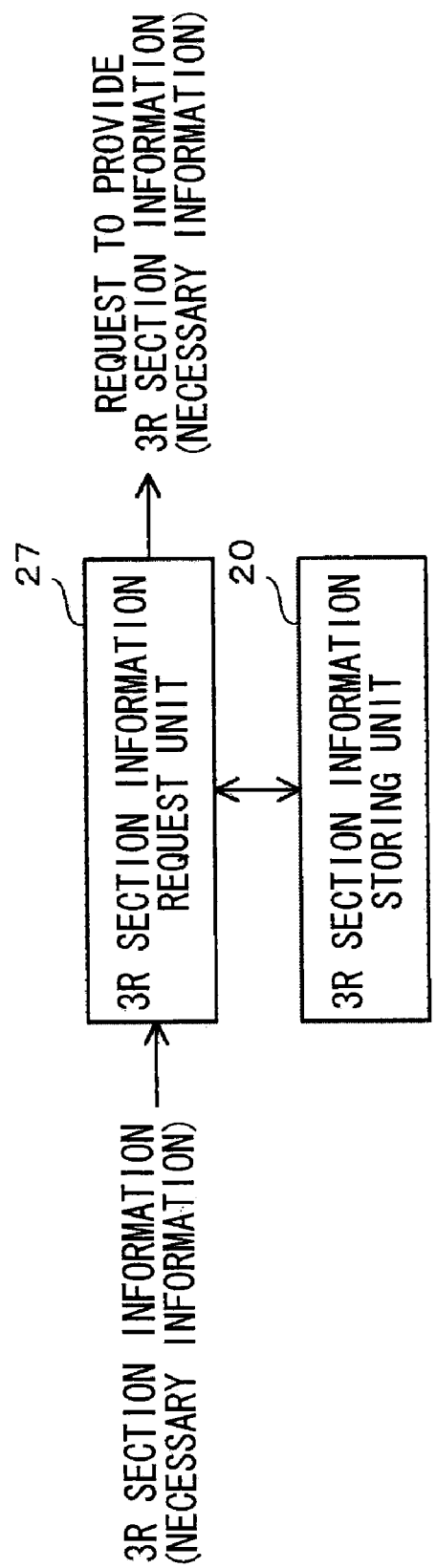
FIG. 39 is a schematic block diagram of the optical node device according to the seventh embodiment.
Figure 40:
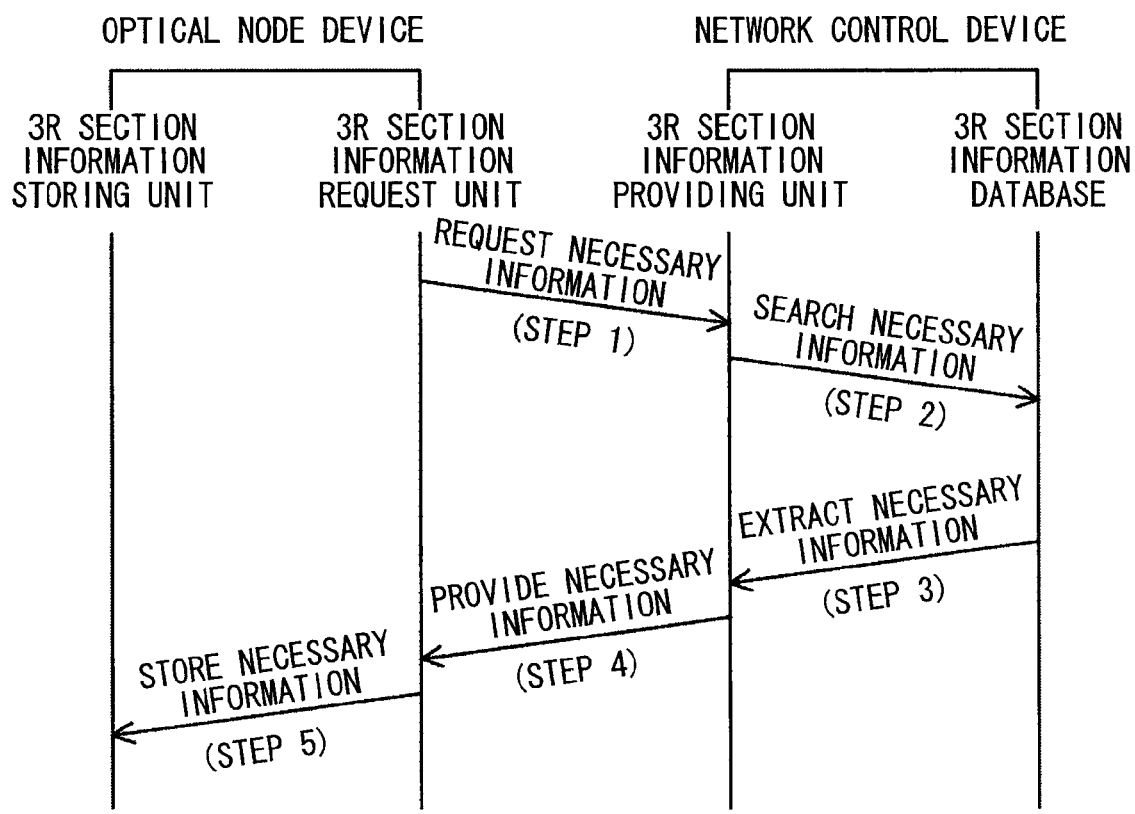
FIG. 40 is a sequence diagram showing the operation of the seventh embodiment.

A network control device and optical node devices according to a seventh embodiment are described with reference to FIG. 37 to FIG. 40. FIG. 37 is a conceptual diagram showing the relationship of the network control device and the optical node devices according to the seventh embodiment. FIG. 38 is a block diagram of the network control device according to the seventh embodiment. FIG. 39 is a schematic block diagram of the optical node device according to the seventh embodiment. FIG. 40 is a sequence diagram showing the operation of the seventh embodiment.

As shown in FIG. 37, the network control device 40 according to the seventh embodiment has a function for mutually communicating with any respective optical node devices 1 to 14, and integrally manages an optical network 50. Hereunder is a description of the managing function concerned with the 3R section information, among the managing functions of the network control device 40.

That is, as shown in FIG. 38, the network control device 40 according to the seventh embodiment comprises: a 3R section information database 41 which stores the 3R section information corresponding to the topology information of the optical network 50; and a 3R section information providing unit 43 which provides the optical node device with the 3R section information stored in this 3R section information database 41 according to a request from the optical node device.

Moreover, the 3R section information stored in the 3R section information database 41 is the 3R section information collected by a 3R section information collection unit 42. As the 3R section information of the optical network 50 is updated, the 3R section information collection unit 42 updates the 3R section information stored in the 3R section information database 41.

As shown in FIG. 39, the optical node device according to the seventh embodiment comprises a 3R section information request unit 27 which requests the network control device 40 that manages the optical network 50 to which the optical node device itself belongs, to provide the 3R section information corresponding to the topology information of this optical network 50 and obtains this information.

Next is a description of the operation of the seventh embodiment with reference to FIG. 40. The 3R section information request unit 27 of the optical node device requests the 3R section information required by the optical node device itself from the 3R section information providing unit 43 of the network control device 40 (Step 1). Here, the 3R section information required by the optical node device itself variously means: the 3R section information of the whole optical network 50; the 3R section information on the optical path passing through the optical node device itself; the 3R section information on the optical path where the optical node device itself becomes the source node; the 3R section information on the 3R section where the optical node device itself becomes the 3R source node; or the 3R section information on the 3R section where the optical node device itself becomes the 3R source node or the 3R destination node. The 3R section information request unit 27 recognizes the 3R section information required by the optical node device itself and requests it from the 3R section information providing unit 43 of the network control device 40. The 3R section information providing unit 43 of the network control device 40 searches for the necessary information requested (Step 2).

The 3R section information providing unit 43 extracts the necessary information of the 3R section information from the 3R section information database 41 (Step 3), and transfers it to the 3R section information request unit 27 of the optical node device (Step 4). The 3R section information request unit 27 examines the 3R section information transferred from the network control device 40 and stores it into the 3R section information storing unit 20 if it is definitely the necessary information requested (Step 5).

In the process of the seventh embodiment, the processing load required for searching and extracting the necessary information by the 3R section information providing unit 43 of the network control device 40, is the highest.

Eighth Embodiment

Figure 41:
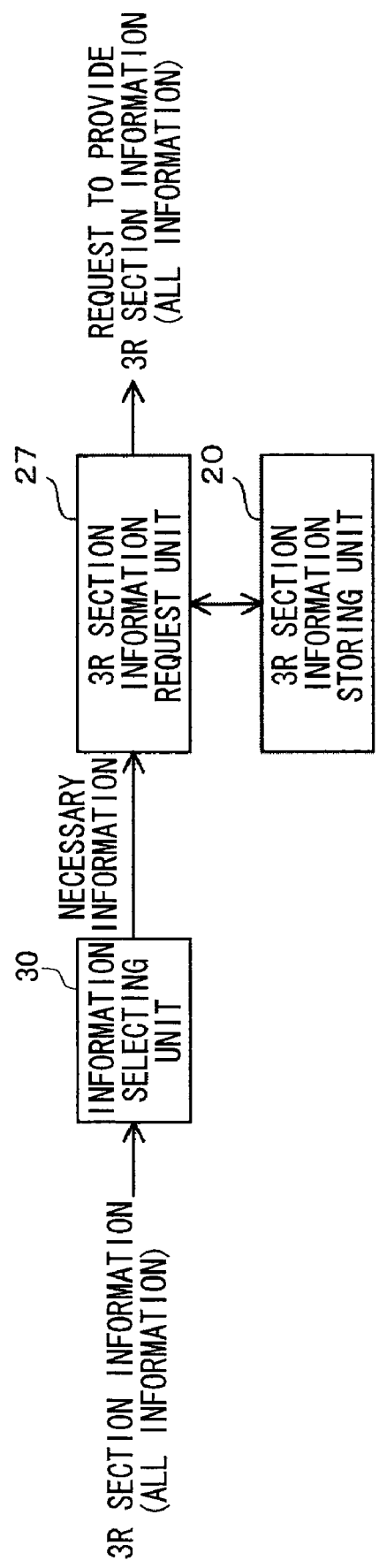
FIG. 41 is a schematic block diagram of an optical node device according to the eighth embodiment.
Figure 42:
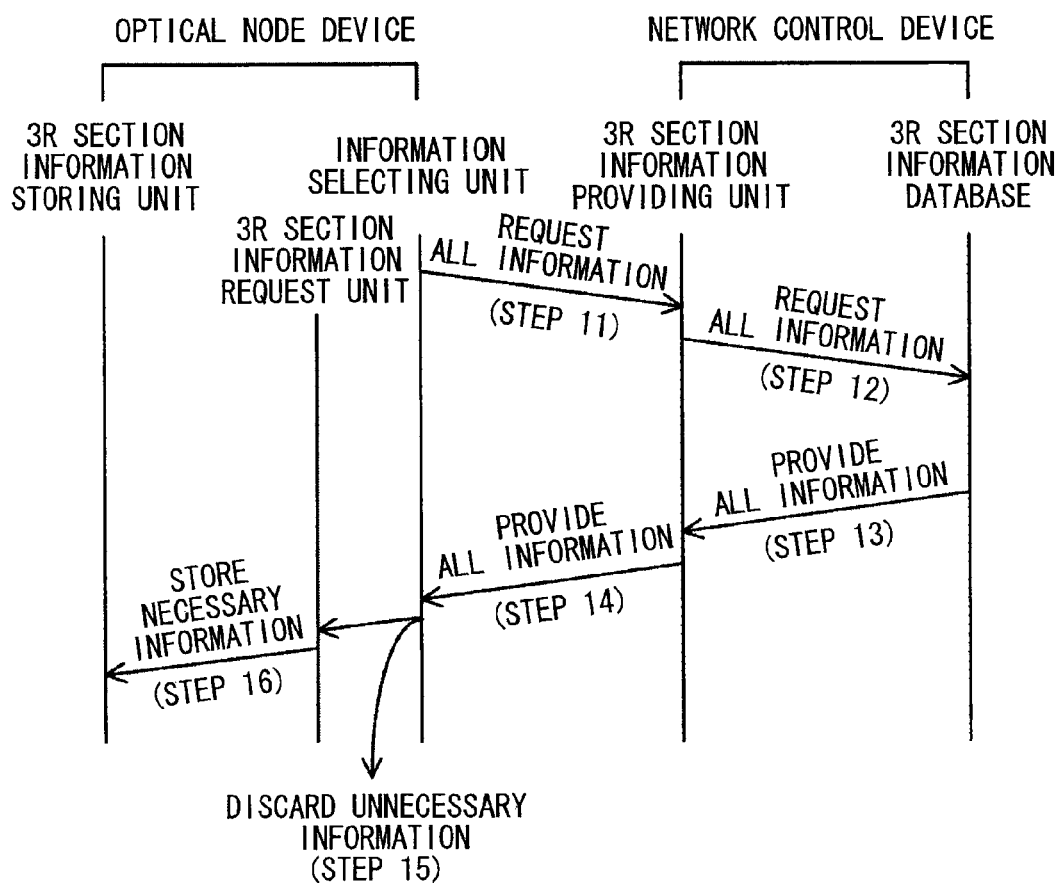
FIG. 42 is a sequence diagram showing the operation of the eighth embodiment.

A network control device and optical node devices according to an eighth embodiment are described with reference to FIG. 37, FIG. 38, FIG. 41, and FIG. 42. FIG. 37 is a conceptual diagram showing the relationship of the network control device and the optical node devices according to the eighth embodiment used in common with the seventh embodiment. FIG. 38 is a block diagram of the network control device according to the eighth embodiment used in common with the seventh embodiment. FIG. 41 is a schematic block diagram of the optical node device according to the eighth embodiment. FIG. 42 is a sequence diagram showing the operation of the eighth embodiment.

As shown in FIG. 37, the network control device 40 according to the eighth embodiment has a function for mutually communicating with any respective optical node devices 1 to 14, and integrally manages an optical network 50. Hereunder is a description of the managing function concerned with the 3R section information, among the managing functions of the network control device 40.

That is, as shown in FIG. 38, the network control device 40 according to the eighth embodiment comprises: a 3R section information database 41 which stores the 3R section information corresponding to the topology information of the optical network 50; and a 3R section information providing unit 43 which provides the optical node device with the 3R section information stored in this 3R section information database 41 according to a request from the optical node device.

Moreover, the 3R section information stored in the 3R section information database 41 is the 3R section information collected by a 3R section information collection unit 42. As the 3R section information of the optical network 50 is updated, the 3R section information collection unit 42 updates the 3R section information stored in the 3R section information database 41.

As shown in FIG. 41, the optical node device according to the eighth embodiment comprises: a 3R section information request unit 27 which requests the network control device 40 that manages the optical network 50 to which the optical node device itself belongs, to provide the 3R section information corresponding to the topology information of this optical network 50 and obtains this information; and an information selecting unit 30 for selecting at least a part of the information related to the optical node device itself, among the obtained 3R section information and storing this information.

Next is a description of the operation of the eighth embodiment with reference to FIG. 42. The 3R section information request unit 27 of the optical node device requests the 3R section information from the 3R section information providing unit 43 of the network control device 40 (Step 11). At this time, in the eighth embodiment, the necessary information of the optical node device itself is not specified.

The 3R section information providing unit 43 of the network control device 40 transfers the intact request to the 3R section information database 41 (Step 12). The 3R section information providing unit 43 extracts the 3R section information from the 3R section information database 41 (Step 13), and transfers it to the information selecting unit 30 of the optical node device (Step 14). The information selecting unit 30 selects the information required by the optical node device itself among the 3R section information transferred from the network control device 40, and discards the unnecessary information (Step 15). The necessary information generated in this way is stored in the 3R section information storing unit 20 (Step 16).

Compared to the seventh embodiment, the information selecting unit 30 is added to the block construction of the optical node device in the eighth embodiment. However, due to the 3R section information request unit 27 of the optical node device, and the 3R section information providing unit 43 of the network control device 40, it is not required to select the necessary information, and the processing load can be reduced compared to the seventh embodiment.

Ninth Embodiment

Figure 43:
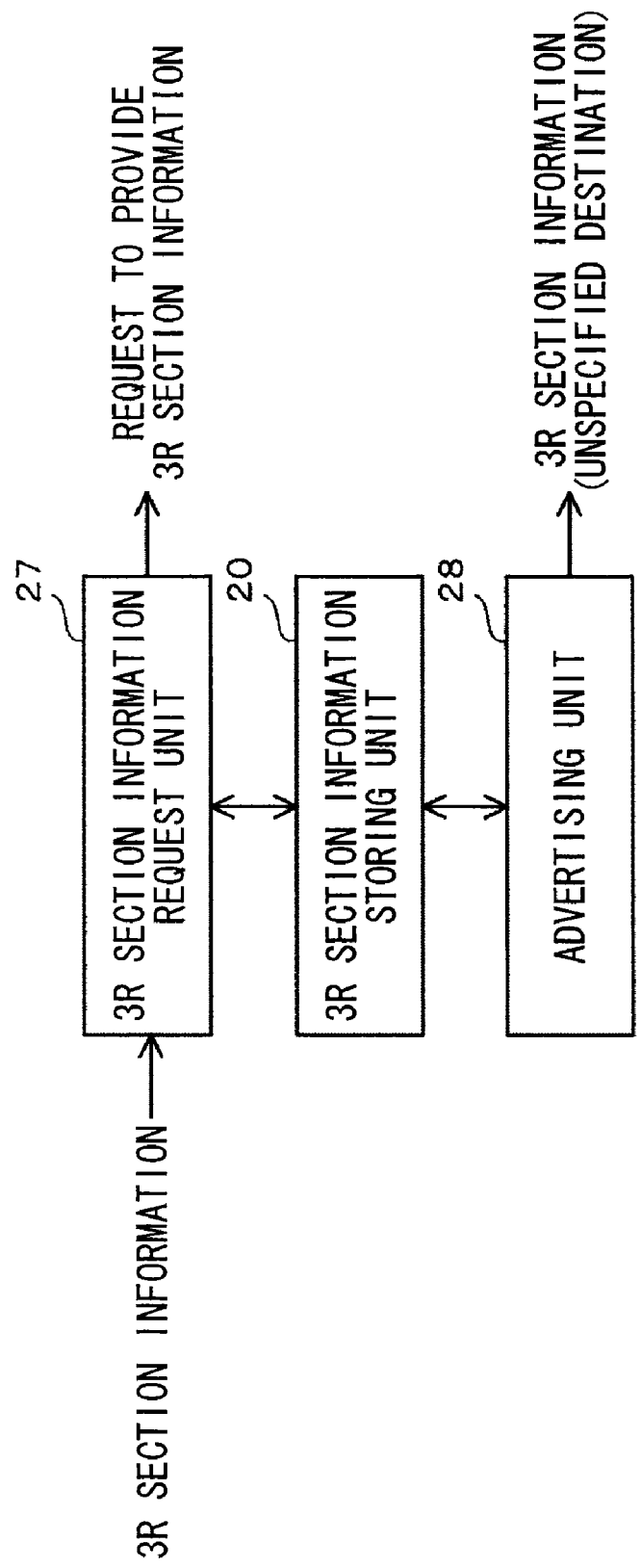
FIG. 43 is a schematic block diagram of an optical node device according to a ninth embodiment.

An optical node device according to a ninth embodiment is described with reference to FIG. 43. FIG. 43 is a schematic block diagram of the optical node device according to the ninth embodiment. As shown in FIG. 43, the optical node device according to the ninth embodiment comprises: a 3R section information request unit 27 which requests and obtains the 3R section information corresponding to the topology information of the optical network 50 to which the optical node device itself belongs, from the network control device 40 that manages the optical network 50 to which the optical node device itself belongs; a 3R section information storing unit 20 which stores the 3R section information obtained by this 3R section information request unit 27; and an advertising unit 28 which advertises the 3R section information stored in this 3R section information storing unit 20 to another optical node device.

For example, in the case where all the optical node devices store the common 3R section information, any of the optical node devices 1 to 14 obtains the 3R section information from the network control device 40 and advertises it to the other optical node devices using the advertising unit 28, so that the processing load of the network control device 40 can be decreased. Alternatively, two optical node devices or more obtain the 3R section information respectively from the network control device 40 and advertise this to the other optical node devices, so that even if the 3R section information obtained by any of the optical node devices is in short, the shortage can be mutually compensated and highly reliable 3R section information can be stored.

Tenth Embodiment

Figure 44:
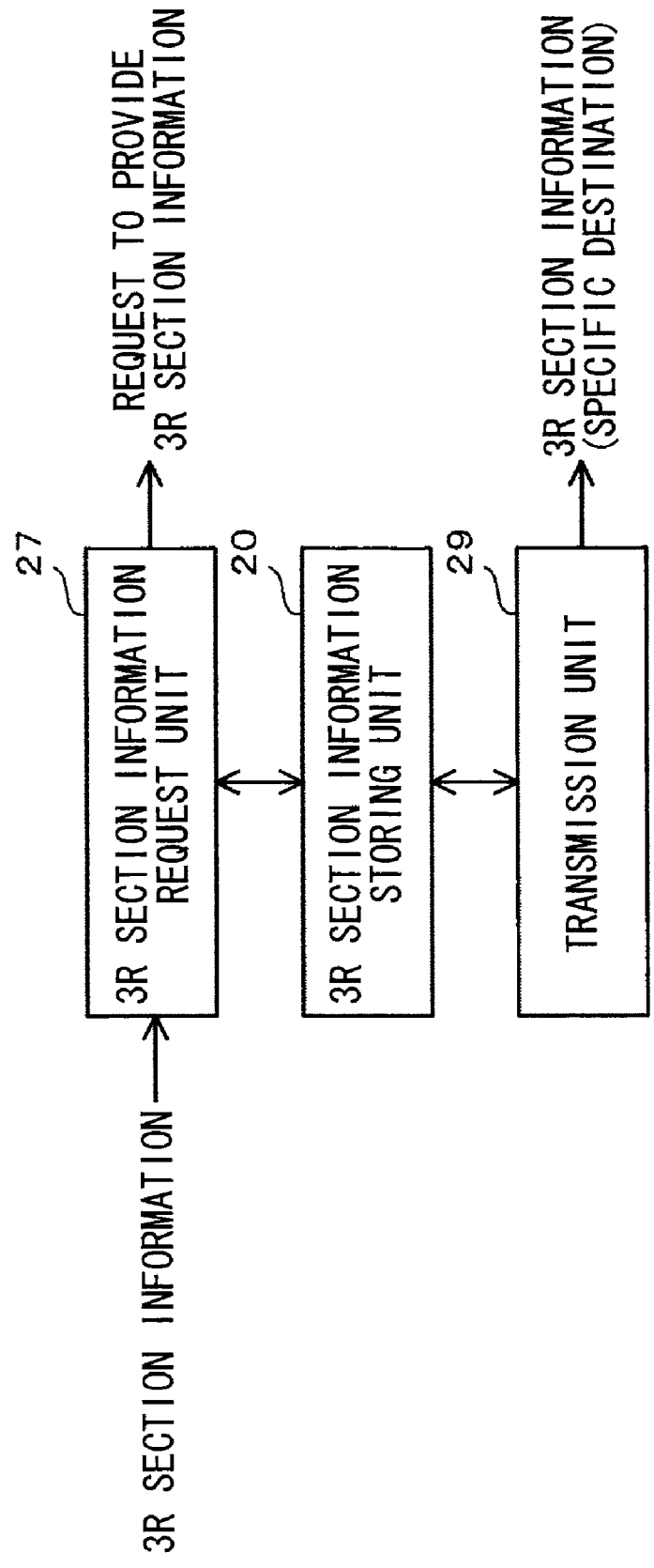
FIG. 44 is a schematic block diagram of an optical node device according to a tenth embodiment.

An optical node device according to a tenth embodiment is described with reference to FIG. 44. FIG. 44 is a schematic block diagram of the optical node device according to the tenth embodiment. As shown in FIG. 44, the optical node device according to the tenth embodiment comprises: a 3R section information request unit 27 which requests and obtains the 3R section information corresponding to the topology information of the optical network 50 to which the optical node device itself belongs, from the network control device 40 that manages the optical network 50 to which the optical node device itself belongs when the optical node device itself is the source node; a 3R section information storing unit 20 which stores the 3R section information obtained by this 3R section information request unit 27; and a transmission unit 29 which transmits the 3R section information stored in this 3R section information storing unit 20 to another optical node device included in the optical path up to the destination node when the optical node device itself is the source node.

For example, it is used in the case where the optical node device being the source node of the optical path, transmits the 3R section information to another optical node device included in the route of the optical path, from the optical node device itself to the optical node device being the destination node. Compared to the ninth embodiment where the 3R section information is advertised to an unspecified destination, the 3R section information is transmitted to a specific destination in the tenth embodiment.

Eleventh Embodiment

Figure 45:
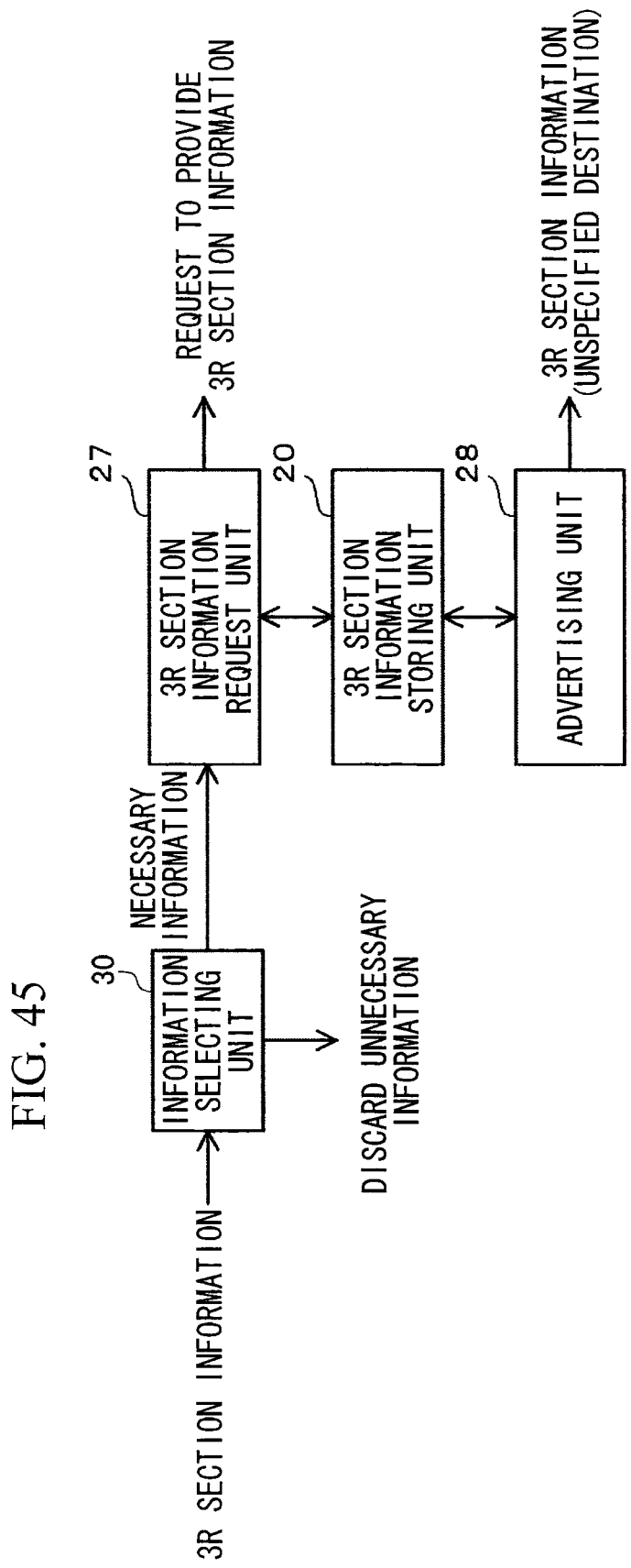
FIG. 45 is a schematic block diagram of an optical node device according to an eleventh embodiment.

An optical node device according to an eleventh embodiment is described with reference to FIG. 45. FIG. 45 is a schematic block diagram of the optical node device according to the eleventh embodiment. As shown in FIG. 45, the optical node device according to the eleventh embodiment comprises: a 3R section information request unit 27 which requests and obtains the 3R section information corresponding to the topology information of the optical network 50 to which the optical node device itself belongs, from the network control device 40 that manages the optical network 50 to which the optical node device itself belongs when the optical node device itself is the source node; a 3R section information storing unit 20 which stores the 3R section information obtained by this 3R section information request unit 27; an advertising unit 28 which advertises the 3R section information stored in this 3R section information storing unit 20 to another optical node device; and an information selecting unit 30 which determines whether or not the advertisement by the advertising unit 28 is related to the optical path passing through the optical node device itself, and this information selecting unit 30 discard the advertisement if the advertisement is not related to the optical path passing through the optical node device itself, and stores the contents of the advertisement into the 3R section information storing unit 20 if the advertisement is related to the optical path passing through the optical node device itself.

In the tenth embodiment, the transmission unit 29 is required to transmit the 3R section information to the specific destination. However, in the eleventh embodiment, it is sufficient that the advertising unit 30 advertises the 3R section information to an unspecified destination, so that the processing load for destination control can be omitted. Furthermore, the 3R section information not related to the optical node device itself can be discarded using the information selecting unit 30. Therefore the information storage resources of the 3R section information storing unit 20 can be effectively used.

Twelfth Embodiment

Figure 46:
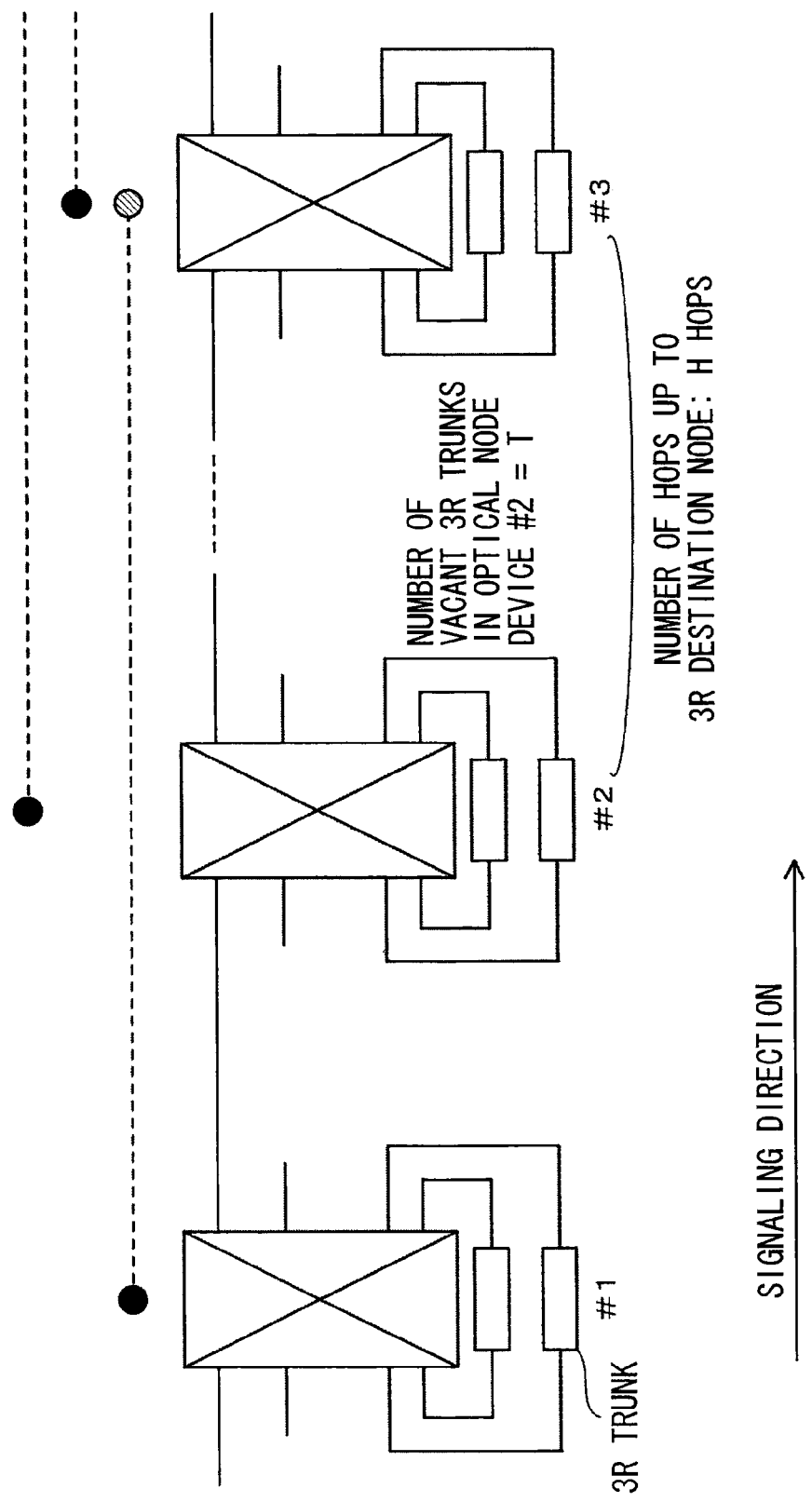
FIG. 46 is an explanatory diagram of a 3R relay implementation node determination method according to the twelfth embodiment.

An optical node device according to a twelfth embodiment is described with reference to FIG. 4 and FIG. 46. FIG. 4 is a schematic block diagram of the optical node device according to the twelfth embodiment used in common with the first embodiment. FIG. 46 is an explanatory diagram of a 3R relay implementation node determination method of the twelfth embodiment. As shown in FIG. 4, the optical node device according to the twelfth embodiment comprises: a 3R section information storing unit 20 which stores the information on the number of hops between the optical node device itself and the 3R destination node in the 3R section to which the optical node device itself belongs; and a 3R relay implementation determining unit 21 which determines autonomously whether or not the optical node device itself implements the 3R relay with respect to the optical signal transmitted from the 3R source node in the 3R section to which the optical node device itself belongs. This 3R relay implementation determining unit 21 determines to implement the 3R relay if T>TH_T and H<TH_H assuming that the number of 3R trunks provided by the optical node device itself is T, the threshold of the number of vacant 3R trunks is TH_T, and the threshold of the number of hops up to the 3R destination node is TH_H.

As shown in FIG. 46, if the optical node device 1 is the 3R source node, the optical node device 3 is the 3R destination node, and the optical node device 2 is between the optical node devices 1 and 3, then, the optical node device 2 is the optical node device where "the one optical node device is the 3R source node on any one of a plurality of 3R sections including the overlapped part on the optical path passing through this one optical node device, and it does not correspond to the 3R source node or 3R destination node on any other 3R sections".

In such a case, in the embodiments prior to the twelfth embodiment, the 3R relay implementation determining unit 21 was described as a unit which uses the 3R implementation simulating unit 23 and the comparison unit 24 "to refer to the 3R section information on the optical path from the one optical node device to the destination node, to compare the number of 3R implementations in the case where the one optical node device functions as the 3R source node, and the case where the one optical node does not function as the 3R source node, and to determine based on this comparison result that the one optical node device is the optical node device for implementing 3R relay when the number of 3R implementations in the case where the one optical node device functions as the 3R source node, is lower than that in the case where the optical node device does not function as the 3R source node."

On the other hand, in the twelfth embodiment, whether the 3R relay is implemented or not is determined by a simpler method than the simulation. That is, it determines to implement the 3R relay if T>TH_T and H<TH_H.

That is, in the optical node device on the route of a certain optical path, in the case where this optical node device is the 3R source node on any 3R section and has a 3R trunk, if the number of the 3R trunks of this optical node device has enough room, and furthermore the number of hops up to the 3R destination node of this optical path, that is the 3R source node of the next 3R section, is small, it is determined that this optical node device had better implement the 3R relay. Accordingly, the 3R relay load on the 3R source node of the next 3R section can be reduced.

In this way, if the previous optical node device of the 3R destination node implements the 3R relay instead of the 3R destination node, a message showing to that effect is transmitted to the 3R destination node. Accordingly, the original 3R destination node recognizes that the previous-hop optical node device with respect to the optical node device itself implemented the 3R relay instead of the optical node device itself, does not implement the 3R relay with respect to the incoming optical signal on which is originally supposed to implement the 3R relay, and it switches as is. In this case, the application is modified from the 3R section which is initially planned to apply, to the 3R section which uses the optical node device that actually implemented the 3R relay as the 3R source node.

Next is a description of the setting policy of the threshold of the number of vacant 3R trunks TH_T and the threshold of the number of hops up to the 3R destination node TH_H. As the number of 3R trunks of the 3R source node of the next 3R section gets lower compared to the number of 3R trunks of the optical node device itself, the necessity for the optical node device itself to aid the 3R relay of the 3R source node of the next 3R section is increased. Therefore, TH_T is desirably set small so that the optical node device itself can implement the 3R relay to aid the 3R relay of the 3R source node of the next 3R section if there is even a little vacancy generated in the 3R trunk of the optical node device itself. However, in the case where the number of hops up to the 3R source node of the next 3R section is large, even if the number of the 3R trunks of the optical node device itself has enough room, if the optical node device itself implements the 3R relay instead of the 3R source node of the next 3R section, there is a possibility that the number of 3R implementations up to the destination node is increased. Therefore, TH_H is desirably small.

In this manner, TH_T and TH_H are appropriately set in consideration of the number of hops of the whole 3R section and the number of 3R trunks of the 3R destination node, that is, the 3R source node of the next 3R section.

Thirteenth Embodiment

Figure 47:
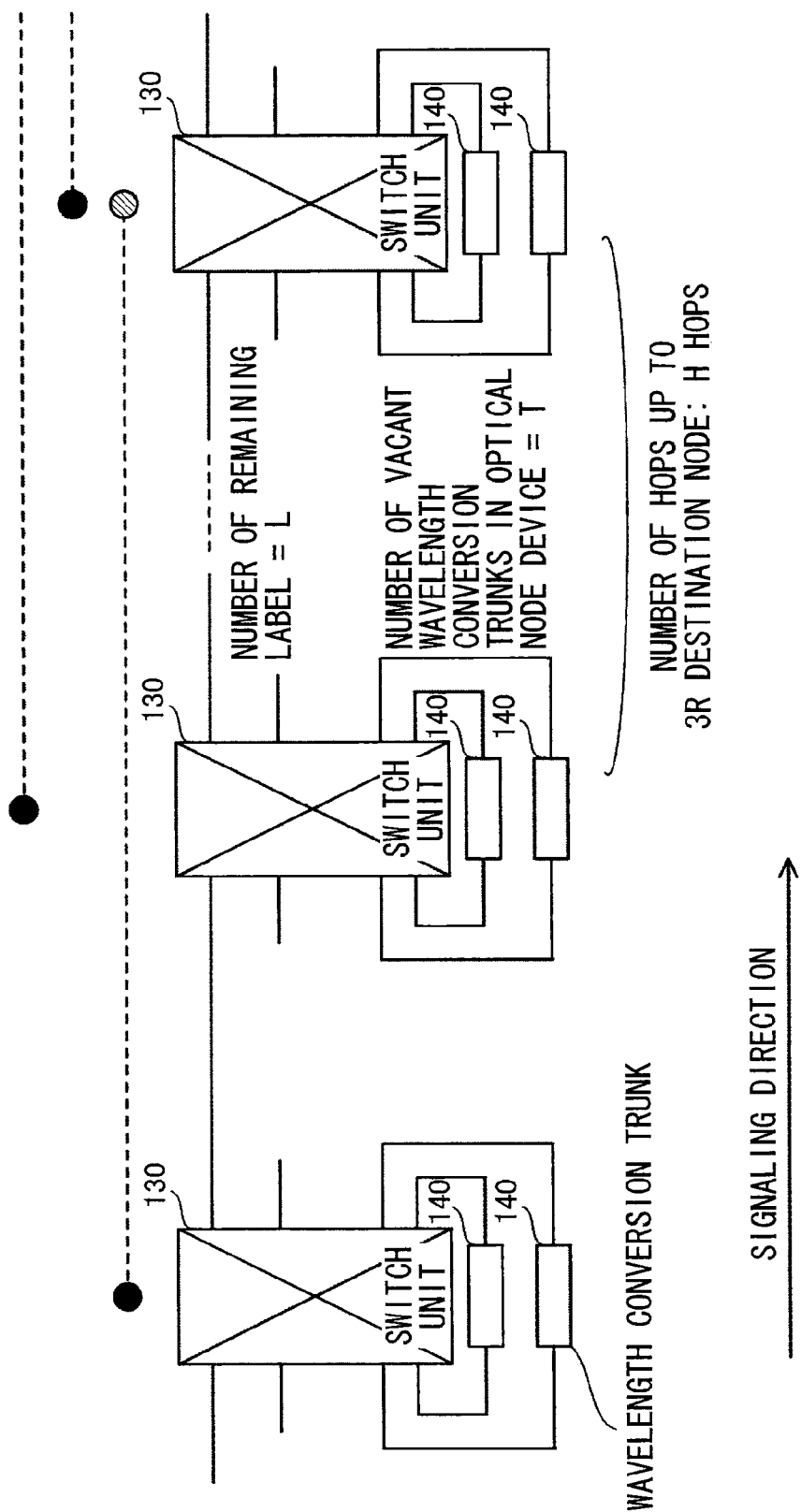
FIG. 47 is an explanatory diagram of a 3R relay implementation node determination method according to thirteenth to sixteenth embodiments.
Figure 48:
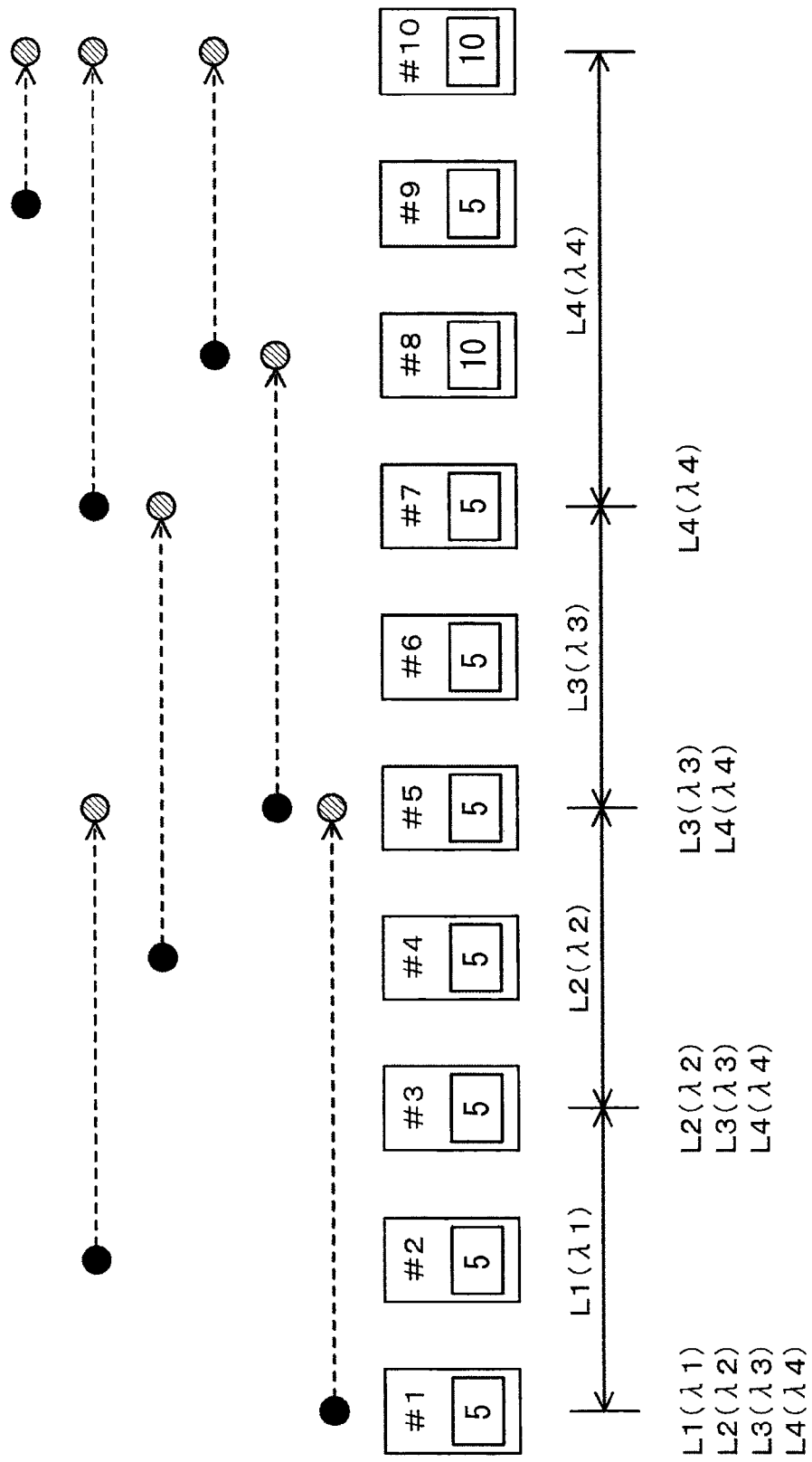
FIG. 48 is an explanatory diagram of the operation of optical node devices according to the thirteenth and fourteenth embodiments.

An optical node device according to a thirteenth embodiment is described with reference to FIG. 4 that were described in the first embodiment, and FIGS. 47 and 48. The schematic block diagram of the optical node device according to the present embodiment is similar to that of the first embodiment as shown in FIG. 4. However, the functions of the respective units constituting the optical node device differ from that of the first embodiment. FIG. 47 is an explanatory diagram of a 3R relay implementation node determination method of the present embodiment. FIG. 48 is an explanatory diagram of the operation of optical node devices in the thirteenth and fourteenth embodiments.

The optical path setting request includes labels to specify the wavelengths used sequentially from the source node when performing switching from the source node to the destination node, and one label is deleted as one wavelength is used.

Switching is performed based on the policy that switching is performed with as small a number of wavelengths as possible on the optical path from the source node to the destination node. That is, the best is to link from the source node to the destination node with one wavelength. The wavelength conversion is performed only in the case where there is not a vacant wavelength partway, and another wavelength is used. The wavelength conversion trunk performs the wavelength conversion for such switching. However, the optical signal is once converted into the electric signal by the wavelength conversion, and then converted into the optical signal once again, so that the 3R relay is implemented at the same time. Moreover, if it is required to implement the 3R relay in a part not requiring wavelength conversion, the wavelength is converted into the same wavelength for both input and output by the wavelength conversion trunk.

Moreover, a method for determining the wavelength used from the source node to the destination node, is based on the topology information of the optical network, and involves referring to the wavelength usage condition of the optical network changing at each time, and making a wavelength conversion plan from the source node to the destination node, and loading a label showing the wavelength to be used into the optical path setting request transmitted from the source node.

A transit optical node device refers to the label, determines whether or not the optical node device itself performs the wavelength conversion, and ensures the wavelength conversion resources of the optical node device itself if it is required to perform the wavelength conversion. If the optical node device itself performs the wavelength conversion, the label corresponding to the wavelength to be converted which is loaded in the optical path setting request is deleted and an optical path setting request is sent to the next-hop adjacent optical node device.

In the present embodiment, it is described that the necessary information is stored in the 3R section information storing unit 20. However, the configuration may be such that a network control device (outside of the drawing) stores the necessary information so that the necessary information can be obtained from the network control device when the source node performs the optical path setting request so as to make the wavelength conversion plan.

That is, as shown in FIG. 4, the optical node device according to the present embodiment comprises: a 3R section information storing unit 20 which stores the information on the number of hops H between the optical node device itself and the 3R destination node in the 3R section to which the optical node device itself belongs; and a 3R relay implementation determining unit 21 which determines autonomously whether or not the optical node device itself implements the 3R relay with respect to the optical signal transmitted from the 3R source node in the 3R section to which the optical node device itself belongs. This 3R relay implementation determining unit 21 determines to implement the 3R relay if T>TH_T and (H<TH_H and L<TH_L) assuming that the number of wavelength conversion trunks provided by the optical node device itself is T, the threshold of the number of vacant 3R trunks is TH_T, the threshold of the number of hops up to the 3R destination node is TH_H, the number of remaining labels is L, and the threshold of the number of remaining labels is TH_L. If the optical node device itself belongs to the 3R section using the destination node as the 3R destination node, the 3R relay implementation determining unit 21 determines that the optical node device itself does not implement the 3R relay.

Next is a description of the operation of the optical node device according to the thirteenth embodiment with reference to FIG. 47 and FIG. 48. As shown in FIG. 47, each optical node device comprises: a switch unit 130 for switching the optical signal; and a plurality of wavelength conversion trunks 140. In the example of FIG. 48, an optical path is set from the optical node device #1 being the source node and the optical node device #10 being the destination node.

The 3R sections set on the optical path include: a section using optical node device #1 as the 3R source node and optical node device #5 as the 3R destination node; a section using optical node device #2 as the 3R source node and optical node device #5 as the 3R destination node; a section using optical node device #4 as the 3R source node and optical node device #7 as the 3R destination node; a section using optical node device #5 as the 3R source node and optical node device #8 as the 3R destination node; a 3R section using optical node device #7 as the 3R source node and optical node device #10 as the 3R destination node; a 3R section using optical node device #8 as the 3R source node and optical node device #10 as the 3R destination node; and a 3R section using optical node device #9 as the 3R source node and optical node device #10 as the 3R destination node.

Moreover, the number of wavelength conversion trunks of the respective optical node devices is 5 for each optical node device #1, #2, #3, #4, #5, #6, #7, and #9, and 10 for each optical node device #8 and #10.

Here, if the optical path using the optical node device #1 as the source node and the optical node device #10 as the destination node is set, the best way in order to keep the number of 3R implementations as small as possible is to relay over the 3R section using the optical node device #1 as the 3R source node and the optical node device #5 as the 3R destination node, the 3R section using the optical node device #5 as the 3R source node and the optical node device #8 as the 3R destination node, and the 3R section using the optical node device #8 as the 3R source node and the optical node device #10 as the 3R destination node.

The optical path setting request is sent from the optical node device #1 to the optical node device #2. A plurality of labels (label set) which show the wavelength conversion required midway on the route are loaded into this optical path setting request. In the example of FIG. 48, the wavelength λ1 and label L1 are used between the optical node device #1 and the optical node device #3. The wavelength λ2 and label L2 are used between the optical node device #3 and the optical node device #5. The wavelength λ3 and label L3 are used between the optical node device #5 and the optical node device #7. The wavelength λ4 and label L4 are used between the optical node device #7 and the optical node device #10.

The optical node device #1 is the source node and the 3R source node, so that it determines to implement the 3R relay from the beginning.

The optical node device #2 which receives the optical path setting request from the optical node device #1, recognizes that the optical node device #2 itself is capable of setting the optical path with the wavelength λ1, determines to set the optical path with the label L1 (λ1), and determines whether or not it implements the 3R relay from T>TH_T and (H<TH_H and L<TH_L). Here, it is assumed that TH_T=4, TH_H=2, and TH_L=1.

The number of wavelength conversion trunks of the optical node device 2 is 5, so that T>TH_T is satisfied. Next, there are three hops from the optical node device #2 to the optical node device #5 being the 3R destination node, so that H<TH_H is not satisfied. Therefore, the optical node device #2 determines not to implement the 3R relay.

The optical node device #3 which receives the optical path setting request from the optical node device #2, recognizes that the optical node device #3 itself is not capable of setting the optical path with the wavelength λ1, and determines to set the optical path with the label L2 (λ2). Moreover, the optical node device #3 itself is not the 3R source node, so that it determines not to implement the 3R relay from the beginning.

The optical node device #4 which receives the optical path setting request from the optical node device #3, recognizes that the optical node device #4 itself is capable of setting the optical path with the wavelength λ2, determines to set the optical path with the label L2 (λ2), and determines whether or not it implements the 3R relay from T>TH_T and (H<TH_H and L<TH_L).

The number of wavelength conversion trunks of the optical node device #4 is 5, so that T>TH_T is satisfied. Next, there is one hop from the optical node device #4 to the optical node device #5 being the 3R destination node, so that H<TH_H is satisfied. Next, since the label L2 is used for the optical node device #4, the number of remaining labels are two of L3 and L4, so that L<TH_L is not satisfied. Therefore, the optical node device #4 determines not to implement the 3R relay.

The optical node device #5 which receives the optical path setting request from the optical node device #4, recognizes that the optical node device #5 itself is not capable of setting the optical path with the wavelength λ2, and determines to set the optical path with the label L3 (λ3). Moreover, the optical node device #5 recognizes that the optical node device #5 is the 3R source node of the next 3R section since the optical node device #5 is the 3R destination node using the optical node device #1 as the 3R source node, and that no previous-hop optical node device among the optical node devices #2, #3, and #4 implements the 3R relay, so that the optical node device #5 determines to implement the 3R relay from the beginning.

The optical node device #6 which receives the optical path setting request from the optical node device #5, recognizes that the optical node device #6 itself is capable of setting the optical path with the wavelength λ3, and determines to set the optical path with the label L3 (λ3). Moreover, the optical node device #6 itself is not the 3R source node, so that the optical node device #6 determines not to implement the 3R relay from the beginning.

The optical node device #7 which receives the optical path setting request from the optical node device #6, recognizes that the optical node device #7 itself is not capable of setting the optical path with the wavelength λ3, determines to set the optical path with the label L4 (λ4), and determines whether or not it implements the 3R relay from the relationship T>TH_T and (H<TH_H and L<TH_L).

The number of wavelength conversion trunks of the optical node device #7 is 5, so that T>TH_T is satisfied. Next, there is one hop from the optical node device #7 to the optical node device #8 being the 3R destination node, so that H<TH_H is satisfied. Next, since the label L4 is used for the optical node device #7, the number of remaining labels are zero, so that L<TH_L is satisfied. Therefore, the optical node device #7 determines to implement the 3R relay. Moreover, the optical node device #7 transmits a message showing that it implements the 3R relay instead of the optical node device #8 to another optical node device.

The optical node device #8 which receives the optical path setting request from the optical node device #7, recognizes that the optical node device #8 itself is capable of setting the optical path with the wavelength λ4, and determines to set the optical path with the label L4 (λ4). Moreover, the optical node device #8 is the 3R destination node using the optical node device #5 as the 3R source node, and receives the message from the optical node device #7 showing that the optical node device #7 implements the 3R relay instead of the optical node device #8 itself, and determines not to implement the 3R relay although it is supposed to implement the 3R relay originally.

The optical node device #9 which receives the optical path setting request from the optical node device #8, recognizes that the optical node device #9 itself is capable of setting the optical path with the wavelength λ4, and determines to set the optical path with the label L4 (λ4). Moreover, although the optical node device #9 is the 3R source node, since it is determined that the optical node device itself does not implement the 3R relay when the next-hop is the destination node and the optical node device itself belongs to the 3R section using the destination node as the 3R destination node, the optical node device #9 determines not to implement the 3R relay.

The optical node device #10 which receives the optical path setting request from the optical node device #9, recognizes that the optical node device #10 itself is capable of setting the optical path with the wavelength λ4, and determines to set the optical path with the label L4 (λ4). Moreover, the optical node device #10 is the destination node, so that the optical node device #10 determines not to implement the 3R relay.

Therefore, the 3R relay is implemented by the optical node devices #1, #5, and #7. The optical node device #7 implements the 3R relay instead of the optical node device #8.

Fourteenth Embodiment

The operation of optical node devices according to a fourteenth embodiment is described. The schematic block diagram of the optical node device according to the fourteenth embodiment is used in common with the thirteenth embodiment shown in FIG. 4. The explanatory diagram of the operation of the optical node device according to the fourteenth embodiment is used in common with the thirteenth embodiment shown in FIG. 48.

In the example of FIG. 48, an optical path is set between the optical node device #1 being the source node and the optical node device #10 being the destination node. The 3R sections set on the optical path include: a section using optical node device #1 as the 3R source node and optical node device #5 as the 3R destination node; a section using optical node device #2 as the 3R source node and optical node device #5 as the 3R destination node; a section using optical node device #4 as the 3R source node and optical node device #7 as the 3R destination node; a section using optical node device #5 as the 3R source node and optical node device #8 as the 3R destination node; a 3R section using optical node device #7 as the 3R source node and optical node device #10 as the 3R destination node; a 3R section using optical node device #8 as the 3R source node and optical node device #10 as the 3R destination node; and a 3R section using optical node device #9 as the 3R source node and optical node device #10 as the 3R destination node.

Moreover, the number of wavelength conversion trunks of the respective optical node devices is 5 for each optical node device #1, #2, #3, #4, #5, #6, #7, and #9, and 10 for each optical node device #8 and #10.

Here, if the optical path using the optical node device #1 as the source node and the optical node device #10 as the destination node is set, the best way in order to keep the number of 3R implementations as small as possible is to relay over the section using the optical node device #1 as the 3R source node and the optical node device #5 as the 3R destination node, the section using the optical node device #5 as the 3R source node and the optical node device #8 as the 3R destination node, and the section using the optical node device #8 as the 3R source node and the optical node device #10 as the 3R destination node.

The optical path setting request is sent from the optical node device #1 to the optical node device #2. A plurality of labels (label set) which show the wavelength conversion required midway on the route are loaded into this optical path setting request. In the example of FIG. 48, the wavelength λ1 and label L1 are used between the optical node device #1 and the optical node device #3. The wavelength λ2 and label L2 are used between the optical node device #3 and the optical node device #5. The wavelength λ3 and label L3 are used between the optical node device #5 and the optical node device #7. The wavelength λ4 and label L4 are used between the optical node device #7 and the optical node device #10.

The optical node device #1 is the source node and the 3R source node, so that it determines to implement the 3R relay.

The optical node device #2 which receives the optical path setting request from the optical node device #1, recognizes that the optical node device #2 itself is capable of setting the optical path with the wavelength λ1, determines to set the optical path with the label L1 (λ1), and determines whether or not it implements the 3R relay from T>TH_T and (H<TH_H or L<TH_L). Here, it is assumed that TH_T=4, TH_H=2, and TH_L=1.

The number of wavelength conversion trunks of the optical node device #2 is 5, so that T>TH_T is satisfied. Next, there are three hops to the optical node device #5 being the 3R destination node, so that H<TH_H is not satisfied. Next, the number of remaining labels are three of L2, L3, and L4, so that L<TH_L is not satisfied. Therefore, the optical node device #2 determines not to implement the 3R relay.

The optical node device #3 which receives the optical path setting request from the optical node device #2, recognizes that the optical node device #3 itself is not capable of setting the optical path with the wavelength λ1, and determines to set the optical path with the label L2 (λ2). Moreover, the optical node device #3 itself is not the 3R source node, so that the optical node device #3 determines not to implement the 3R relay from the beginning.

The optical node device #4 which receives the optical path setting request from the optical node device #3, recognizes that the optical node device #4 itself is capable of setting the optical path with the wavelength λ2, determines to set the optical path with the label L2 (λ2), and determines whether or not it implements the 3R relay from T>TH_T and (H<TH_H or L<TH_L).

The number of wavelength conversion trunks of the optical node device #4 is 5, so that T>TH_T is satisfied. Next, there is one hop from the optical node device #4 to the optical node device #5 being the 3R destination node, so that H<TH_H is satisfied. Therefore, the optical node device #4 determines to implement the 3R relay. Moreover, the optical node device #4 transmits a message showing that it implements the 3R relay instead of the optical node device #5, to another optical node device.

The optical node device #5 which receives the optical path setting request from the optical node device #4, recognizes that the optical node device #5 itself is capable of setting the optical path with the wavelength λ3, and determines to set the optical path with the label L3 (λ3). Moreover, although the optical node device #5 is the 3R destination node using the optical node device #1 as the 3R source node, since the optical node device #5 receives the message from the optical node device #4 showing that the optical node device #4 implements the 3R relay instead of the optical node device #5 itself, so that the optical node device #5 determines not to implement the 3R relay although it is supposed to implement the 3R relay originally.

The optical node device #6 which receives the optical path setting request from the optical node device #5, recognizes that the optical node device #6 itself is capable of setting the optical path with the wavelength λ3, and determines to set the optical path with the label L3 (λ3). Moreover, the optical node device #6 itself is not the 3R source node, so that it determines not to implement the 3R relay from the beginning.

The optical node device #7 which receives the optical path setting request from the optical node device #6, recognizes that the optical node device #7 itself is not capable of setting the optical path with the wavelength λ3, and determines to set the optical path with the label L4 (λ4). The optical node device #7 also receives the message showing that the optical node device #4 implements the 3R relay instead of the optical node device #5, to find out that the optical node device #7 is the 3R destination node and the 3R source node of the next 3R section if the optical node device #4 is the 3R source node. Therefore the optical node device #7 determines to implement the 3R relay. Moreover, the optical node device #7 transmits a message showing that the optical node device #7 itself implements the 3R relay, to another optical node device.

The optical node device #8 which receives the optical path setting request from the optical node device #7, recognizes that the optical node device #8 itself is capable of setting the optical path with the wavelength λ4, and determines to set the optical path with the label L4 (λ4). Moreover, the optical node device #8 receives the message from the optical node device #7 showing that the optical node device #7 implements the 3R relay, to thereby recognize that the optical node device #8 belongs to the 3R section using the optical node device #7 as the 3R source node and the optical node device #10 as the 3R destination node. Therefore, the optical node device #8 determines not to implement the 3R relay from the beginning.

The optical node device #9 which receives the optical path setting request from the optical node device #8, recognizes that the optical node device #9 itself is capable of setting the optical path with the wavelength λ4, and determines to set the optical path with the label L4 (λ4). Moreover, the optical node device #9 receives the message from the optical node device #7 showing that the optical node device #7 implements the 3R relay, to thereby recognize that the optical node device #9 belongs to the 3R section using the optical node device #7 as the 3R source node and the optical node device #10 as the 3R destination node. Therefore, the optical node device #9 determines not to implement the 3R relay from the beginning.

The optical node device #10 which receives the optical path setting request from the optical node device #9, recognizes that the optical node device #10 itself is capable of setting the optical path with the wavelength λ4, and determines to set the optical path with the label L4 (λ4). Moreover, the optical node device #10 is the destination node, so that it determines not to implement the 3R relay.

Therefore, the 3R relay is implemented by the optical node devices #1, #4, and #7. The optical node device #4 takes on the role of the optical node device #5.

Fifteenth Embodiment

Figure 49:
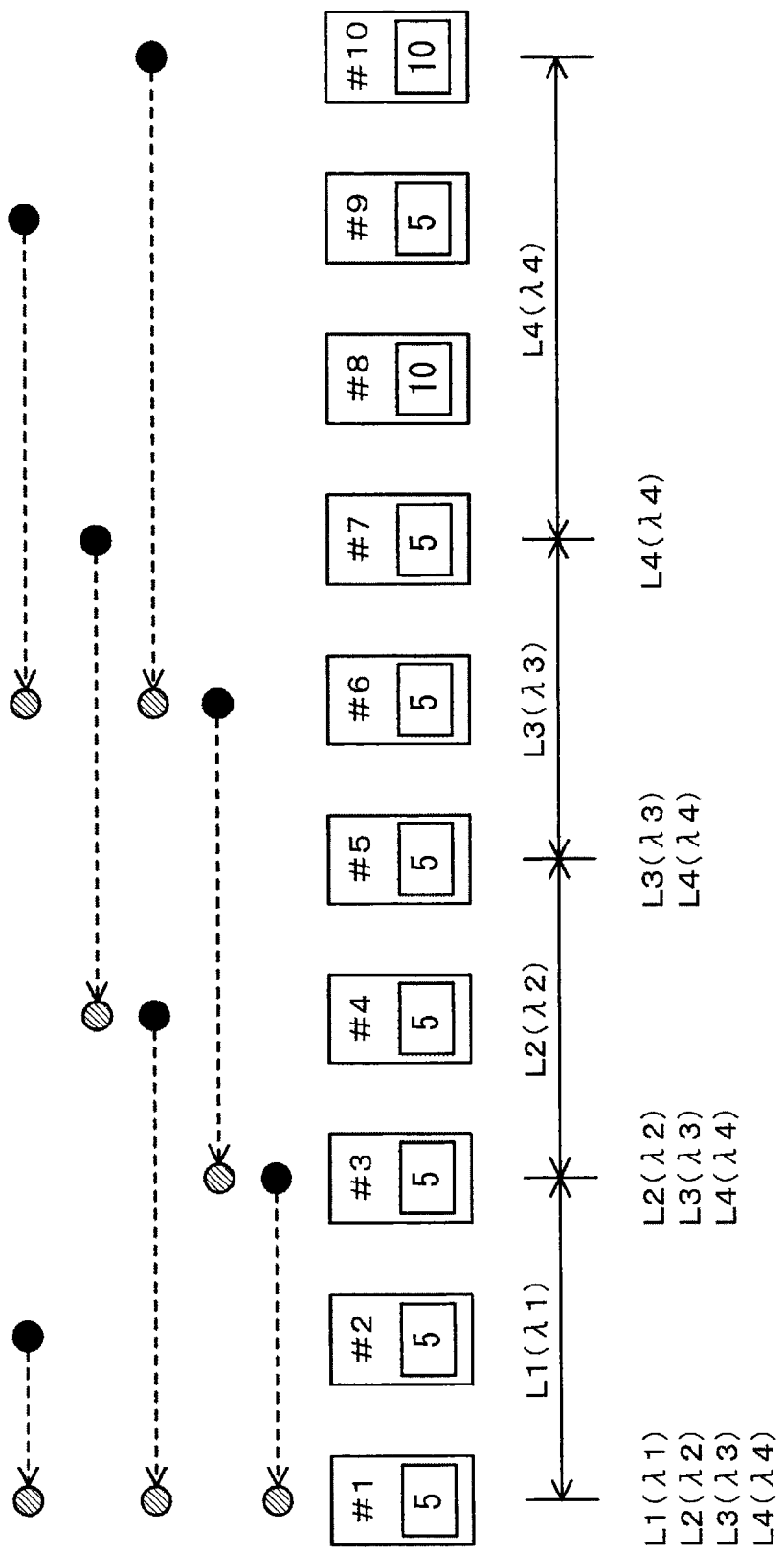
FIG. 49 is an explanatory diagram of the operation of optical node devices according to the fifteenth and sixteenth embodiments.

The operation of the optical node device according to the fifteenth embodiment is described with reference to FIG. 49. FIG. 49 is an explanatory diagram of the operation of optical node devices in the fifteenth and sixteenth embodiments. The fifteenth embodiment is an embodiment for the bi-directional optical path. From the aspect of the bi-directional optical path, the embodiment in the downstream optical path was described in the thirteenth embodiment. Here, the embodiment for the upstream optical path is described in the fifteenth embodiment. Therefore, in the actual setting of the bi-directional optical path, the procedure described in the thirteenth embodiment and the procedure to be described in the fifteenth embodiment are executed in parallel approximately at the same time.

The 3R sections set on the upstream optical path shown in FIG. 49 include: a section using optical node device #10 as the 3R source node and optical node device #6 as the 3R destination node; a section using optical node device #9 as the 3R source node and optical node device #6 as the 3R destination node; a section using optical node device #7 as the 3R source node and optical node device #4 as the 3R destination node; a section using optical node device #6 as the 3R source node and optical node device #3 as the 3R destination node; a 3R section using optical node device #4 as the 3R source node and optical node device #1 as the 3R destination node, a 3R section using optical node device #3 as the 3R source node and optical node device #1 as the 3R destination node, and a 3R section using optical node device #2 as the 3R source node and optical node device #1 as the 3R destination node.

Moreover, the number of wavelength conversion trunks of the respective optical node devices is 5 for each optical node device #1, #2, #3, #4, #5, #6, #7, and #9, and 10 for each optical node device #8 and #10.

Here, if the upstream optical path using the optical node device #1 as the source node and the optical node device #10 as the destination node is set, the best way in order to keep the number of 3R implementations as small as possible is to relay over the section using the optical node device #10 as the 3R source node and the optical node device #6 as the 3R destination node, the section using the optical node device #6 as the 3R source node and the optical node device #3 as the 3R destination node, and the section using the optical node device #3 as the 3R source node and the optical node device #1 as the 3R destination node.

The optical path setting request is sent from the optical node device #1 to the optical node device #2. A plurality of labels (label set) which show the wavelength conversion required midway on the route are loaded into this optical path setting request. In the example of FIG. 49, the wavelength λ1 and label L1 are used between the optical node device #1 and the optical node device #3. The wavelength λ2 and label L2 are used between the optical node device #3 and the optical node device #5. The wavelength λ3 and label L3 are used between the optical node device #5 and the optical node device #7. The wavelength λ4 and label L4 are used between the optical node device #7 and the optical node device #10.

The optical node device #1 is the source node and the 3R destination node on the upstream optical path, so that it determines not to implement the 3R relay.

The optical node device #2 which receives the optical path setting request from the optical node device #1, recognizes that the optical node device #2 itself is capable of setting the optical path with the wavelength λ1, and determines to set the optical path with the label L1 (λ1). Moreover, on the upstream optical path, the optical node device #2 itself belongs to the 3R section using the optical node device #3 as the 3R source node and the optical node device #1 as the 3R destination node. Therefore the optical node device #2 determines not to implement the 3R relay.

The optical node device #3 which receives the optical path setting request from the optical node device #2, recognizes that the optical node device #3 itself is not capable of setting the optical path with the wavelength λ1, and determines to set the optical path with the label L2 (λ2). Moreover, the optical node device #3 itself is the 3R source node on the predetermined upstream optical path, so that it determines to implement the 3R relay.

The optical node device #4 which receives the optical path setting request from the optical node device #3, recognizes that the optical node device #4 itself is capable of setting the optical path with the wavelength λ2, and determines to set the optical path with the label L2 (λ2). Since the optical node device #4 is the 3R source node, the optical node device #4 determines whether or not it implements the 3R relay from T>TH_T and (H<TH_H and L>TH_L). It is assumed that TH_T=4, TH_H=2, and TH_L=1.

The number of wavelength conversion trunks of the optical node device #4 is 5, so that T>TH_T is satisfied. Next, there is one hop from the optical node device #4 to the optical node device #3 being the 3R destination node on the upstream optical path, so that H<TH_H is satisfied. Next, since the label L2 is used for the optical node device #4, the number of remaining labels are two of L3 and L4, so that L>TH_L is satisfied. Therefore, the optical node device #4 determines to implement the 3R relay. The determination result is transmitted to the optical node device #3.

When the optical node device #3 receives this transmitted determination result from the optical node device #4, it withdraws the determination to implement the 3R relay previously determined by the optical node device #4 itself.

The optical node device #5 which receives the optical path setting request from the optical node device #4, recognizes that the optical node device #5 itself is not capable of setting the optical path with the wavelength λ2, and determines to set the optical path with the label L3 (λ3). Moreover, the optical node device #5 is not the 3R source node, so that the optical node device #5 determines not to implement the 3R relay from the beginning.

The optical node device #6 which receives the optical path setting request from the optical node device #5, recognizes that the optical node device #6 itself is capable of setting the optical path with the wavelength λ3, and determines to set the optical path with the label L3 (λ3). Moreover, the optical node device #6 itself is the 3R source node on the predetermined upstream optical path, so that the optical node device #6 determines to implement the 3R relay from the beginning.

The optical node device #7 which receives the optical path setting request from the optical node device #6, recognizes that the optical node device #7 itself is not capable of setting the optical path with the wavelength λ3, determines to set the optical path with the label L4 (λ4), and determines whether or not it implements the 3R relay from T>TH_T and (H<TH_H and L>TH_L).

The number of wavelength conversion trunks of the optical node device #7 is 5, so that T>TH_T is satisfied. Next, there is one hop from the optical node device #7 to the optical node device #6 being the 3R destination node, so that H<TH_H is satisfied. Next, since the label L4 is used for the optical node device #7, the number of remaining labels are zero, so that L>TH_L is not satisfied. Therefore, the optical node device #7 determines not to implement the 3R relay.

The optical node device #8 which receives the optical path setting request from the optical node device #7, recognizes that the optical node device #8 itself is capable of setting the optical path with the wavelength λ4, and determines to set the optical path with the label L4 (λ4). Moreover, the optical node device #8 is not the 3R source node, so that it determines not to implement the 3R relay from the beginning.

The optical node device #9 which receives the optical path setting request from the optical node device #8, recognizes that the optical node device #9 itself is capable of setting the optical path with the wavelength λ4, determines to set the optical path with the label L4 (λ4), and determines whether or not it implements the 3R relay from T>TH_T and (H<TH_H and L>TH_L).

The number of wavelength conversion trunks of the optical node device #9 is 5, so that T>TH_T is satisfied. Next, there are three hops from the optical node device #9 to the optical node device #6 being the 3R destination node, so that H<TH_H is not satisfied. Therefore, the optical node device #9 determines not to implement the 3R relay.

The optical node device #10 which receives the optical path setting request from the optical node device #9, recognizes that the optical node device #10 itself is capable of setting the optical path with the wavelength λ4, and determines to set the optical path with the label L4 (λ4). Moreover, since the optical node device #10 is the destination node, the optical node device #10 is the 3R source node on the upstream optical path, so that it determines to implement the 3R relay.

Therefore, the 3R relay is implemented by the optical node devices #4, #6, and #10. The optical node device #4 implements the 3R relay instead of the optical node device #3.

Sixteenth Embodiment

The operation of the optical node device according to the sixteenth embodiment is described with reference to FIG. 49. The sixteenth embodiment is an embodiment in the bi-directional optical path. From the aspect of the bi-directional optical path, the embodiment for the downstream optical path was described in the fourteenth embodiment. Here, the embodiment for the upstream optical path is described in the sixteenth embodiment. Therefore, in the actual setting of the bi-directional optical path, the procedure described in the fourteenth embodiment and the procedure to be described in the sixteenth embodiment are executed in parallel approximately at the same time.

The 3R sections set on the upstream optical path shown in FIG. 49 include: a section using optical node device #10 as the 3R source node and optical node device #6 as the 3R destination node; a section using optical node device #9 as the 3R source node and optical node device #6 as the 3R destination node; a section using optical node device #7 as the 3R source node and optical node device #4 as the 3R destination node; a section using optical node device #6 as the 3R source node and optical node device #3 as the 3R destination node; a 3R section using optical node device #4 as the 3R source node and optical node device #1 as the 3R destination node; a 3R section using optical node device #3 as the 3R source node and optical node device #1 as the 3R destination node; and a 3R section using optical node device #2 as the 3R source node and optical node device #1 as the 3R destination node.

Moreover, the number of wavelength conversion trunks of the respective optical node devices is 5 for each optical node device #1, #2, #3, #4, #5, #6, #7, and #9, and 10 for each optical node device #8 and #10.

Here, if the upstream optical path using the optical node device #1 as the source node and the optical node device #10 as the destination node is set, the best way in order to keep the number of 3R implementations as small as possible is to relay over the section using the optical node device #10 as the 3R source node and the optical node device #6 as the 3R destination node, the section using the optical node device #6 as the 3R source node and the optical node device #3 as the 3R destination node, and the section using the optical node device #3 as the 3R source node and the optical node device #1 as the 3R destination node.

The optical node device #1 is the source node and the 3R destination node on the upstream optical path, so that it determines not to implement the 3R relay.

The optical path setting request is sent from the optical node device #1 to the optical node device #2. A plurality of labels (label set) which shows the wavelength conversion required midway on the route are loaded into this optical path setting request. In the example of FIG. 49, the wavelength λ1 and label L1 are used between the optical node device #1 and the optical node device #3. The wavelength λ2 and label L2 are used between the optical node device #3 and the optical node device #5. The wavelength λ3 and label L3 are used between the optical node device #5 and the optical node device #7. The wavelength λ4 and label L4 are used between the optical node device #7 and the optical node device #10.

The optical node device #2 which receives the optical path setting request from the optical node device #1, recognizes that the optical node device #2 itself is capable of setting the optical path with the wavelength λ1, and determines to set the optical path with the label L1 (λ1). Moreover, on the upstream optical path, the optical node device #2 itself belongs to the 3R section using the optical node device #3 as the 3R source node and the optical node device #1 as the 3R destination node. Therefore the optical node device #2 determines not to implement the 3R relay.

The optical node device #3 which receives the optical path setting request from the optical node device #2, recognizes that the optical node device #3 itself is not capable of setting the optical path with the wavelength λ1, and determines to set the optical path with the label L2 (λ2). Moreover, the optical node device #3 itself is the 3R source node on the predetermined upstream optical path, so that it determines to implement the 3R relay.

The optical node device #4 which receives the optical path setting request from the optical node device #3, recognizes that the optical node device #4 itself is capable of setting the optical path with the wavelength λ2, and determines to set the optical path with the label L2 (λ2). Since the optical node device #4 is the 3R source node, the optical node device #4 determines whether or not it implements the 3R relay from T>TH_T and (H<TH_H or L>TH_L). It is assumed that TH_T=4, TH_H=2, and TH_L=1.

The number of wavelength conversion trunks of the optical node device #4 is 5, so that T>TH_T is satisfied. Next, there is one hop from the optical node device #4 to the optical node device #3 being the 3R destination node on the upstream optical path, so that H<TH_H is satisfied. Therefore, the optical node device #4 determines to implement the 3R relay. The determination result is transmitted to the optical node device #3.

When the optical node device #3 receives this transmitted determination result from the optical node device #4, it withdraws the determination to implement the 3R relay previously determined by the optical node device #3 itself.

The optical node device #5 which receives the optical path setting request from the optical node device #4, recognizes that the optical node device #5 itself is not capable of setting the optical path with the wavelength λ2, and determines to set the optical path with the label L3 (λ3). Moreover, the optical node device #5 is not the 3R source node, so that it determines not to implement the 3R relay from the beginning.

The optical node device #6 which receives the optical path setting request from the optical node device #5, recognizes that the optical node device #6 itself is capable of setting the optical path with the wavelength λ3, and determines to set the optical path with the label L3 (λ3). Moreover, the optical node device #6 itself is the 3R source node on the predetermined upstream optical path, so that it determines to implement the 3R relay from the beginning.

The optical node device #7 which receives the optical path setting request from the optical node device #6, recognizes that the optical node device #7 itself is not capable of setting the optical path with the wavelength λ3, determines to set the optical path with the label L4 (λ4), and determines whether or not it implements the 3R relay from T>TH_T and (H<TH_H or L>TH_L).

The number of wavelength conversion trunks of the optical node device #7 is 5, so that T>TH_T is satisfied. Next, there is one hop from the optical node device #7 to the optical node device #6 being the 3R destination node, so that H<TH_H is satisfied. Therefore, the optical node device #7 determines to implement the 3R relay. This determination result is transmitted to the optical node device #6.

When the optical node device #6 receives this transmitted determination result from the optical node device #7, it withdraws the determination to implement the 3R relay previously determined by the optical node device #6 itself.

The optical node device #8 which receives the optical path setting request from the optical node device #7, recognizes that the optical node device #8 itself is capable of setting the optical path with the wavelength λ4, and determines to set the optical path with the label L4 (λ4). Moreover, the optical node device #8 is not the 3R source node, so that it determines not to implement the 3R relay from the beginning.

The optical node device #9 which receives the optical path setting request from the optical node device #8, recognizes that the optical node device #9 itself is capable of setting the optical path with the wavelength λ4, determines to set the optical path with the label L4 (λ4), and determines whether or not it implements the 3R relay from T>TH_T and (H<TH_H or L>TH_L).

The number of wavelength conversion trunks of the optical node device #9 is 5, so that T>TH_T is satisfied. Next, there are three hops from the optical node device #9 to the optical node device #6 being the 3R destination node, so that H<TH_H is not satisfied. Next, the number of remaining labels are zero, so that L>TH_L is not satisfied. Therefore, the optical node device #9 determines not to implement the 3R relay.

The optical node device #10 which receives the optical path setting request from the optical node device #9, recognizes that the optical node device #10 itself is capable of setting the optical path with the wavelength λ4, and determines to set the optical path with the label L4 (λ4). Moreover, since the optical node device #10 is the destination node and is the 3R source node on the upstream optical path, so that it determines to implement the 3R relay.

Therefore, the 3R relay is implemented by the optical node devices #4, #7, and #10. The optical node device #4 implements the 3R relay instead of the optical node device #3, and the optical node device #7 takes on the role of the 3R relay of the optical node device #6.

Seventeenth Embodiment

Figure 50:
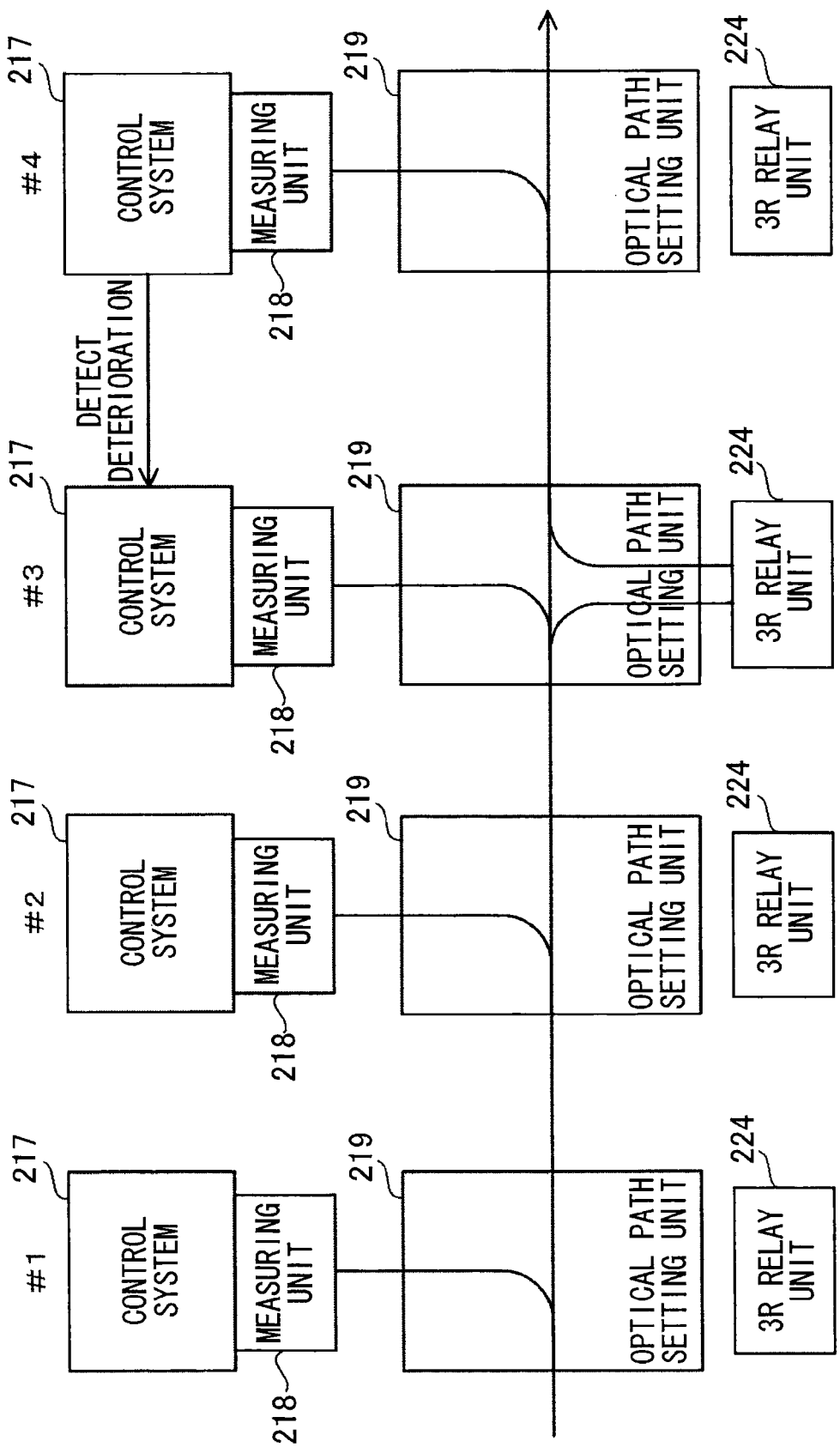
FIG. 50 is an explanatory diagram of the schematic block configuration and the operation of optical node devices according to a seventeenth embodiment.
Figure 51:
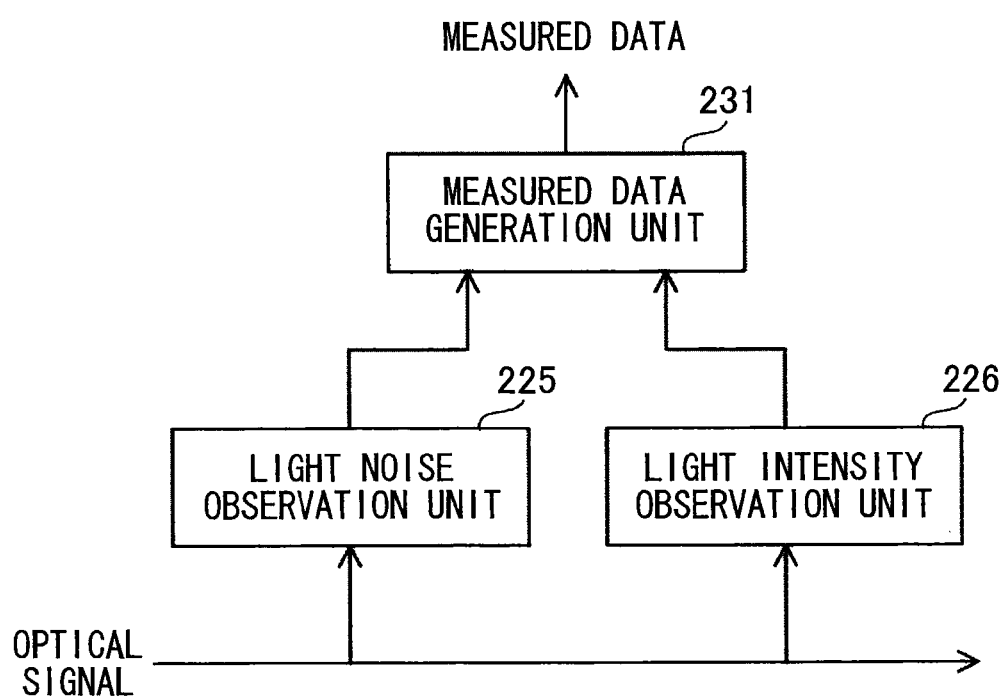
FIG. 51 is a block diagram of a measuring unit.
Figure 52:
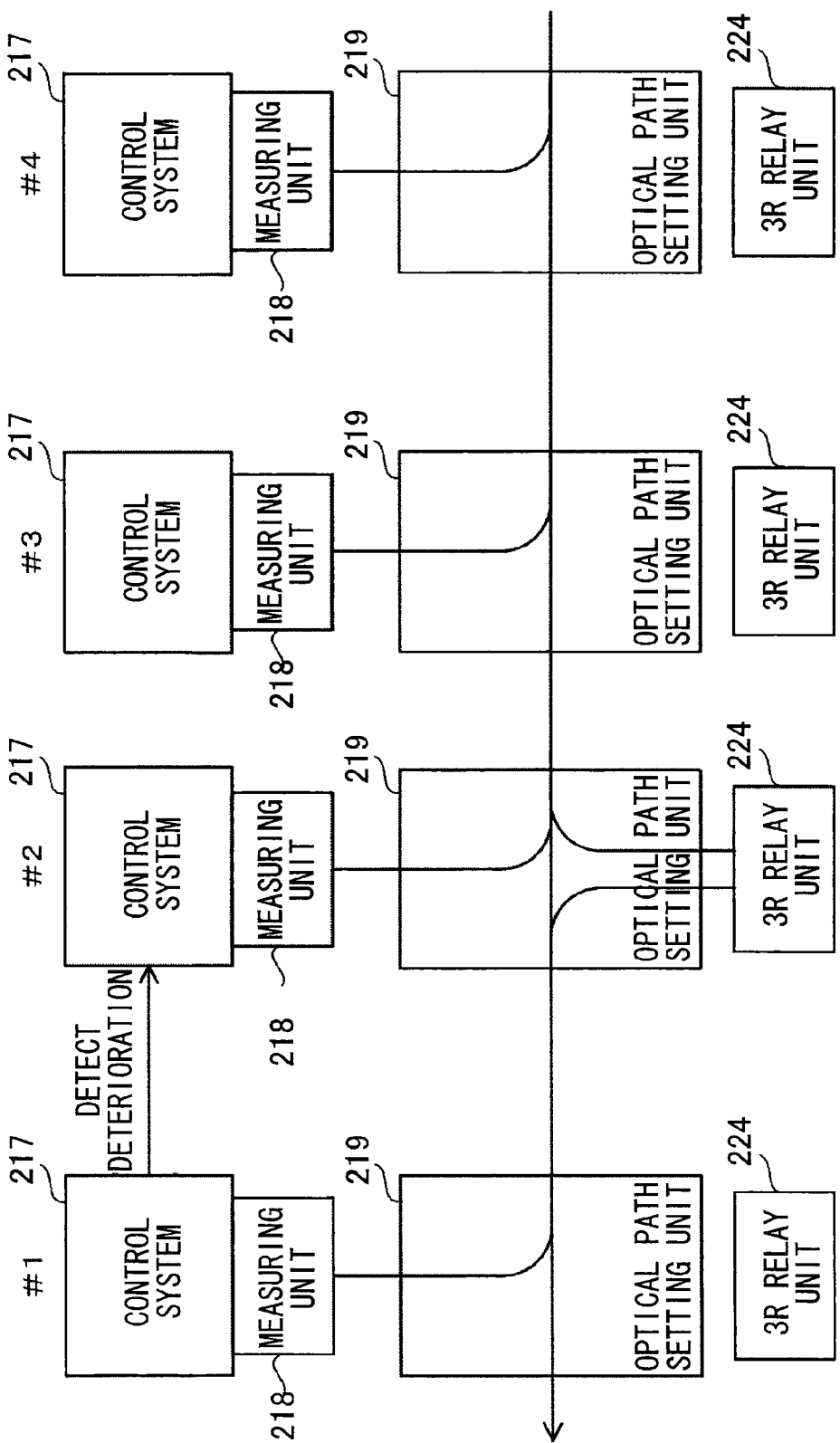
FIG. 52 is an explanatory diagram of the schematic block configuration and the operation of optical node device according to the seventeenth embodiment.

Optical node devices according to a seventeenth embodiment are described with reference to FIG. 50 to FIG. 52. FIG. 50 and FIG. 52 are explanatory diagrams of the schematic block configuration and the operation of optical node devices according to the seventeenth embodiment. FIG. 51 is a block diagram of a measuring unit. As shown in FIG. 50, the optical node device according to the seventeenth embodiment comprises: a measuring unit 218 which detects the deterioration state of the optical signal arriving at the optical node device itself; a control system 217 which notifies the 3R relay request to an adjacent optical node device one hop before the optical node device itself when the detection result of this measuring unit 218 shows signal deterioration; and a 3R relay unit 224 which implements the 3R relay with respect to the optical signal arriving at the optical node device itself when the optical node device itself receives the 3R relay request from the control system 217 of the next-hop adjacent optical node device.

As shown in FIG. 51, the measuring unit 218 measures the light noise of the optical signal by a light noise observation unit 225, and the light intensity of the optical signal by a light intensity observation unit 226. This measurement result is aggregated by a measured data generation unit 231. The measuring unit 218 in other embodiments has a similar configuration.

Next is a description of the operation of the optical node device according to the seventeenth embodiment. If an optical path passing through the optical node device itself is set, the optical node device according to the seventeenth embodiment branches and inputs the optical signal transmitted on the optical path into the measuring unit 218, and observes the signal deterioration state. Now, if optical signal deterioration is detected in the optical node device #4, the optical node device #4 requests the optical node device #3 to implement the 3R relay. The optical node device #3 which receives this request leads the optical path passing through the optical node device #3 itself to the 3R relay unit 224 and implements the 3R relay.

The seventeenth embodiment up to here is described on the assumption of a downstream optical path of the unidirectional optical path or the bi-directional optical path. The following is a description on the assumption of the upstream optical path, with reference to FIG. 52. As shown in FIG. 52, the optical node device according to the seventeenth embodiment comprises: a measuring unit 218 which detects the deterioration state of the optical signal of the upstream optical path arriving at the optical node device itself; a control system 217 which sends the 3R relay implementation request to an adjacent optical node device corresponding to the next-hop of the optical node device itself when the detection result of this measuring unit 218 shows signal deterioration; and a 3R relay unit 224 which implements the 3R relay with respect to the optical signal arriving at the optical node device itself when the optical node device itself receives the 3R relay implementation request from the control system 217 of the previous-hop adjacent optical node device.

Next is a description of the operation of the optical node device according to the seventeenth embodiment. If an upstream optical path passing through the optical node device itself is set, the optical node device according to the seventeenth embodiment branches and inputs the optical signal transmitted on the upstream optical path into the measuring unit 218, and observes the signal deterioration state thereof. Now, if optical signal deterioration is detected in the optical node device #1, the optical node device #1 sends the 3R relay implementation request to the optical node device #2. The optical node device #2 which receives this 3R relay implementation request leads the upstream optical path passing through the optical node device #2 itself to the 3R relay unit 224 and implements the 3R relay.

Describing the situation where the preset 3R section is changed in this way, for example in the case where a large number of new optical paths are set to one optical node device, there might be a case where the existing optical path receives noise caused by cross talk or nonlinear effects due to the effect of the new optical paths. In such a case, a change occurs in the 3R section. In the seventeenth embodiment, it is possible to flexibly deal with such changes of the 3R section.

If the respective optical node devices each have the 3R relay unit 224, there is concern of whether or not the network resources can be effectively used compared to the conventional technique. However, while conventionally all optical node devices implement the 3R relay equally, only the selected optical node device implements the 3R relay in the seventeenth embodiment, and load due to the 3R relay is distributed to a plurality of the optical node devices, so that the network resources can be effectively used.

That is, in most cases, the 3R relay unit 224 of the respective optical node devices may implement the 3R relay only on a part of the optical path passing through the optical node device itself. On the other hand, conventionally, the 3R relay unit 224 of the respective optical node devices is required to implement the 3R relay to all of the optical paths passing through the optical node device itself. Therefore, the scale of the 3R relay unit 224 can be smaller to deal with compared to the conventional technique, so that the network resources can be effectively used and the cost can be reduced.

Eighteenth Embodiment

Figure 53:
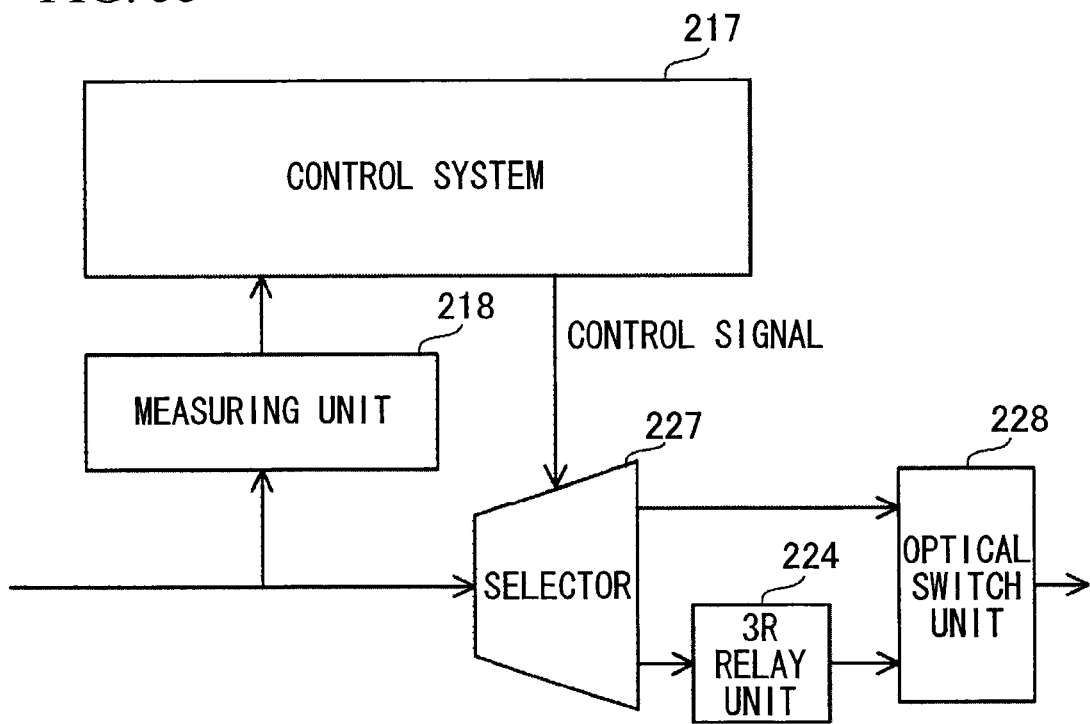
FIG. 53 is a block diagram of an optical node device comprising an optical switch unit on the output side in an eighteenth embodiment.
Figure 54:
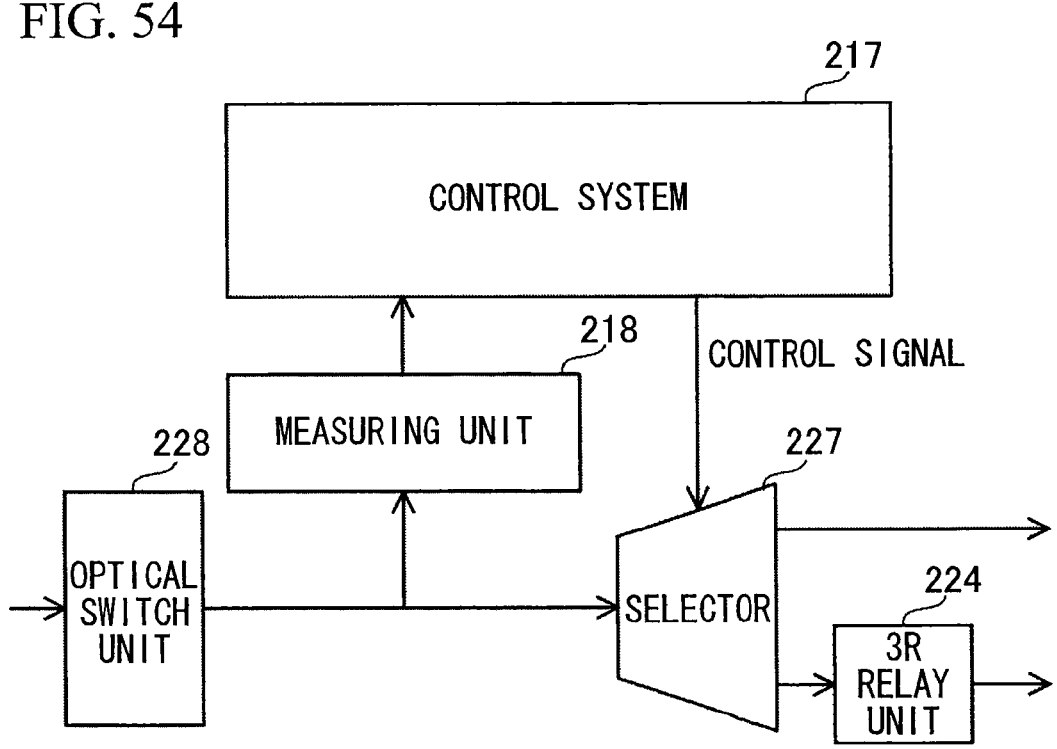
FIG. 54 is a block diagram of an optical node device comprising the optical switch unit on the input side in the eighteenth embodiment.
Figure 55:
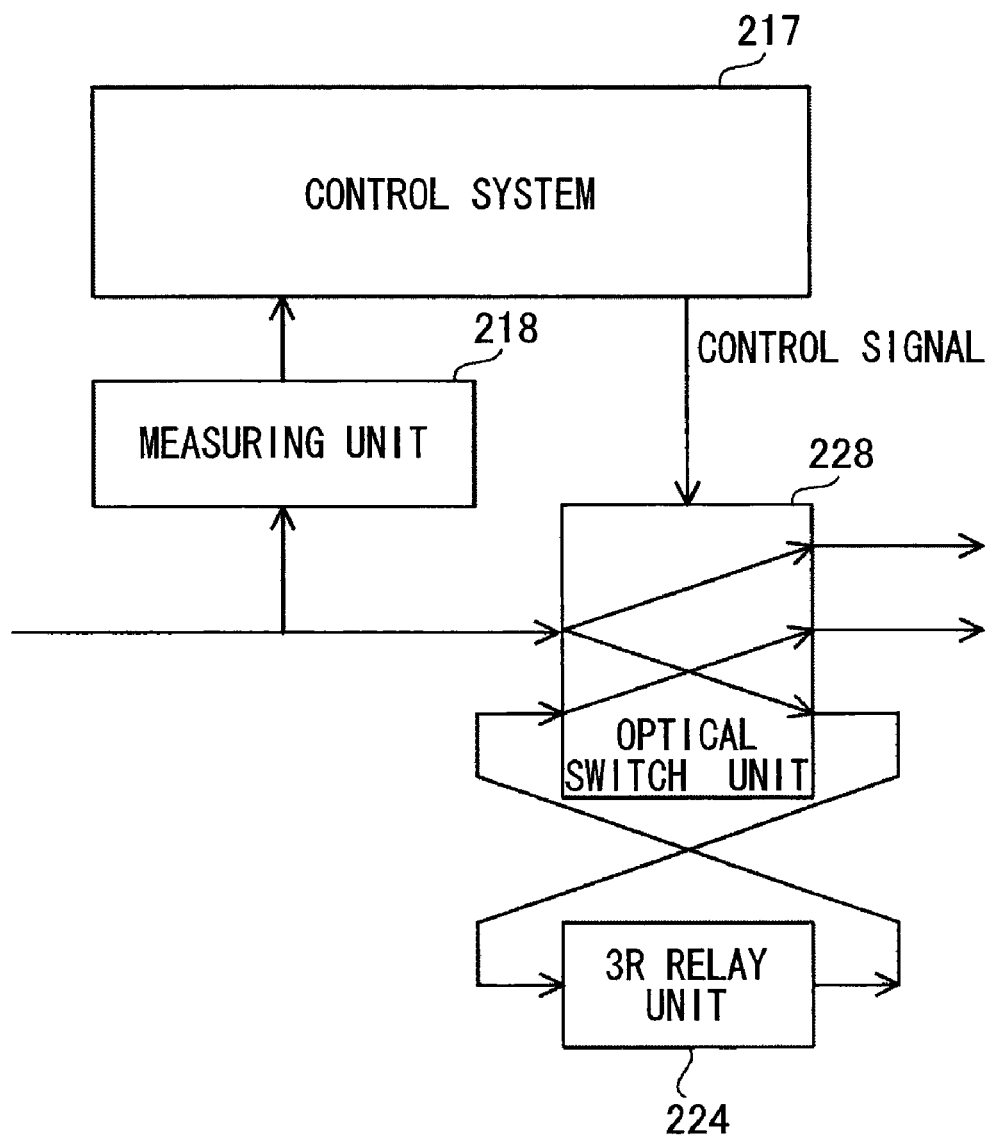
FIG. 55 is a block diagram of an optical node device comprising a trunk-type 3R relay unit in the eighteenth embodiment.

An optical node device according to an eighteenth embodiment is described with reference to FIG. 53 to FIG. 55. FIG. 53 is a block diagram of an optical node device comprising an optical switch unit on the output side in the eighteenth embodiment. FIG. 54 is a block diagram of an optical node device comprising the optical switch unit on the input side in the eighteenth embodiment. FIG. 55 is a block diagram of an optical node device comprising a trunk-type 3R relay unit in the eighteenth embodiment.

The optical node device according to the eighteenth embodiment comprises: a measuring unit 218 which detects the deterioration state of the optical signal arriving at the optical node device itself; and a 3R relay unit 224 which implements the 3R relay with respect to the optical signal arriving at the optical node device itself when the detection result of this measuring unit 218 shows signal deterioration.

Next is a description of the operation of the optical node device according to the eighteenth embodiment. In the optical node device shown in FIG. 53, when the measuring unit 218 detects deterioration of the input optical signal, the detection result is transmitted to the control system 217. The control system 217 outputs an instruction to the selector 227 and the input optical signal is connected to the 3R relay unit 224. Accordingly, the optical signal which is subjected to the 3R relay is input into the optical switch unit 228 via the 3R relay unit 224.

In the optical node device shown in FIG. 54, when the measuring unit 218 detects the deterioration of the optical signal output from the optical switch unit 228, the detection result is transmitted to the control system 217. The control system 217 outputs an instruction to the selector 227 and the input optical signal is connected to the 3R relay unit 224. Accordingly, the optical signal which is subjected to the 3R relay is output via the 3R relay unit 224.

In the optical node device shown in FIG. 55, when the measuring unit 218 detects deterioration of the input optical signal, the detection result is transmitted to the control system 217. The control system 217 outputs an instruction to the optical switch unit 228 and the input optical signal is connected to the 3R relay unit 224. Accordingly, the optical signal which is once output from the optical switch unit 228 and then 3R relayed via the 3R relay unit 224, is input into the optical switch unit 228 again. The optical switch unit 228 switches the 3R relayed optical signal to the target route.

The eighteenth embodiment up to here is described on the assumption of a downstream optical path of the unidirectional optical path or the bi-directional optical path. Since it can be readily inferred that the 3R section information of the upstream optical path can be generated in a similar procedure to that of the downstream optical path, detailed description is omitted.

That is, the optical node device according to the eighteenth embodiment comprises: the measuring unit 218 which detects the deterioration state of the optical signal of the upstream optical path arriving at the optical node device itself; and the 3R relay unit 224 which implements the 3R relay with respect to the optical signal of the upstream optical path arriving at the optical node device itself when the detection result of this measuring unit 218 shows signal deterioration.

Nineteenth Embodiment

Figure 56:
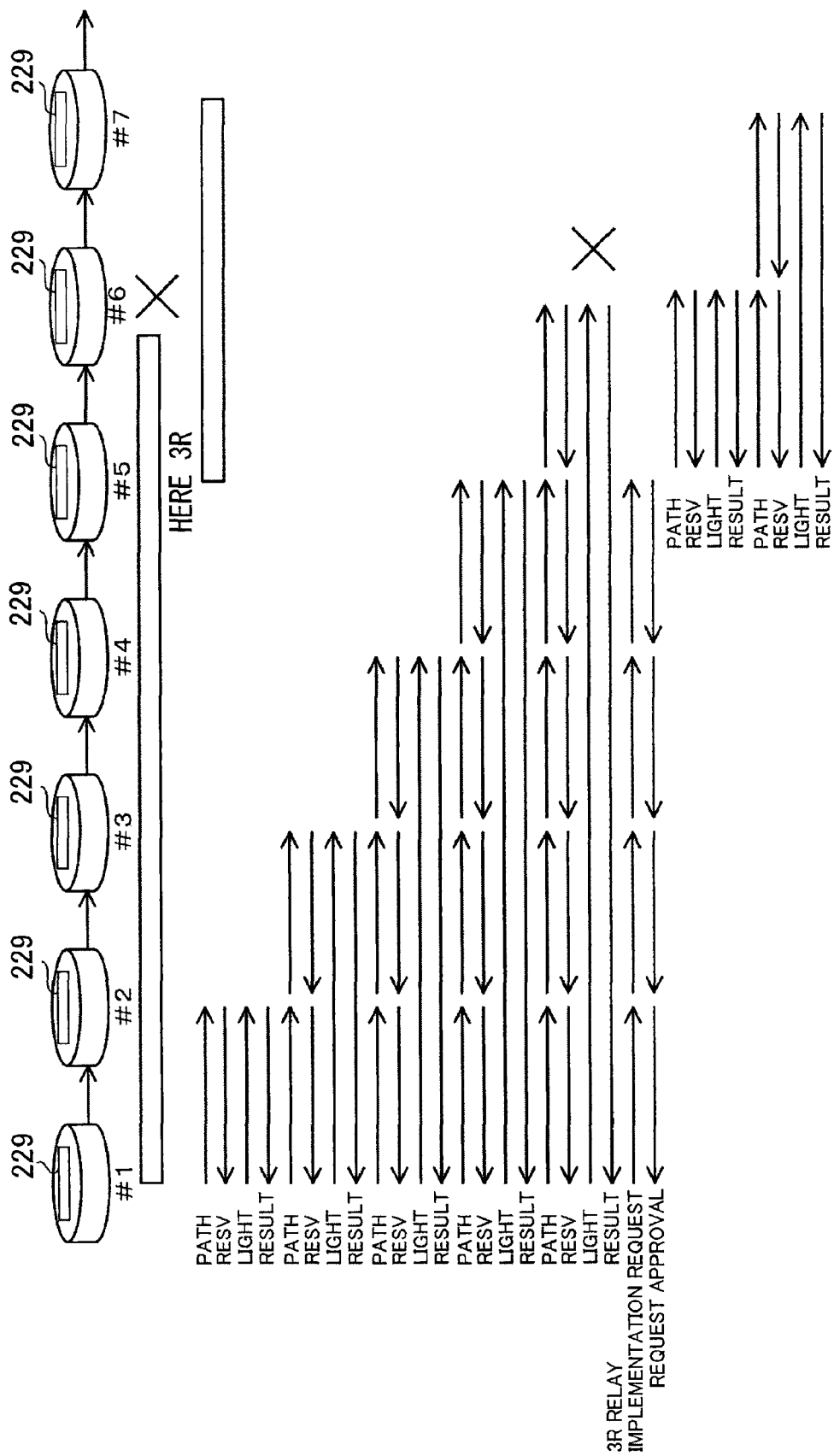
FIG. 56 shows a concept of 3R section information collection in optical node devices according to a nineteenth embodiment.
Figure 57:
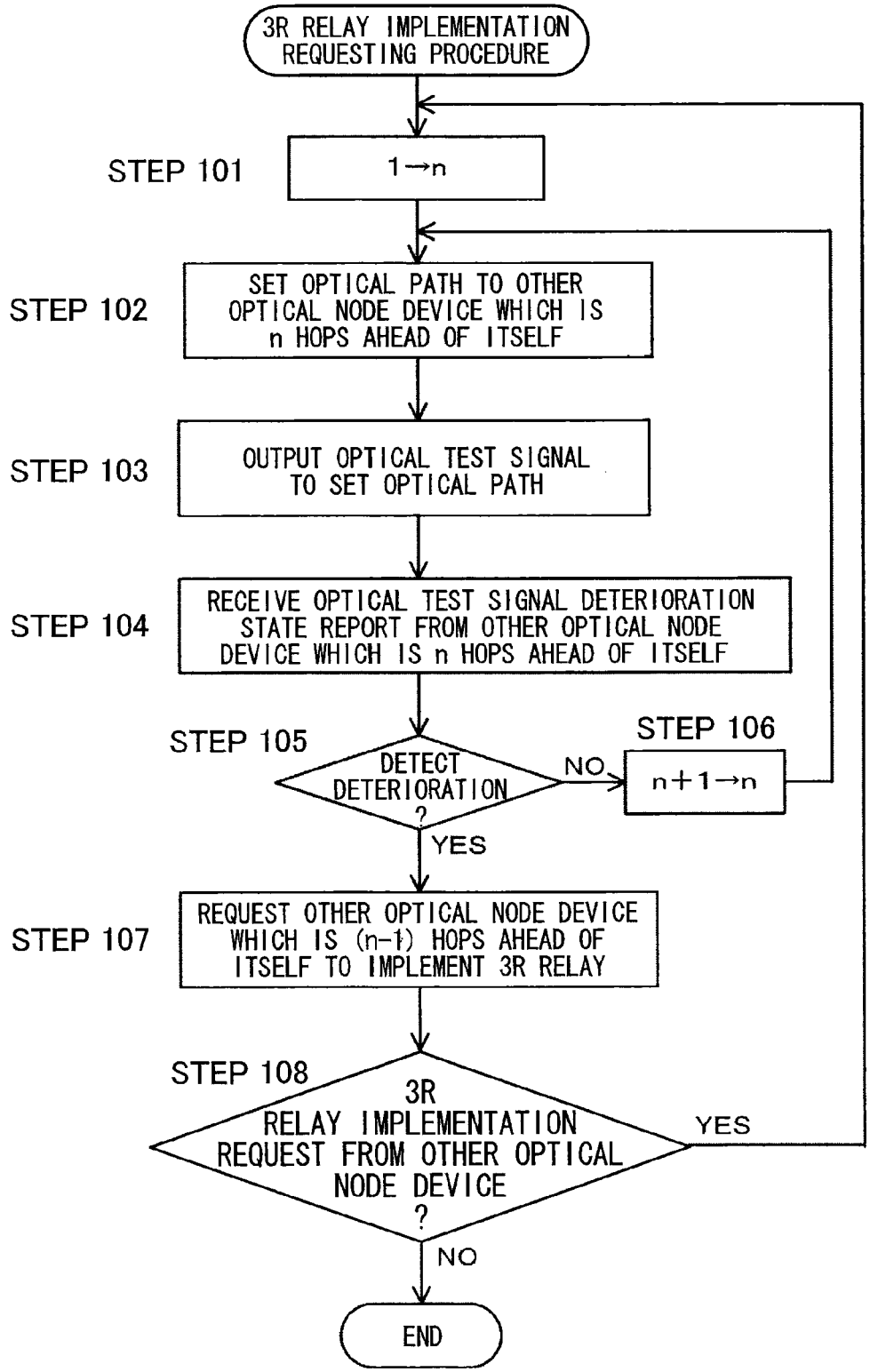
FIG. 57 shows a 3R section information collecting procedure in the optical node device according to the nineteenth embodiment.
Figure 58:
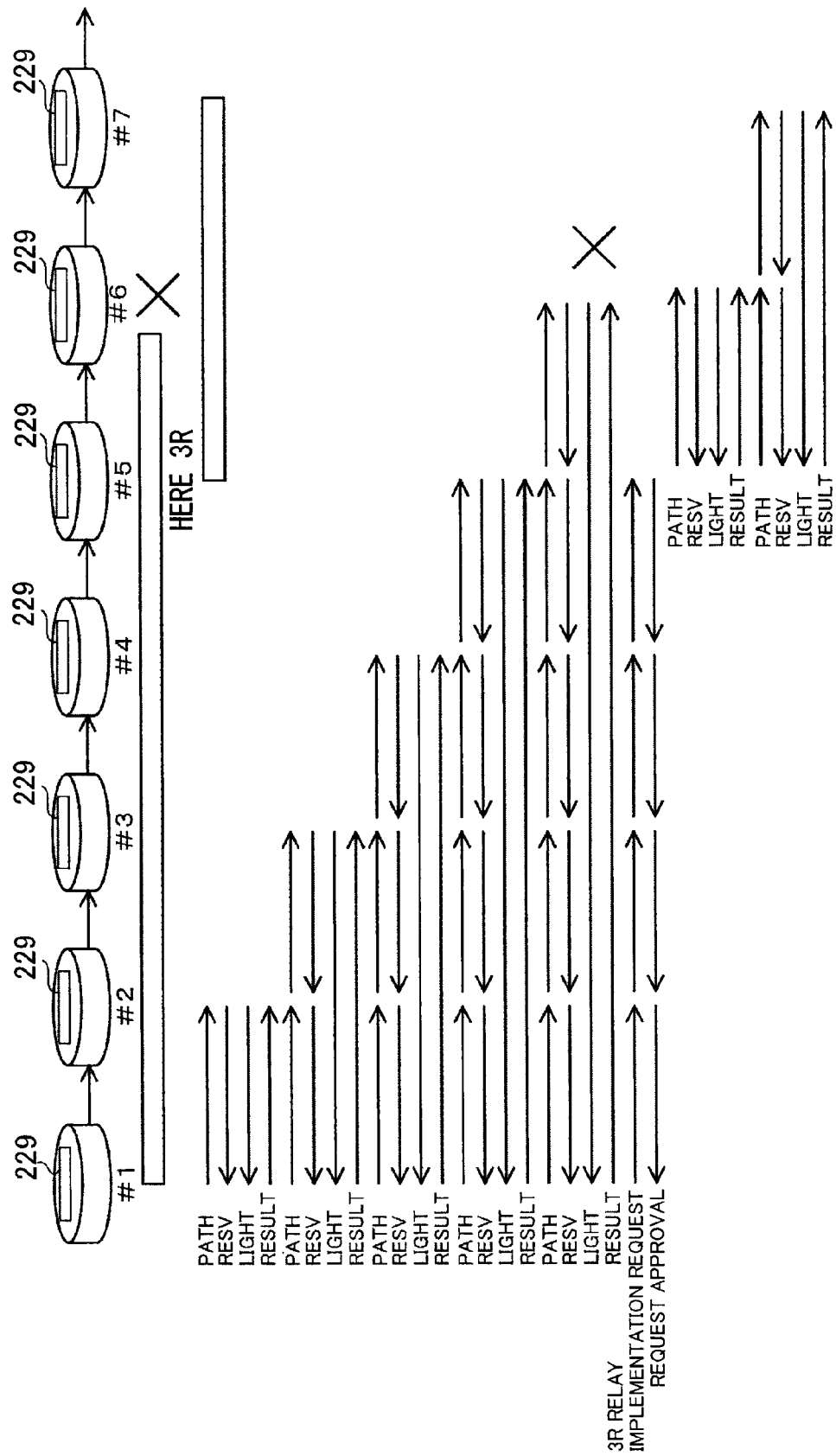
FIG. 58 shows a concept of 3R section information collection in the optical node device according to the nineteenth embodiment.
Figure 59:
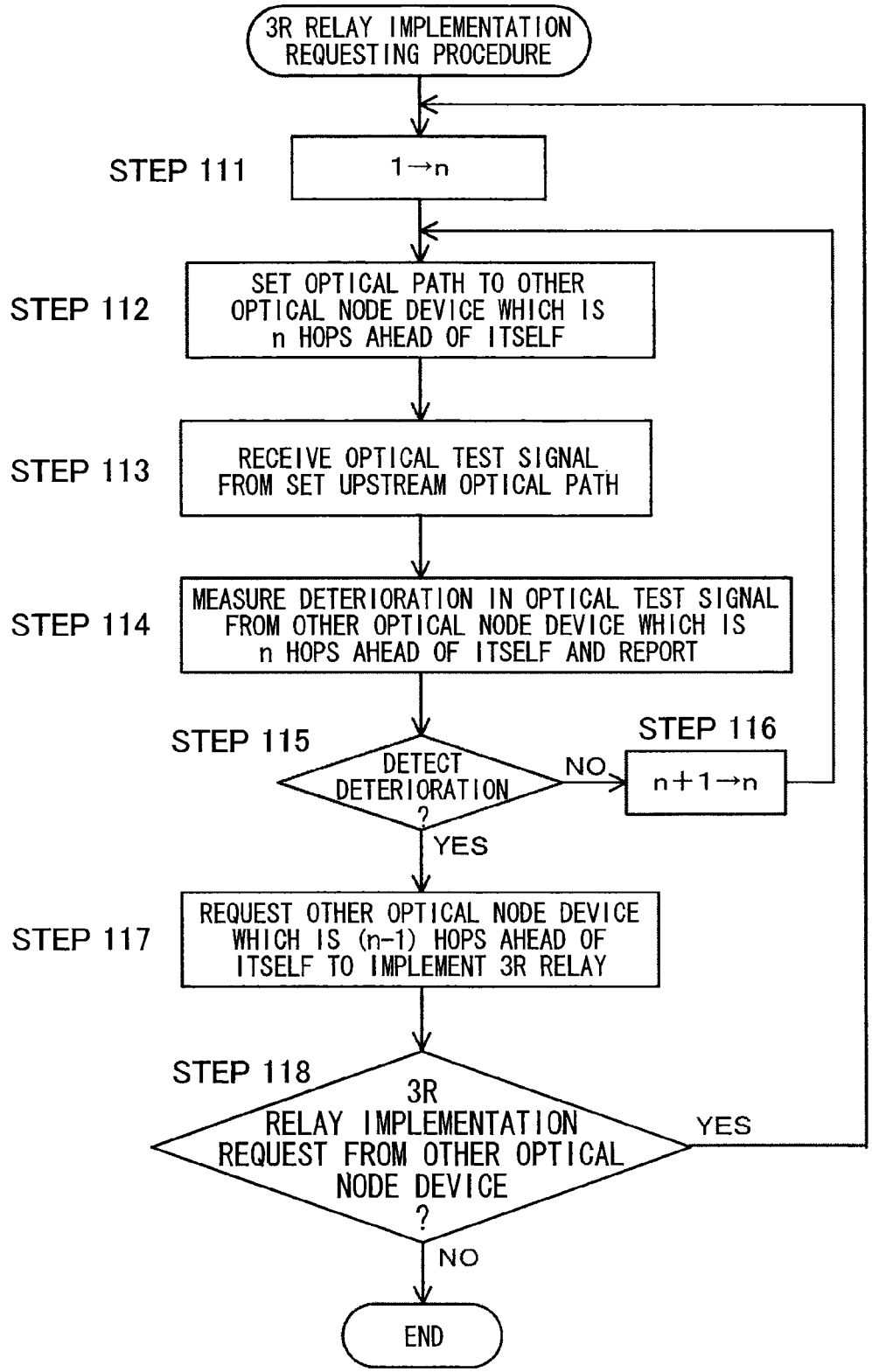
FIG. 59 shows a 3R section information collecting procedure in the optical node device according to the nineteenth embodiment.

Optical node devices according to a nineteenth embodiment are described with reference to FIG. 56 to FIG. 59. FIG. 56 and FIG. 58 show concepts of 3R section information collection in the optical node devices according to the nineteenth embodiment. FIG. 57 and FIG. 59 show 3R section information collecting procedures in the optical node devices according to the nineteenth embodiment.

The optical node device according to the nineteenth embodiment is an optical node device which switches the optical signal and sequentially sets the optical path one hop at a time from the next-hop adjacent optical node device to another optical node device included in a route from the optical node device itself to the destination node, and, as shown in FIG. 56, comprises in the 3R relay implementation determining unit 229: a unit which sends an optical test signal at each time when the optical path is sequentially set for the other optical node devices included in the route to the destination node one hop at a time from the next-hop adjacent optical node device; a unit which receives a report on the deterioration state of the optical test signal from another optical node device at the farthest end receiving the optical test signal at each time when the optical test signal is sequentially sent to the other optical node device included in the route to the destination node one hop at a time from the next-hop adjacent optical node device by this sending unit; and a unit which requests another optical node device one-hop before the other optical node device at the farthest end to implement the 3R relay if the deterioration state of the optical test signal based on the reported result received by this receiving unit satisfies a predetermined deterioration condition. The 3R relay implementation determining unit 229 of the other optical node device which is requested to implement the 3R relay comprises: a unit which sends the optical test signal at each time when the optical path is sequentially set for the other optical node devices included in the route to the destination node one hop at a time from the next-hop adjacent optical node device; a unit which receives the report on the deterioration state of the optical test signal from another optical node device at the farthest end receiving the optical test signal at each time when the optical test signal is sequentially sent to the other optical node device included in the route to the destination node one hop at a time from the next-hop adjacent optical node device by this sending unit; and a unit which requests another optical node device one hop before the other optical node device at the farthest end to implement the 3R relay when the deterioration state of the optical test signal based on the reported result received by this receiving unit satisfies a predetermined deterioration condition. In practice, each optical node device comprises the 3R relay implementation determining unit 229, and the above functions of the respective units are activated when each optical node device itself becomes the source node or the 3R source node.

Next is a description of the optical node device according to the nineteenth embodiment. The 3R relay implementation requesting procedure shown in FIG. 57 is executed by the 3R relay implementation determining unit 229. Here is a description of an embodiment of a process in which the optical node device #1 is the 3R source node and the 3R relay implementation is requested while setting the optical path. As shown in FIG. 57, the 3R relay implementation determining unit 229 of the optical node device #1 sets an optical path to the optical node device #2, which is one hop ahead of the optical node device itself (Step 101 and Step 102). In FIG. 56, the optical node device #1 sends an optical path setting request (PATH) to the optical node device #2. When the optical node device #2 receives the optical path setting request (PATH), it ensures the resources required for optical path setting and sends the optical path setting completion notification (RESV) to the optical node device #1. Accordingly, the optical path is set between the optical node devices #1 and #2.

Subsequently, the optical node device #1 sends an optical test signal (LIGHT) to the set optical path (Step 103), and receives an optical test signal deterioration state report (RESULT) from the optical node device #2 (Step 104). Since no deterioration is shown in the optical test signal deterioration state report from the optical node device #2 (Step 105), the optical node device #1 sets an optical path to the optical node device #3, which is two hops ahead of the optical node device #1 itself (Step 106 and Step 102). In FIG. 56, the optical node device #1 sends the optical path setting request (PATH) to the optical node device #3 via the optical node device #2. When the optical node device #3 receives the optical path setting request (PATH), the optical node device #3 ensures the resources required for optical path setting and sends the optical path setting completion notification (RESV) to the optical node device #1 via the optical node device #2. Accordingly, the optical path is set between the optical node devices #1 and #3.

Subsequently, the optical node device #1 sends an optical test signal (LIGHT) to the set optical path (Step 103), and receives an optical test signal deterioration state report (RESULT) from the optical node device #3 (Step 104). Since no deterioration is shown in the optical test signal deterioration state report from the optical node device #3 (Step 105), the optical node device #1 sets an optical path to the optical node device #4, which is three hops ahead of the optical node device #1 itself (Step 106 and Step 102). In FIG. 56, the optical node device #1 sends the optical path setting request (PATH) to the optical node device #4 via the optical node devices #2 and #3. When the optical node device #4 receives the optical path setting request (PATH), it ensures the resources required for optical path setting and sends the optical path setting completion notification (RESV) to the optical node device #1 via the optical node devices #3 and #2. Accordingly, the optical path is set between the optical node devices #1 and #4.

Subsequently, the optical node device #1 sends an optical test signal (LIGHT) to the set optical path (Step 103), and receives an optical test signal deterioration state report (RESULT) from the optical node device #4 (Step 104). Since no deterioration is shown in the optical test signal deterioration state report from the optical node device #4 (Step 105), the optical node device #1 sets an optical path to the optical node device #5, which is four hops ahead of the optical node device #1 itself (Step 106 and Step 102). In FIG. 56, the optical node device #1 sends the optical path setting request (PATH) to the optical node device #5 via the optical node devices #2, #3, and #4. When the optical node device #5 receives the optical path setting request (PATH), it ensures the resources required for optical path setting and sends the optical path setting completion notification (RESV) to the optical node device #1 via the optical node devices #4, #3, and #2. Accordingly, the optical path is set between the optical node devices #1 and #5.

Subsequently, the optical node device #1 sends an optical test signal (LIGHT) to the set optical path (Step 103), and receives an optical test signal deterioration state report (RESULT) from the optical node device #5 (Step 104). Since no deterioration is shown in the optical test signal deterioration state report from the optical node device #5 (Step 105), the optical node device #1 sets an optical path to the optical node device #6, which is five hops ahead of the optical node device #1 itself (Step 106 and Step 102). In FIG. 56, the optical node device #1 sends the optical path setting request (PATH) to the optical node device #6 via the optical node devices #2, #3, #4, and #5. When the optical node device #6 receives the optical path setting request (PATH), it ensures the resources required for optical path setting and sends the optical path setting completion notification (RESV) to the optical node device #1 via the optical node devices #5, #4, #3, and #2. Accordingly, the optical path is set between the optical node devices #1 and #6.

Subsequently, the optical node device #1 sends an optical test signal (LIGHT) to the set optical path (Step 103), and receives an optical test signal deterioration state report (RESULT) from the optical node device #6 (Step 104). Deterioration is shown in the optical test signal deterioration state report from the optical node device #6 (Step 105), so the optical node device #1 requests the optical node device #5, which is four hops ahead of the optical node device #1 itself to implement the 3R relay (Step 107). When the optical node device #5 receives the request to implement the 3R relay from the optical node device #1, it sends an approval with respect to the request to the optical node device #1.

Moreover, the optical node device #5 receives the 3R relay implementation request from the optical node device #1 (Step 108), so that it recognizes that the optical node device #5 itself is the 3R source node, and executes the procedure from Step 101. Furthermore, the process is terminated since the optical node device #1 requests the optical node device #5 to implement the 3R relay, and the optical node device #1 does not receive the 3R relay implementation request from another optical node device.

In this way, in the nineteenth embodiment, it is possible to determine the optical node device for implementing the 3R relay in the process of the optical path setting. In the example of FIG. 56, all of the respective optical node devices #1 to #7 comprise a 3R relay implementation determining unit 229. However the configuration may be such that for example every other optical node device comprises it. Moreover, in the present embodiment, in order to facilitate description, the optical test signal was sent to the optical node device #2 or #3 which is not expected to require the 3R relay. However, the sending procedure of the optical test signal may be omitted with respect to these optical node devices #2 and #3. Alternatively, the optical test signal may be sent to only the optical node device #5 or #6 which is expected to require the 3R relay.

The nineteenth embodiment up to here is described on the assumption of a downstream optical path of the unidirectional optical path or the bi-directional optical path. The following is a description on the assumption of the upstream optical path, with reference to FIG. 58 and FIG. 59. The optical node device according to the nineteenth embodiment sequentially sets the optical path one hop at a time from the next-hop adjacent optical node device to another optical node device included in a route to the destination node, if the optical node device itself is the source node. The 3R relay implementation determining unit 229 comprises a unit which sends the optical test signal to the upstream optical path when the optical path is set to the optical node device itself, if the optical node device itself is not the source node. Moreover, this 3R relay implementation determining unit 229 comprises a unit which receives the optical test signal if the optical node device itself is the source node and notifies the report on the optical test signal deterioration state to the sender of the optical test signal. Furthermore, the 3R relay implementation determining unit 229 of the sender optical node device of the optical test signal determines to implement the 3R relay with respect to the optical signal arriving from the upstream optical path, if the optical test signal deterioration state based on this notification satisfies a predetermined deterioration condition. Furthermore, the 3R relay implementation determining unit 229 comprises a unit which sequentially sets the optical path one hop at a time from the next-hop adjacent optical node device to another optical node device included in the route from the optical node device itself to the destination node, if the optical node device itself is the optical node device for implementing the 3R relay on the upstream optical path, receives the optical test signal, and notifies the report on the optical test signal deterioration state to the sender of the optical test signal. In practice, each optical node device comprises the 3R relay implementation determining unit 229, and the above functions of the respective units are activated when each optical node device itself becomes the source node, the 3R source node, or the 3R destination node.

Next is a description of the operation of the optical node devices according to the nineteenth embodiment. The 3R relay implementation requesting procedure shown in FIG. 59 is executed by the 3R relay implementation determining unit 229. Here is a description of an example of a process in which the optical node device #1 is the 3R destination node on the upstream optical path and the 3R relay implementation is requested while setting the optical path. As shown in FIG. 59, the 3R relay implementation determining unit 229 of the optical node device #1 sets an optical path to the optical node device #2, which is one hop ahead of the optical node device #1 itself (Step 111 and Step 112). In FIG. 58, the optical node device #1 sends an optical path setting request (PATH) to the optical node device #2. When the optical node device #2 receives the optical path setting request (PATH), it ensures the resources required for optical path setting and sends the optical path setting completion notification (RESV) to the optical node device #1. Accordingly, the optical path is set between the optical node devices #1 and #2.

Subsequently, the optical node device #1 receives an optical test signal (LIGHT) from the set upstream optical path (Step 113), and measures the deterioration of the optical test signal from the optical node device #2 and reports the measurement result (RESULT) to the optical node device #2 (Step 114). Since no deterioration is shown in the optical test signal from the optical node device #2 (Step 115), the optical node device #1 sets an optical path to the optical node device #3, which is two hops ahead of the optical node device #1 itself (Step 116 and Step 112). In FIG. 58, the optical node device #1 sends the optical path setting request (PATH) to the optical node device #3 via the optical node device #2. When the optical node device #3 receives the optical path setting request (PATH), it ensures the resources required for optical path setting and sends the optical path setting completion notification (RESV) to the optical node device #1 via the optical node device #2. Accordingly, the optical path is set between the optical node devices #1 and #3.

Subsequently, the optical node device #1 receives an optical test signal (LIGHT) from the set upstream optical path (Step 113), and measures the deterioration of the optical test signal from the optical node device #3 and reports the measurement result (RESULT) to the optical node device #3 (Step 114). Since no deterioration is shown in the optical test signal from the optical node device #3 (Step 115), the optical node device #1 sets an optical path to the optical node device #4, which is three hops ahead of the optical node device #1 itself (Step 116 and Step 112). In FIG. 58, the optical node device #1 sends the optical path setting request (PATH) to the optical node device #4 via the optical node devices #2 and #3. When the optical node device #4 receives the optical path setting request (PATH), it ensures the resources required for optical path setting and sends the optical path setting completion notification (RESV) to the optical node device #1 via the optical node devices #3 and #2. Accordingly, the optical path is set between the optical node devices #1 and #4.

Subsequently, the optical node device #1 receives an optical test signal (LIGHT) from the set upstream optical path (Step 113), and measures the deterioration of the optical test signal from the optical node device #4 and reports the measurement result (RESULT) to the optical node device #4 (Step 114). Since no deterioration is shown in the optical test signal from the optical node device #4 (Step 115), the optical node device #1 sets an optical path to the optical node device #5, which is four hops ahead of the optical node device #1 itself (Step 116 and Step 112). In FIG. 58, the optical node device #1 sends the optical path setting request (PATH) to the optical node device #5 via the optical node devices #2, #3, and #4. When the optical node device #5 receives the optical path setting request (PATH), it ensures the resources required for optical path setting and sends the optical path setting completion notification (RESV) to the optical node device #1 via the optical node devices #4, #3, and #2. Accordingly, the optical path is set between the optical node devices #1 and #5.

Subsequently, the optical node device #1 receives an optical test signal (LIGHT) from the set upstream optical path (Step 113), and measures the deterioration of the optical test signal from the optical node device #5 and reports the measurement result (RESULT) to the optical node device #5 (Step 114). Since no deterioration is shown in the optical test signal from the optical node device #5 (Step 115), the optical node device #1 sets an optical path to the optical node device #6, which is five hops ahead of the optical node device #1 itself (Step 116 and Step 112). In FIG. 58, the optical node device #1 sends the optical path setting request (PATH) to the optical node device #6 via the optical node devices #2, #3, #4, and #5. When the optical node device #6 receives the optical path setting request (PATH), it ensures the resources required for optical path setting and sends the optical path setting completion notification (RESV) to the optical node device #1 via the optical node devices #5, #4, #3, and #2. Accordingly, the optical path is set between the optical node devices #1 and #6.

Subsequently, the optical node device #1 receives an optical test signal (LIGHT) from the set upstream optical path (Step 113), and measures the deterioration of the optical test signal from the optical node device #6 and reports the measurement result (RESULT) to the optical node device #6 (Step 114). Deterioration is shown in the optical test signal from the optical node device #6 (Step 115), so the optical node device #1 requests the optical node device #5, which is four hops ahead of the optical node device #1 itself to implement the 3R relay (Step 117). When the optical node device #5 receives the request to implement the 3R relay from the optical node device #1, it sends an approval with respect to the request to the optical node device #1.

Moreover, the optical node device #5, in response to the notification from the optical node device #1 (Step 118), recognizes that the optical node device #5 itself is the 3R source node, and executes the procedure from Step 111. Furthermore, the process is terminated since the optical node device #1 requests the optical node device #5 to implement the 3R relay, and the optical node device #1 does not receive the 3R relay implementation request from another optical node device.

In this way, in the nineteenth embodiment, it is possible to determine the optical node device for implementing the 3R relay in the process of the optical path setting. In the example of FIG. 58, all of the respective optical node devices #1 to #7 comprise a 3R relay implementation determining unit 229. However the configuration may be such that for example every other optical node device comprises it. Moreover, in the present embodiment, in order to facilitate description, the optical test signal was sent to the optical node device #2 or #3 which is not expected to require the 3R relay. However, the sending procedure of the optical test signal may be omitted with respect to these optical node devices #2 and #3. Alternatively, the optical test signal may be sent to only the optical node device #5 or #6 which is expected to require the 3R relay.

Twentieth Embodiment

Figure 60:
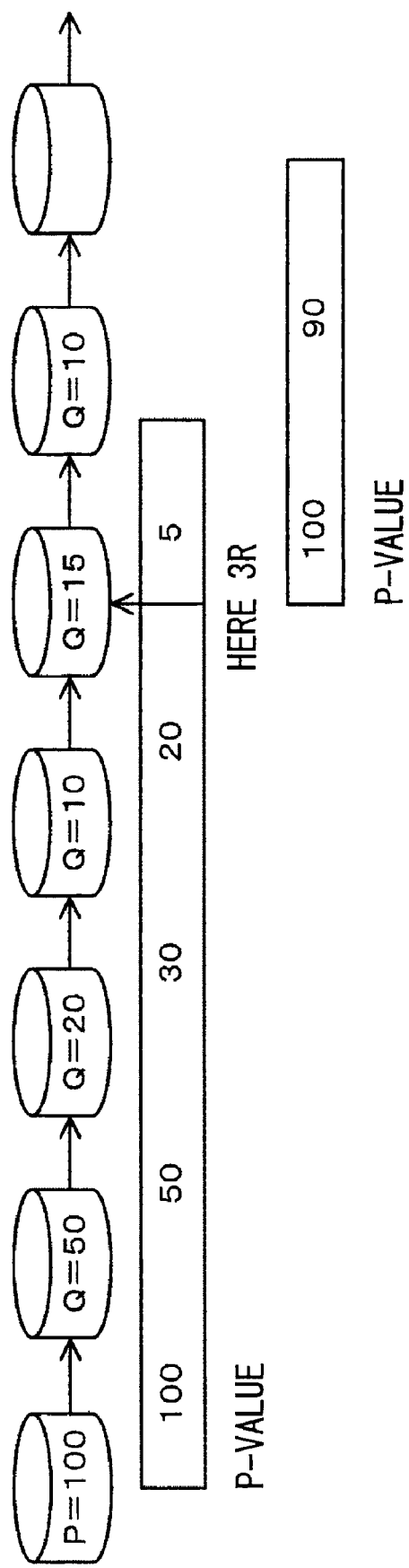
FIG. 60 shows a concept of 3R section information collection in optical node devices of twentieth and twenty-ninth embodiments.
Figure 61:
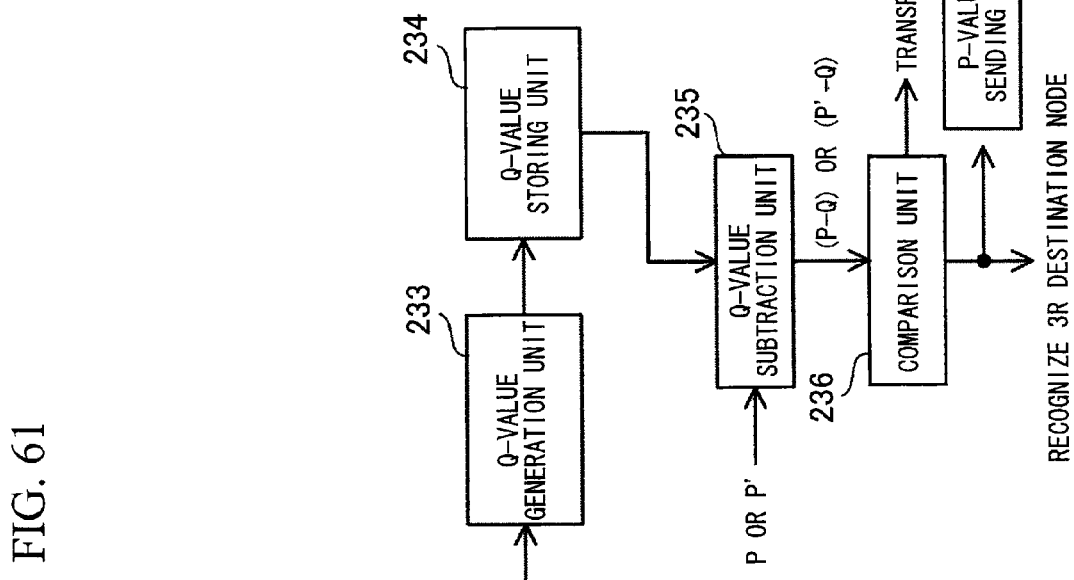
FIG. 61 is a block diagram of an optical node device according to the twentieth and twenty-ninth embodiments.
Figure 62:
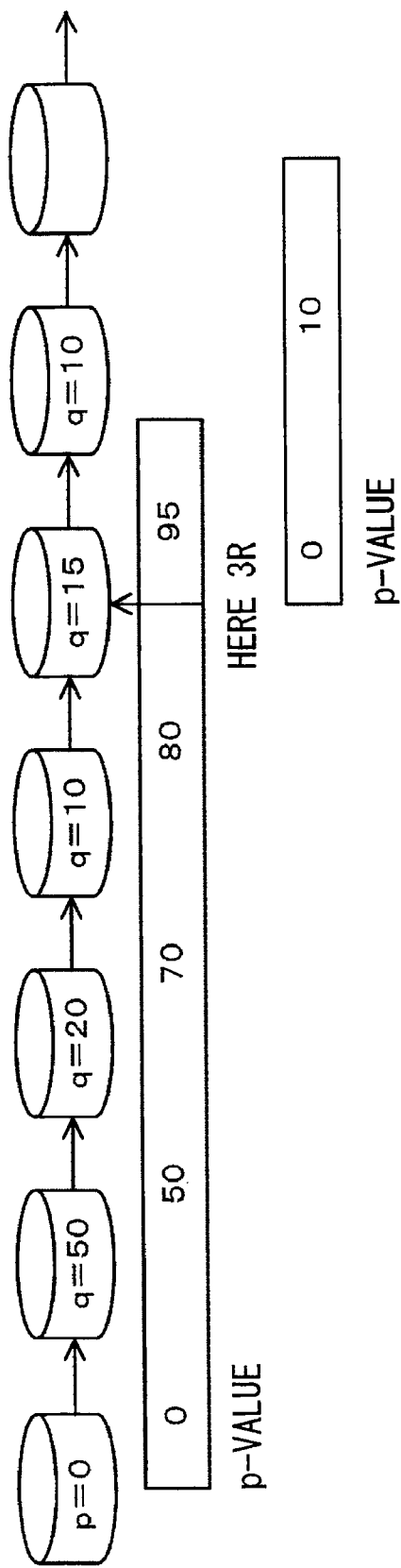
FIG. 62 shows a concept of 3R section information collection in the optical node devices according to the twentieth and twenty-ninth embodiments.
Figure 63:
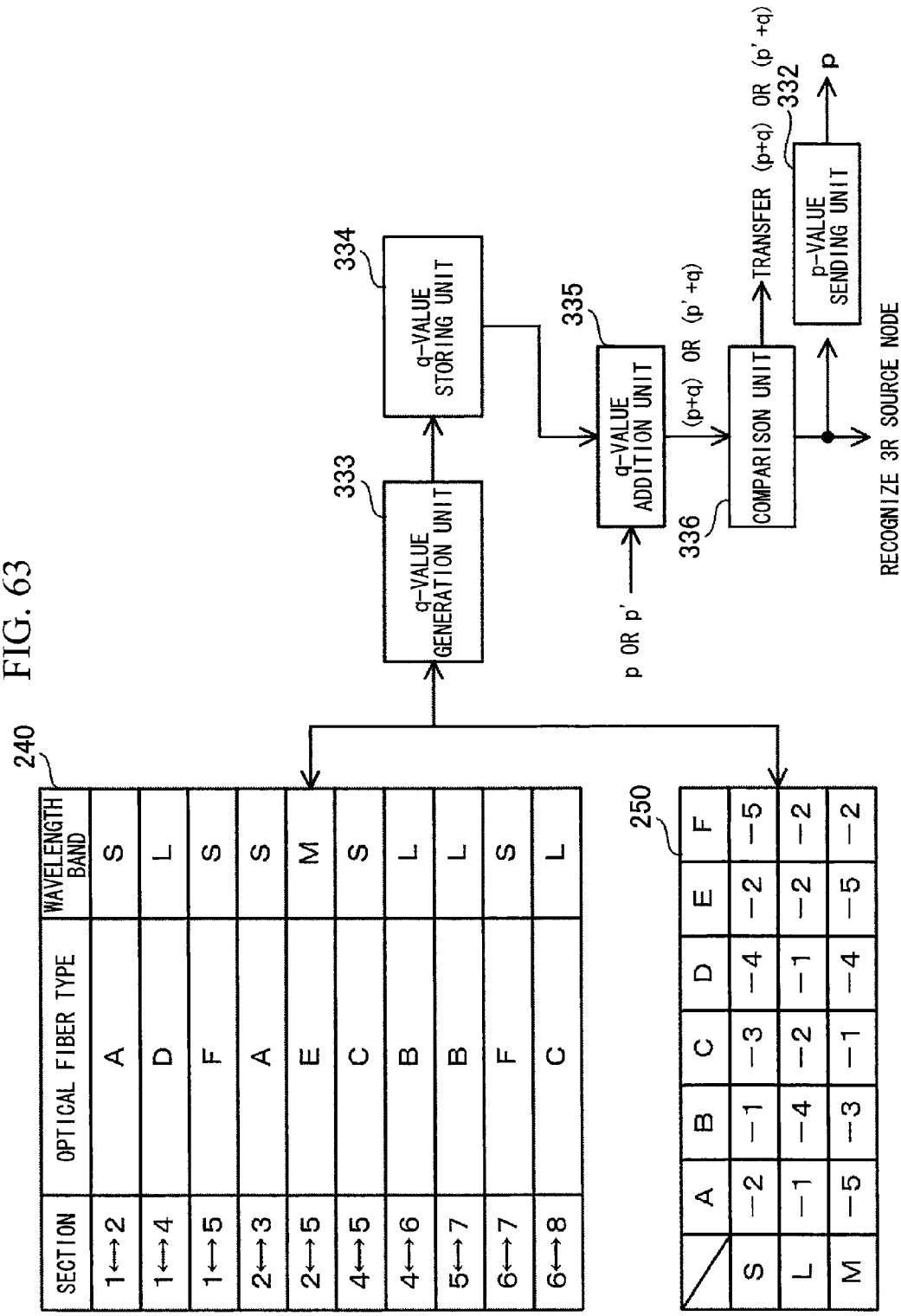
FIG. 63 is a block diagram of an optical node device according to the twentieth and twenty-ninth embodiments.

Optical node devices according to a twentieth embodiment are described with reference to FIG. 60 to FIG. 63. FIG. 60 and FIG. 62 show concepts of 3R section information collection in the optical node devices according to the twentieth embodiment. FIG. 61 and FIG. 63 are block diagrams of the optical node devices according to the twentieth embodiment.

As shown in FIG. 61, the optical node device according to the twentieth embodiment comprises: a Q-value storing unit 234 which stores a value Q, preset for each link based on the optical signal deterioration characteristic in the link between the optical node device itself and the adjacent node; a P-value sending unit 232 which transmits the initial value P of the minuend value to the next-hop adjacent optical node device if the optical node device itself is the source node; a Q-value subtraction unit 235 which calculates (P−Q) or (P'−Q) if the optical node device itself receives the initial value P or the minuend value P' which has already been reduced from the initial value P from the previous-hop adjacent optical node device; and a comparison unit 236 which compares the calculation result by this Q-value subtraction unit 235 with a threshold, then transmits the calculation result to the next-hop adjacent optical node device if the calculation result is greater than the threshold, or sends an instruction to implement the 3R relay of an optical signal that reaches the optical node device itself if the calculation result is less than or equal to the threshold, and the P-value sending unit 232 transmits the initial value P of the minuend value to the next-hop adjacent optical node device using the optical node device itself as the 3R source node if the optical node device itself is not the destination node of the optical path on which the minuend value is transmitted.

Next is a description of the operation of the optical node device according to the twentieth embodiment. The Q-value generation unit 233 generates a Q-value based on the result for the degree of optical signal deterioration of the link connected to the optical node device itself, with reference to a parameter table 240 and a degree of deterioration table 250. The Q-value is a constant which is determined in proportion to the degree of deterioration, and is provided for each link. Moreover, the Q-value is set with respect to the initial value P. For example, if the degree of optical signal deterioration of the optical node device itself is considered using the optical signal intensity and the light noise, in the case where the optical signal sent from the 3R source node is attenuated to half intensity and the error rate of the optical signal sent from the 3R source node is increased to double, the Q-value is set to 50 if the initial value P is 100. This Q-value is subtracted at each time of passing through the optical node device, and it is found that the optical node device having the subtraction result less than or equal to the threshold implements the 3R relay. Furthermore, if the optical node device itself is not the destination node of the measured optical path, the optical node device defines the optical node device itself as the 3R source node, and newly send the initial value P.

In this manner, the 3R relay implementation can be determined in the process of optical path setting. That is, if the initial value P is loaded into the optical path setting request, the optical path setting procedure can be executed while determining whether or not the optical node device itself implements the 3R relay in the respective optical node devices which receive the optical path setting request.

The twentieth embodiment up to here is described on the assumption of a downstream optical path of the unidirectional optical path or the bi-directional optical path. The following is a description on the assumption of the upstream optical path, with reference to FIG. 62 and FIG. 63. As shown in FIG. 63, the optical node device according to the twentieth embodiment comprises: a q-value storing unit 334 which stores a value q, preset for each link based on the optical signal deterioration characteristic in the link between the optical node device itself and the adjacent node; a p-value sending unit 332 which transmits the initial value p of the augend to the next-hop adjacent optical node device if the optical node device itself is the source node; a q-value addition unit 335 which calculates (p+q) or (p'+q) if the optical node device itself receives the initial value p or the augend value p', which has already been increased from the initial value p, from the previous-hop adjacent optical node device; and a comparison unit 336 which compares the calculation result by this q-value addition unit 335 with the threshold, then transmits the calculation result to the next-hop adjacent optical node device if the calculation result is less than the threshold, or sends an instruction to implement the 3R relay of an optical signal in the upstream optical path that reaches the optical node device itself if the calculation result is greater than or equal to the threshold, wherein the p-value sending unit 332 transmits the initial value p of the augend to the next-hop adjacent optical node device using the optical node device itself as the 3R destination node on the upstream optical path if the optical node device itself is not the destination node of the optical path on which the augend is transmitted.

Next is a description of the operation of the optical node device according to the twentieth embodiment. The q-value generation unit 333 generates a q-value based on the result for the degree of optical signal deterioration of the link connected to the optical node device itself, with reference to the parameter table 240 and the degree of deterioration table 250. The q-value is a constant which is determined in proportion to the degree of deterioration, and is provided for each link. Moreover, the q-value is set similarly to the case of the Q-value of the downstream optical path.

This q-value is added at each time of passing through the optical node device, and it is found that the optical node device having the addition result greater than or equal to the threshold implements the 3R relay on the upstream optical path. Furthermore, if the optical node device itself is not the destination node of the measured optical path, the optical node device defines the optical node device itself as the 3R destination node on the upstream optical path, and newly sends the initial value p. The p value is "0" in the twentieth embodiment; however the p-value may be set in consideration of various conditions. For example, the length of the 3R section to be set can be adjusted by the p-value within a range of the maximum length of the 3R section. That is, if the threshold is fixed, assuming that the p-value is a negative integer, the value capable of being added is increased more than in the case where the p-value is set to "0", enabling the 3R section to be set longer. Conversely, assuming that the p-value is a positive integer, the value capable of being added is decreased more than in the case where the p-value is set to "0", enabling the 3R section to be set shorter.

In this manner, the 3R relay implementation can be determined in the process of optical path setting. That is, if the initial value p is loaded into the optical path setting request, the optical path setting procedure can be executed while determining whether or not the optical node device itself implements the 3R relay in the respective optical node devices which receive the optical path setting request.

In the seventeenth to twentieth embodiments, in order to facilitate description, the case on the assumption of the downstream optical path and the case on the assumption of the upstream optical path were described separately. However, in practice, by performing them at the same time, the 3R section can be set both on the upstream and downstream bi-directional optical paths at the same time.

Twenty-first Embodiment

Figure 64:
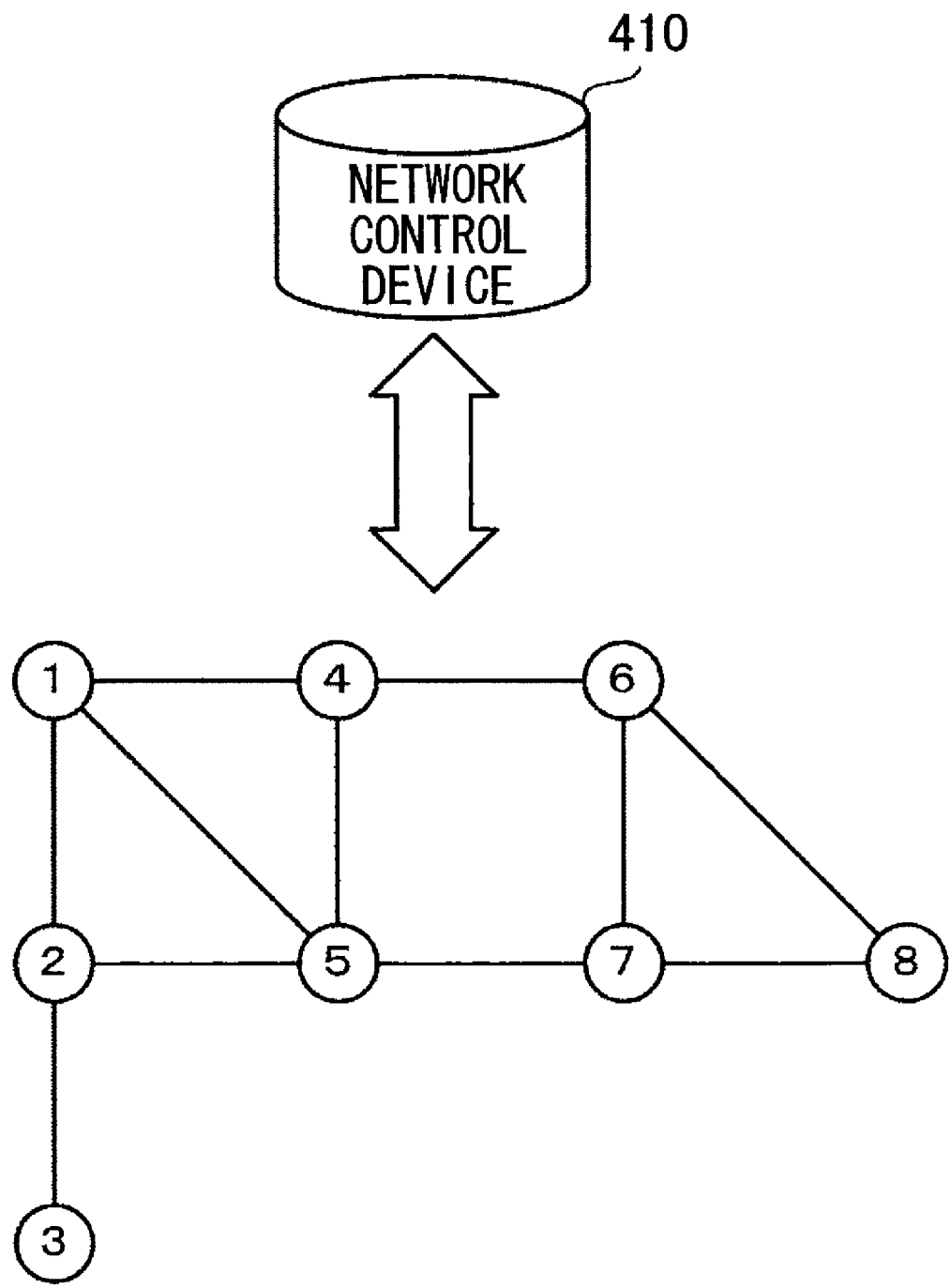
FIG. 64 shows the relation of a network control device and optical node devices in a twenty-first embodiment.
Figure 65:
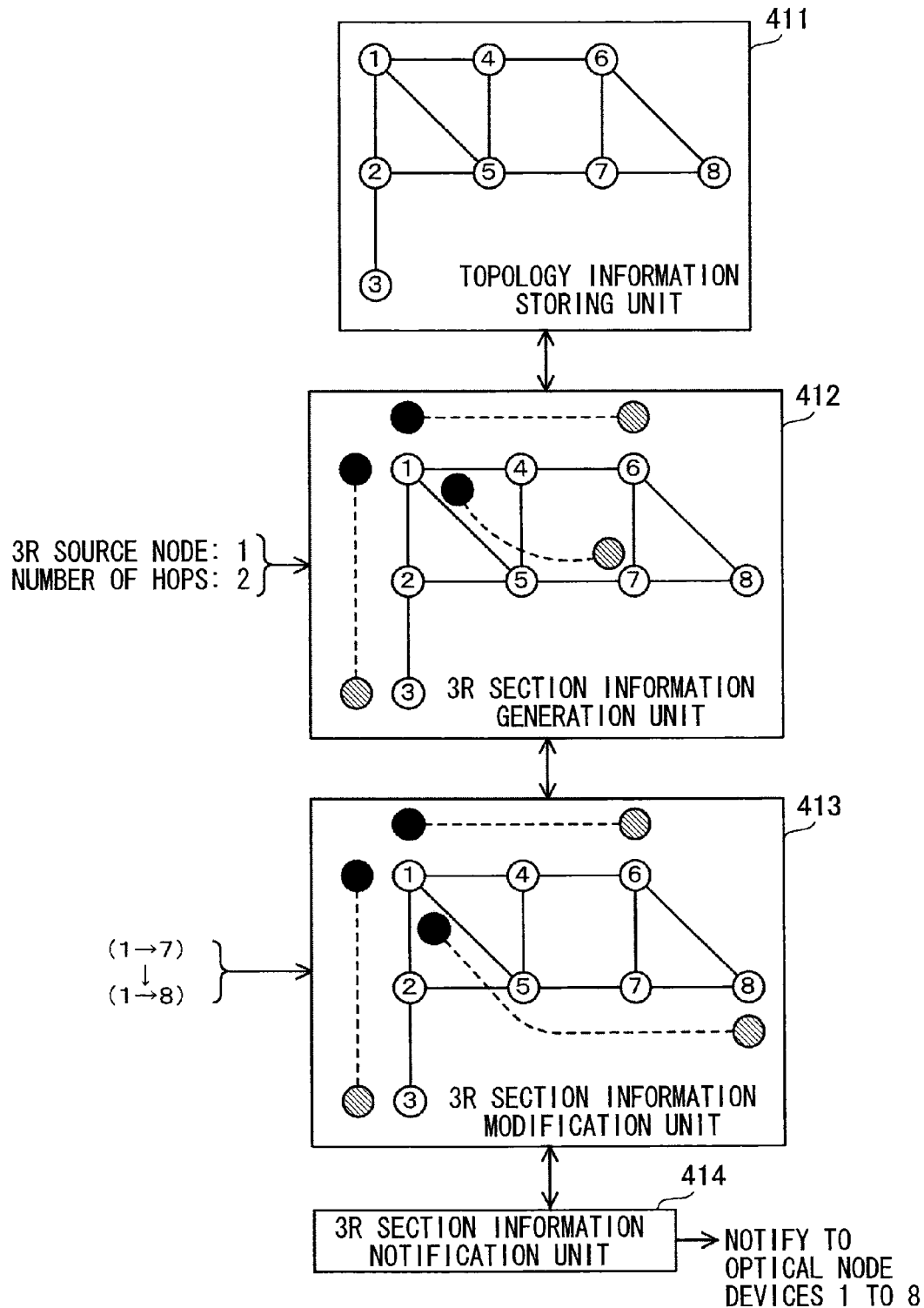
FIG. 65 is a block diagram of the network control device according to the twenty-first embodiment.
Figure 66:
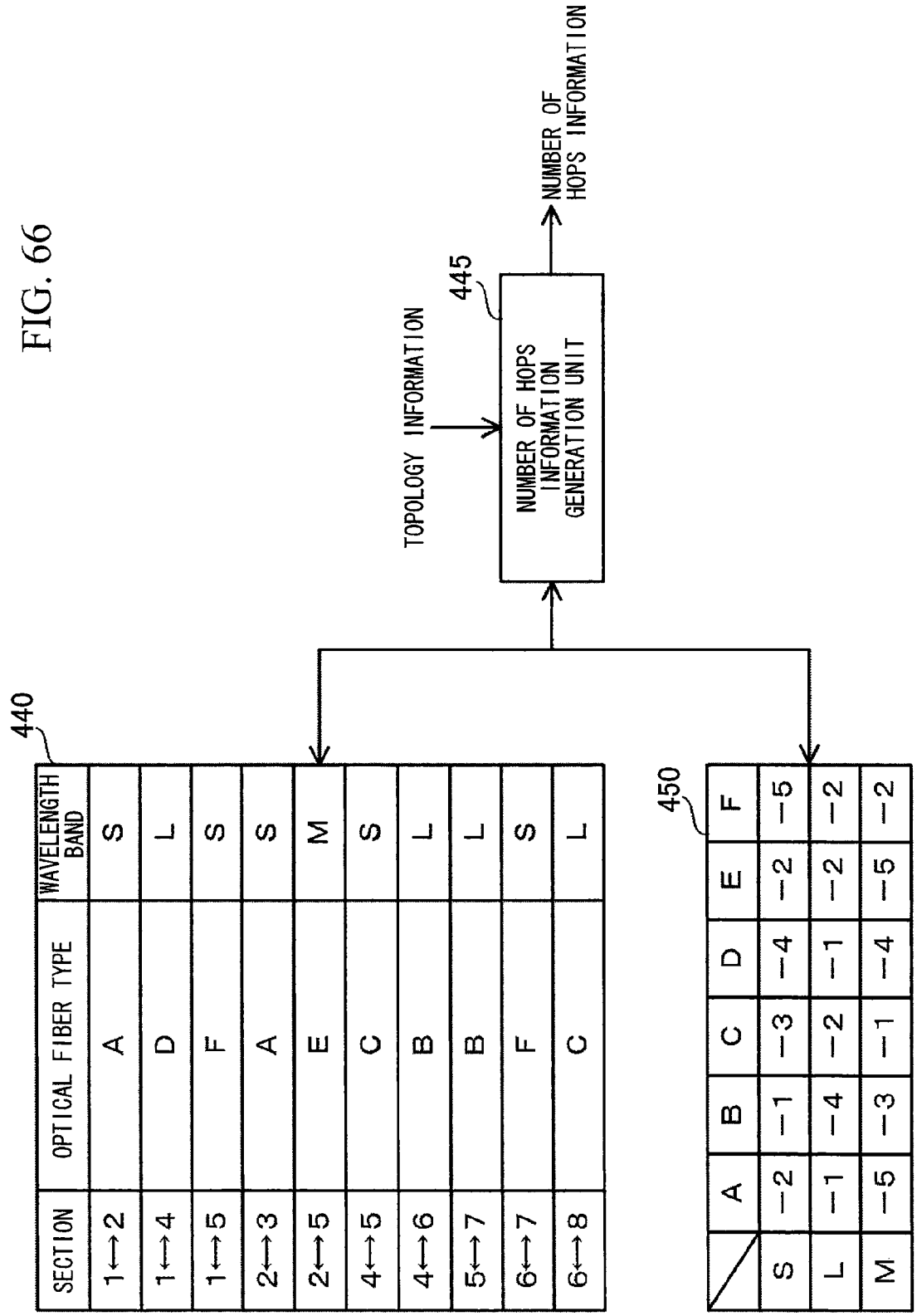
FIG. 66 is a block diagram of a maintenance-staff device according to the twenty-first embodiment.

A twenty-first embodiment according to the present invention is described with reference to FIG. 64 to FIG. 66. FIG. 64 shows the relation of a network control device and an optical network in the twenty-first embodiment. FIG. 65 is a block diagram of the network control device according to the twenty-first embodiment. FIG. 66 is a block diagram of a maintenance-staff device according to the twenty-first embodiment.

As shown in FIG. 64, the twenty-first embodiment is a network control device 410 which manages an optical network comprising a plurality of optical node devices 1 to 8 which switch the optical signal, and optical transmission paths which connect between this plurality of optical node devices 1 to 8. Here, as shown in FIG. 65, the twenty-first embodiment comprises: a topology information storing unit 411 which stores the topology information of the optical network; a 3R section information generation unit 412 which generates in the topology information, estimate information of a 3R section in which an optical node device specified is a 3R source node, based on input information of the number of hops; a 3R section information modification unit 413 which modifies a part or all of the 3R section estimate information in the topology information that was generated by this 3R section information generation unit 412, based on the input instruction; and a 3R section information notification unit 414 which notifies the information of the 3R section in the topology information that was modified by this 3R section information modification unit 413, to the optical node devices.

Next is a description of the operation of the network control device 410 according to the twenty-first embodiment. As shown in FIG. 64, the network control device 410 integrally manages the optical network comprising the optical node devices 1 to 8. That is, the respective optical node devices 1 to 8 communicate with the network control device 410, so that they recognize a role which has been assigned to the optical node device itself on the optical network, and activate the function corresponding to the role. Moreover, the network control device 410 aggregates and stores various information from the respective optical node devices 1 to 8, and executes various calculations and processing required for the optical network management, based on the aggregated information.

Here is a description of an embodiment where the network control device 410 generates the 3R section information. The topology information storing unit 411 stores the topology information of the optical network shown in FIG. 64. The information is updated at regular intervals. Alternatively, it is updated at each time when the topology is modified. Subsequently, the 3R section estimate information using the optical node device specified based on input information of the number of hops as the 3R source node, is generated in this topology information. In the example of FIG. 65, the information of the number of hops is "2" and the 3R source node is the optical node device 1.

Accordingly, the estimated information for three 3R sections of 1->2->3, 1->4->6, and 1->5->7 is generated in the topology information of the 3R section information generation unit 412. Subsequently, the modified information of the 3R section estimate information which is desired to be modified is input into the 3R section information modification unit 413. In the example of FIG. 64, an instruction to modify the 3R section from 1->5->7 to 1->5->7->8 is input. Such instruction to modify is performed in a case where a user who frequently uses the section 1->5->7->8 confirms by measurement, that the section 1->5->7->8 is the 3R section.

The 3R section information modified in such manner is notified to the respective optical node devices 1 to 8 by the 3R section information notification unit 414. This notification may be performed at each time when the 3R section information is modified, or the respective optical node devices 1 to 8 may request the notification from the network control device 410 as necessary.

Here is a description of a method of determining the information of the number of hops input into the 3R section information generation unit 412. The information of the number of hops is determined by estimating the 3R section and the number of hops thereof. However, a maintenance-staff device which has a function of automatically calculating the information of the number of hops is described in the twenty-first embodiment.

As shown in FIG. 66, the maintenance-staff device according to the twenty-first embodiment comprises: an information of the number of hops generation unit 445 which generates the information on the number of hops; a parameter table 440 which stores the topology information of the optical network together with the information on the optical fiber type and the wavelength band used in the optical network; and a degree of deterioration table 450 which records the relation between the optical fiber type and the wavelength band, and the degree of optical signal deterioration per unit section, wherein the information of the number of hops generation unit 445 compares the information on the optical fiber type and the wavelength band in the topology information obtained with reference to the parameter table 440, with the optical fiber type and the wavelength band and the degree of optical signal deterioration per unit section recorded in the degree of deterioration table 450, and generates the information on the number of hops.

Next is a description of the operation of the maintenance-staff device according to the twenty-first embodiment. The information of the number of hops generation unit 445 refers to the topology information to estimate the 3R section, using for example the optical node device 1 as the 3R source node. The parameter table 440 and the degree of deterioration table 450 are used for this estimation.

Here is a description of the estimating procedure of the information of the number of hops if the optical node device 1 is the 3R source node. Assuming that an optical path is set from the optical node device 1 to the optical node device 4, then from the parameter table 440, the optical fiber type where the optical path is set is D, and the wavelength band is L. Next, the degree of deterioration of a combination of the optical fiber type D and the wavelength band L is examined with reference to the degree of deterioration table 450. The result is "−1".

Subsequently, assuming that an optical path is set from the optical node device 4 to the optical node device 6, then from the parameter table 440, the optical fiber type where the optical path is set is B and the wavelength band is L. Next, the degree of deterioration of a combination of the optical fiber type B and the wavelength band L is examined with reference to the degree of deterioration table 450. The result is "−4". From these results, the degree of deterioration from the optical node device 1 to the optical node device 6 is "−5".

Subsequently, assuming that an optical path is set from the optical node device 6 to the optical node device 8, then from the parameter table 440, the optical fiber type where the optical path is set is C and the wavelength band is L. Next, the degree of deterioration of a combination of the optical fiber type C and the wavelength band L is examined with reference to the degree of deterioration table 450. The result is "−2". From these results, the degree of deterioration from the optical node device 1 to the optical node device 8 is "−7".

Here, for example if it is apparent that the 3R relay is not required for the degree of deterioration up to "−5", it becomes apparent that the 3R relay is not required for the optical node device up to 1->4->6. From the result obtained in this manner, the number of hops of the 3R section is estimated and it is given to the 3R section information generation unit 412 of the network control device 410.

The twenty-first embodiment up to here is described on the assumption of a downstream optical path of the unidirectional optical path or the bi-directional optical path. Since it can be readily inferred that the 3R section information of the upstream optical path can be generated in a similar procedure to that of the downstream optical path, detailed description is omitted.

Twenty-second Embodiment

Figure 67:
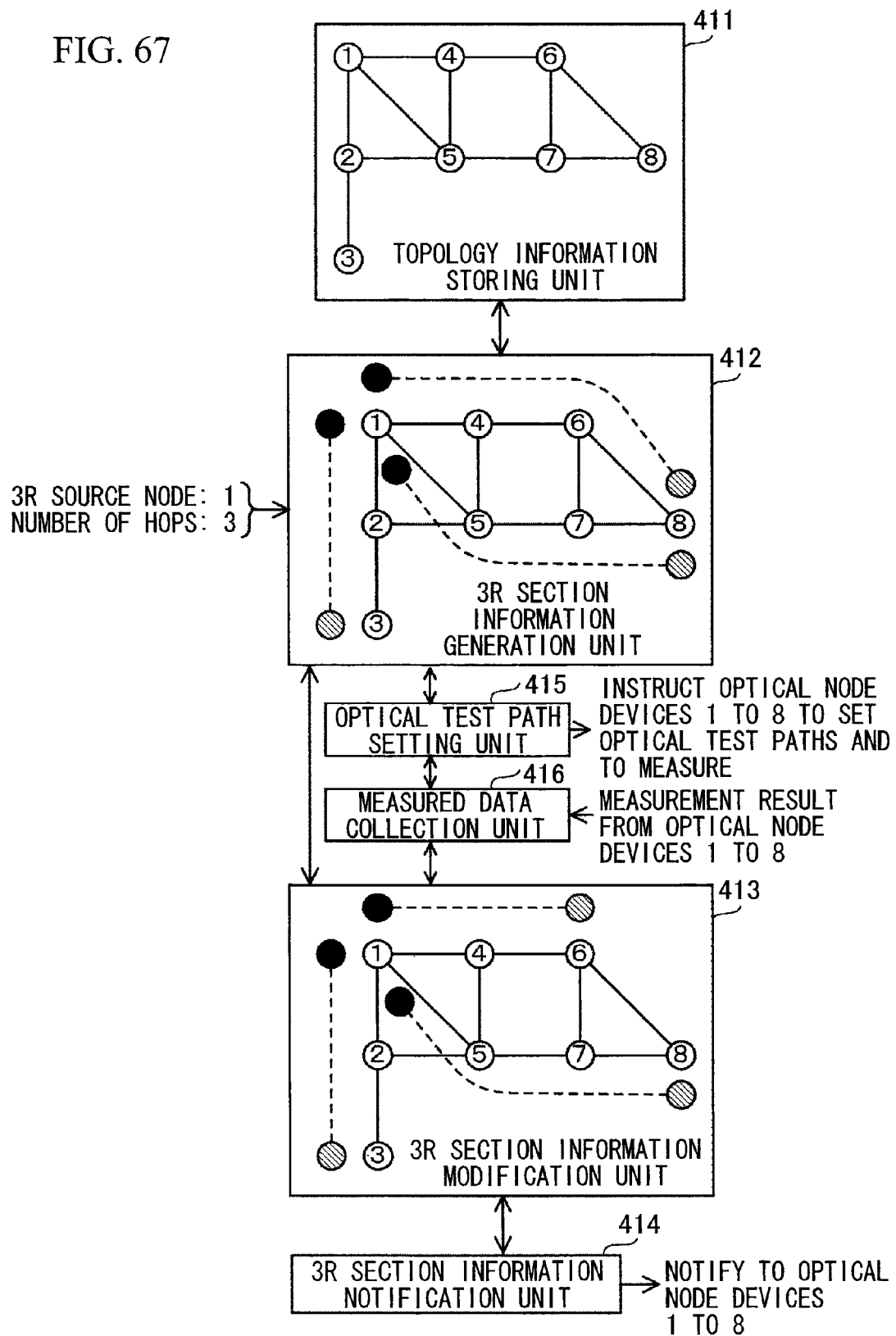
FIG. 67 is a block diagram of a network control device according to a twenty-second embodiment.
Figure 68:
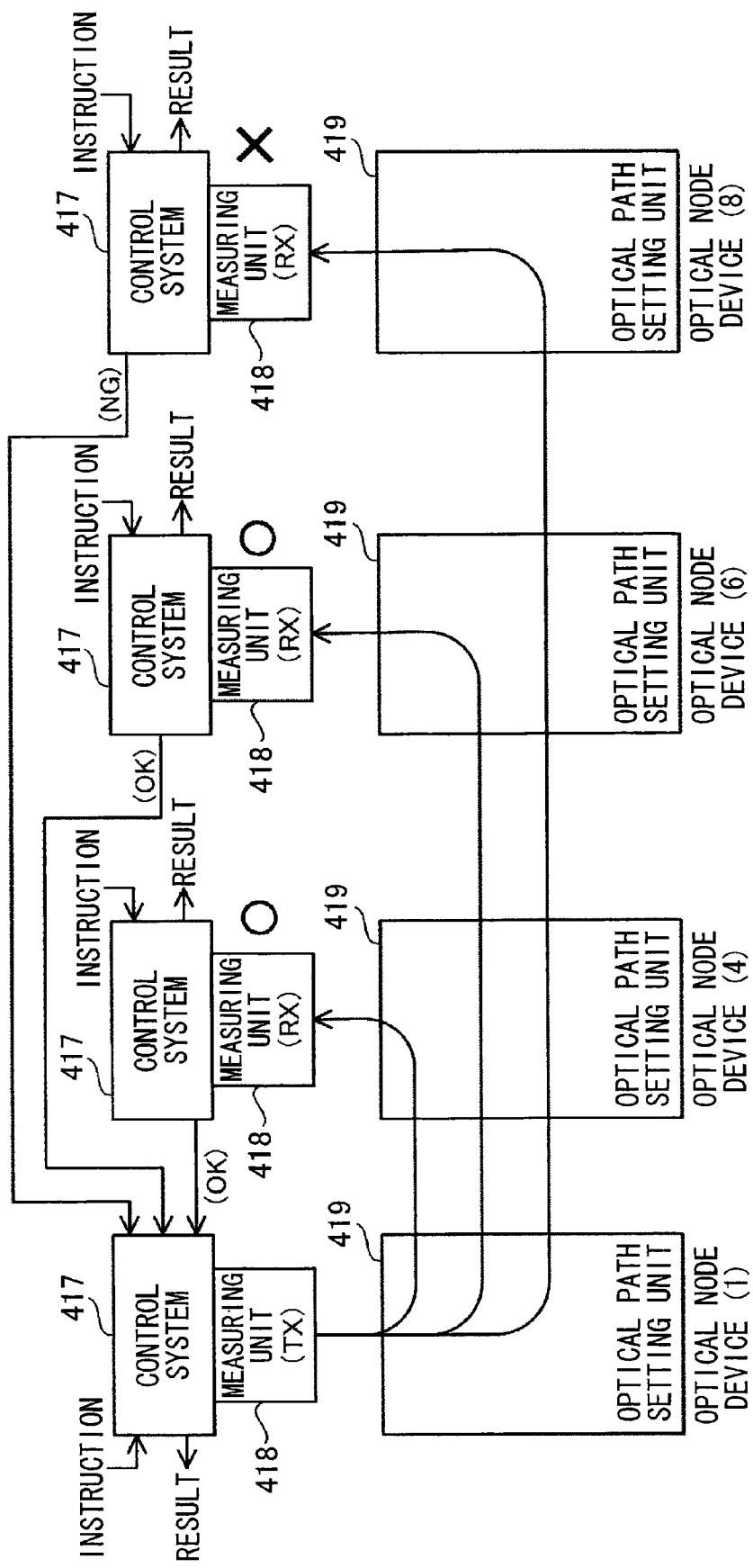
FIG. 68 is an explanatory diagram of an optical node device which measures based on an instruction from the network control device according to the twenty-second embodiment.
Figure 69:
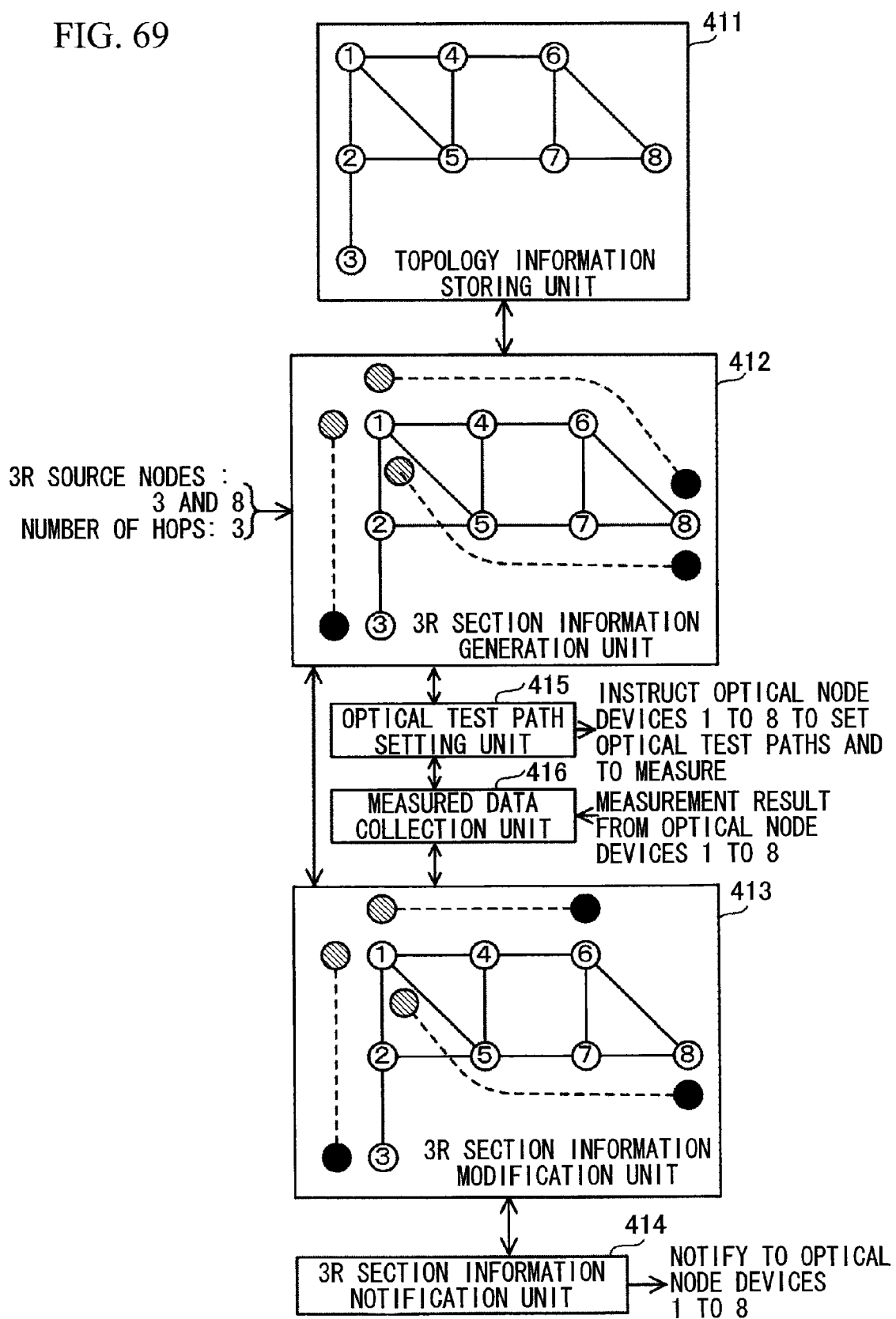
FIG. 69 is a block diagram of a network control device according to the twenty-second embodiment.
Figure 70:
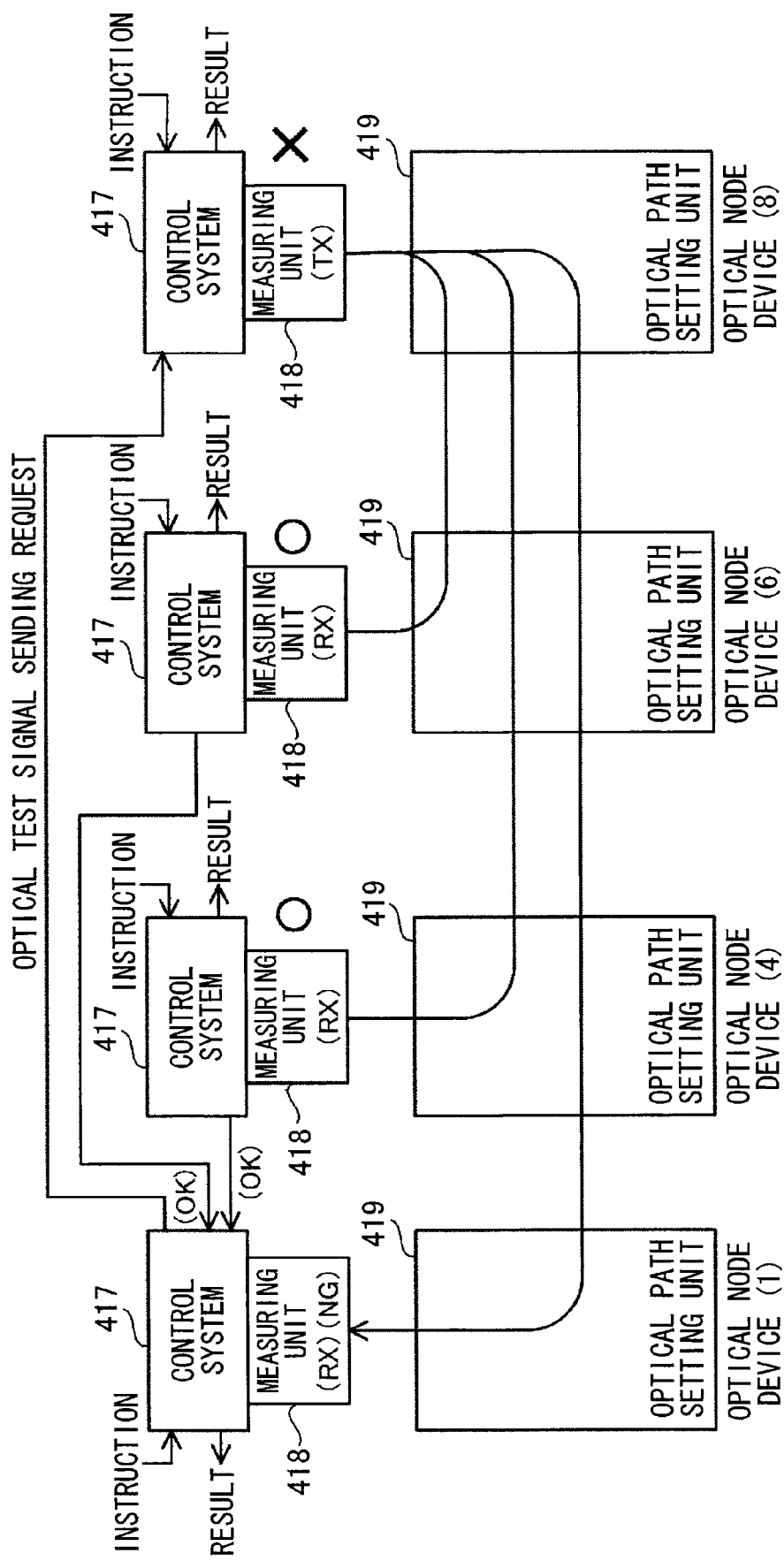
FIG. 70 is an explanatory diagram of the optical node device which measures based on an instruction from the network control device according to the twenty-second embodiment.

A twenty-second embodiment is described with reference to FIG. 51 that was referred to in the seventeenth embodiment, and to FIG. 67 to FIG. 70. FIG. 67 and FIG. 69 are block diagrams of the network control device according to the twenty-second embodiment. FIG. 68 and FIG. 70 are explanatory diagrams of an optical node device which measures based on an instruction from the network control device according to the twenty-second embodiment. The block diagram of the measuring unit of the present embodiment is similar to that of FIG. 51.

As shown in FIG. 67, a network control device 410 according to the twenty-second embodiment comprises: a topology information storing unit 411 which stores the topology information of the optical network; a 3R section information generation unit 412 which generates in the topology information, estimate information of a 3R section in which an optical node device 1 specified is the 3R source node based on input information of the number of hops; an optical test path setting unit 415 which instructs the optical node devices 1 to 8 to set optical test paths on the section in the optical network corresponding to the 3R section estimate information in the topology information that was generated by this 3R section information generation unit 412; a measured data collection unit 416 which collects the measurement results of the degree of optical signal deterioration in the optical test path set by this optical test path setting unit 415 of the optical node devices 1 to 8; a 3R section information modification unit 413 which modifies a part or all of the 3R section estimate information in the topology information that was generated by the 3R section information generation unit 412, based on the measurement result of the degree of optical signal deterioration collected by this measured data collection unit 416; and a 3R section information notification unit 414 which notifies the information of the 3R section in the topology information that was modified by this 3R section information modification unit 413, to the optical node devices 1 to 8.

Next is a description of the operation of the network control device 410 according to the twenty-second embodiment. As shown in FIG. 64, the network control device 410 integrally manages the optical network comprising the optical node devices 1 to 8. That is, the respective optical node devices 1 to 8 communicate with the network control device 410, so that they recognize a role which has been assigned to the optical node device itself on the optical network, and activate the function corresponding to the role. Moreover, the network control device 410 aggregates and stores various information from the respective optical node devices 1 to 8, and executes various calculations and processing required for the optical network management, based on the aggregated information.

Here is a description of an embodiment where the network control device 410 generates the 3R section information. The topology information storing unit 411 stores the topology information of the optical network shown in FIG. 64. The information is updated at regular intervals. Alternatively, it is updated at each time when the topology is modified. Subsequently, the 3R section estimate information using the optical node device specified based on input information of the number of hops as the 3R source node, is generated in this topology information. In the example of FIG. 67, the information of the number of hops is "3" and the 3R source node is the optical node device 1.

Accordingly, the estimated information for three 3R sections of 1->2->3, 1->4->6->8, and 1->5->7->8 is generated in the topology information of the 3R section information generation unit 412. Subsequently, the optical test path setting unit 415 instructs the optical node devices 1 to 8 to actually set the optical test path on the 3R section generated by the 3R section information generation unit 412, so as to measure.

The 3R section measuring procedure in the optical node devices 1, 4, 6, and 8 is described with reference to FIG. 68. When an instruction from the optical test path setting unit 415 arrives at the control system 417 of the respective optical node devices 1, 4, 6, or 8, the respective optical node devices 1, 4, 6, or 8 recognize their own role and activate their functions. That is, the optical node device 1 recognizes that the optical node device 1 itself is the 3R source node and sets the optical test path up to the optical node device 8, ensures the resources required for optical test path setting up to the adjacent optical node device 4, and sends an optical test path setting request to the optical node device 4. The optical node device 4 receives the optical test path setting request from the optical node device 1, ensures the resources required for optical test path setting up to the adjacent optical node device 6, and sends the optical test path setting request to the optical node device 6. The optical node device 6 receives the optical test path setting request from the optical node device 4, ensures the resources required for optical test path setting up to the adjacent optical node device 8, and sends the optical test path setting request to the optical node device 8. The optical node device 8 receives the optical test path setting request from the optical node device 6, performs the optical test path setting between the optical node device 6, and sends an optical test path setting completion notification for notifying the completion of the setting to the optical node device 6. The optical node device 6 receives the optical test path setting completion notification from the optical node device 8, performs the optical test path setting between the optical node device 4, and sends the optical test path setting completion notification for notifying the completion of the setting to the optical node device 4. The optical node device 4 receives the optical test path setting completion notification from the optical node device 6, performs the optical test path setting between the optical node device 1, and sends the optical test path setting completion notification for notifying the completion of the setting to the optical node device 1. These optical test path settings are performed by the optical path setting unit 419.

The optical node device 1 receives the optical test path setting completion notification from the optical node device 4, recognizes that the optical test path was set up to the optical node device 8, and sends an optical test signal from the transmitter (TX) of the measuring unit 418 to the optical test path. This optical test signal is received by the receiver (RX) of the measuring units 418 of the respective optical node devices 4, 6, and 8. The measuring unit 418 of the respective optical node devices 4, 6, and 8 which receive the optical test signal determines the degree of deterioration of the optical test signal and notifies the result to the control system 417 of the optical node device 1. The control system 417 of the optical node device 1 which receives these notifications recognizes that the 3R relay is not required up to the optical node devices 4 and 6, and notifies the measurement result to the network control device 410. The optical node device 1 also measures the section 1->2->3 and the section 1->5->7->8 in a similar manner.

As described with reference to FIG. 51, the measuring unit 418 measures the light noise of the optical signal by a light noise observation unit 225, and the light intensity of the optical signal by a light intensity observation unit 226. This measurement result is aggregated by a measured data generation unit 231. The measuring unit 418 in other embodiments has a similar configuration.

The measured data collection unit 416 of the network control device 410 collects the measurement result notified from the optical node device 1, and transmits it to the 3R section information modification unit 413. The 3R section information modification unit 413 modifies the 3R section estimate information generated by the 3R section information generation unit 412, based on the measurement result transmitted from the measured data collection unit 416. As a result, the 3R section 1->4->6->8 is modified into 1->4->6. The 3R section information modified by the 3R section information modification unit 413 is notified to the respective optical node devices 1 to 8 by the 3R section information notification unit 414. This notification may be performed at each time when the 3R section information is modified, or the respective optical node devices 1 to 8 may request the notification from the network control device 410 as necessary.

The twenty-second embodiment up to here is described on the assumption of a downstream optical path of the unidirectional optical path or the bi-directional optical path. The following is a description on the assumption of the upstream optical path, with reference to FIG. 69 and FIG. 70. As shown in FIG. 64, the network control device 410 integrally manages the optical network comprising the optical node devices 1 to 8. That is, the respective optical node devices 1 to 8 communicate with the network control device 410, so that they recognize a role which has been assigned to the optical node device itself on the optical network, and activate the function corresponding to the role. Moreover, the network control device 410 aggregates and stores various information from the respective optical node devices 1 to 8, and executes various calculations and processing required for the optical network management, based on the aggregated information.

Here is a description of an embodiment where the network control device 410 generates the 3R section information. The topology information storing unit 411 stores the topology information of the optical network shown in FIG. 64. The information is updated at regular intervals. Alternatively, it is updated at each time when the topology is modified. Subsequently, the 3R section estimate information using the optical node device specified based on input information of the number of hops as the 3R source node, is generated in this topology information. In the example of FIG. 69, the information of the number of hops is "3" and the 3R source nodes are the optical node devices 3 and 8.

Accordingly, the estimated information for three 3R sections of 3->2->1, 8->6->4->1, and 8->7->5->1 is generated on the topology information of the 3R section information generation unit 412. Subsequently, the optical test path setting unit 415 instructs the optical node devices 1 to 8 to actually set the optical test paths on the 3R sections generated by the 3R section information generation unit 412, so as to measure.

The 3R section measuring procedure in the optical node devices 1, 4, 6, and 8 is described with reference to FIG. 70. When an instruction from the optical test path setting unit 415 arrives at the control system 417 of the respective optical node devices 1, 4, 6, or 8, the respective optical node devices 1, 4, 6, or 8 recognize their own role and activate their functions. That is, the optical node device 1 recognizes that the optical node device 1 itself is the 3R destination node on the upstream optical path and sets the optical test path up to the optical node device 8, ensures the resources required for optical test path setting up to the adjacent optical node device 4, and sends an optical test path setting request to the optical node device 4. The optical node device 4 receives the optical test path setting request from the optical node device 1, ensures the resources required for optical test path setting up to the adjacent optical node device 6, and sends the optical test path setting request to the optical node device 6. The optical node device 6 receives the optical test path setting request from the optical node device 4, ensures the resources required for optical test path setting up to the optical node device 8, and sends the optical test path setting request to the optical node device 8. The optical node device 8 receives the optical test path setting request from the optical node device 6, performs the optical test path setting between the optical node device 6, and sends an optical test path setting completion notification for notifying the completion of the setting to the optical node device 6. The optical node device 6 receives the optical test path setting completion notification from the optical node device 8, performs the optical test path setting between the optical node device 4, and sends the optical test path setting completion notification for notifying the completion of the setting to the optical node device 4. The optical node device 4 receives the optical test path setting completion notification from the optical node device 6, performs the optical test path setting between the optical node device 1, and sends the optical test path setting completion notification for notifying the completion of the setting to the optical node device 1. These optical test path settings are performed by the optical path setting unit 419.

The optical node device 1 receives the optical test path setting completion notification from the optical node device 4, and recognizes that the optical test path was set up to the optical node device 8. Subsequently, the optical node device 1 requests the optical node device 8 to send an optical test signal. The optical node device 8 which receives this request sends the optical test signal from the transmitter (TX) of the measuring unit 418 to the upstream optical test path. This optical test signal is received by the receiver (RX) of the measuring units 418 of the respective optical node devices 6, 4, and 1. The measuring unit 418 of the respective optical node devices 6 and 4 which receive the optical test signal determines the degree of deterioration of the optical test signal and notifies the result to the control system 417 of the optical node device 1. The control system 417 of the optical node device 1 which receives these notifications recognizes that the 3R relay is not required for the optical node devices 4 and 6 but is required for the optical node device 1 due to a lot of deterioration in the optical test signal received by itself (optical node device 1), and notifies the measurement result to the network control device 410. The optical node device 1 also measures the section 3->2->1 and the section 8->7->5->1 in a similar manner.

The measured data collection unit 416 of the network control device 410 collects the measurement result notified from the optical node device 1, and transmits it to the 3R section information modification unit 413. The 3R section information modification unit 413 modifies the 3R section estimate information generated by the 3R section information generation unit 412, based on the measurement result transmitted from the measured data collection unit 416. As a result, the 3R section 8->6->4->1 is modified into 6->4->1. The 3R section information modified by the 3R section information modification unit 413 is notified to the respective optical node devices 1 to 8 by the 3R section information notification unit 414. This notification may be performed at each time when the 3R section information is modified, or the respective optical node devices 1 to 8 may request the notification from the network control device 410 as necessary.

In this manner, the network control device 410 of the twenty-second embodiment measures the estimate value of the number of hops which was initially given to the 3R section information generation unit 412, and modifies it, so that accurate 3R section information can be obtained eventually. Therefore, a maximum value estimated as possible for the 3R section is desirably given as the estimate value of the number of hops to give to the 3R section information generation unit 412. Alternatively, the number of hops slightly exceeding the maximum value may be given, in anticipation of amendment by measurement. Accordingly, a 3R section as large as possible can be set on the optical network, so that it is possible to constitute an economical optical network by effectively using network resources by using the minimum number of, or minimum capacity of, the 3R repeater.

Twenty-third Embodiment

Figure 71:
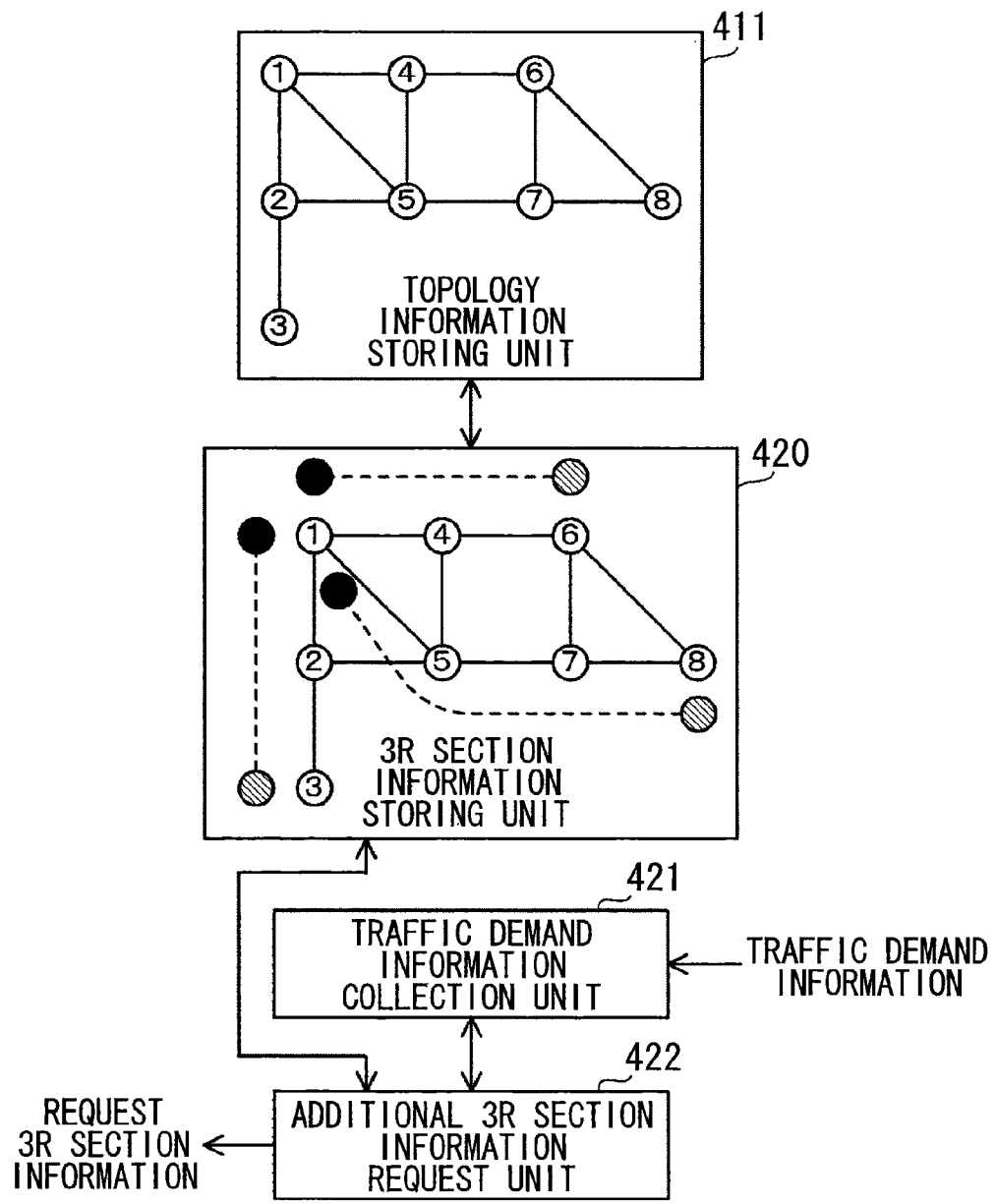
FIG. 71 is a schematic block diagram of a network control device according to a twenty-third embodiment.
Figure 72:
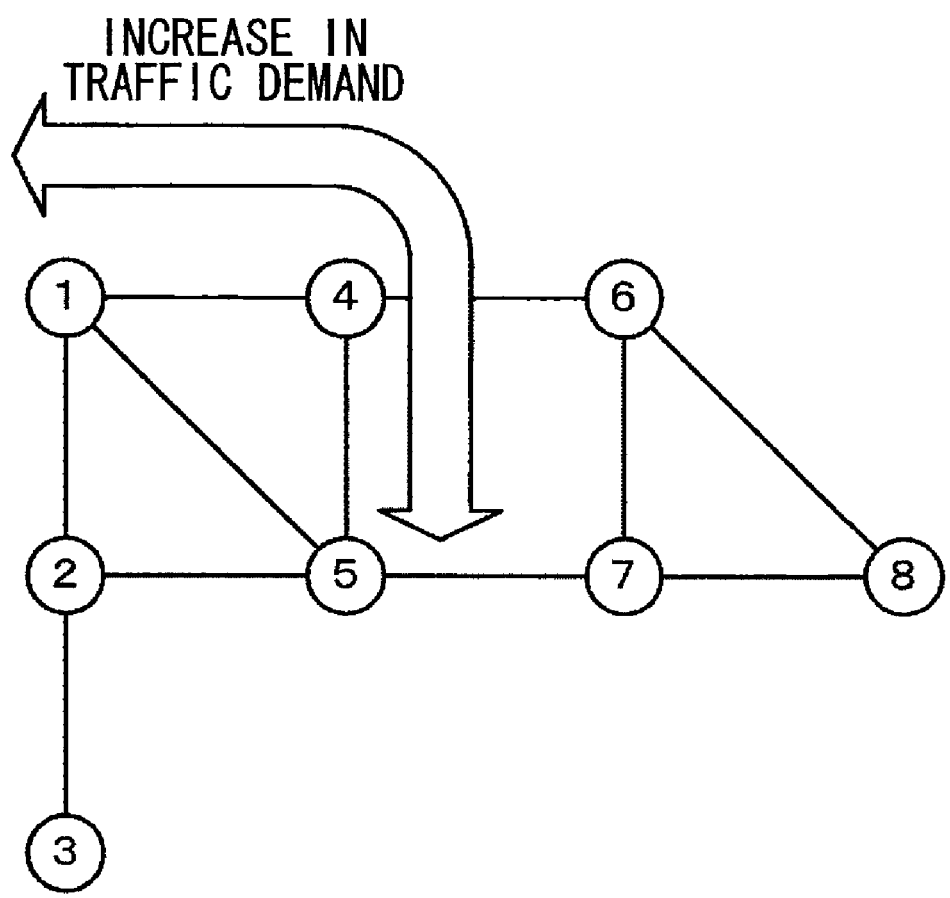
FIG. 72 is an explanatory diagram of traffic demand information collection in the network control device according to the twenty-third and twenty-fourth embodiments.

A twenty-third embodiment is described with reference to FIG. 71 and FIG. 72. FIG. 71 is a schematic block diagram of a network control device according to the twenty-third embodiment. FIG. 72 is an explanatory diagram of traffic demand information collection in the network control device according to the twenty-third embodiment.

As shown in FIG. 71, a network control device 410 according to the twenty-third embodiment comprises: a topology information storing unit 411 which stores the topology information of the optical network; a 3R section information storing unit 420 which stores a 3R section set in the optical network, corresponding to the topology information; a traffic demand information collection unit 421 which collects the traffic demand information in the optical network; and an additional 3R section information request unit 422 which refers to the information of the 3R section information storing unit 420, based on the traffic demand information collected by this traffic demand information collection unit 421, to notify the section not having 3R section information generated yet among the sections having the traffic demand increased, to the maintenance-staff.

Next is a description of the operation of the network control device 410 according to the twenty-third embodiment. The network control device 410 according to the twenty-third embodiment stores the 3R section information on the optical network that is already obtained in the 3R section information storing unit 420. The respective optical node device 1 to 8 measure the traffic in links connected to the optical node devices themselves. The traffic demand information collection unit 421 collects the traffic demand information in links connected to the respective optical node devices 1 to 8 notified by the optical node devices 1 to 8. Since the traffic measurement for the respective optical node devices 1 to 8 is a well-known technique, detailed description is omitted. This traffic demand information is transmitted to the additional 3R section information request unit 422.

Now, as shown in FIG. 72, if the additional 3R section information request unit 422 detects that the traffic demand in a section 1->4->5 is increased, it refers to the 3R section information storing unit 420. Then, when it becomes apparent that there is no 3R section information of the section 1->4->5, the additional 3R section information request unit 422 requests the 3R section information of the section 1->4->5 from the maintenance-staff. The maintenance-staff who receive this request generate the 3R section information using the function of the network control device described for embodiment in the twenty-first embodiment or the twenty-second embodiment.

The twenty-third embodiment up to here is described on the assumption of a downstream optical path of the unidirectional optical path or the bi-directional optical path. Since it can be readily inferred that the 3R section information of the upstream optical path can be generated in a similar procedure to that of the downstream optical path, detailed description is omitted.

Twenty-fourth Embodiment

Figure 73:
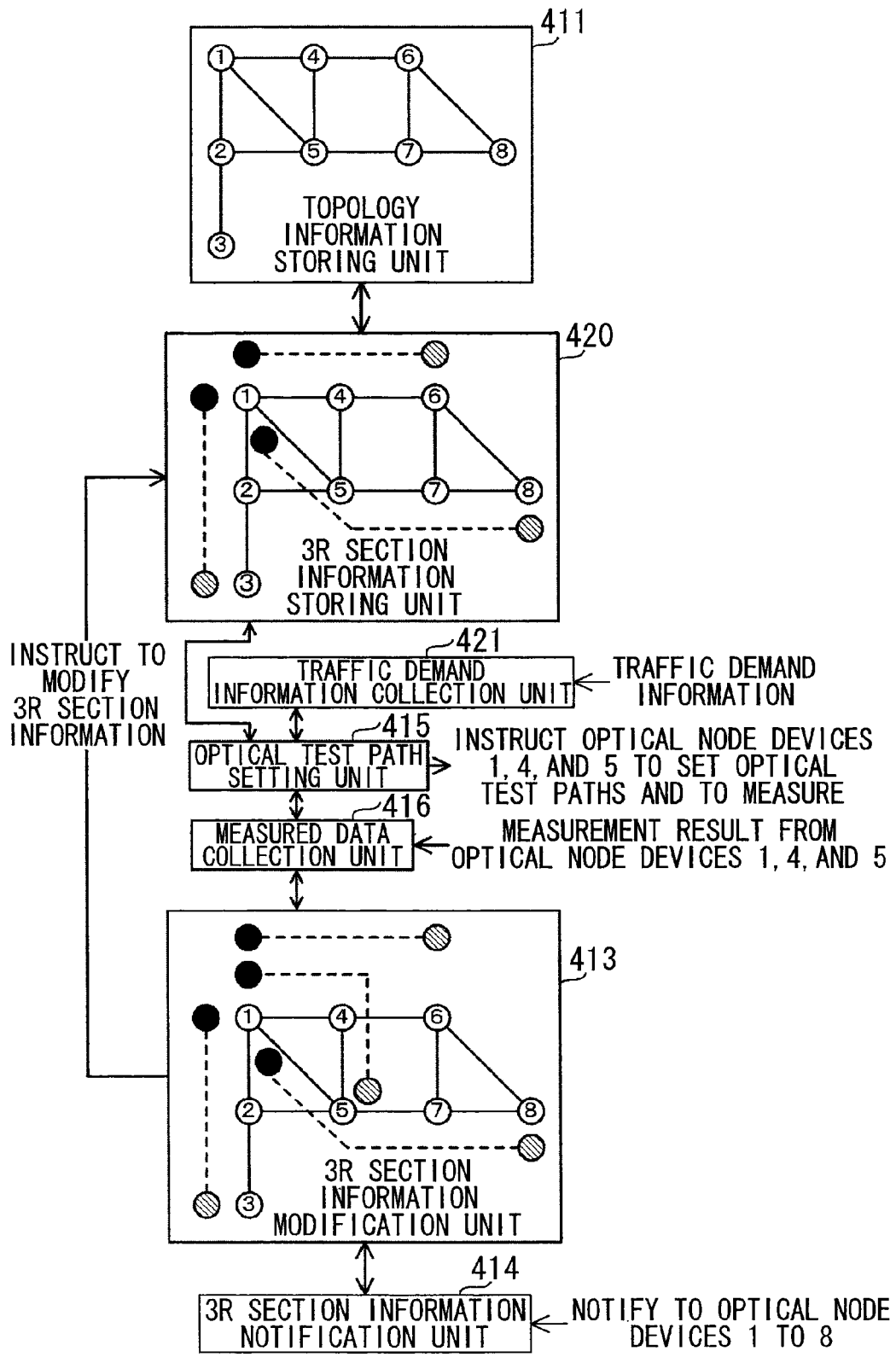
FIG. 73 is a schematic block diagram of the network control device according to the twenty-fourth embodiment.

A network control device according to a twenty-fourth embodiment is described with reference to FIG. 72 and FIG. 73. FIG. 72 is an explanatory diagram of traffic demand information collection in the network control device according to the twenty-fourth embodiment, used in common with the twenty-third embodiment. FIG. 73 is a schematic block diagram of a network control device according to the twenty-fourth embodiment.

As shown in FIG. 73, a network control device 410 according to the twenty-fourth embodiment comprises: a topology information storing unit 411 which stores the topology information of the optical network; a 3R section information storing unit 420 which stores a 3R section set in the optical network, corresponding to the topology information; a traffic demand information collection unit 421 which collects the traffic demand information in the optical network; an optical test path setting unit 415 which refers to the information of the 3R section information storing unit 420, based on the traffic demand information collected by this traffic demand information collection unit 421, to newly generate the 3R section information of the section not having 3R section information generated yet among the sections having the traffic demand increased; a measured data collection unit 416; and a 3R section information modification unit 413.

Next is a description of the operation of the network control device 410 according to the twenty-fourth embodiment. The network control device 410 according to the twenty-fourth embodiment stores the 3R section information on the optical network that is already obtained in the 3R section information storing unit 420. The respective optical node device 1 to 8 measure the traffic in links connected to the optical node devices themselves. The traffic demand information collection unit 421 collects the traffic demand information in links connected to the respective optical node devices 1 to 8 notified by the optical node device 1 to 8. Since the traffic measurement for the respective optical node devices 1 to 8 is a well-known technique, detailed description is omitted. This traffic demand information is transmitted to the optical test path setting unit 415.

Now, as shown in FIG. 72, if the optical test path setting unit 415 detects that the traffic demand in a section 1->4->5 is increased, it refers to the 3R section information storing unit 420. Then, when it becomes apparent that there is no 3R section information of the section 1->4->5, the optical test path setting unit 415 instructs the optical node devices 1, 4, and 5 to set the optical test path and to measure the 3R section information. The measured data collection unit 416 collects the measurement result of the 3R section information from the optical node devices 1, 4, and 5. If the measurement result shows that it is possible to use the section 1->4->5 as the 3R section, the 3R section information modification unit 413 is instructed to use the section 1->4->5 as a new 3R section. When the 3R section information modification unit 413 receives the instruction, it modifies the 3R section information, instructs the 3R section information storing unit 420 to modify the 3R section information, and transmits the modified contents to the 3R section information notification unit 414. The 3R section information notification unit 414 notifies the modified contents to the respective optical node devices 1 to 8.

The twenty-fourth embodiment up to here is described on the assumption of a downstream optical path of the unidirectional optical path or the bi-directional optical path. Since it can be readily inferred that the 3R section information of the upstream optical path can be generated in a similar procedure to that of the downstream optical path, detailed description is omitted.

Twenty-fifth Embodiment

Figure 74:
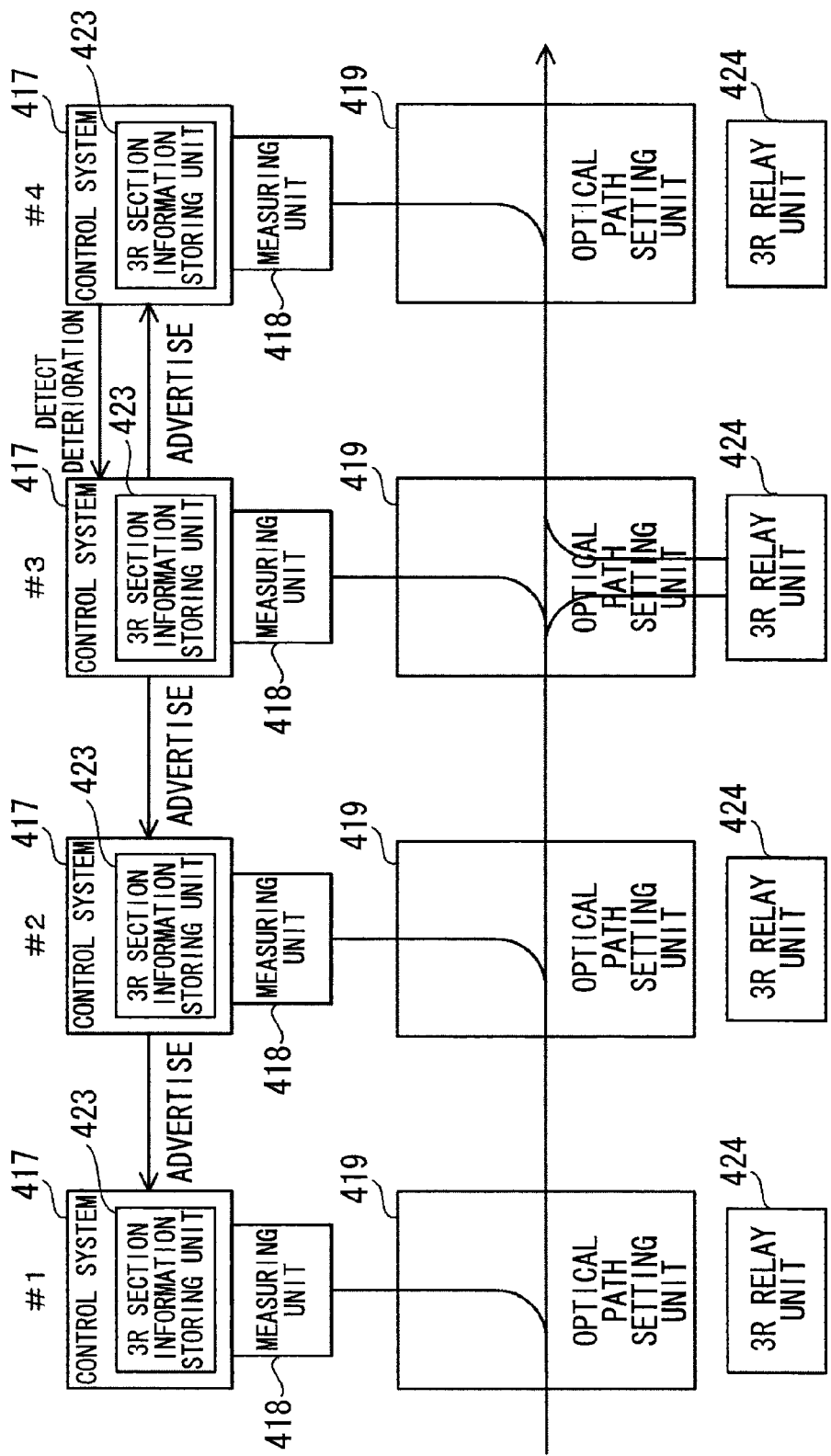
FIG. 74 is an explanatory diagram of the schematic block configuration and the operation of an optical node device according to a twenty-fifth embodiment.
Figure 75:
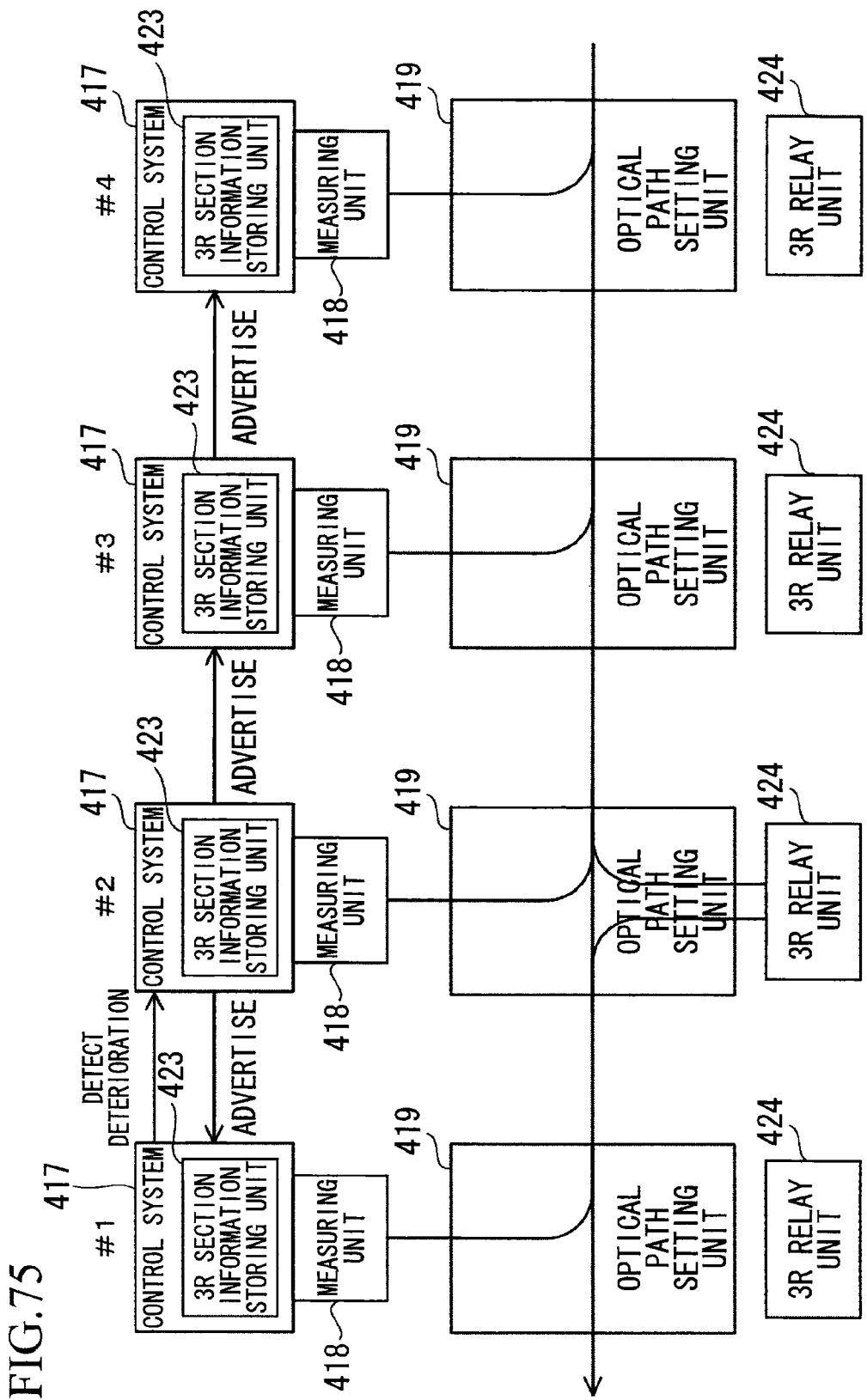
FIG. 75 is an explanatory diagram of the schematic block configuration and the operation of an optical node device according to the twenty-fifth embodiment.

Optical node devices according to a twenty-fifth embodiment are described with reference to FIG. 74 and FIG. 75. FIG. 74 and FIG. 75 are explanatory diagrams of the schematic block configuration and the operation of optical node devices according to the twenty-fifth embodiment. As shown in FIG. 74, the optical node device according to the twenty-fifth embodiment comprises: a measuring unit 418 which detects the deterioration state of the optical signal arriving at the optical node device itself; a control system 417 which notifies that the optical node device is the 3R destination node and the 3R source node of the next 3R section, to an adjacent optical node device one hop before the optical node device itself when the detection result of this measuring unit 418 shows signal deterioration; a 3R relay unit 424 which recognizes that the optical node device itself is the 3R destination node and the 3R source node of the next 3R section when the optical node device itself receives the notification from the control system 417 of the next-hop adjacent optical node device; and a 3R section information storing unit 423 which updates the 3R section information stored by the 3R section information storing unit 423 itself based on the recognition result.

Next is a description of the operation of the optical node device according to the twenty-fifth embodiment. The optical node device according to the twenty-fifth embodiment stores the 3R section information of the whole optical network in the 3R section information storing unit 423, by mutual advertisement between the optical node devices. Moreover, if an optical path passing through the optical node device itself is set, the optical node device branches and inputs the optical signal transmitted on this optical path into the measuring unit 418, and observes the signal deterioration state. Now, if optical signal deterioration is detected in the optical node device #4, the optical node device #4 notifies that the optical node device #3 is the 3R destination node and the 3R source node of the next 3R section, to the optical node device #3. The optical node device #3 which receives this notification leads the optical path passing through the optical node device #3 itself to the 3R relay unit 424, and implements the 3R relay. Furthermore, the control system 417 of the optical node device #3 advertises that the optical node device #3 itself is the 3R destination node and the 3R source node of the next 3R section, to the other optical node devices. The 3R section information storing unit 423 of an optical node device which receives the advertisement updates the 3R section information stored by this optical node device itself.

The twenty-fifth embodiment up to here is described on the assumption of a downstream optical path of the unidirectional optical path or the bi-directional optical path. The following is a description on the assumption of the upstream optical path, with reference to FIG. 75. As shown in FIG. 75, the optical node device according to the twenty-fifth embodiment comprises: a measuring unit 418 which detects the deterioration state of the optical signal of the upstream optical path arriving at the optical node device itself; a control system 417 which notifies that the optical node device is the 3R destination node and the 3R source node of the next 3R section on the upstream optical path, to an adjacent optical node device corresponding to the next-hop to the optical node device itself when the detection result of this measuring unit 418 shows signal deterioration; a 3R relay unit 424 which recognizes that the optical node device itself is the 3R destination node and the 3R source node of the next 3R section on the upstream optical path when this optical node device itself receives the notification from the control system 417 of the previous-hop adjacent optical node device; and a 3R section information storing unit 423 which updates the 3R section information stored by the 3R section information storing unit 423 itself based on the recognition result.

Next is a description of the operation of the optical node device according to the twenty-fifth embodiment. The optical node device according to the twenty-fifth embodiment stores the 3R section information of the whole optical network in the 3R section information storing unit 423, by mutual advertisement between the optical node devices. Moreover, if an upstream optical path passing through the optical node device itself is set, the optical node device branches and inputs the optical signal transmitted on the upstream optical path into the measuring unit 418, and observes the signal deterioration state. Now, if optical signal deterioration is detected in the optical node device #1, the optical node device #1 notifies that the optical node device #2 is the 3R destination node and the 3R source node of the next 3R section on the upstream optical path, to the optical node device #2. The optical node device #2 which receives this notification leads the upstream optical path passing through the optical node device #2 itself to the 3R relay unit 424, and implements the 3R relay. Furthermore, the control system 417 of the optical node device #2 advertises that the optical node device #2 itself is the 3R destination node and the 3R source node of the next 3R section, to the other optical node devices. The 3R section information storing unit 423 of an optical node device which receives the advertisement updates the 3R section information stored by the 3R section information storing unit 423 itself.

Describing the situation where the preset 3R section is changed in this way, for example in the case where a large number of new optical paths are set to one optical node device, there might be a case where the existing optical path receives noise caused by cross talk or nonlinear effects due to the effect of the new optical paths. In such a case, a change occurs in the 3R section. In the twenty-fifth embodiment, it is possible to flexibly deal with such changes of the 3R section.

If the respective optical node devices each have the 3R relay unit 424, there is concern of whether or not the network resources can be effectively used compared to the conventional technique. However, while conventionally all optical node devices implement the 3R relay equally, only the selected optical node device implements the 3R relay in the twenty-fifth embodiment, and the 3R relay load is distributed to a plurality of the optical node devices, so that the network resources can be effectively used.

That is, in most cases, it is sufficient that the 3R relay unit 424 of the respective optical node devices implements the 3R relay only on a part of the optical path passing through the respective optical node devices themselves. On the other hand, conventionally, the 3R relay unit 424 of the respective optical node devices is required to implement the 3R relay to all of the optical paths passing through the respective optical node devices themselves. Therefore, the scale of the 3R relay unit 424 can be smaller to deal with compared to the conventional technique, so that the network resources can be effectively used and the cost can be reduced.

Twenty-sixth Embodiment

Figure 76:
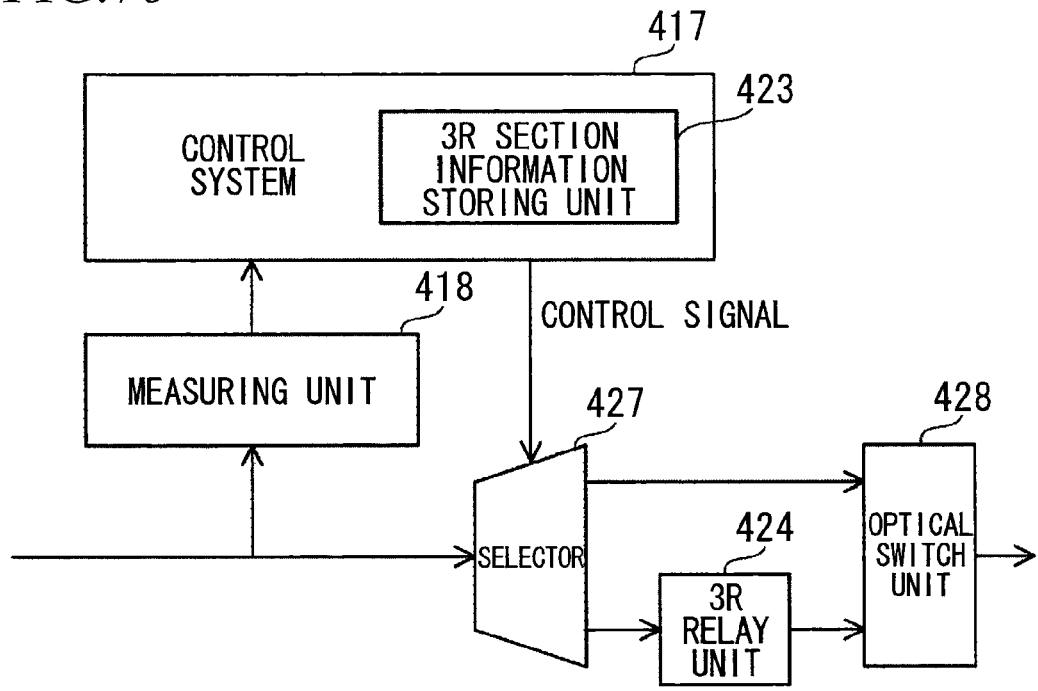
FIG. 76 is a block diagram of an optical node device comprising an optical switch unit on the output side in a twenty-sixth embodiment.
Figure 77:
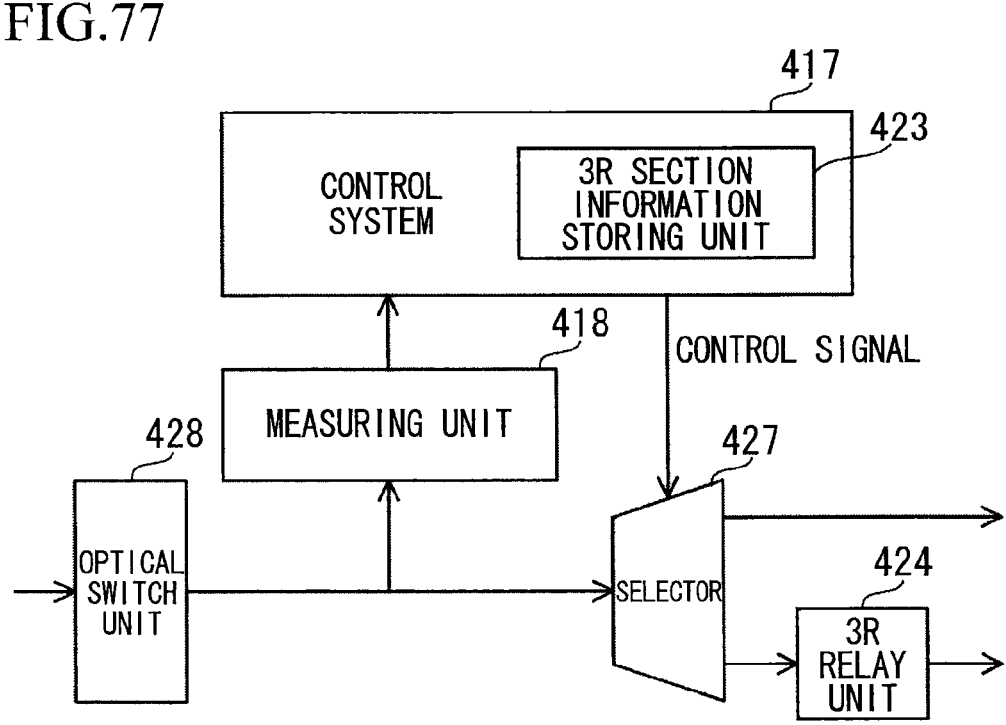
FIG. 77 is a block diagram of an optical node device comprising the optical switch unit on the input side in the twenty-sixth embodiment.
Figure 78:
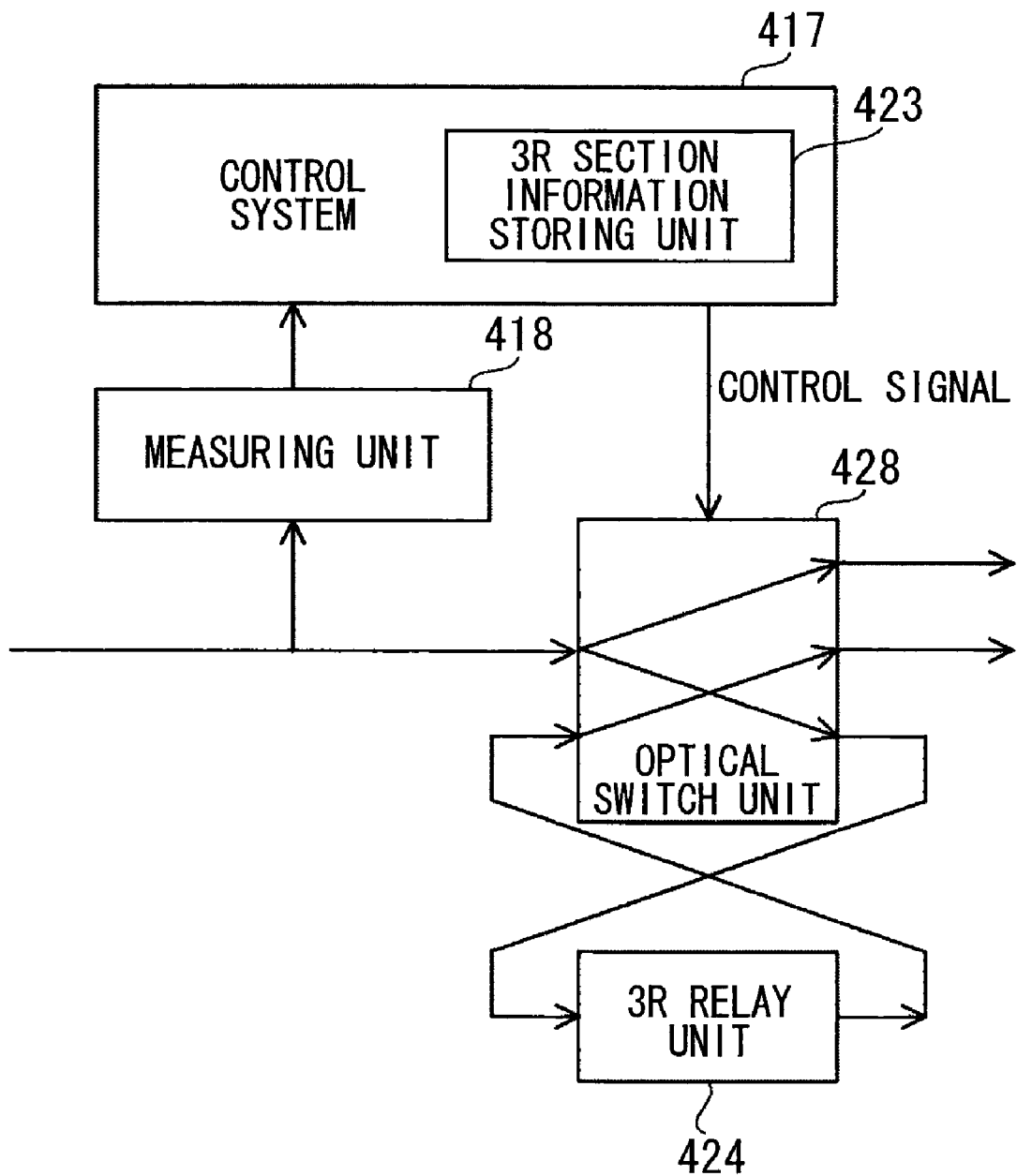
FIG. 78 is a block diagram of an optical node device comprising a trunk-type 3R relay unit according to the twenty-sixth embodiment.

An optical node device according to a twenty-sixth embodiment is described with reference to FIG. 76 to FIG. 78. FIG. 76 is a block diagram of an optical node device comprising an optical switch unit on the output side in the twenty-sixth embodiment. FIG. 77 is a block diagram of an optical node device comprising the optical switch unit on the input side in the twenty-sixth embodiment. FIG. 78 is a block diagram of an optical node device comprising a trunk-type 3R relay unit in the twenty-sixth embodiment.

The optical node device according to the twenty-sixth embodiment comprises: a measuring unit 418 which detects the deterioration state of the optical signal arriving at the optical node device itself; a 3R relay unit 424 which recognizes that the optical node device itself is the 3R destination node and the 3R source node of the next 3R section when the detection result of this measuring unit 418 shows signal deterioration; and a 3R section information storing unit 423 which updates the 3R section information stored by the 3R section information storing unit 423 itself based on the recognition result.

In contrast to the twenty-fifth embodiment where the optical node device which detected the optical signal deterioration notifies that the optical node device itself is the 3R destination node and the 3R source node of the next 3R section, to the previous-hop optical node device of the optical node device itself, in the twenty-sixth embodiment the optical node device itself which detected the optical signal deterioration recognizes that the optical node device itself is the 3R destination node and the 3R source node of the next 3R section. Therefore, the degree of optical signal deterioration detected in the twenty-sixth embodiment is a lower degree of deterioration compared to the degree of optical signal deterioration detected in the twenty-fifth embodiment. That is, even if the degree of optical signal deterioration in the twenty-fifth embodiment is a notable deterioration to the extent that it can not be regenerated by the 3R relay, there is no problem since the previous-hop optical node device implements the 3R relay. On the other hand, the degree of optical signal deterioration in the twenty-sixth embodiment must be to an extent that it can be regenerated by the 3R relay of the optical node device itself.

Next is a description of the operation of the optical node device according to the twenty-sixth embodiment. In the optical node device shown in FIG. 76, when the measuring unit 418 detects deterioration of the input optical signal, the detection result is transmitted to the control system 417. The control system 417 outputs an instruction to the selector 427 and the input optical signal is connected to the 3R relay unit 424. Accordingly, the optical signal which is subjected to the 3R relay is input into the optical switch unit 428 via the 3R relay unit 424. Moreover, the 3R section information storing unit 423 recognizes that the optical node device itself is the 3R destination node and the 3R source node of the next 3R section, and updates the 3R section information which was stored until now. The configuration may be such that, as described in the twenty-fifth embodiment, the updated 3R section information is advertised to other optical node devices.

In the optical node device shown in FIG. 77, when the measuring unit 418 detects deterioration of the optical signal output from the optical switch unit 428, the detection result is transmitted to the control system 417. The control system 417 outputs an instruction to the selector 427 and the input optical signal is connected to the 3R relay unit 424. Accordingly, the optical signal which is subjected to the 3R relay is output via the 3R relay unit 424. Moreover, the 3R section information storing unit 423 recognizes that the optical node device itself becomes the optical node device for implementing the 3R relay, and updates the 3R section information which was stored until now. The configuration may be such that, as described in the twenty-fifth embodiment, the updated 3R section information is advertised to other optical node devices.

In the optical node device shown in FIG. 78, when the measuring unit 418 detects deterioration of the input optical signal, the detection result is transmitted to the control system 417. The control system 417 outputs an instruction to the optical switch unit 428 and the input optical signal is connected to the 3R relay unit 424. Accordingly, the optical signal which is once output from the optical switch unit 428 and then 3R relayed via the 3R relay unit 424, is input into the optical switch unit 428 again. The optical switch unit 428 switches the 3R relayed optical signal to the target route. Moreover, the 3R section information storing unit 423 recognizes that the optical node device itself becomes the optical node device for implementing the 3R relay, and updates the 3R section information which was stored until now. The configuration may be such that, as described in the twenty-fifth embodiment, the updated 3R section information is advertised to other optical node devices.

The twenty-sixth embodiment up to here is described on the assumption of a downstream optical path of the unidirectional optical path or the bi-directional optical path. Since it can be readily inferred that the 3R section information of the upstream optical path can be generated in a similar procedure to that of the downstream optical path, detailed description is omitted.

That is, the optical node device comprises: the measuring unit 418 which detects the deterioration state of the optical signal of the upstream optical path arriving at the optical node device itself; the control system 417 which recognizes that the optical node device itself is the 3R destination node and the 3R source node of the next 3R section on the upstream optical path when the detection result of this measuring unit 418 shows signal deterioration; and a 3R section information storing unit 423 which updates the 3R section information stored by the 3R section information storing unit 423 itself based on the recognition result.

Twenty-seventh Embodiment

Figure 79:
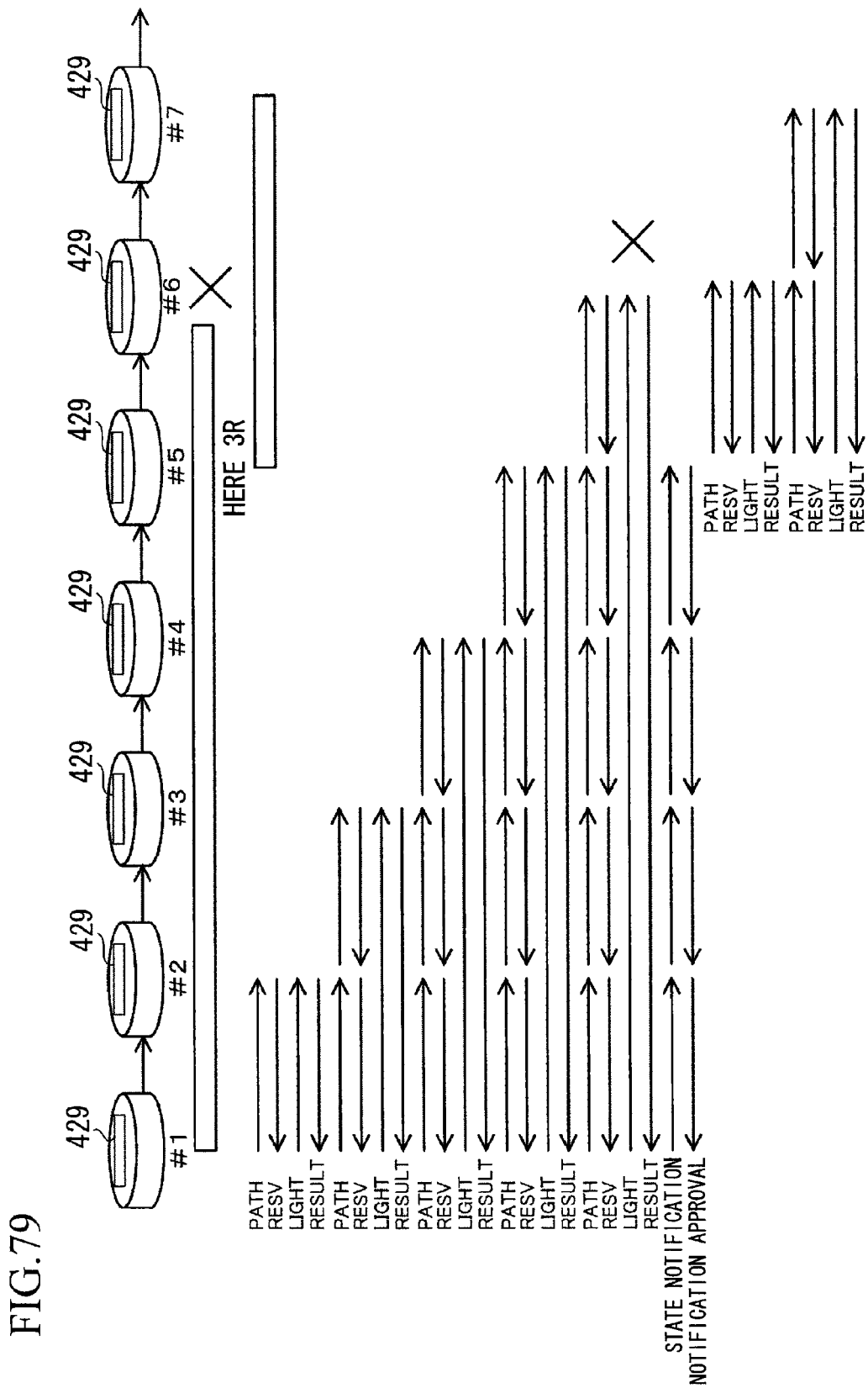
FIG. 79 shows a concept of 3R section information collection in an optical node device according to a twenty-seventh embodiment.
Figure 80:
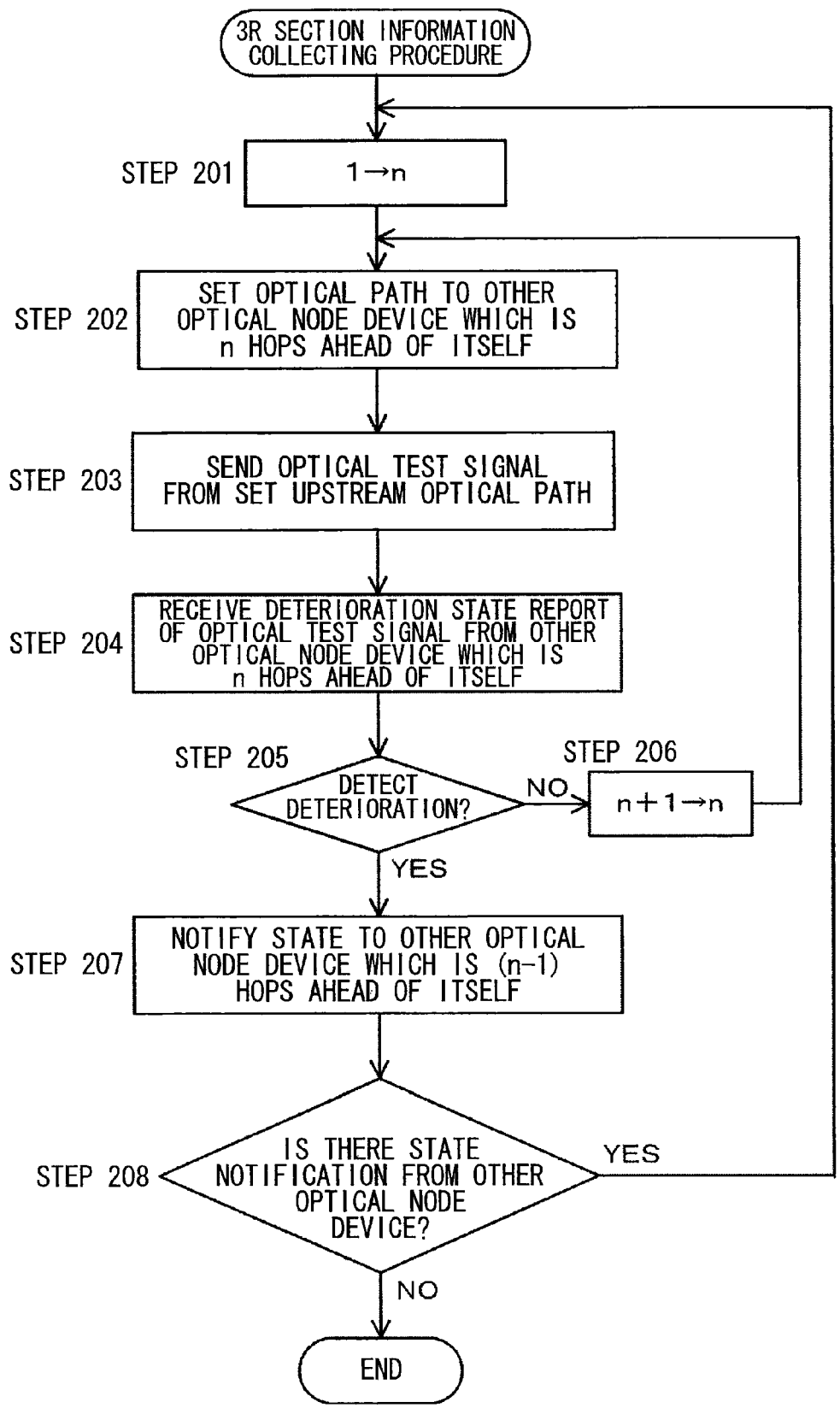
FIG. 80 shows a 3R section information collecting procedure in the optical node device according to the twenty-seventh embodiment.
Figure 81:
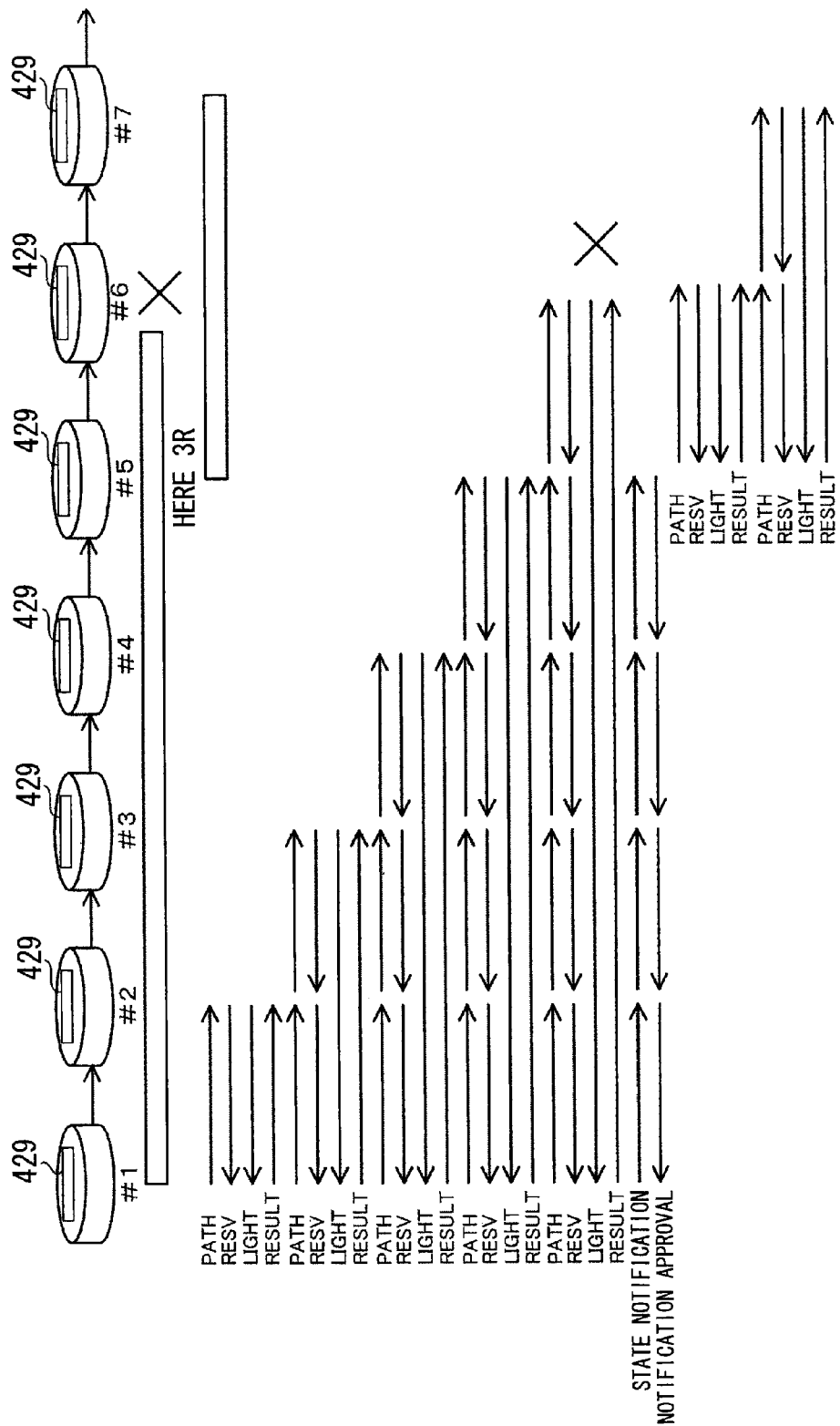
FIG. 81 shows a concept of 3R section information collection in the optical node device according to the twenty-seventh embodiment.
Figure 82:
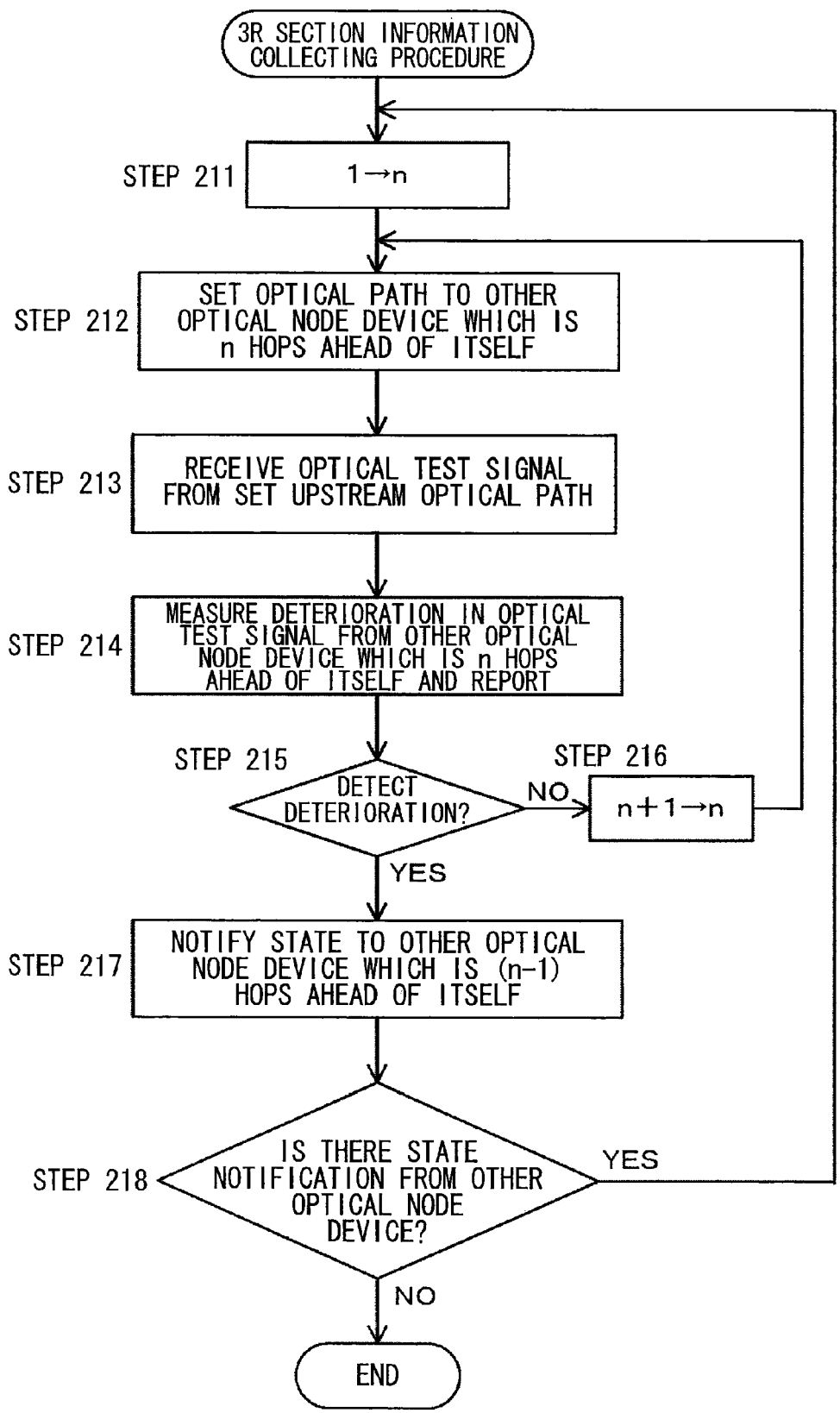
FIG. 82 shows a 3R section information collecting procedure in the optical node device according to the twenty-seventh embodiment.

Optical node devices according to a twenty-seventh embodiment are described with reference to FIG. 79 to FIG. 82. FIG. 79 and FIG. 81 show concepts of 3R section information collection in the optical node devices of the twenty-seventh embodiment. FIG. 80 and FIG. 82 show 3R section information collection procedures in the optical node devices according to the twenty-seventh embodiment.

The optical node device according to the twenty-seventh embodiment is an optical node device which switches the optical signal and generates the 3R section information on a route from the optical node device itself to the destination node. As shown in FIG. 79, the 3R section information collection unit 429 comprises: a unit which sends an optical test signal at each time when the optical path is sequentially set for the other optical node devices included in the route to the destination node one hop at a time from the next-hop adjacent optical node device; a unit which receives a report on the optical test signal deterioration state from another optical node device at the farthest end receiving the optical test signal at each time when the optical test signal is sequentially sent to the other optical node device included in the route to the destination node one hop at a time from the next-hop adjacent optical node device by this sending unit; and a unit which notifies that another optical node device is the 3R destination node and the 3R source node of the next 3R section to the other optical node device one hop before the other optical node device at the farthest end, if the optical test signal deterioration state based on the reported result received by this receiving unit satisfies a predetermined deterioration condition. The 3R section information collection unit 429 of the other optical node device which receives the notification comprises: a unit which sends the optical test signal at each time when the optical path is sequentially set for the other optical node devices included in the route to the destination node one hop at a time from the next-hop adjacent optical node device; a unit which receives a report on the optical test signal deterioration state from another optical node device at the farthest end receiving the optical test signal at each time when the optical test signal is sequentially sent to the other optical node device included in the route to the destination node one hop at a time from the next-hop adjacent optical node device by this sending unit; and a unit which notifies that the other optical node device is the 3R destination node and the 3R source node of the next 3R section to the other optical node device one hop before the other optical node device at the farthest end when the optical test signal deterioration state based on the reported result received by this receiving unit satisfies a predetermined deterioration condition. In practice, each optical node device comprises a 3R section information collection unit 429, and the above functions of the respective units are activated when the optical node device itself becomes the source node or the 3R source node.

Next is a description of the optical node device according to the twenty-seventh embodiment. The 3R section information collecting procedure shown in FIG. 80 is executed by the 3R section information collection unit 429. Here is a description of an example of a process in which the optical node device #1 is the 3R source node and the 3R section information is generated while setting the optical path. As shown in FIG. 80, the 3R section information collection unit 429 of the optical node device #1 sets an optical path to the optical node device #2, which is one hop ahead of the optical node device #1 itself (Step 201 and Step 202). In FIG. 79, the optical node device #1 sends an optical path setting request (PATH) to the optical node device #2. When the optical node device #2 receives the optical path setting request (PATH), it ensures the resources required for optical path setting and sends the optical path setting completion notification (RESV) to the optical node device #1. Accordingly, the optical path is set between the optical node devices #1 and #2.

Subsequently, the optical node device #1 sends an optical test signal (LIGHT) to the set optical path (Step 203), and receives an optical test signal deterioration state report (RESULT) from the optical node device #2 (Step 204). Since no deterioration is shown in the optical test signal deterioration state report from the optical node device #2 (Step 205), the optical node device #1 sets an optical path to the optical node device #3, which is two hops ahead of the optical node device #1 itself (Step 206 and Step 202). In FIG. 79, the optical node device #1 sends the optical path setting request (PATH) to the optical node device #3 via the optical node device #2. When the optical node device #3 receives the optical path setting request (PATH), it ensures the resources required for optical path setting and sends the optical path setting completion notification (RESV) to the optical node device #1 via the optical node device #2. Accordingly, the optical path is set between the optical node devices #1 and #3.

Subsequently, the optical node device #1 sends an optical test signal (LIGHT) to the set optical path (Step 203), and receives an optical test signal deterioration state report (RESULT) from the optical node device #3 (Step 204). Since no deterioration is shown in the optical test signal deterioration state report from the optical node device #3 (Step 205), the optical node device #1 sets an optical path to the optical node device #4, which is three hops ahead of the optical node device #1 itself (Step 206 and Step 202). In FIG. 79, the optical node device #1 sends the optical path setting request (PATH) to the optical node device #4 via the optical node devices #2 and #3. When the optical node device #4 receives the optical path setting request (PATH), it ensures the resources required for optical path setting and sends the optical path setting completion notification (RESV) to the optical node device #1 via the optical node devices #3 and #2. Accordingly, the optical path is set between the optical node devices #1 and #4.

Subsequently, the optical node device #1 sends an optical test signal (LIGHT) to the set optical path (Step 203), and receives an optical test signal deterioration state report (RESULT) from the optical node device #4 (Step 204). Since no deterioration is shown in the optical test signal deterioration state report from the optical node device #4 (Step 205), the optical node device #1 sets an optical path to the optical node device #5, which is four hops ahead of the optical node device #1 itself (Step 206 and Step 202). In FIG. 79, the optical node device #1 sends the optical path setting request (PATH) to the optical node device #5 via the optical node devices #2, #3, and #4. When the optical node device #5 receives the optical path setting request (PATH), it ensures the resources required for optical path setting and sends the optical path setting completion notification (RESV) to the optical node device #1 via the optical node devices #4, #3, and #2. Accordingly, the optical path is set between the optical node devices #1 and #5.

Subsequently, the optical node device #1 sends an optical test signal (LIGHT) to the set optical path (Step 203), and receives an optical test signal deterioration state report (RESULT) from the optical node device #5 (Step 204). Since no deterioration is shown in the optical test signal deterioration state report from the optical node device #5 (Step 205), the optical node device #1 sets an optical path to the optical node device #6, which is five hops ahead of the optical node device #1 itself (Step 206 and Step 202). In FIG. 79, the optical node device #1 sends the optical path setting request (PATH) to the optical node device #6 via the optical node devices #2, #3, #4, and #5. When the optical node device #6 receives the optical path setting request (PATH), it ensures the resources required for optical path setting and sends the optical path setting completion notification (RESV) to the optical node device #1 via the optical node devices #5, #4, #3, and #2. Accordingly, the optical path is set between the optical node devices #1 and #6.

Subsequently, the optical node device #1 sends an optical test signal (LIGHT) to the set optical path (Step 203), and receives an optical test signal deterioration state report (RESULT) from the optical node device #6 (Step 204). Deterioration is shown in the optical test signal deterioration state report from the optical node device #6 (Step 205), so that the optical node device #1 notifies (state notification) that the optical node device #5 is the 3R destination node and the 3R source node of the next 3R section, to the optical node device #5, which is four hops ahead of the optical node device #1 itself (Step 207). When the optical node device #5 receives the notification from the optical node device #1, it sends an approval that the optical node device #5 itself is the 3R destination node and the 3R source node of the next 3R section, to the optical node device #1.

Moreover, the optical node device #5 receives the notification from the optical node device #1 (Step 208), so that it recognizes that the optical node device #5 itself is the 3R source node, and executes the procedure from Step 201. Furthermore, the process is terminated since the optical node device #1 notifies that the optical node device #5 is the 3R destination node and the 3R source node of the next 3R section, and the optical node device #1 does not receive notification that the optical node device #1 is the 3R destination node and the 3R source node of the next 3R section from another optical node device.

In this way, in the twenty-seventh embodiment, it is possible to collect the 3R section information while determining the optical node device for implementing the 3R relay in the process of the optical path setting. In the example of FIG. 79, all of the respective optical node devices #1 to #7 comprise a 3R section information collection unit 429. However the configuration may be such that for example every other optical node device comprises it. Moreover, in the present embodiment, in order to facilitate description, the optical test signal was sent to the optical node devices #2 and #3 which are not expected to require the 3R relay. However, the sending procedure of the optical test signal may be omitted with respect to these optical node devices #2 and #3. Alternatively, the optical test signal may be sent to only the optical node devices #5 and #6 which are expected to require the 3R relay.

The twenty-seventh embodiment up to here is described on the assumption of a downstream optical path of the unidirectional optical path or the bi-directional optical path. The following is a description on the assumption of the upstream optical path, with reference to FIG. 81 and FIG. 82. The optical node device according to the twenty-seventh embodiment is an optical node device which generates the 3R section information on a route from the source node to the destination node, and comprises a 3R section information collection unit 429 which sequentially sets the optical path one hop at a time from the next-hop adjacent optical node device to another optical node device included in the route to the destination node, if the optical node device itself is the source node. The 3R section information collection unit 429 comprises a unit which sends an optical test signal to the upstream optical path when the optical path is set to the optical node device itself, if the optical node device itself is not the source node. Moreover, this 3R section information collection unit 429 comprises a unit which receives the optical test signal if the optical node device itself is the source node and notifies the report on the optical test signal deterioration state to the sender of the optical test signal. Furthermore, the 3R section information collection unit 429 of the optical node device of the sender of the optical test signal comprises a unit which recognizes that the optical node device itself is the 3R source node and the 3R destination node of the previous 3R section on the upstream optical path, if the optical test signal deterioration state based on this notification satisfies a predetermined deterioration condition. The 3R section information collection unit 429 of the optical node device which recognizes that the optical node device itself is the 3R source node and the 3R destination node of the previous 3R section on the upstream optical path, comprises a unit which sequentially sets the optical path one hop at a time from the next-hop adjacent optical node device to another optical node device included in the route from the optical node device itself to the destination node, receives the optical test signal, and notifies the report on the optical test signal deterioration state to the sender of the optical test signal. In practice, each optical node device comprises a 3R section information collection unit 429, and the above functions of the respective units are activated when the optical node device itself becomes the source node, the 3R source node, or the 3R destination node.

Next is a description of the optical node device according to the twenty-seventh embodiment. The 3R section information collecting procedure shown in FIG. 82 is executed by the 3R section information collection unit 429. Here is a description of an example of a process in which the optical node device #1 is the 3R destination node on the upstream optical path and the 3R section information is generated while setting the optical path. As shown in FIG. 82, the 3R section information collection unit 429 of the optical node device #1 sets an optical path to the optical node device #2, which is one hop ahead of the optical node device #1 itself (Step 211 and Step 212). In FIG. 81, the optical node device #1 sends an optical path setting request (PATH) to the optical node device #2. When the optical node device #2 receives the optical path setting request (PATH), it ensures the resources required for optical path setting and sends the optical path setting completion notification (RESV) to the optical node device #1. Accordingly, the optical path is set between the optical node devices #1 and #2.

Subsequently, the optical node device #1 receives an optical test signal (LIGHT) from the set upstream optical path (Step 213), and measures the deterioration in the optical test signal from the optical node device #2 and reports the measurement result (RESULT) to the optical node device #2 (Step 214). Since no deterioration is shown in the optical test signal from the optical node device #2 (Step 215), the optical node device #1 sets an optical path to the optical node device #3, which is two hops ahead of the optical node device #1 itself (Step 216 and Step 212). In FIG. 81, the optical node device #1 sends the optical path setting request (PATH) to the optical node device #3 via the optical node device #2. When the optical node device #3 receives the optical path setting request (PATH), it ensures the resources required for optical path setting and sends the optical path setting completion notification (RESV) to the optical node device #1 via the optical node device #2. Accordingly, the optical path is set between the optical node devices #1 and #3.

Subsequently, the optical node device #1 receives an optical test signal (LIGHT) from the set upstream optical path (Step 213), and measures the deterioration in the optical test signal from the optical node device #3 and reports the measurement result (RESULT) to the optical node device #3 (Step 214). Since no deterioration is shown in the optical test signal from the optical node device #3 (Step 215), the optical node device #1 sets the optical path to the optical node device #4, which is three hops ahead of the optical node device #1 itself (Step 216 and Step 212). In FIG. 81, the optical node device #1 sends the optical path setting request (PATH) to the optical node device #4 via the optical node devices #2 and #3. When the optical node device #4 receives the optical path setting request (PATH), it ensures the resources required for optical path setting and sends the optical path setting completion notification (RESV) to the optical node device #1 via the optical node devices #3 and #2. Accordingly, the optical path is set between the optical node devices #1 and #4.

Subsequently, the optical node device #1 receives an optical test signal (LIGHT) from the set upstream optical path (Step 213), and measures the deterioration in the optical test signal from the optical node device #4 and reports the measurement result (RESULT) to the optical node device #4 (Step 214). Since no deterioration is shown in the optical test signal from the optical node device #4 (Step 215), the optical node device #1 sets the optical path to the optical node device #5, which is four hops ahead of the optical node device #1 itself (Step 216 and Step 212). In FIG. 81, the optical node device #1 sends the optical path setting request (PATH) to the optical node device #5 via the optical node devices #2, #3, and #4. When the optical node device #5 receives the optical path setting request (PATH), it ensures the resources required for optical path setting and sends the optical path setting completion notification (RESV) to the optical node device #1 via the optical node devices #4, #3, and #2. Accordingly, the optical path is set between the optical node devices #1 and #5.

Subsequently, the optical node device #1 receives an optical test signal (LIGHT) from the set upstream optical path (Step 213), and measures the deterioration in the optical test signal from the optical node device #5 and reports the measurement result (RESULT) to the optical node device #5 (Step 214). Since no deterioration is shown in the optical test signal from the optical node device #5 (Step 215), the optical node device #1 sets the optical path to the optical node device #6, which is five hops ahead of the optical node device #1 itself (Step 216 and Step 212). In FIG. 81, the optical node device #1 sends the optical path setting request (PATH) to the optical node device #6 via the optical node devices #2, #3, #4, and #5. When the optical node device #6 receives the optical path setting request (PATH), it ensures the resources required for optical path setting and sends the optical path setting completion notification (RESV) to the optical node device #1 via the optical node devices #5, #4, #3, and #2. Accordingly, the optical path is set between the optical node devices #1 and #6.

Subsequently, the optical node device #1 receives an optical test signal (LIGHT) from the set upstream optical path (Step 213), and measures the deterioration in the optical test signal from the optical node device #6 and reports the measurement result (RESULT) to the optical node device #6 (Step 214). Deterioration is detected in the optical test signal from the optical node device #6 (Step 215), so the optical node device #1 notifies (state notification) that the optical node device #5 is the 3R source node and the 3R destination node of the previous 3R section on the upstream optical path, to the optical node device #5, which is four hops ahead of the optical node device #1 itself (Step 217). When the optical node device #5 receives the notification from the optical node device #1, it sends an approval that the optical node device #5 itself is the 3R source node and the 3R destination node of the previous 3R section on the upstream optical path, to the optical node device #1.

Moreover, the optical node device #5 receives the notification from the optical node device #1 (Step 218), so that it recognizes that the optical node device #5 itself is the 3R source node, and executes the procedure from Step 211. Furthermore, the process is terminated since the optical node device #1 notifies that the optical node device #5 is the 3R source node and the 3R destination node of the previous 3R section, to the optical node device #5, and the optical node device #1 does not receive notification that the optical node device #1 is the 3R source node and the 3R destination node of the previous 3R section from another optical node device.

In the example of FIG. 81, when the optical node device #1 receives the optical test signal of the optical node devices #2 to #5 arriving from the upstream optical path, even if deterioration is not detected, the report is performed (RESULT). However, this report has only the role of ensuring reception confirmation of the optical test signal, so that this reporting procedure may be omitted.

In this way, in the twenty-seventh embodiment, it is possible to collect the 3R section information while determining the optical node device for implementing the 3R relay in the process of the optical path setting. In the example of FIG. 81, all of the respective optical node devices #1 to #7 comprise a 3R section information collection unit 429. However the configuration may be such that for example every other optical node device comprises it. Moreover, in the present embodiment, in order to facilitate description, the optical test signal was sent to the optical node devices #2 and #3 which are not expected to require the 3R relay. However, the sending procedure of the optical test signal may be omitted with respect to these optical node devices #2 and #3. Alternatively, the optical test signal may be sent to the optical node devices #5 and #6 which are expected to require the 3R relay.

Twenty-eighth Embodiment

Figure 83:
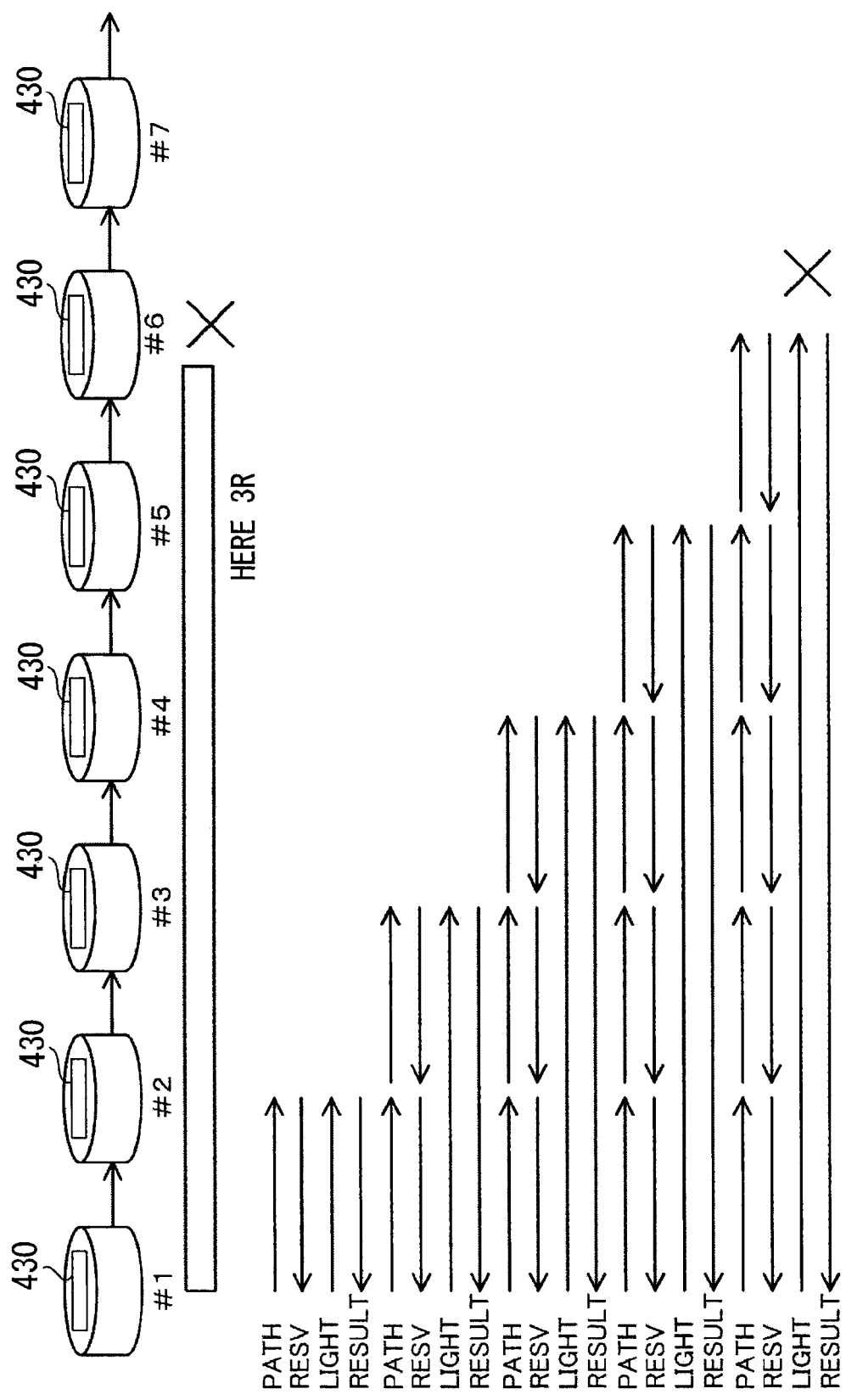
FIG. 83 shows a concept of 3R section information collection in optical node devices according to a twenty-eighth embodiment.
Figure 84:
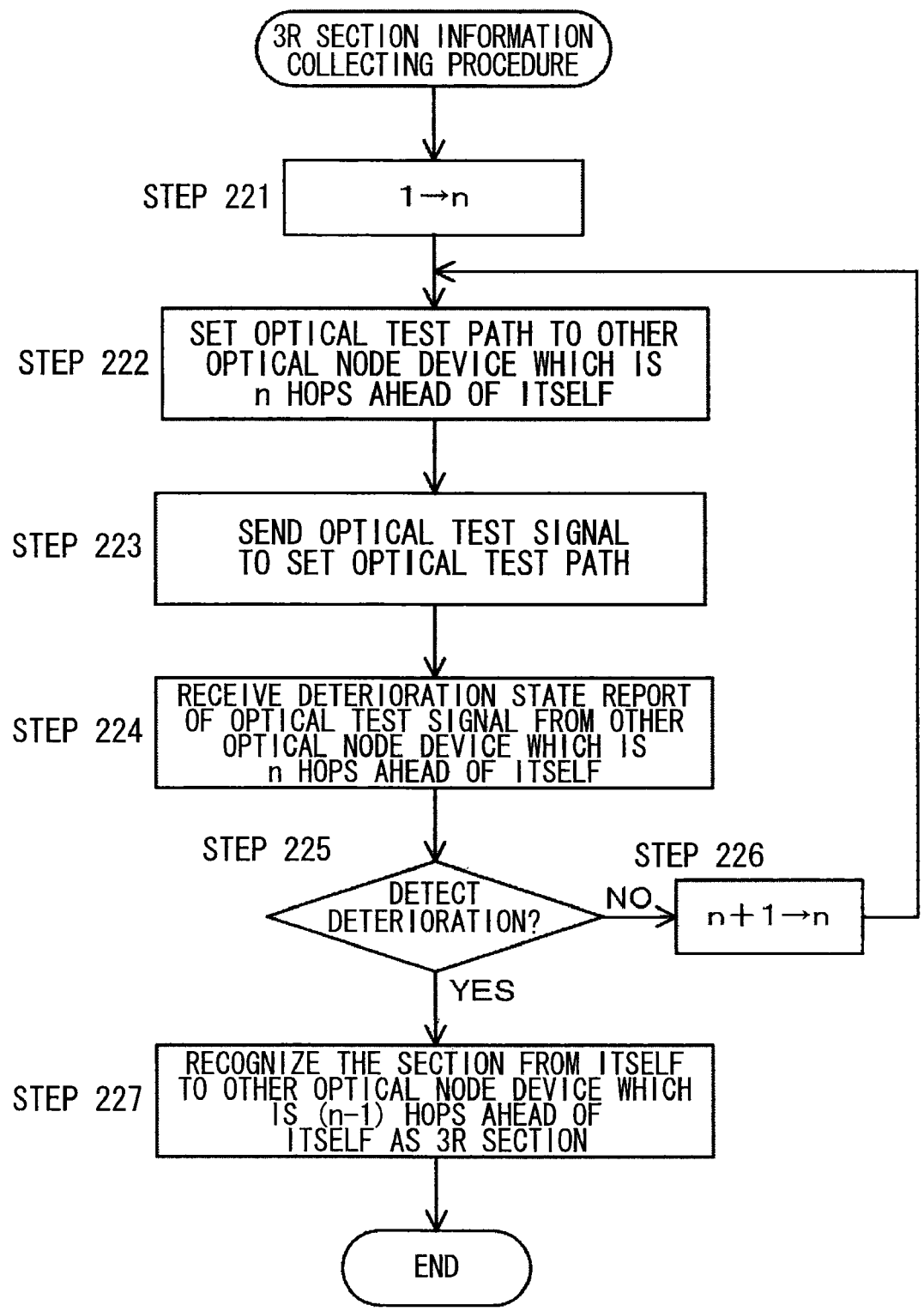
FIG. 84 shows a 3R section information collecting procedure in the optical node device according to the twenty-eighth embodiment.
Figure 85:
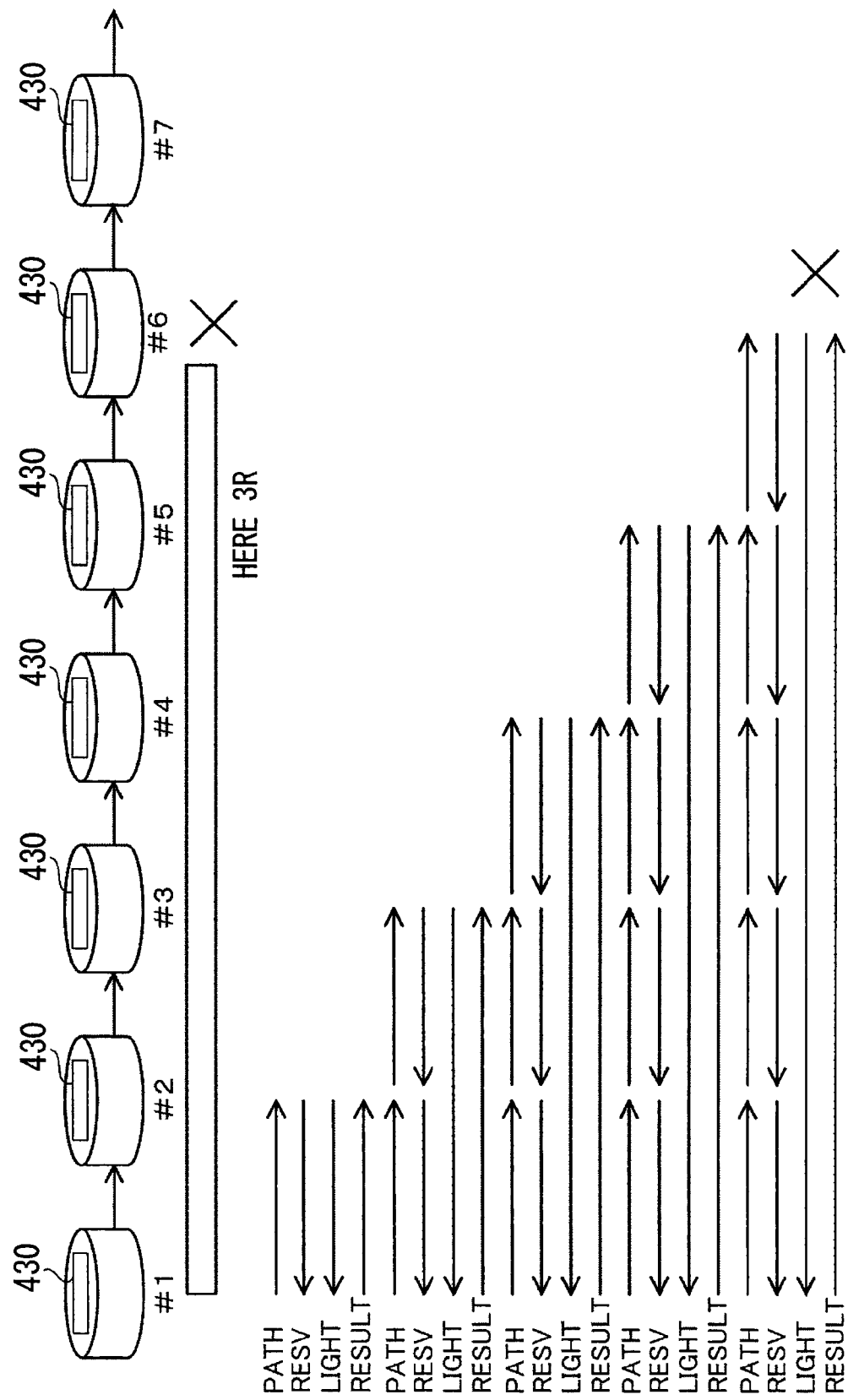
FIG. 85 shows a concept of 3R section information collection in the optical node device according to the twenty-eighth embodiment.
Figure 86:
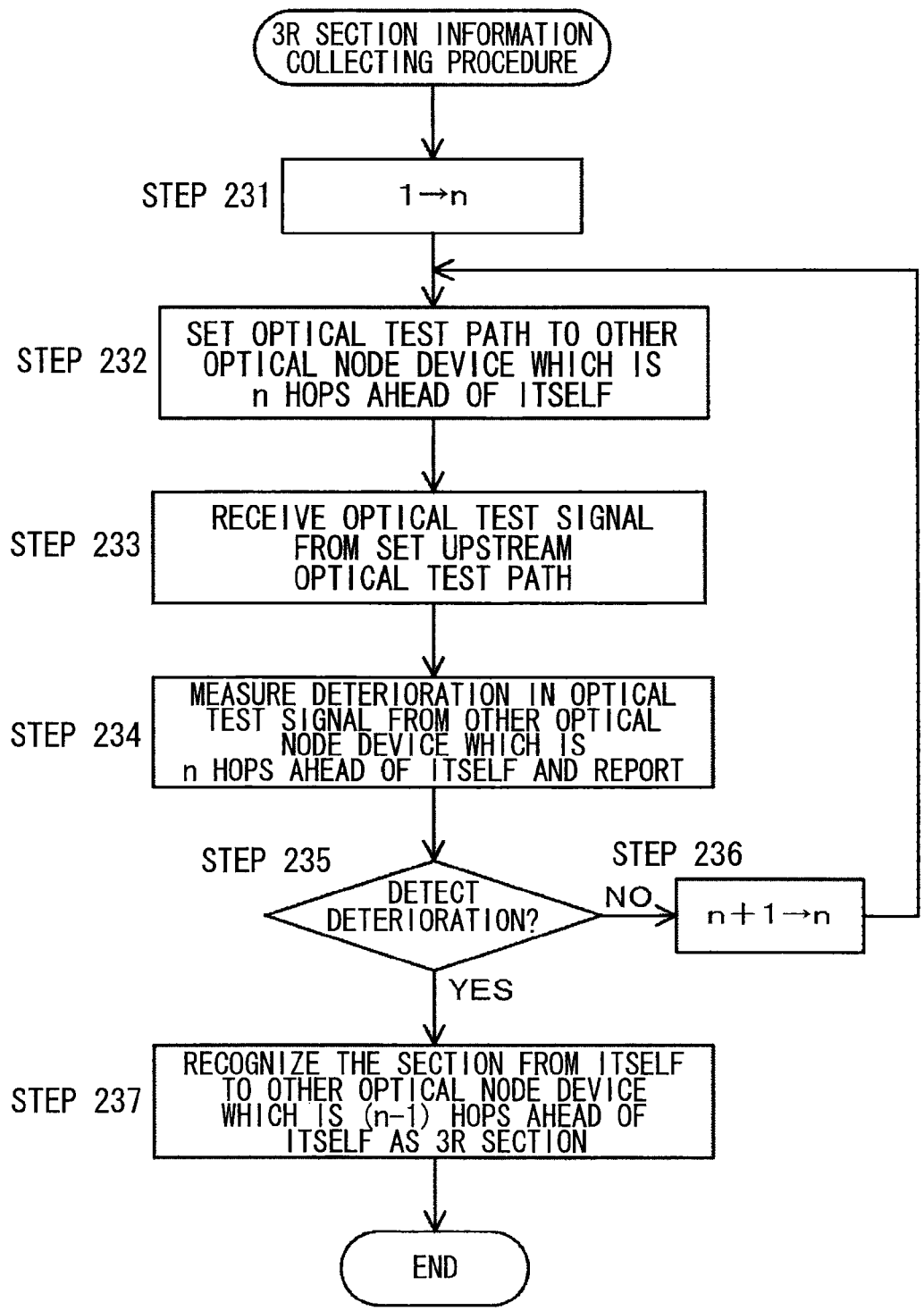
FIG. 86 shows a 3R section information collecting procedure in the optical node device according to the twenty-eighth embodiment.
Figure 87:
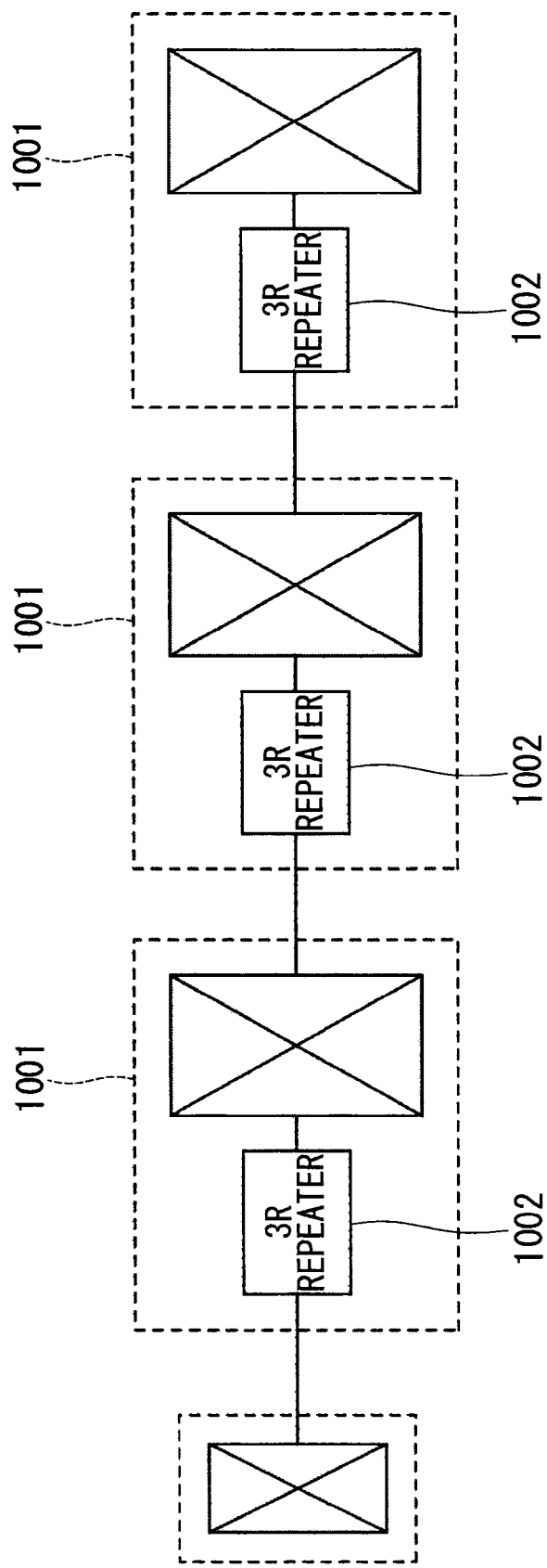
FIG. 87 shows a conventional optical network configuration.

Optical node devices according to a twenty-eighth embodiment are described with reference to FIG. 83 to FIG. 86. FIG. 83 and FIG. 85 show concepts of 3R section information collection in the optical node devices according to the twenty-eighth embodiment. FIG. 84 and FIG. 86 show 3R section information collecting procedures in the optical node devices according to the twenty-eighth embodiment.

The 3R section information collection unit 430 of the optical node device according to the twenty-eighth embodiment comprises: a unit which sequentially sets an optical test path from the optical node device itself one hop at a time from the next-hop adjacent optical node device to another optical node device included in a measured link being subjected to the measurement of 3R section information; a unit which sends an optical test signal at each time when the optical path is sequentially set to the other optical node device included in the measured link one hop at a time from the next-hop adjacent optical node device by this setting unit; a unit which receives a report on the optical test signal deterioration state from another optical node device at the farthest end receiving the optical test signal at each time when the optical test signal is sequentially sent to the other optical node device included in the measured link one hop at a time from the next-hop adjacent optical node device by this sending unit; and a unit which recognizes that another optical node device one hop before the other optical node device at the farthest end, is the 3R destination node and the 3R source node of the next 3R section, if the optical test signal deterioration state based on the reported result received by this receiving unit satisfies a predetermined deterioration condition. In practice, each optical node device comprises a 3R section information collection unit 430, and the above functions of the respective units are activated as required to collect the 3R section information of the optical node device itself.

Next is a description of the optical node device according to the twenty-eighth embodiment. The 3R section information collecting procedure shown in FIG. 84 is executed by the 3R section information collection unit 430. Here is a description of an example of a process in which the 3R section information is collected assuming that the optical node device #1 is the 3R source node. As shown in FIG. 83, the 3R section information collection unit 430 of the optical node device #1 sets an optical test path to the optical node device #2, which is one hop ahead of the optical node device #1 itself (Step 221 and Step 222). In FIG. 83, the optical node device #1 sends an optical test path setting request (PATH) to the optical node device #2. When the optical node device #2 receives the optical test path setting request (PATH), it ensures the resources required for optical test path setting and sends the optical test path setting completion notification (RESV) to the optical node device #1. Accordingly, the optical test path is set between the optical node devices #1 and #2.

Subsequently, the optical node device #1 sends an optical test signal (LIGHT) to the set optical test path (Step 223), and receives an optical test signal deterioration state report (RESULT) from the optical node device #2 (Step 224). Since no deterioration is shown in the optical test signal deterioration state report from the optical node device #2 (Step 225), the optical node device #1 sets an optical test path to the optical node device #3, which is two hops ahead of the optical node device #1 itself (Step 226 and Step 222). In FIG. 83, the optical node device #1 sends the optical test path setting request (PATH) to the optical node device #3 via the optical node device #2. When the optical node device #3 receives the optical test path setting request (PATH), it ensures the resources required for optical test path setting and sends the optical test path setting completion notification (RESV) to the optical node device #1 via the optical node device #2. Accordingly, the optical test path is set between the optical node devices #1 and #3.

Subsequently, the optical node device #1 sends an optical test signal (LIGHT) to the set optical test path (Step 223), and receives an optical test signal deterioration state report (RESULT) from the optical node device #3 (Step 224). Since no deterioration is shown in the optical test signal deterioration state report from the optical node device #3 (Step 225), the optical node device #1 sets an optical test path to the optical node device #4, which is three hops ahead of the optical node device #1 itself (Step 226 and Step 222). In FIG. 83, the optical node device #1 sends the optical test path setting request (PATH) to the optical node device #4 via the optical node devices #2 and #3. When the optical node device #4 receives the optical test path setting request (PATH), it ensures the resources required for optical test path setting and sends the optical test path setting completion notification (RESV) to the optical node device #1 via the optical node devices #3 and #2. Accordingly, the optical test path is set between the optical node devices #1 and #4.

Subsequently, the optical node device #1 sends an optical test signal (LIGHT) to the set optical test path (Step 223), and receives an optical test signal deterioration state report (RESULT) from the optical node device #4 (Step 224). Since no deterioration is shown in the optical test signal deterioration state report from the optical node device #4 (Step 225), the optical node device #1 sets an optical test path to the optical node device #5, which is four hops ahead of the optical node device #1 itself (Step 226 and Step 222). In FIG. 83, the optical node device #1 sends the optical test path setting request (PATH) to the optical node device #5 via the optical node devices #2, #3, and #4. When the optical node device #5 receives the optical test path setting request (PATH), it ensures the resources required for optical test path setting and sends the optical test path setting completion notification (RESV) to the optical node device #1 via the optical node devices #4, #3, and #2. Accordingly, the optical test path is set between the optical node devices #1 and #5.

Subsequently, the optical node device #1 sends an optical test signal (LIGHT) to the set optical test path (Step 223), and receives an optical test signal deterioration state report (RESULT) from the optical node device #5 (Step 224). Since no deterioration is shown in the optical test signal deterioration state report from the optical node device #5 (Step 225), the optical node device #1 sets an optical test path to the optical node device #6, which is five hops ahead of the optical node device #1 itself (Step 226 and Step 222). In FIG. 83, the optical node device #1 sends the optical test path setting request (PATH) to the optical node device #6 via the optical node devices #2, #3, #4, and #5. When the optical node device #6 receives the optical test path setting request (PATH), it ensures the resources required for optical test path setting and sends the optical test path setting completion notification (RESV) to the optical node device #1 via the optical node devices #5, #4, #3, and #2. Accordingly, the optical test path is set between the optical node devices #1 and #6.

Subsequently, the optical node device #1 sends an optical test signal (LIGHT) to the set optical test path (Step 223), and receives an optical test signal deterioration state report (RESULT) from the optical node device #6 (Step 224). Deterioration is shown in the optical test signal deterioration state report from the optical node device #6 (Step 225), so that the optical node device #1 recognizes that the section from the optical node device #1 itself to the optical node device #5, which is four hops ahead of the optical node device #1 itself is the 3R section (Step 227).

In this way, in the twenty-eighth embodiment, it is possible to set the optical test path and recognize the 3R section. In the example of FIG. 83, all of the respective optical node devices #1 to #7 comprise a 3R section information collection unit 430. However the configuration may be such that for example every other optical node device comprises it. Moreover, in the present embodiment, in order to facilitate description, the optical test signal was sent to the optical node devices #2 and #3 which are not expected to require the 3R relay. However, the sending procedure of the optical test signal may be omitted with respect to these optical node devices #2 and #3. Alternatively, the optical test signal may be sent to only the optical node devices #5 and #6 which are expected to require the 3R relay.

Moreover, the 3R section information collection unit 430 stores the information of the optical node device for implementing the 3R relay recognized in this manner. Furthermore, the configuration may be such that the 3R section information collection unit 430 advertises the information of the optical node device for implementing the 3R relay recognized in this manner, to the other optical node devices, and receives the advertisement from the other optical node devices so as to store the information of the optical node device for implementing the 3R relay included in the advertisement together with the information of the optical node device for implementing the 3R relay recognized by the optical node device itself. Accordingly, the respective optical node devices can store the same 3R section information.

Alternatively, the 3R section information collection unit 430 notifies the information of the optical node device for implementing the 3R relay recognized by the optical node device itself to the network control device 410 shown in FIG. 64, so that the network control device 410 can store the 3R section information of the whole optical network. Then, the respective optical node devices request the network control device 410 to provide the 3R section information required by the optical node devices themselves and obtain it as necessary, prior to the optical path setting, so that the amount of the 3R section information stored in the respective optical node devices can be reduced.

Such a network control device 410 comprises a database comprising: a function for receiving the information of the optical node device which implements the 3R relay from an optical node device constituting the optical network and updating the 3R section information stored up to now; and a function for providing a part of or all of the 3R section information stored according to a request from the optical node device, to this optical node device.

The twenty-eighth embodiment up to here is described on the assumption of a downstream optical path of the unidirectional optical path or the bi-directional optical path. The following is a description on the assumption of the upstream optical path, with reference to FIG. 85 and FIG. 86. The optical node devices according to the twenty-eighth embodiment comprise the 3R section information collection unit 430 which sequentially sets an upstream optical test path one hop at a time from the next-hop adjacent optical node device to another optical node device included in a measured link being subjected to the measurement of 3R section information when the optical node device itself is the source node. The 3R section information collection unit 430 of the optical node device having this upstream optical test path set, comprises a unit which sends an optical test signal to the upstream optical test path. Furthermore, the 3R section information collection unit 430 of the optical node device where the optical node device itself is the source node, comprises a unit which receives the optical test signal and notifies the report on the optical test signal deterioration state to the sender of the optical test signal. The 3R section information collection unit 430 of the sender optical node device of the optical test signal comprises a unit which recognizes that the optical node device itself is the 3R source node and the 3R destination node of the previous 3R section on the upstream optical path, if the optical test signal deterioration state based on this notification satisfies a predetermined deterioration condition. The 3R section information collection unit 430 of the optical node device which recognized that the optical node device itself is the 3R source node and the 3R destination node of the previous 3R section on the upstream optical path, comprises a unit which sequentially sets the upstream optical test path one hop at a time from the next-hop adjacent optical node device to another optical node device included in a measured link being subjected to the measurement of 3R section information, receives the optical test signal, and notifies the report on the optical test signal deterioration state to the sender of the optical test signal. In practice, each optical node device comprises a 3R section information collection unit 430, and the above functions of the respective units are activated according to the necessity for the 3R section information collection of the optical node device itself.

Next is a description of the optical node device according to the twenty-eighth embodiment. The 3R section information collecting procedure shown in FIG. 86 is executed by the 3R section information collection unit 430. Here is a description of an example of a process in which the 3R section information is collected assuming that the optical node device #1 is the 3R destination node on the upstream optical path. As shown in FIG. 85, the 3R section information collection unit 430 of the optical node device #1 sets the optical test path to the optical node device #2, which is one hop ahead of the optical node device #1 itself (Step 231 and Step 232). In FIG. 85, the optical node device #1 sends an optical test path setting request (PATH) to the optical node device #2. When the optical node device #2 receives the optical test path setting request (PATH), it ensures the resources required for optical test path setting and sends the optical test path setting completion notification (RESV) to the optical node device #1. Accordingly, the optical test path is set between the optical node devices #1 and #2.

Subsequently, the optical node device #1 receives an optical test signal (LIGHT) from the set upstream optical test path (Step 233), and measures the deterioration in the optical test signal from the optical node device #2 and reports the measurement result (RESULT) to the optical node device #2 (Step 234). Since no deterioration is shown in the optical test signal from the optical node device #2 (Step 235), the optical node device #1 sets an optical test path to the optical node device #3, which is two hops ahead of the optical node device itself (Step 236 and Step 232). In FIG. 85, the optical node device #1 sends the optical test path setting request (PATH) to the optical node device #3 via the optical node device #2. When the optical node device #3 receives the optical test path setting request (PATH), it ensures the resources required for optical test path setting and sends the optical test path setting completion notification (RESV) to the optical node device #1 via the optical node device #2. Accordingly, the optical test path is set between the optical node devices #1 and #3.

Subsequently, the optical node device #1 receives an optical test signal (LIGHT) from the set upstream optical test path (Step 233), and measures the deterioration in the optical test signal from the optical node device #3 and reports the measurement result (RESULT) to the optical node device #3 (Step 234). Since no deterioration is detected in the optical test signal from the optical node device #3 (Step 235), the optical node device #1 sets an optical test path to the optical node device #4, which is three hops ahead of the optical node device #1 itself (Step 236 and Step 232). In FIG. 85, the optical node device #1 sends the optical test path setting request (PATH) to the optical node device #4 via the optical node devices #2 and #3. When the optical node device #4 receives the optical test path setting request (PATH), it ensures the resources required for optical test path setting and sends the optical test path setting completion notification (RESV) to the optical node device #1 via the optical node devices #3 and #2. Accordingly, the optical test path is set between the optical node devices #1 and #4.

Subsequently, the optical node device #1 receives an optical test signal (LIGHT) from the set upstream optical test path (Step 233), and measures the deterioration in the optical test signal from the optical node device #4 and reports the measurement result (RESULT) to the optical node device #4 (Step 234). Since no deterioration is detected in the optical test signal from the optical node device #4 (Step 235), the optical node device #1 sets an optical test path to the optical node device #5, which is four hops ahead of the optical node device #1 itself (Step 236 and Step 232). In FIG. 85, the optical node device #1 sends the optical test path setting request (PATH) to the optical node device #5 via the optical node devices #2, #3, and #4. When the optical node device #5 receives the optical test path setting request (PATH), it ensures the resources required for optical test path setting and sends the optical test path setting completion notification (RESV) to the optical node device #1 via the optical node devices #4, #3, and #2. Accordingly, the optical test path is set between the optical node devices #1 and #5.

Subsequently, the optical node device #1 receives an optical test signal (LIGHT) from the set upstream optical test path (Step 233), and measures the deterioration in the optical test signal from the optical node device #5 and reports the measurement result (RESULT) to the optical node device #5 (Step 234). Since no deterioration is detected in the optical test signal from the optical node device #5 (Step 235), the optical node device #1 sets an optical test path to the optical node device #6, which is five hops ahead of the optical node device #1 itself (Step 236 and Step 232). In FIG. 85, the optical node device #1 sends the optical test path setting request (PATH) to the optical node device #6 via the optical node devices #2, #3, #4, and #5. When the optical node device #6 receives the optical test path setting request (PATH), it ensures the resources required for optical test path setting and sends the optical test path setting completion notification (RESV) to the optical node device #1 via the optical node devices #5, #4, #3, and #2. Accordingly, the optical test path is set between the optical node devices #1 and #6.

Subsequently, the optical node device #1 receives an optical test signal (LIGHT) from the set upstream optical test path (Step 233), and measures the deterioration in the optical test signal from the optical node device #6 and reports the measurement result (RESULT) to the optical node device #6 (Step 234). Deterioration is detected in the optical test signal from the optical node device #6 (Step 235), so that the optical node device #1 recognizes that the section from the optical node device #1 itself to the optical node device #5, which is four hops ahead of the optical node device #1 itself is the 3R section (Step 237).

In the example of FIG. 85, when the optical node device #1 receives the optical test signal of the optical node devices #2 to #5 arriving from the upstream optical path, even if deterioration is not detected, the report is performed (RESULT). However, this report has only the role of ensuring reception confirmation of the optical test signal, so that this reporting procedure may be omitted.

In this way, in the twenty-eighth embodiment, it is possible to set the optical test path and recognize the 3R section. In the example of FIG. 85, all of the respective optical node devices #1 to #7 comprise a 3R section information collection unit 430. However the configuration may be such that for example every other optical node device comprises it. Moreover, in the present embodiment, in order to facilitate description, the optical test signal was sent to the optical node devices #2 and

3 which are not expected to require the 3R relay. However, the sending procedure of the optical test signal may be omitted with respect to these optical node devices #2 and #3. Alternatively, the optical test signal may be sent to only the optical node devices #5 and #6 which are expected to require the 3R relay.

Moreover, the 3R section information collection unit 430 stores the information of the optical node device for implementing the 3R relay recognized in this manner. Furthermore, the configuration may be such that the 3R section information collection unit 430 advertises the information of the optical node device for implementing the 3R relay recognized in this manner, to the other optical node devices, and receives the advertisement from the other optical node devices so as to store the information of the optical node device for implementing the 3R relay included in the advertisement together with the information of the optical node device for implementing the 3R relay recognized by the optical node device itself. Accordingly, the respective optical node devices can store the same 3R section information.

Alternatively, the 3R section information collection unit 430 notifies the information of the optical node device for implementing the 3R relay recognized by the optical node device itself to the network control device 410 shown in FIG. 64, so that the network control device 410 can store the 3R section information of the whole optical network. Then, the respective optical node devices request the network control device 410 to provide the 3R section information required by the optical node devices themselves and obtain it as necessary, prior to the optical path setting, so that the amount of the 3R section information stored in the respective optical node devices can be reduced.

Such a network control device 410 comprises a database comprising: a function for receiving the information of the optical node device which implements the 3R relay from an optical node device constituting the optical network and updating the 3R section information stored up to now; and a function for providing a part of or all of the 3R section information stored according to a request from the optical node device, to this optical node device.

Twenty-ninth Embodiment

Since the basic concept of the twenty-ninth embodiment is similar to that of the twentieth embodiment, the optical node device of the present embodiment is described with reference to FIG. 60 to FIG. 63 used for the twentieth embodiment. However, as described below, the detailed operation in the units shown in FIG. 60 to FIG. 63 is different from that of the twentieth embodiment. FIG. 60 and FIG. 62 show concepts of 3R section information collection in the optical node devices according to the twenty-ninth embodiment. FIG. 61 and FIG. 63 are block diagrams of the optical node device according to the twenty-ninth embodiment.

As shown in FIG. 61, the optical node device according to the twenty-ninth embodiment comprises: a Q-value storing unit 234 which stores a value Q, preset for each link based on the optical signal deterioration characteristic in the link between the optical node device itself and the adjacent node; a P-value sending unit 232 which transmits an initial value P of the minuend value to the next-hop adjacent optical node device if the optical node device itself is the source node; a Q-value subtraction unit 235 which calculates (P−Q) or (P′− Q) if the optical node device itself receives the initial value P or a minuend value P' which has already been reduced from the initial value P, from the previous-hop adjacent optical node device; and a comparison unit 236 which compares the calculation result by this Q-value subtraction unit 235 with a threshold, then transmits the calculation result to the next-hop adjacent optical node device, if the calculation result is greater than the threshold, or recognizes that the optical node device itself is the 3R destination node using the optical node device that sent the initial value P of the minuend value as the 3R source node, if the calculation result is less than or equal to the threshold. The P-value sending unit 232 recognizes that the optical node device itself is the 3R destination node, and transmits the initial value P of the minuend value to the next-hop adjacent optical node device using the optical node device itself as the 3R source node, if the optical node device itself is not the destination node of the optical path on which the minuend value is transmitted.

Next is a description of the operation of the optical node device according to the twenty-ninth embodiment. The Q-value generation unit 233 generates a Q-value based on the result for the degree of optical signal deterioration of the link connected to the optical node device itself, with reference to a parameter table 240 and a degree of deterioration table 250. The Q-value is a constant which is determined in proportion to the degree of deterioration, and is provided for each link. Moreover, the Q-value is set with respect to the initial value P. For example, if the degree of deterioration of the optical signal of the optical node device itself is considered using the optical signal intensity and the light noise, in the case where the optical signal sent from the 3R source node is attenuated to half intensity and the error rate of the optical signal sent from the 3R source node is increased to double, the Q-value is set to 50 if the initial value P is 100.

This Q-value is subtracted at each time of passing through the optical node device, and it is found that the optical node device having the subtraction result less than or equal to the threshold is the 3R destination node. In this manner, it recognizes that the optical node device itself is the 3R destination node if the optical node device that sent the initial value P is used as the 3R source node, and stores the recognition result as the section information. Alternatively, by advertising this recognition result to other optical node devices or the network control device as well as storing the recognition result, the respective optical node devices can share the same 3R section information.

Furthermore, if it recognizes the optical node device itself to be the 3R destination node and not the destination node of the measured optical path, an initial value P is newly sent using the optical node device itself as the 3R source node.

In this manner, the 3R section information from the source node to the destination node can be collected. Moreover, the collection of the 3R section information can be performed in the process of optical path setting. That is, if the initial value P is loaded into the optical path setting request, the optical path setting procedure can be executed while determining whether or not the optical node device itself is the 3R destination node in the respective optical node devices which received the optical path setting request.

The twenty-ninth embodiment up to here is described on the assumption of a downstream optical path of the unidirectional optical path or the bi-directional optical path. The following is a description on the assumption of the upstream optical path of the bi-directional optical path with reference to FIG. 62 and FIG. 63.

As shown in FIG. 63, the optical node device according to the twenty-ninth embodiment comprises: a q-value storing unit 334 which stores a value q, preset for each link based on the optical signal deterioration characteristic in the link between the optical node device itself and the adjacent node; a p-value sending unit 332 which transmits an initial value p of the augend to the next-hop adjacent optical node device if the optical node device itself is the source node; a q-value addition unit 335 which calculates (p+q) or (p'+q) if the optical node device itself receives the initial value p or an augend value p', which has already been increased from the initial value p, from the previous-hop adjacent optical node device; and a comparison unit 336 which compares the calculation result by this q-value addition unit 335 with the threshold, then transmits the calculation result to the next-hop adjacent optical node device, if the calculation result is less than the threshold, or recognizes that the optical node device itself is the 3R source node using the optical node device that sent the initial value p of the augend as the 3R destination node on the upstream optical path, if calculation result is greater than or equal to the threshold. The p-value sending unit 332 recognizes that the optical node device itself is the 3R source node on the upstream optical path and transmits the initial value p of the augend to the next-hop adjacent optical node device using the optical node device itself as the 3R destination node on the upstream optical path, if the optical node device itself is not the destination node of the optical path on which the augend is transmitted.

Next is a description of the operation of the optical node device according to the twenty-ninth embodiment. The q-value generation unit 333 generates a q-value based on the result for the degree of optical signal deterioration of the link connected to the optical node device itself, with reference to the parameter table 240 and the degree of deterioration table 250. The q-value is a constant which is determined in proportion to the degree of deterioration, and is provided for each link. Moreover, the q-value is set similarly to the case of the Q-value of the downstream optical path.

This q-value is added at each time of passing through the optical node device, and it is found that the optical node device having the addition result greater than or equal to the threshold is the 3R source node on the upstream optical path. In this manner, it recognizes that the optical node device itself is the 3R source node if the optical node device that sent the initial value p is used as the 3R destination node on the upstream optical path, and stores the recognition result as the 3R section information. Alternatively, by advertising this recognition result to other optical node devices or the network control device as well as storing the recognition result, the respective optical node devices can share the same 3R section information.

Furthermore, if it recognizes that the optical node device itself is the 3R source node on the upstream optical path, and the optical node device itself is not the destination node of the measured optical path, then assuming that the optical node device itself is the 3R destination node on the upstream optical path, the initial value p is newly sent.

The p value is "0" in the twenty-ninth embodiment; however the p-value may be set in consideration of various conditions. For example, the length of the 3R section generated can be adjusted by the p-value within a range of the maximum length of the 3R section. That is, if the threshold is fixed, assuming that the p-value is a negative integer, the value capable of being added is increased more than in the case where the p-value is set to "0", enabling the 3R section to be set longer. Conversely, assuming that the p-value is a positive integer, the value capable of being added is decreased compared to the case where the p-value is set to "0", enabling the 3R section to be set shorter.

In this manner, the 3R section information from the source node to the destination node can be collected. Moreover, the collection of the 3R section information can be performed in the process of optical path setting. That is, if the initial value p is loaded into the optical path setting request, the optical path setting procedure can be executed while determining whether or not the optical node device itself is the 3R source node on the upstream optical path in the respective optical node devices which received the optical path setting request.

In the twenty-first to twenty-ninth embodiments, in order to facilitate description, the case on the assumption of the downstream optical path and the case on the assumption of the upstream optical path were separately described. However, in practice, by performing them at the same time, the 3R section information can be generated both on the upstream and downstream bi-directional optical paths at the same time.

INDUSTRIAL APPLICABILITY

The present invention is used in optical networks that switch optical signals. In particular, it relates to optical networks including optical node devices for implementing 3R relay. According to the present invention, it is possible to constitute an economical optical network by effectively using network resources by using the minimum number of, or minimum capacity of 3R repeaters.

The invention claimed is:
1. An optical node device that switches an optical signal, comprising:
  a requesting unit which is configured to request that a network control device provide the optical node device itself with 3R section information corresponding to topology information of an optical network to which the optical node device itself belongs, the network control device managing the optical network; and
  an acquiring unit which is configured to acquire the 3R section information, which is provided from the network control device,
  wherein the acquiring unit is provided with a unit which is configured to select and store at least a portion of information associated with the optical node device itself from the 3R section information acquired.

2. An optical node device that switches an optical signal, comprising:
  a requesting unit which is configured to request that a network control device provide the optical node device itself with 3R section information corresponding to topology information of an optical network to which the optical node device itself belongs, the network control device managing the optical network; and
  an acquiring unit which is configured to acquire the 3R section information, which is provided from the network control device,
  wherein a preset section in which data transmission is possible without 3R relay is defined as a 3R section, and the optical node device is further provided with
  a unit which is configured to store the 3R section information acquired by the acquiring unit, and to advertise the 3R section information to other optical node devices.

3. An optical node device that switches an optical signal, comprising:
  a requesting unit which is configured to request that a network control device provide the optical node device itself with 3R section information corresponding to topology information of an optical network to which the optical node device itself belongs, the network control device managing the optical network; and
  an acquiring unit which is configured to acquire the 3R section information, which is provided from the network control device, wherein a preset section in which data transmission is possible without 3R relay is defined as a 3R section, an optical node device, being a source of a setting request for an optical path, is defined as a source node, and an optical node device at an end point of the optical path is defined as a destination node, the requesting unit is configured to request the network control device for the 3R section information when the optical node device itself is a source node, and the optical node device is further provided with a unit which is configured to store the 3R section information acquired by the acquiring unit, and to transmit the 3R section information to other optical node devices contained in an optical path up to the destination node when the optical node device itself is used as the source node.

4. An optical node device that switches an optical signal, comprising:

a requesting unit which is configured to request that a network control device provide the optical node device itself with 3R section information corresponding to topology information of an optical network to which the optical node device itself belongs, the network control device managing the optical network; and an acquiring unit which is configured to acquire the 3R section information, which is provided from the network control device, wherein a preset section in which data transmission is possible without 3R relay is defined as a 3R section, an optical node device, being a source of a setting request for an optical path, is defined as a source node, and an optical node device at an end point of the optical path is defined as a destination node, the requesting unit is configured to request the network control device for the 3R section information when the optical node device itself is a source node, the optical node device is further provided with:

an advertising unit which is configured to store the 3R section information acquired by the acquiring unit, and to advertise the 3R section information to other optical node devices;

a determining unit which is configured to determine whether an advertisement by the advertising unit is associated with an optical path that passes through the optical node device itself;

a unit which is configured to discard the advertisement when a determination result of the determining unit indicates that the advertisement is not associated with the optical path that passes through the optical node device itself; and a unit which is configured to store contents of the advertisement when the determination result of the determining unit indicates that the advertisement is associated with the optical path which passes through the optical node device itself.

* * * * *